United States Patent [19]
Horiuchi et al.

[11] Patent Number: 5,638,216
[45] Date of Patent: Jun. 10, 1997

[54] ZOOM LENS

[75] Inventors: Akihisa Horiuchi; Hiroyuki Hamano; Akihiro Nishio, all of Kanagawa-ken; Yasunori Murata, Tokyo, all of Japan

[73] Assignee: Canon Kabushiki Kaisha, Tokyo, Japan

[21] Appl. No.: 208,498

[22] Filed: Mar. 10, 1994

Related U.S. Application Data

[63] Continuation of Ser. No. 934,253, Aug. 25, 1992, abandoned.

[30] Foreign Application Priority Data

| Aug. 30, 1991 | [JP] | Japan | 3-220151 |
| Sep. 8, 1991 | [JP] | Japan | 3-222888 |
| Sep. 26, 1991 | [JP] | Japan | 3-247453 |
| Sep. 30, 1991 | [JP] | Japan | 3-278793 |
| Jul. 8, 1992 | [JP] | Japan | 4-181100 |

[51] Int. Cl.$^6$ ............................................. G02B 15/14
[52] U.S. Cl. .......................... 359/683; 359/684; 359/687
[58] Field of Search ............................ 359/687, 684, 359/677, 683, 676

[56] References Cited

U.S. PATENT DOCUMENTS

| 4,657,351 | 4/1987 | Mori | 359/687 |
| 4,859,042 | 8/1989 | Tanaka | 359/687 |
| 5,009,492 | 4/1991 | Hamano | 350/687 |
| 5,134,524 | 7/1992 | Hamano et al. | 359/687 |
| 5,138,492 | 8/1992 | Hamano et al. | 359/684 |
| 5,233,471 | 8/1993 | Nakamura et al. | 359/687 |
| 5,353,157 | 10/1994 | Horiuchi | 359/687 |

FOREIGN PATENT DOCUMENTS

| 62-24213 | 2/1987 | Japan. |
| 0401862A3 | 12/1990 | Japan. |

*Primary Examiner*—Scott J. Sugarman
*Attorney, Agent, or Firm*—Fitzpatrick, Cella, Harper & Scinto

[57] ABSTRACT

A zoom lens includes, from front to rear, a first lens unit of positive refractive power, a second lens unit of negative refractive power, a third lens unit of positive refractive power and a fourth lens unit of positive refractive power, zooming being performed by moving the second and fourth lens units, and focusing being performed by moving the fourth lens unit, wherein the second lens unit is constructed from three single lenses, i.e., from front to rear, a negative first lens having a strong concave surface facing the image side, a negative second lens of bi-concave form and a positive third lens having a strong convex surface facing the object side.

34 Claims, 79 Drawing Sheets

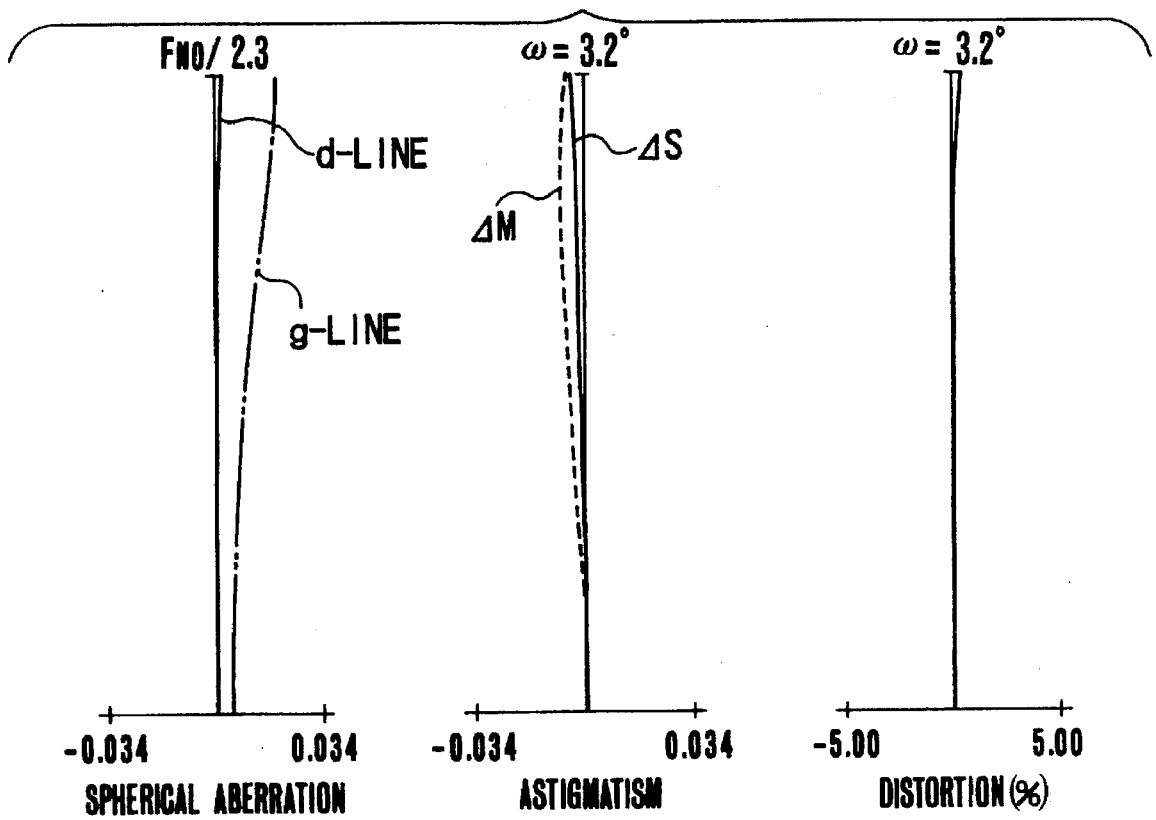

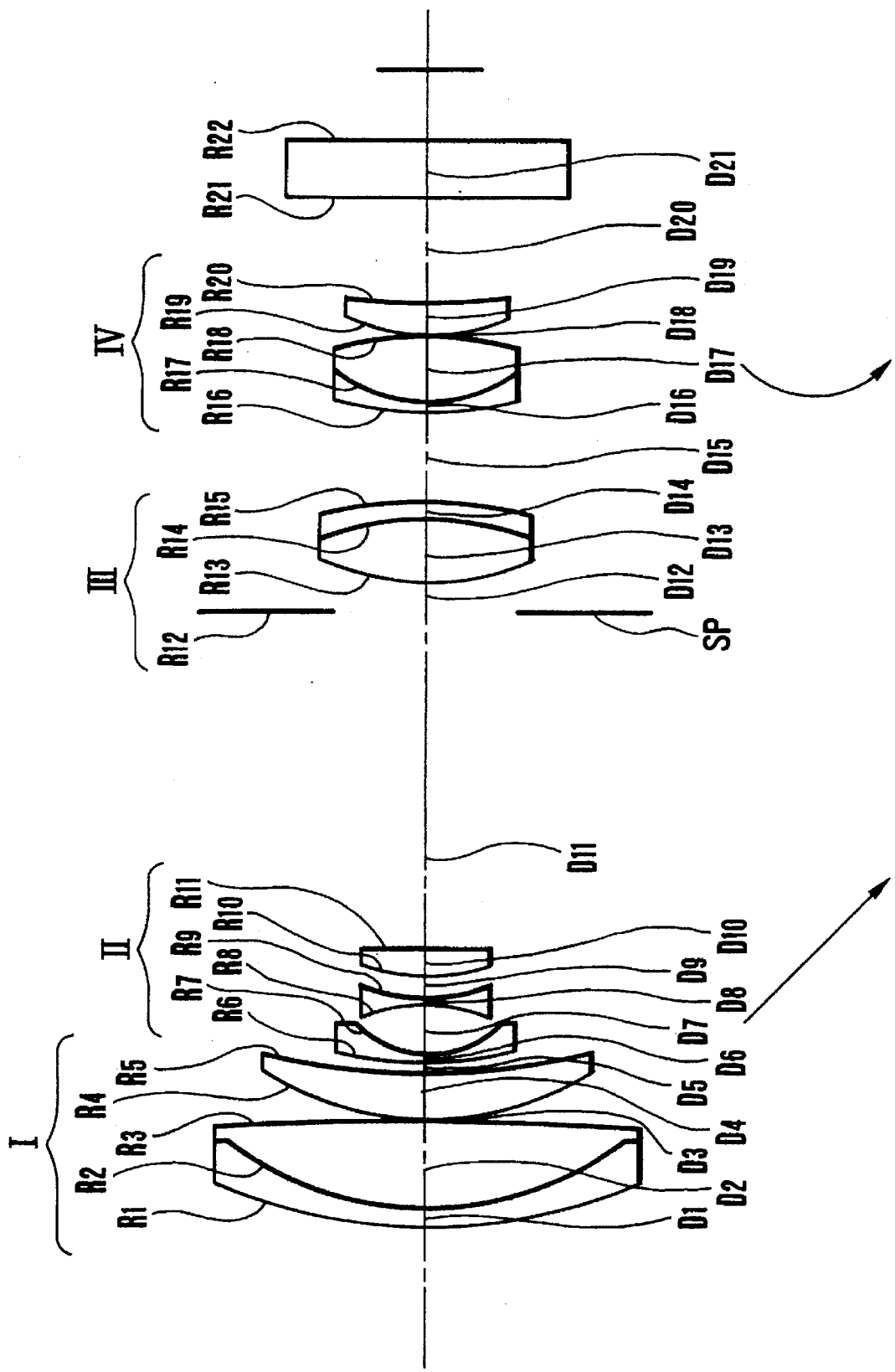

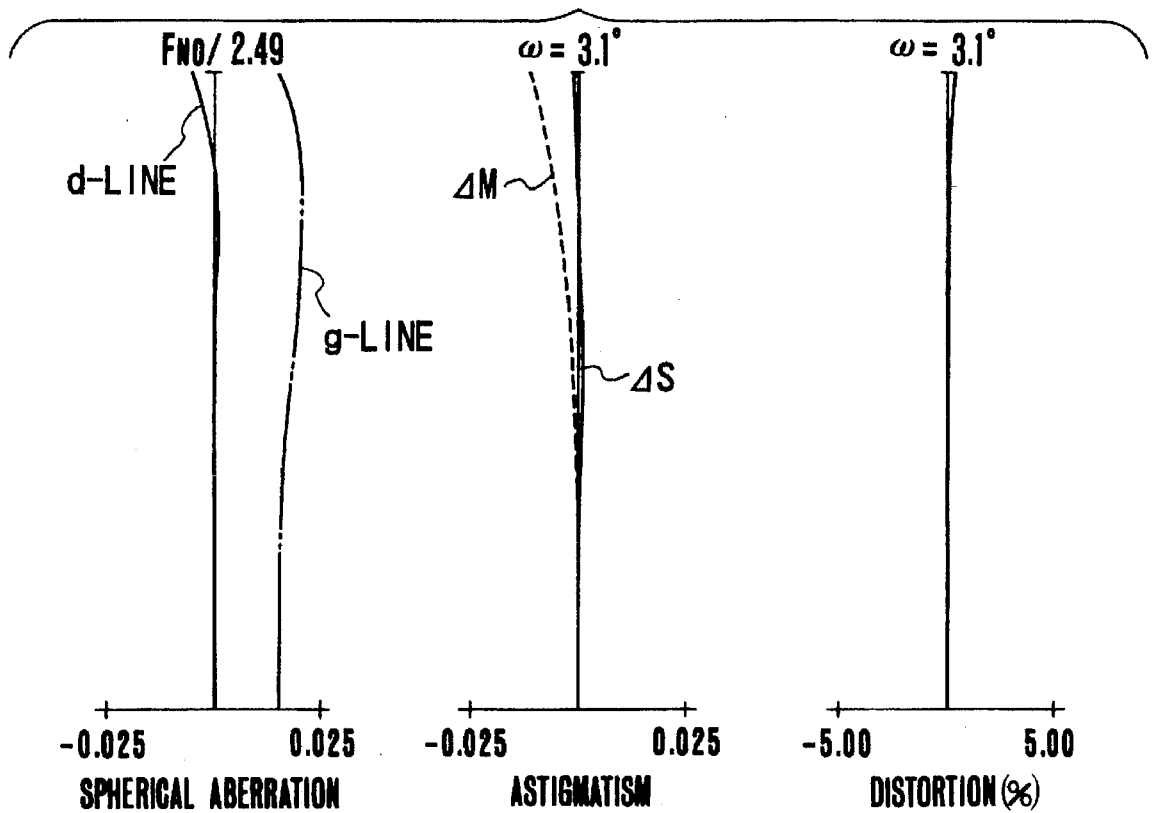

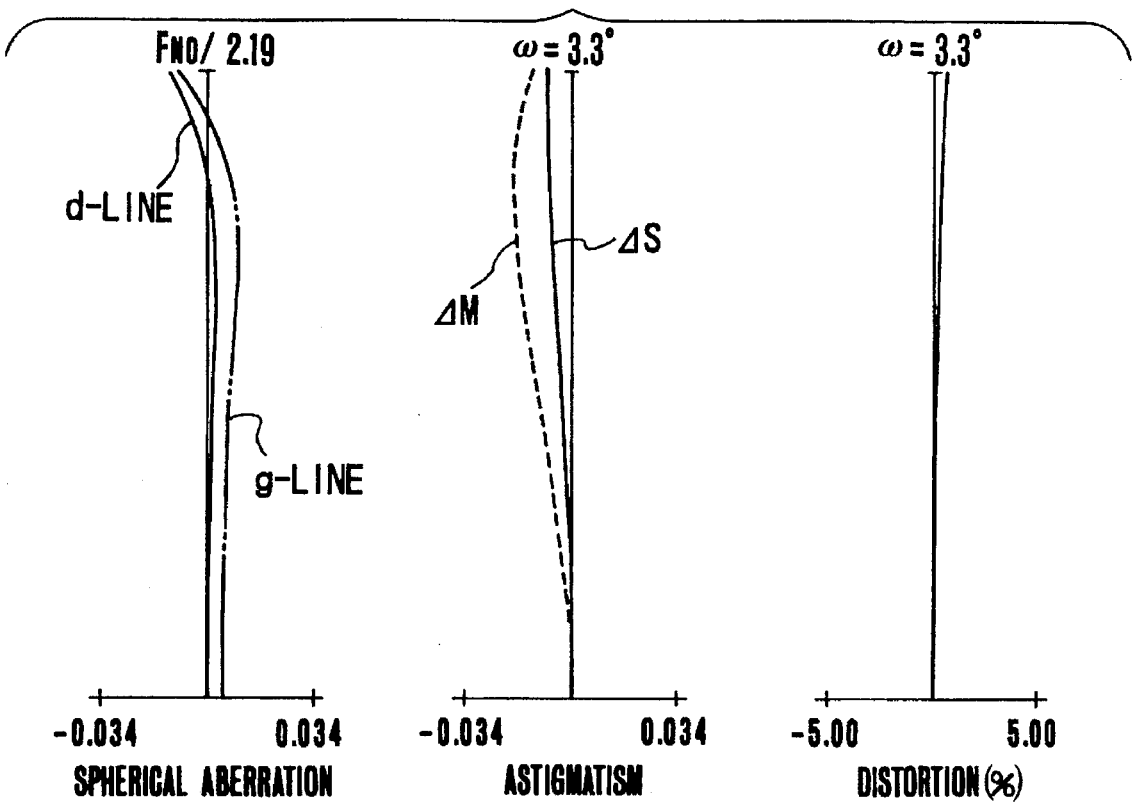

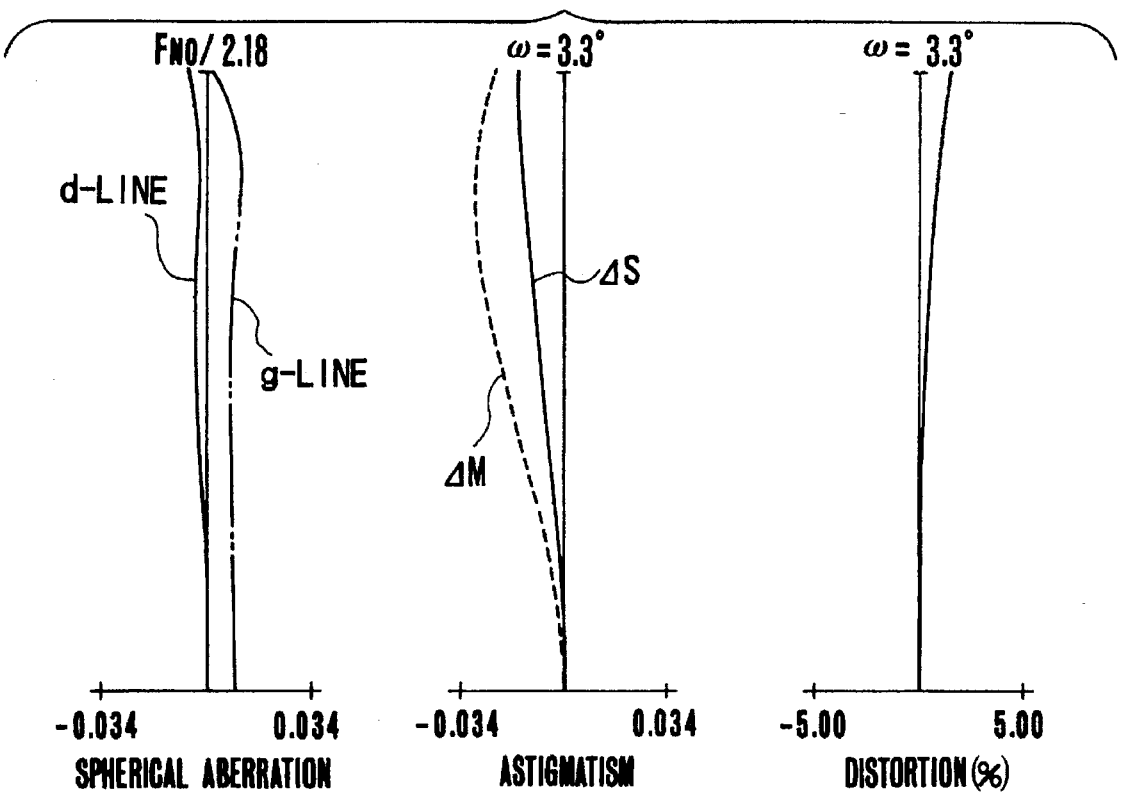

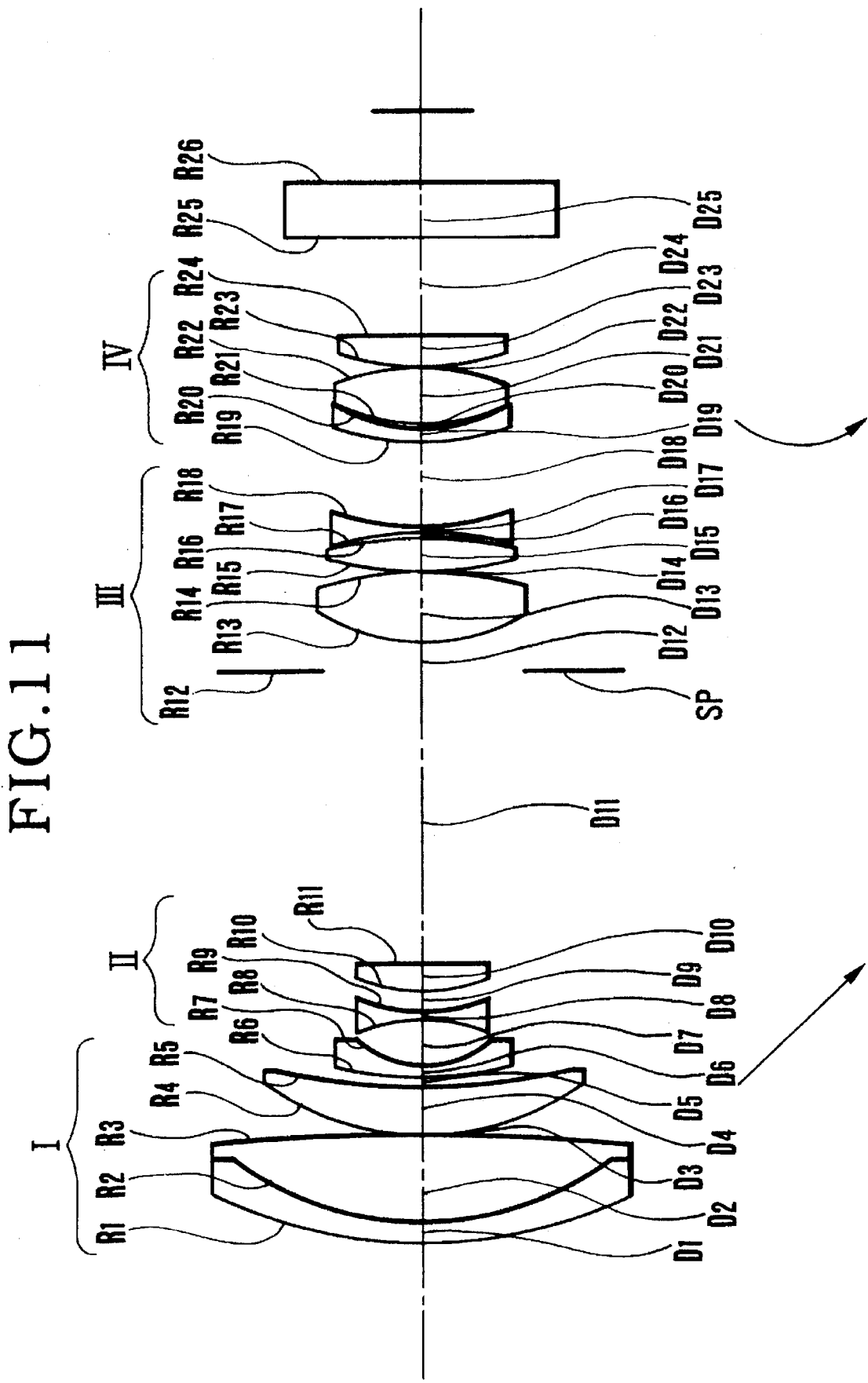

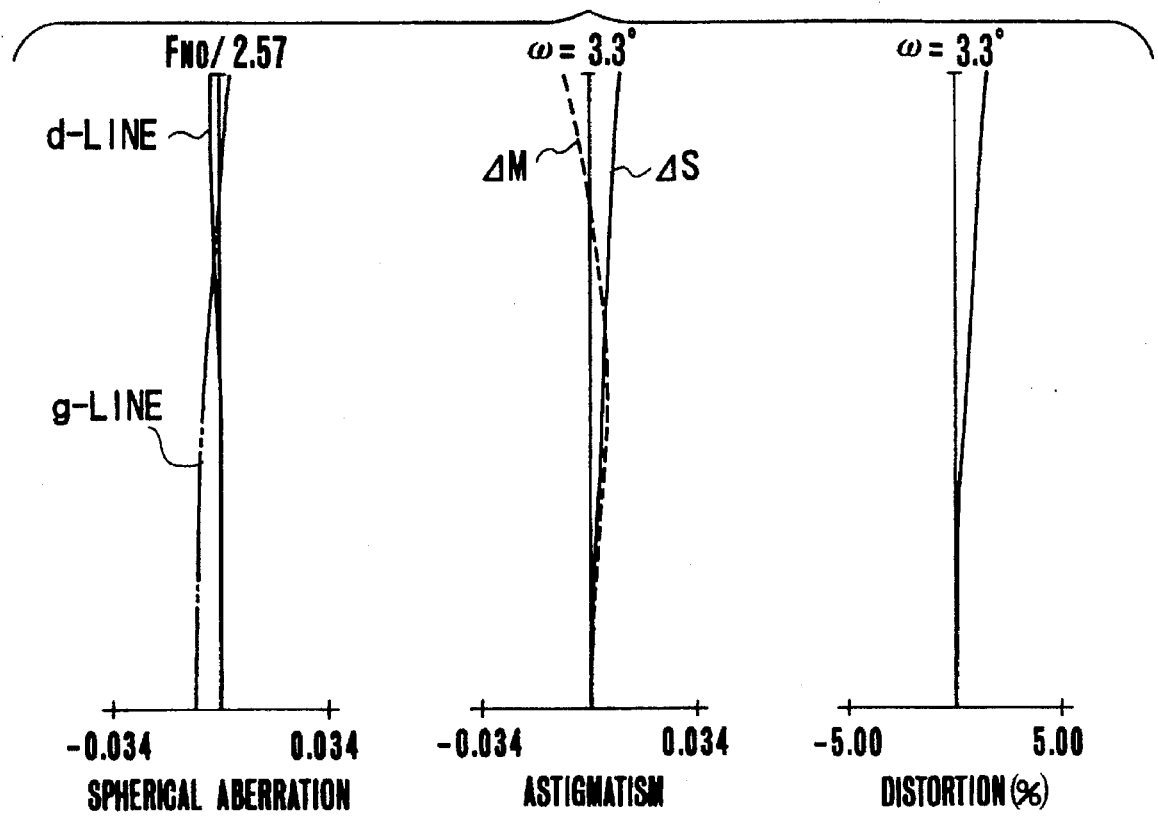

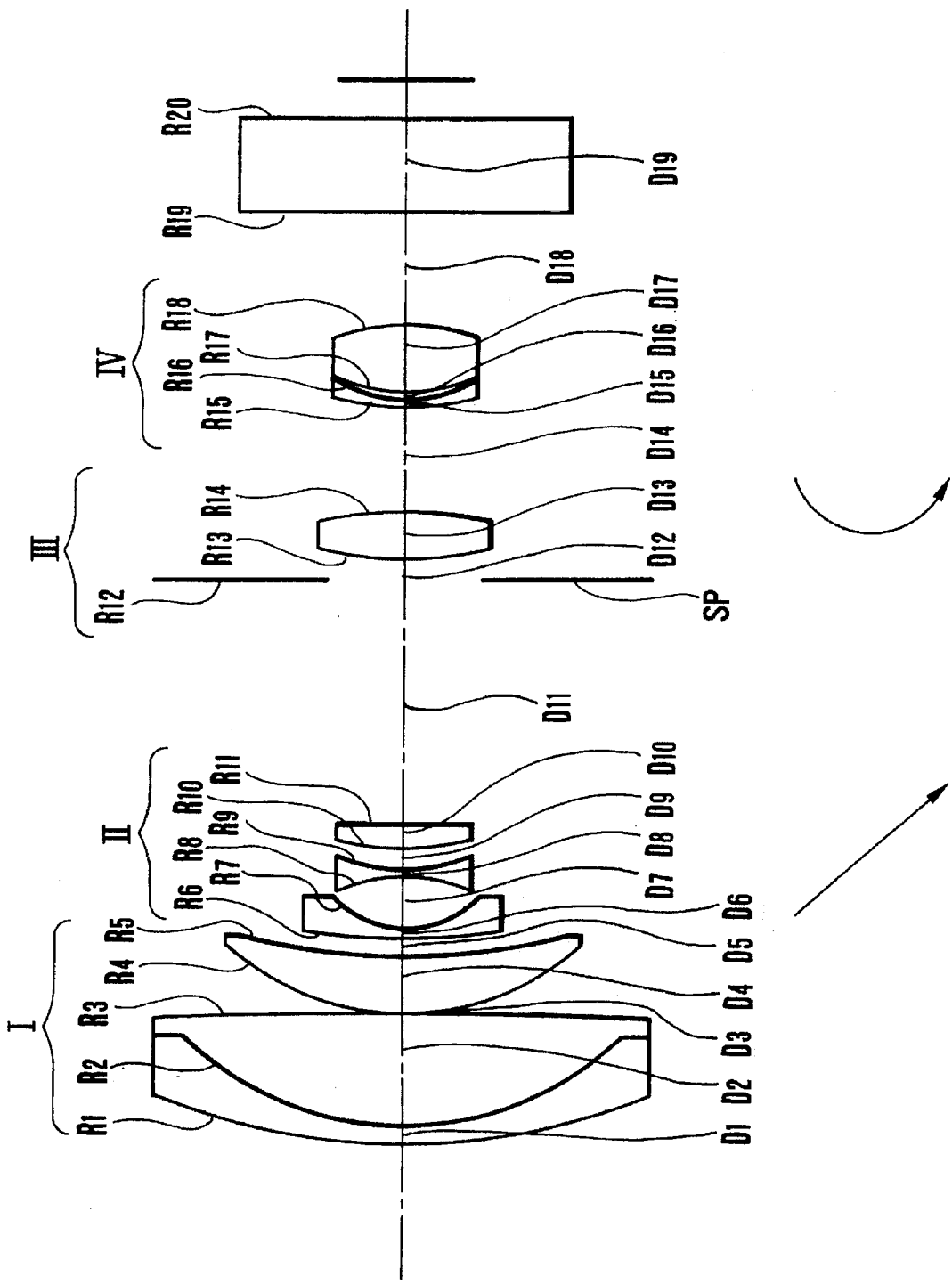

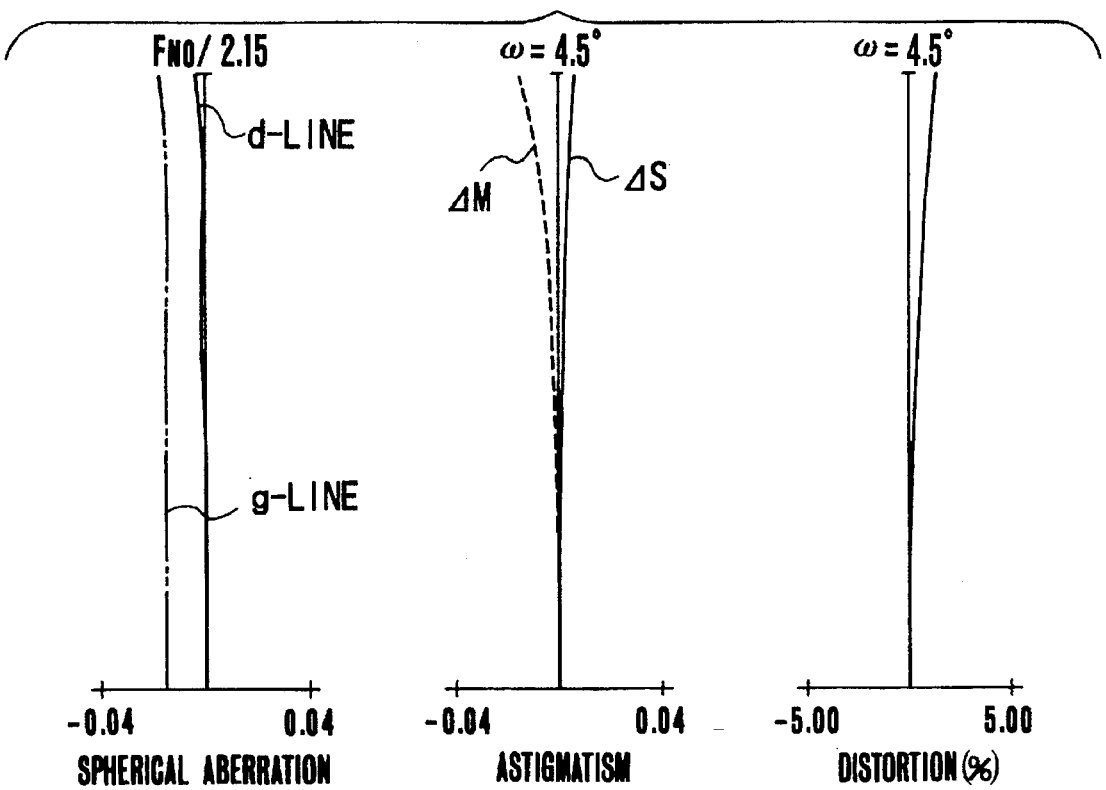
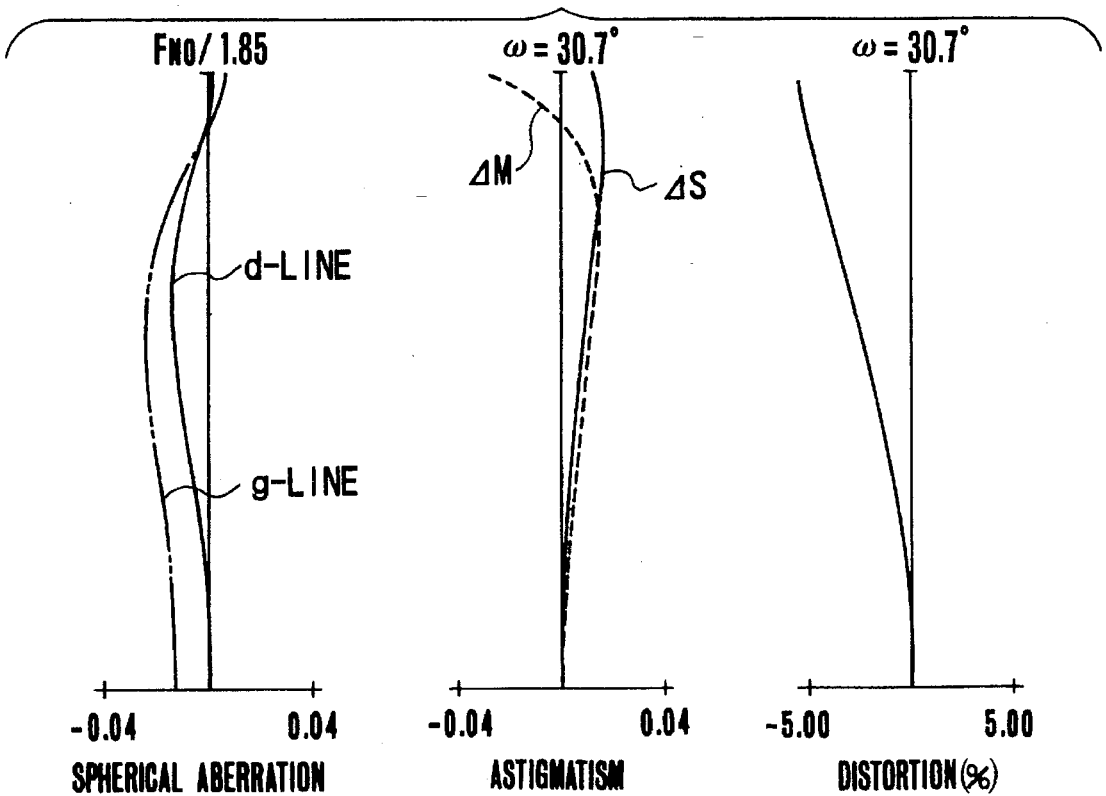

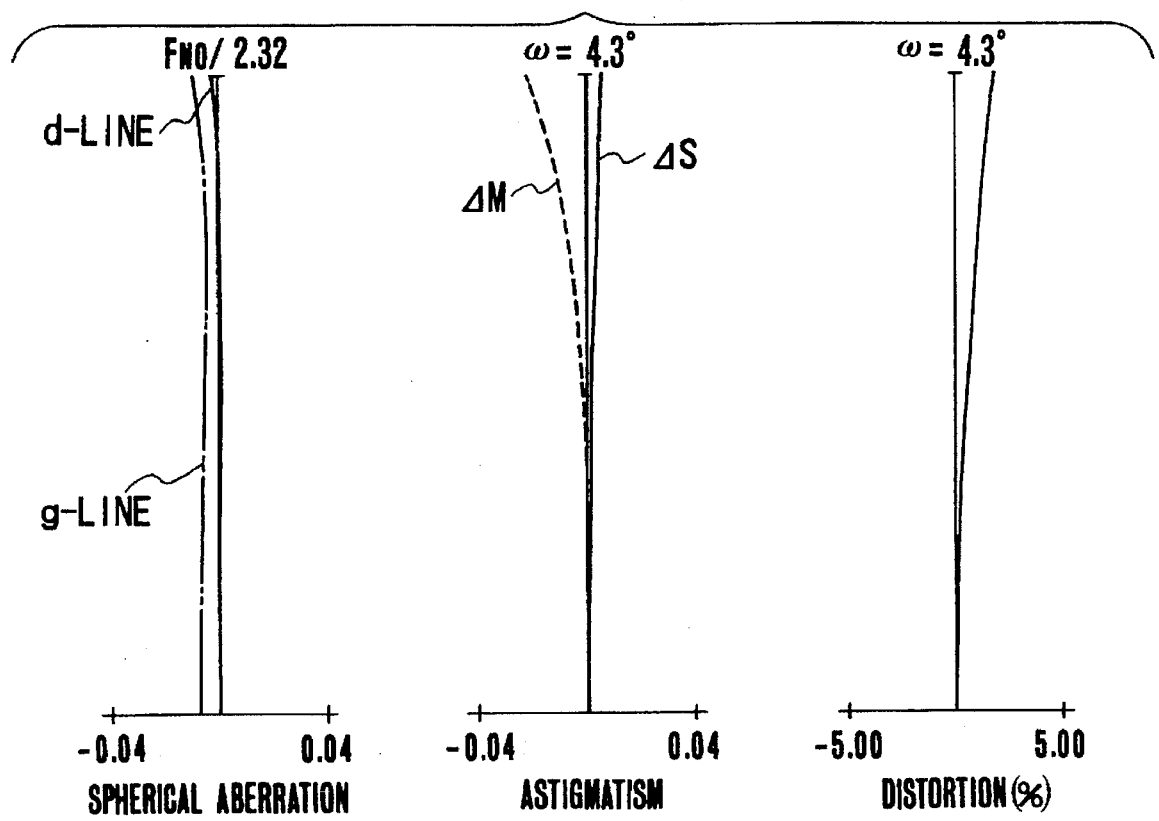

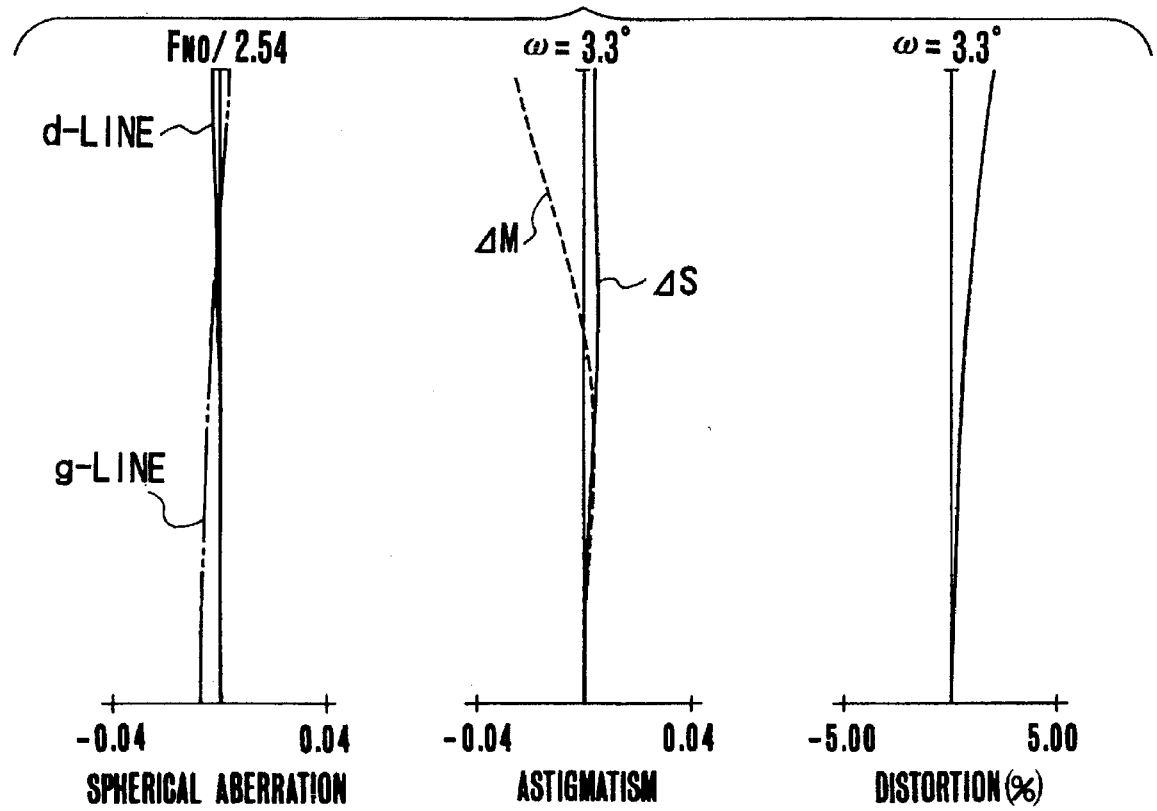

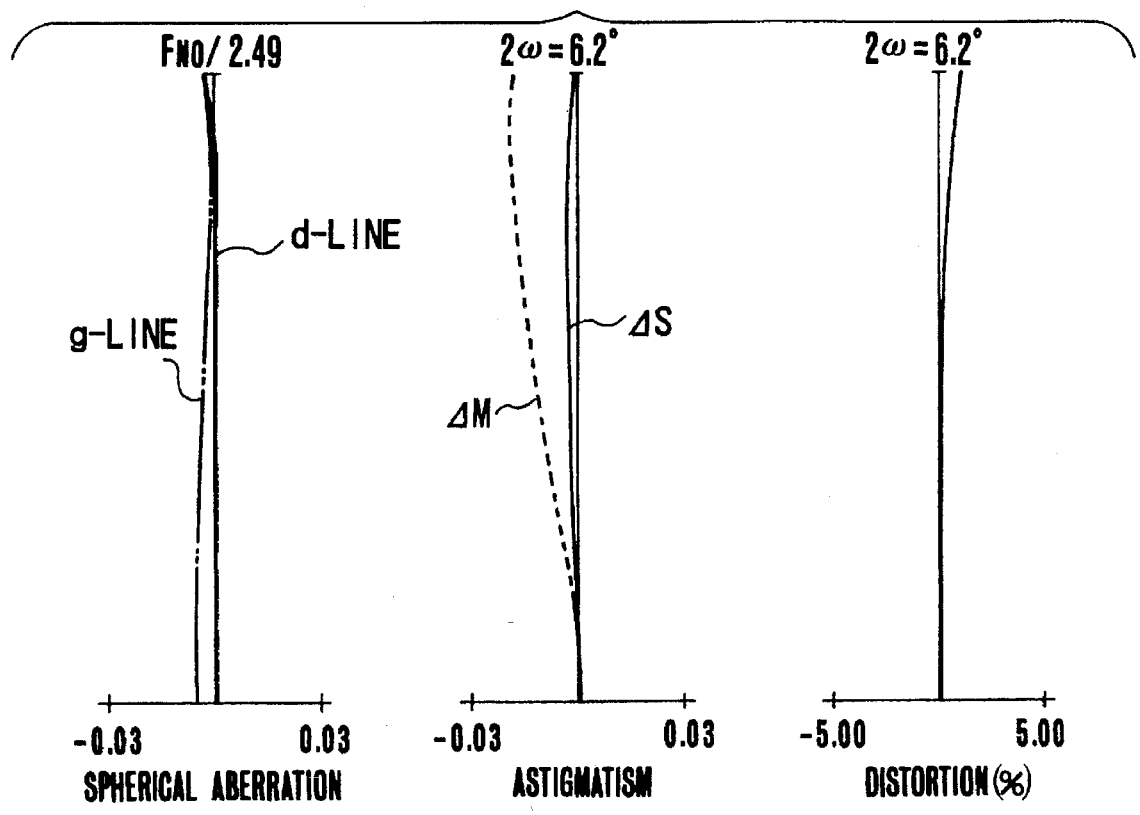

ZOOM LENS

This application is a continuation of application Ser. No. 07/934,253 filed Aug. 25, 1992, now abandoned.

BACKGROUND OF THE INVENTION

1. Field of the Invention

This invention relates to zoom lenses having a range of 8–10 and an F-number of 1.4–2.0 or thereabout for use in video cameras or photographic cameras and, more particularly, to rear focus type zoom lenses of compact form while still getting a high zoom ratio and a large relative aperture.

2. Description of the Related Art

In zoom lenses for use in video cameras or photographic cameras, it has been known to make the focusing provision in a lens unit other than the first lens unit, when counted from the object side, and a wide variety of zoom lenses employing the so-called rear focus method have been proposed. The rear focus type zoom lenses, because of their focusing lens units being relatively small in size and light in weight, generally have the advantages that a weak driving power suffices for moving the focusing lens unit and that a rapid focus adjustment becomes possible.

Japanese Laid-Open Patent application No. Sho 62-24213, for example, proposes a rear focus type of zoom lens comprising, from front to rear, a first lens unit of positive refractive power, a second lens unit of negative refractive power for varying the focal length, a third lens unit of positive refractive power and a fourth lens unit of positive refractive power, totaling four lens units, wherein the first and third lens units remain stationary, the second lens unit moves to vary the focal length, the fourth lens unit moves to compensate for the shift of an image plane resulting from the variation of the focal length, and a focusing is performed by moving the fourth lens unit.

By the way, in view of the embodiments of this reference, the second lens unit, which has the function of varying the focal length, is constructed from, in order from the object side, a negative single lens of meniscus form convex toward the object side and a cemented lens consisting of a negative lens of bi-concave form and a positive lens. This cemented lens chiefly corrects longitudinal chromatic aberration, spherical aberration and off-axial aberrations. Also, the distortion varies with zooming to as large an extent as 9–12%. Particularly at the wide-angle end, it reaches 5% or above in most cases.

In the above-described rear focus type of zoom lens, if a further reduction of the bulk and size and a valuable increase of the zoom ratio are aimed by strengthening the refractive power of the second lens unit, the burden of aberration correction on the cemented surface in the second lens unit becomes too large. It is, therefore, difficult to realize high performance throughout the entire zooming range.

The increase of the refractive power of the second lens unit calls for a smaller curvature of each of the surfaces of the lenses constituting the second lens unit, giving rise to additional problems on an aberration correction and an increase of the production cost.

SUMMARY OF THE INVENTION

The present invention is concerned with a technique of improving the above-described zoom lens of the rear focus type. Its object is to achieve a further increase of the performance and a further reduction of the bulk and size of the large relative aperture, high range zoom lens.

According to the invention, a zoom lens has four lens units of which the first lens unit, when counted from the object side, is of positive refractive power, the second lens unit is of negative refractive power, the third lens unit is of positive refractive power, and the fourth lens unit is of positive refractive power, the first and third lens units remaining stationary, the second lens unit being arranged to move to vary the focal length, the fourth lens being arranged to move to compensate for the image shift resulting from the variation of the focal length, and a focusing being performed by moving the fourth lens unit, wherein the second lens unit is constructed from three single lenses of which the first, when counted from the object side, is a negative lens having a strong concave surface facing the image side, the second is a bi-concave lens and the third is a positive lens having a strong convex surface facing the object side.

BRIEF DESCRIPTION OF THE DRAWINGS

FIGS. 2(A), 2(B) and 2(C) are graphic representations of the various aberrations of the numerical example 1.

FIG. 3 is a longitudinal section view of a numerical example 2 of a zoom lens of the invention.

FIGS. 6(A), 6(B) and 6(C) are graphic representations of the various aberrations of the numerical example 5.

FIGS. 8(A), 8(B) and 8(C) are graphic representations of the various aberrations of the numerical example 4.

FIGS. 10(A), 10(B) and 10(C) are graphic representations of the various aberrations of the numerical example 5.

FIG. 11 is a longitudinal section view of a numerical example 6 of a zoom lens of the invention.

FIGS. 20(A), 20(B) and 20(C) are graphic representations of the various aberrations of the numerical example 10.

FIG. 25 is a longitudinal section view of a numerical example 13 of a zoom lens of the invention.

FIGS. 26(A), 26(B) and 26(C) are graphic representations of the various aberrations of the numerical example 13.

FIGS. 27(A), 27(B) and 27(C) are graphic representations of the various aberrations of a numerical example 14.

FIGS. 30(A), 30(B) and 30(C) are graphic representations of the various aberrations of a numerical example 17.

FIGS. 37(A), 37(B) and 37(C) are graphic representations of the various aberrations of the numerical example 22.

FIGS. 45(A), 45(B) and 45(C) are graphic representations of the various aberrations of the numerical example 27.

DETAILED DESCRIPTION OF THE PREFERRED EMBODIMENTS

Figure 1:
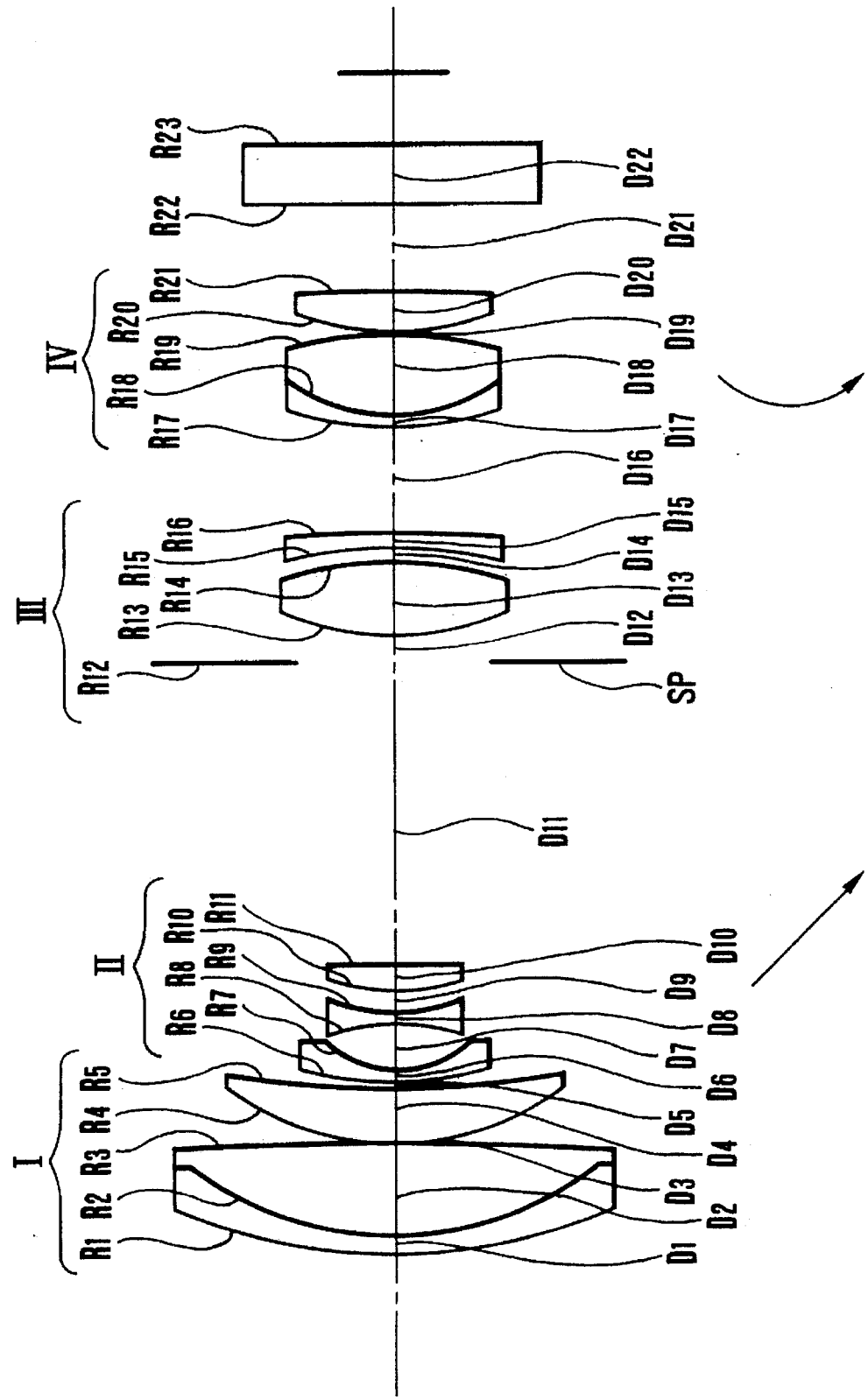
FIG. 1 is a longitudinal section view of a numerical example 1 of a zoom lens of the invention.
Figure 2A:
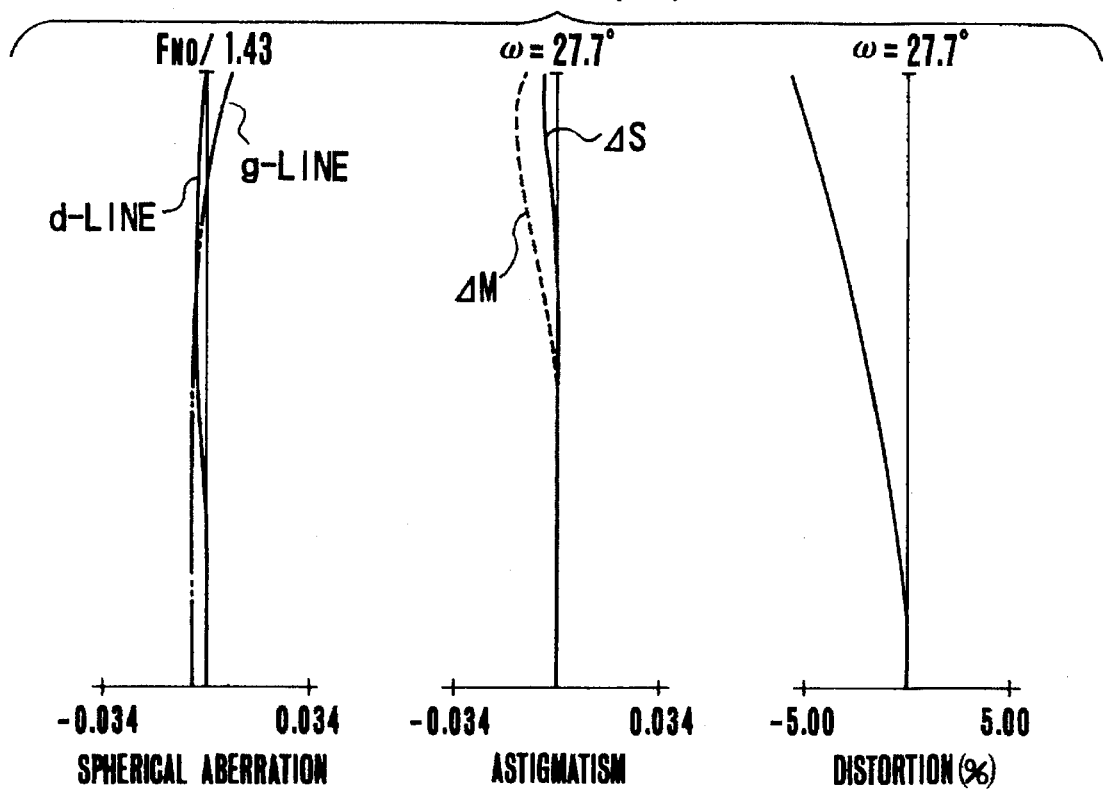
Figure 2B:
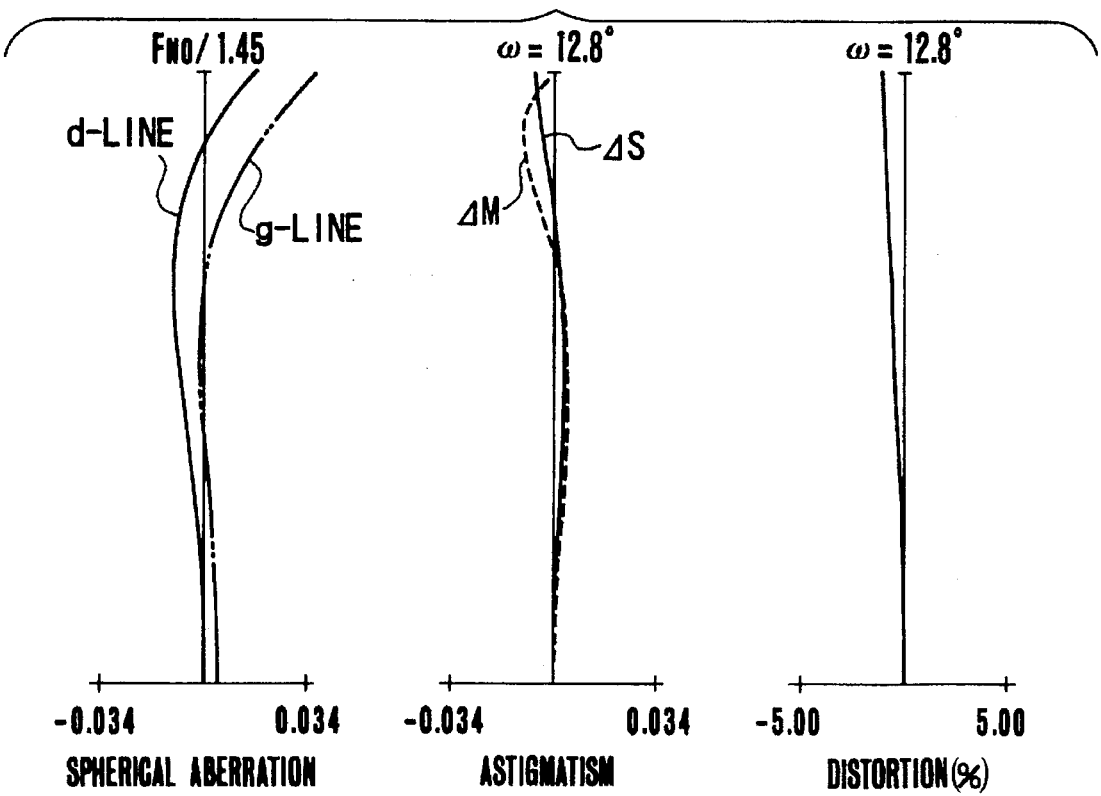
Figure 4A:
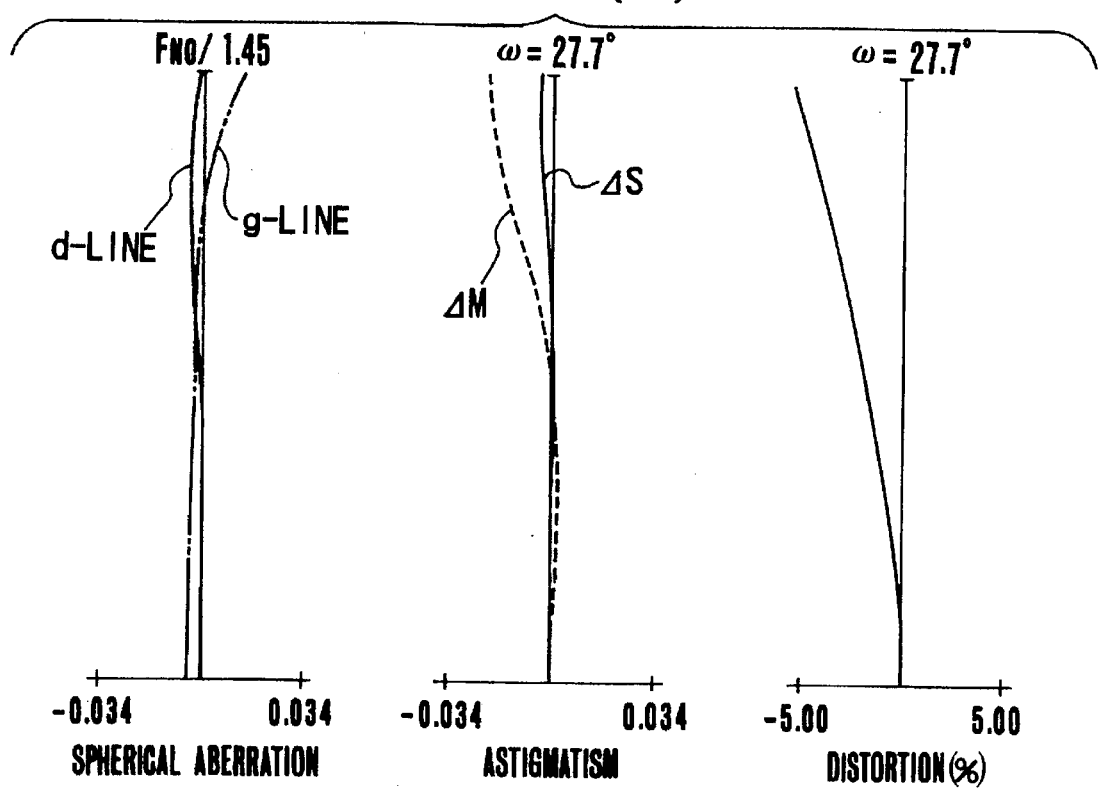
FIGS. 4(A), 4(B) and 4(C) are graphic representations of the various aberrations of the numerical example 2.
Figure 4B:
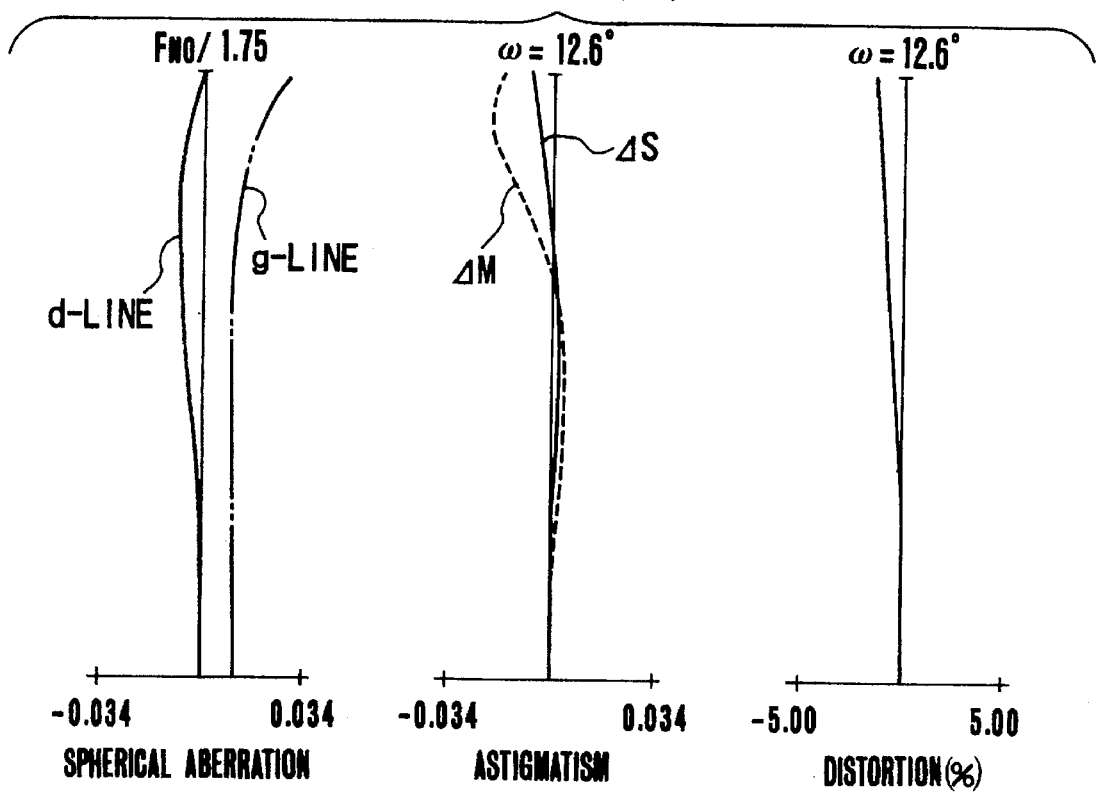
Figure 4C:
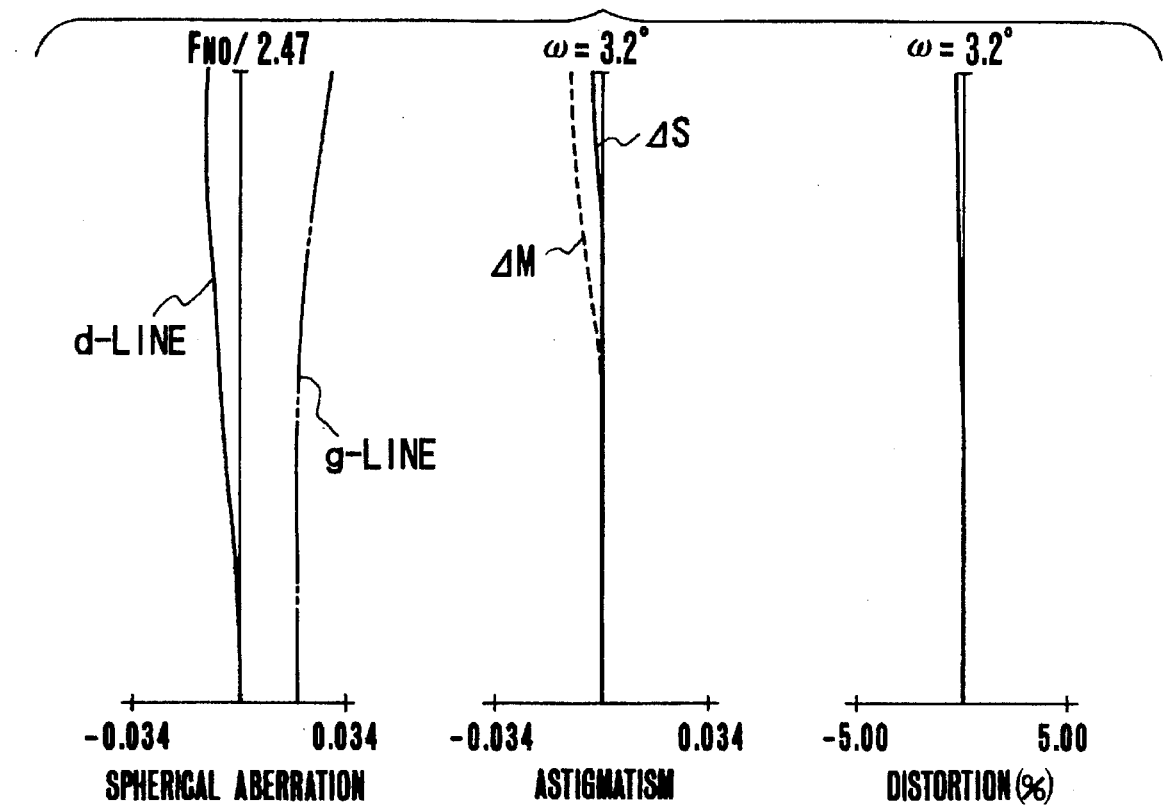

The zoom lens of the rear focus type of the invention is next described by reference to the drawings.

FIGS. 1, 3, 5, 7, 9, 11, 13, 15, 17, 19, 21, 23, 25, 31, 36, 38, 40, 44, 48 and 50 in the longitudinal section view show respective zoom lenses of the rear focus type of the invention. Reference character I denotes a first lens unit having a positive refractive power; II a second lens unit having a negative refractive power; III a third lens unit having a positive refractive power; IV a fourth lens unit having a positive refractive power. Zooming from the wide-angle end to the telephoto end is performed by axially moving the second and fourth lens units II and IV in the loci indicated by arrows. Further, focusing is performed by moving the fourth lens unit. Incidentally, the first and third lens units always remain stationary. SP denotes a stop.

Thus, the zoom lenses of the rear focus type having as high a zoom ratio as 8 to 10 or thereabout are attained. In the invention, while giving such a high zoom ratio, it has, despite a lesser number of lens elements, to obtain a good optical performance as the variation of aberrations is reduced. For this purpose, the second lens unit is constructed from three single lenses, of which the first, when counted from the object side, is a negative lens having a strong concave surface facing the image side, the second is a negative lens of bi-concave form and the third is a positive lens having a strong convex surface facing the object side.

In the invention, by such a construction and arrangement of the constituent parts of the second lens unit, it becomes possible to minimize the varied amount of, in particular, distortion during zooming. In many conventional popular zoom lenses, the distortion exceeds 5% in the wide-angle end, and reaches around +5% in the telephoto end. In the invention, it becomes possible that, in the wide-angle end, the distortion is put below −5% and, in the telephoto end, sharply falls off to below +3%.

Further, because the front principal point of the second lens unit can be put to a more forward position, its interval from the principal point of the first lens unit can be shortened. It is also possible for the first lens unit to take its place closer to the stop. Accordingly, the height of incidence of the off-axial light beam on the first lens unit from the optical axis is lowered. So, the diameter of the first lens unit can be reduced. Owing to the above arrangement, a shortening of the total length of the entire lens, a minimization of the bulk and size and a reduction of the weight can be achieved.

In the invention, each of the second negative lens and the positive third lens in the second lens unit is constructed in the form of a single lens, thereby giving an air lens that can function to correct aberrations. This favors correction of spherical aberration, coma and longitudinal chromatic aberration. Further, for the on-axial light ray traveling the second lens unit, after having emerged from the second negative lens, it enters the positive third lens at a higher height from the optical axis than when the cemented type is used as is common in the prior art. Therefore, the positive third lens gets too strong an effect of correcting aberrations. This leads to a possibility of so much loosening of the curvature of the front surface of the positive third lens, the curvature of the rear surface of the first negative lens and the curvatures of both surfaces of the second negative lens. By this arrangement, the thickness of the positive third lens can be thinned and the production cost can be lowered.

In such a zoom type, in order to achieve further advances in the compact form and the zoom ratio, the refractive power of the second lens unit may be strengthened. In this case, the curvatures of the lenses constituting the second lens unit must be made small. With this arrangement, however, higher order aberrations are produced. Also, variation of aberrations with zooming increases objectionably. As a countermeasure to this, in the present embodiment, the mean value $\bar{N}_{IIU}$ of the refractive indices of the two negative lenses constituting part of the second lens unit is set to be not less than 1.60.

By the way, as has been described before, the spacing between the negative second lens and the positive third lens in the second lens unit acts as an air lens on correction of aberrations. For this air spacing $D_{II4}$, letting the focal length of the second lens unit be denoted by $f_2$, the following condition is then set forth:

$$0.10 < |D_{II4}/f_2| < 0.83$$

When this condition is satisfied, improved results of correction of longitudinal chromatic aberration and coma are attained.

Here, when the lower limit of this condition is exceeded, inward coma, in particular, comes to be produced. Meanwhile, when the upper limit is exceeded, conversely, outward coma comes to be produced and the tendency to under-correct longitudinal chromatic aberration is intensified. So, it is no good.

Further, as has been described before, the rear surface of the first negative lens in the second lens unit and the front surface of the second negative lens may have gentler curvatures $R_{II2}$ and $R_{II3}$, respectively. To achieve a further improvement of the aberration correction for a higher performance, it is then desirable to satisfy the following condition:

$$0.42 < (1/R_{II3} - 1/R_{II2})f_2 < 1.89$$

When the lower limit is exceeded, the distortion in the wide-angle end tends to be of the barrel type. Meanwhile, when the upper limit is exceeded, the distortion in the telephoto end tends to conversely be of the pincushion type.

Now, it is also preferable that, particularly for correction of the image surface, the difference between the refractive indices $N_1$ and $N_2$ of the first and second negative lenses, respectively, of the second lens unit is small. So, it is desirable to suppress $|N_1 - N_2|$ to below 0.22 or thereabout.

Next, specific embodiments are described by reference to numerical examples and the corresponding drawings thereto.

FIG. 1 is a view of the construction and arrangement of a numerical example 1 of the invention. In order from the object side, the first lens unit of positive refractive power is constructed from a negative meniscus lens convex toward the object side, a positive lens cemented thereto, and a positive meniscus lens convex toward the object side. The second lens unit of negative refractive power is constructed from a negative meniscus lens having a strong concave surface facing the image side, a bi-concave lens and a positive meniscus lens having a strong convex surface facing the object side. The third lens unit of positive refractive power is constructed from a bi-convex lens and a negative meniscus lens concave toward the object side. The fourth lens unit of positive refractive power is constructed from a negative meniscus lens convex toward the object side, a bi-convex lens cemented thereto and a positive lens having a strong convex surface facing the object side. The frontmost surface in the third lens unit is formed to an aspheric shape.

In this example, $\bar{N}_{IIU} = 1.73$, $|D_{II4}/f_2| = 0.171$, $(1/R_{II3} - 1/R_{II2})f_2 = 1.509$ FIG. 3 in longitudinal section view shows a numerical example 2 of the invention. In order from the object side, the first lens unit of positive refractive power is similar in construction and arrangement to the numerical example 1. The negative lens unit of negative refractive power is constructed from a negative meniscus lens having a strong concave surface facing the image side, a bi-concave lens and a bi-convex lens having a strong convex surface facing the object side. The third lens unit of positive refractive power is constructed from a bi-convex lens and a negative meniscus lens convex toward the image side cemented thereto. The fourth lens unit of positive refractive power is constructed from a negative meniscus lens convex toward the object side, a bi-convex lens cemented thereto and a positive meniscus lens convex toward the object side. The frontmost surface in the third lens unit is formed to an aspheric shape.

Figure 5:
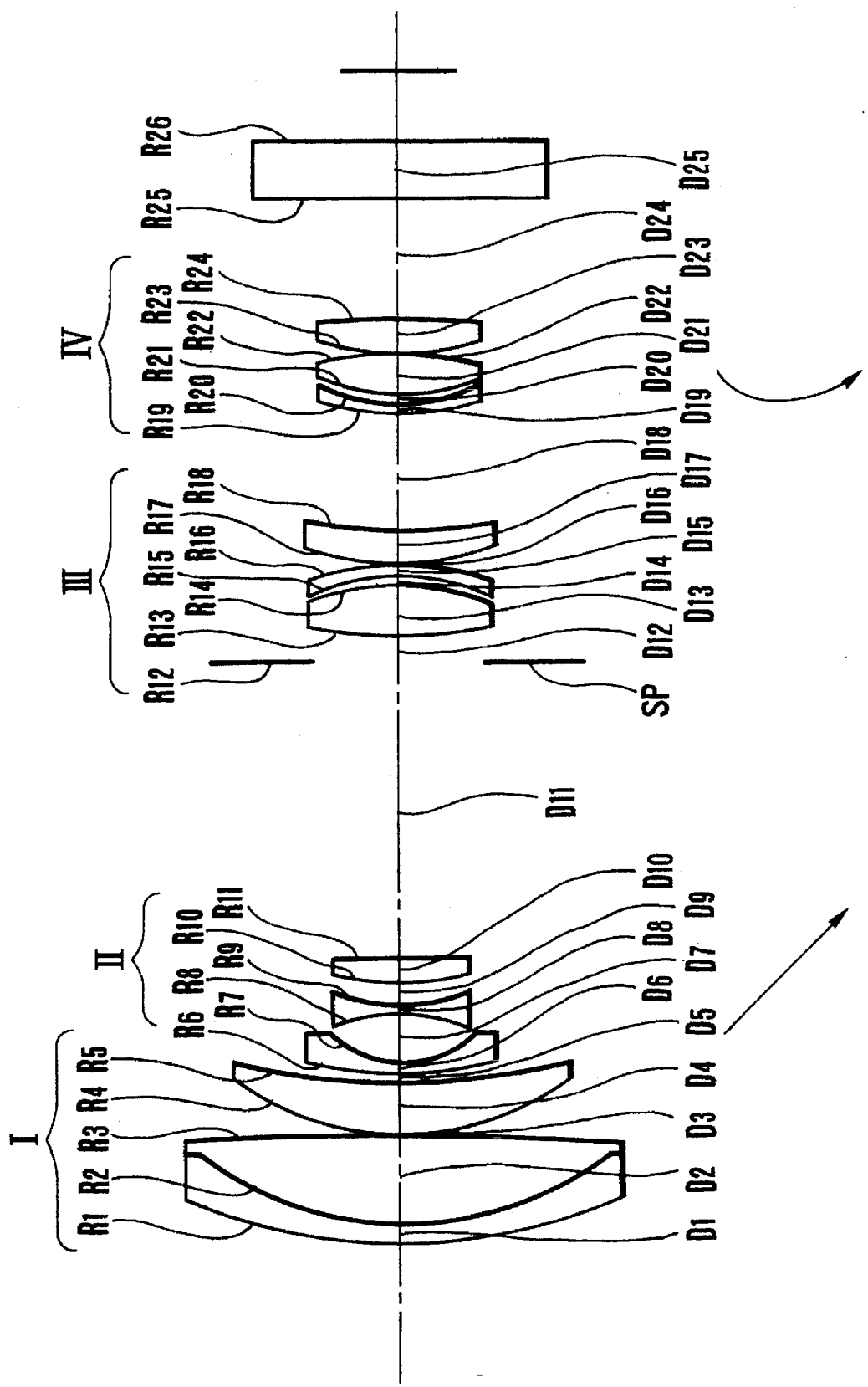
FIG. 5 is a longitudinal section view of a numerical example 3 of a zoom lens of the invention.
Figure 6A:
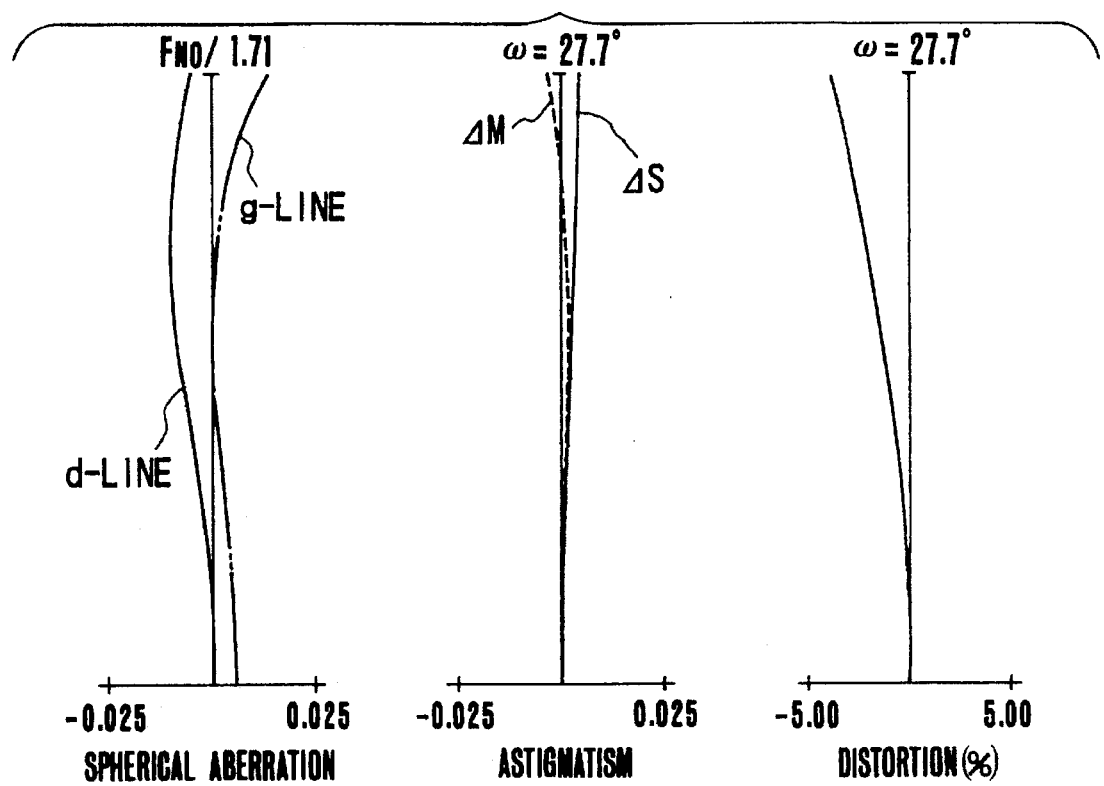
Figure 6B:
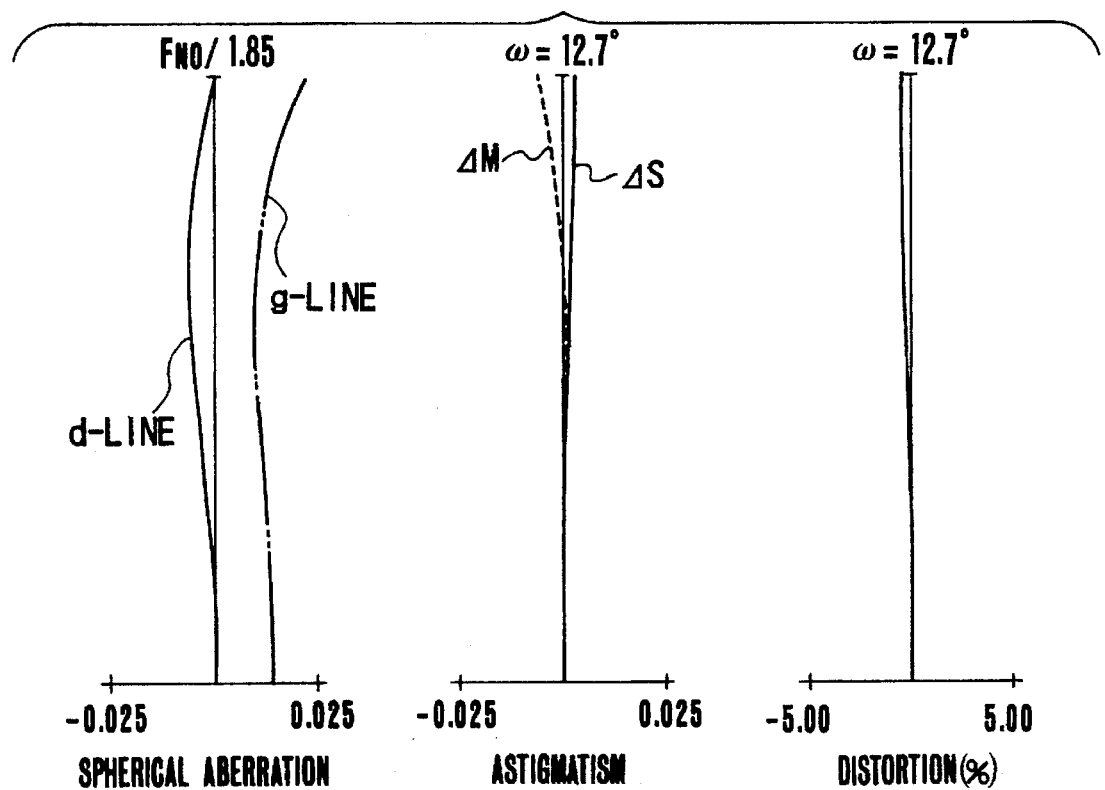

In this example, $\bar{N}_{IIU} = 1.77$, $|D_{II4}/f_2| = 0.176$, $(1/R_{II3} - 1/R_{II2})f_2 = 1.491$ FIG. 5 is a block diagram of a numerical example 3 of the invention. In order from the object side, the first lens unit of positive refractive power and the second lens unit of negative refractive power are similar in construction and arrangement to the numerical example 1. The third lens unit of positive refractive power is constructed from a bi-convex lens, a negative meniscus lens convex toward the image side and a positive meniscus lens convex toward the object side. The fourth lens unit of positive refractive power is constructed from a negative meniscus lens convex toward the object side and two bi-convex lenses. The frontmost lens surface in the third lens unit is formed to an aspheric shape.

Figure 7:
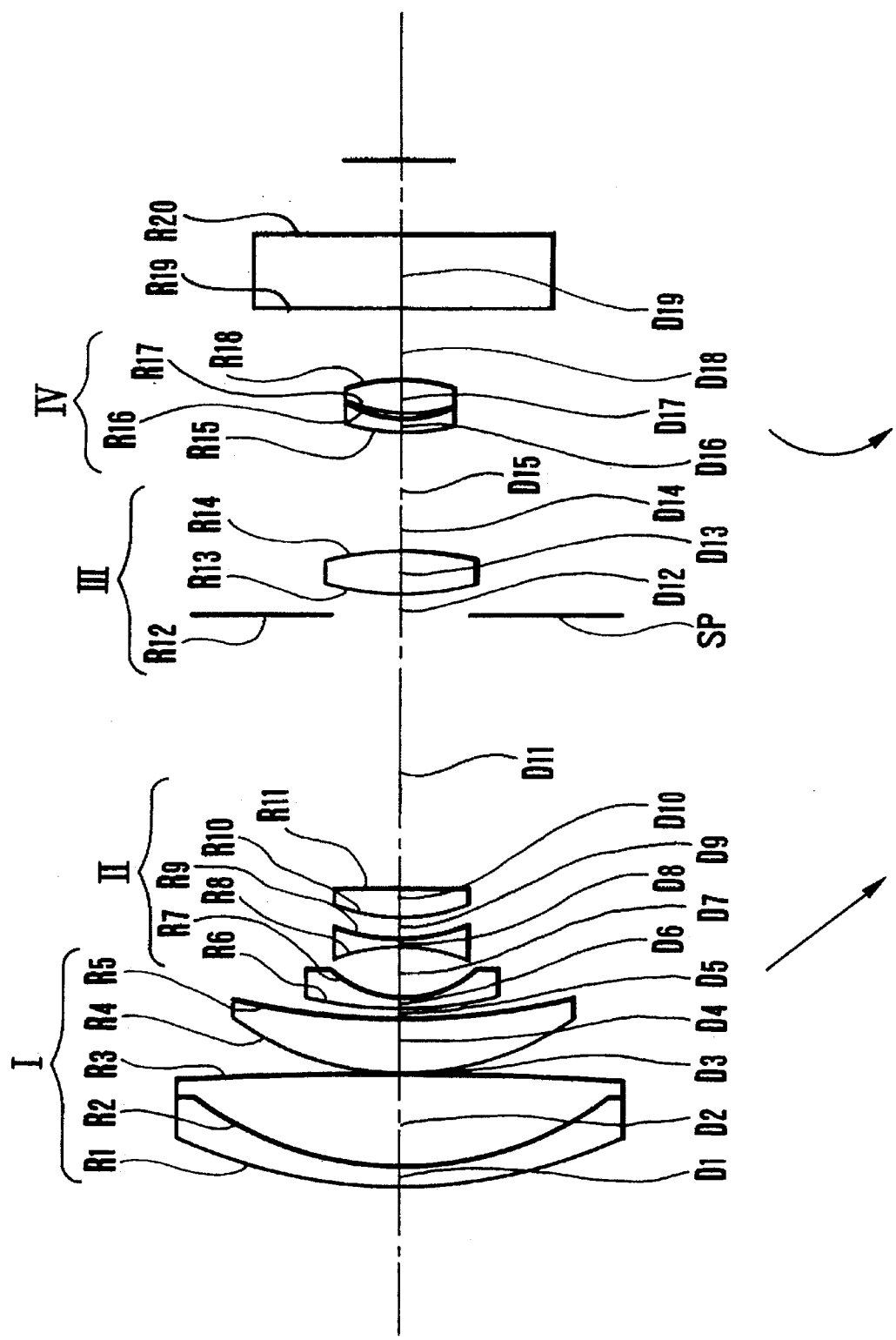
FIG. 7 is a longitudinal section view of a numerical example 4 of a zoom lens of the invention.
Figure 8A:
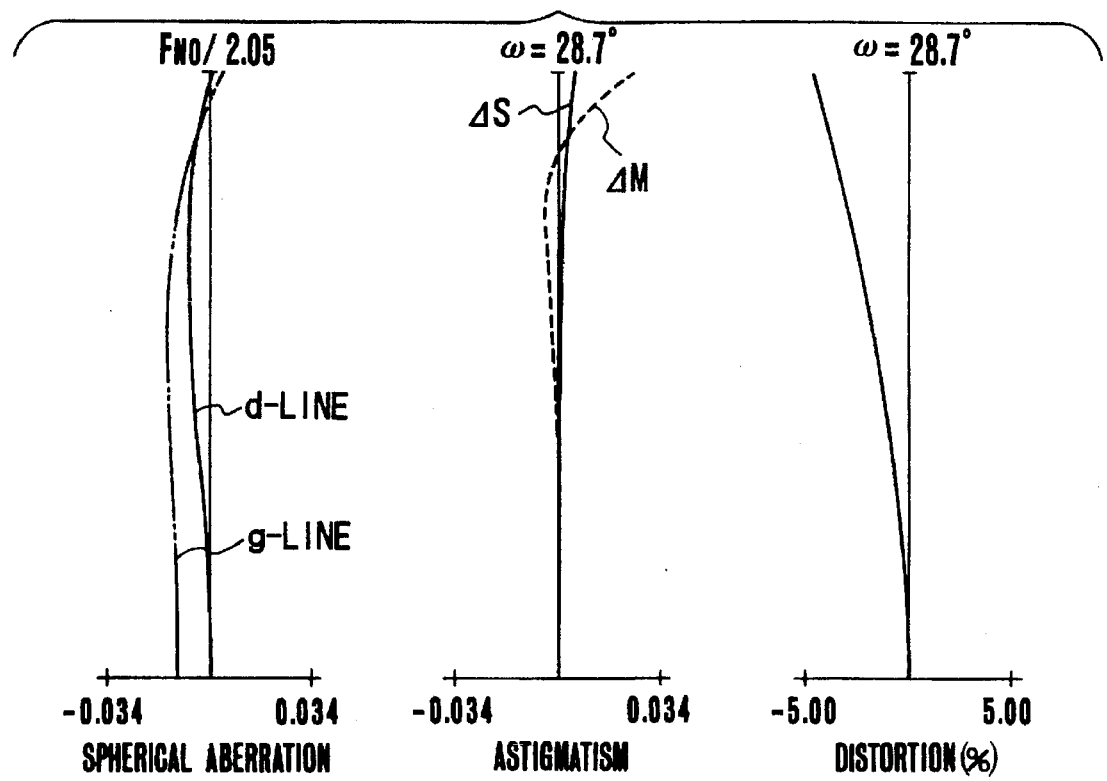
Figure 8B:
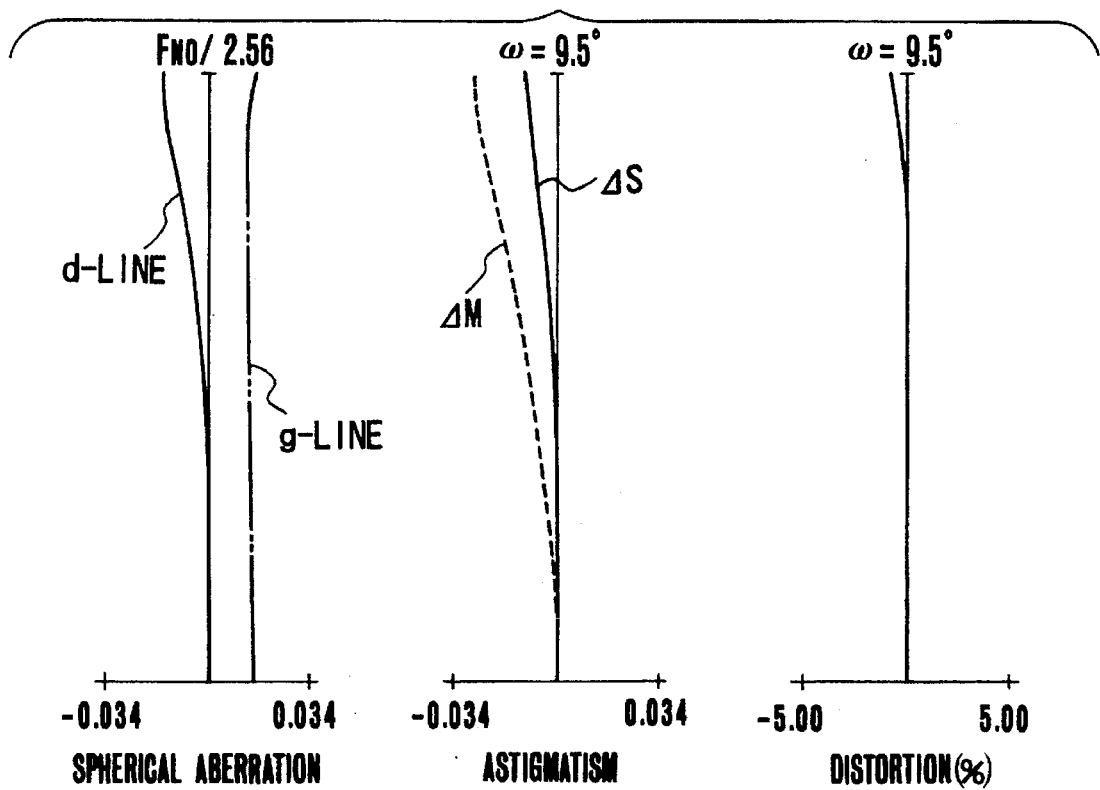

In this example, $\bar{N}_{IIU} = 1.61$, $|D_{II4}/f_2| = 0.126$, $(1/R_{II3} - 1/R_{II2})f_2 = 1.717$ FIG. 7 is a block diagram of a numerical example 4 of the invention. In order from the object side, the first lens unit of positive refractive power and the second lens unit of negative refractive power are similar in construction and arrangement to the numerical example 1. The third lens unit of positive refractive power is constructed from a bi-convex lens. The fourth lens unit of positive refractive power is constructed from a negative meniscus lens convex toward object side and a bi-convex lens. The frontmost surface in the third lens unit and the rearmost surface in the fourth lens unit are formed to aspheric shapes.

Figure 9:
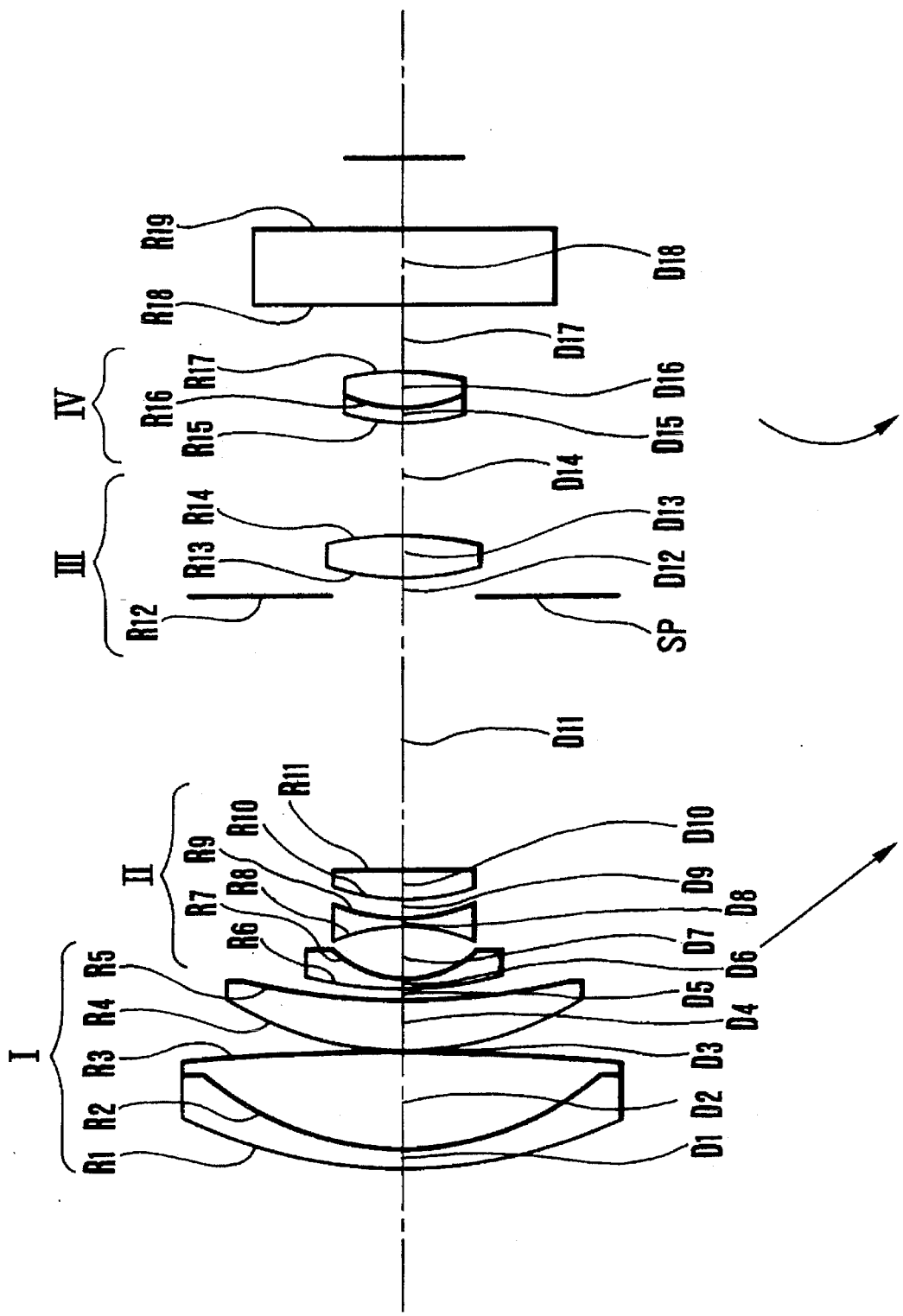
FIG. 9 is a longitudinal section view of a numerical example 5 of a zoom lens of the invention.
Figure 10A:
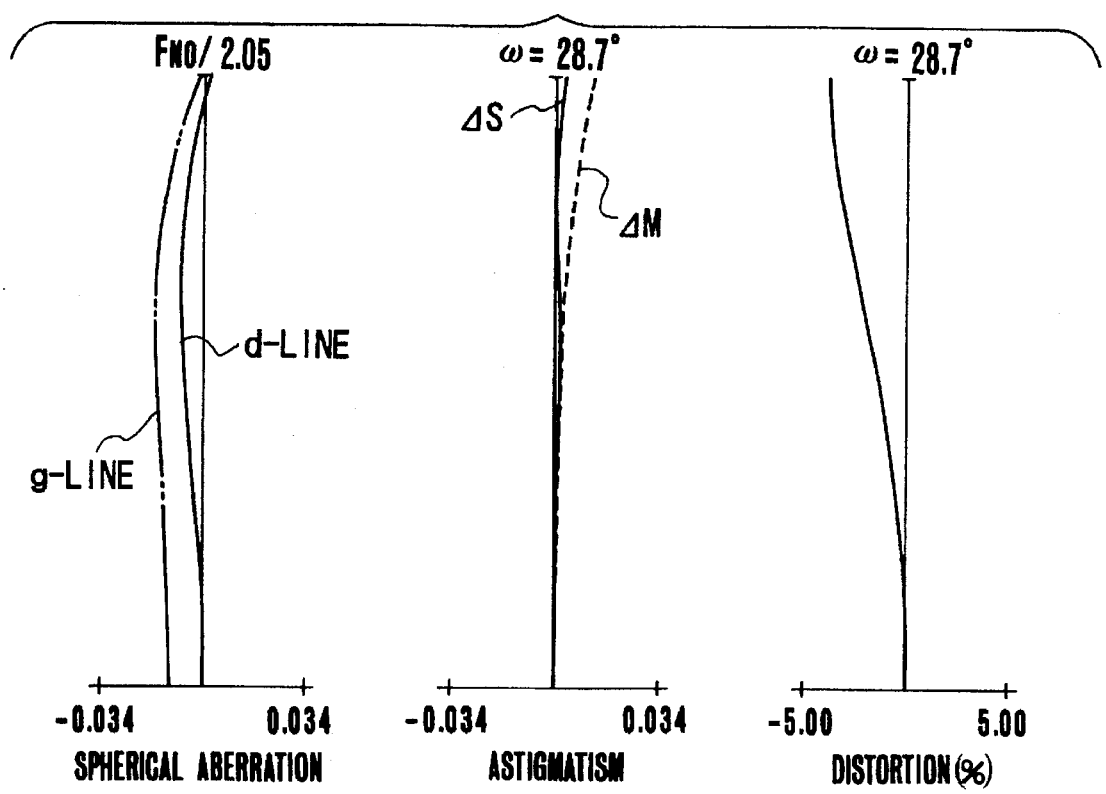
Figure 10B:
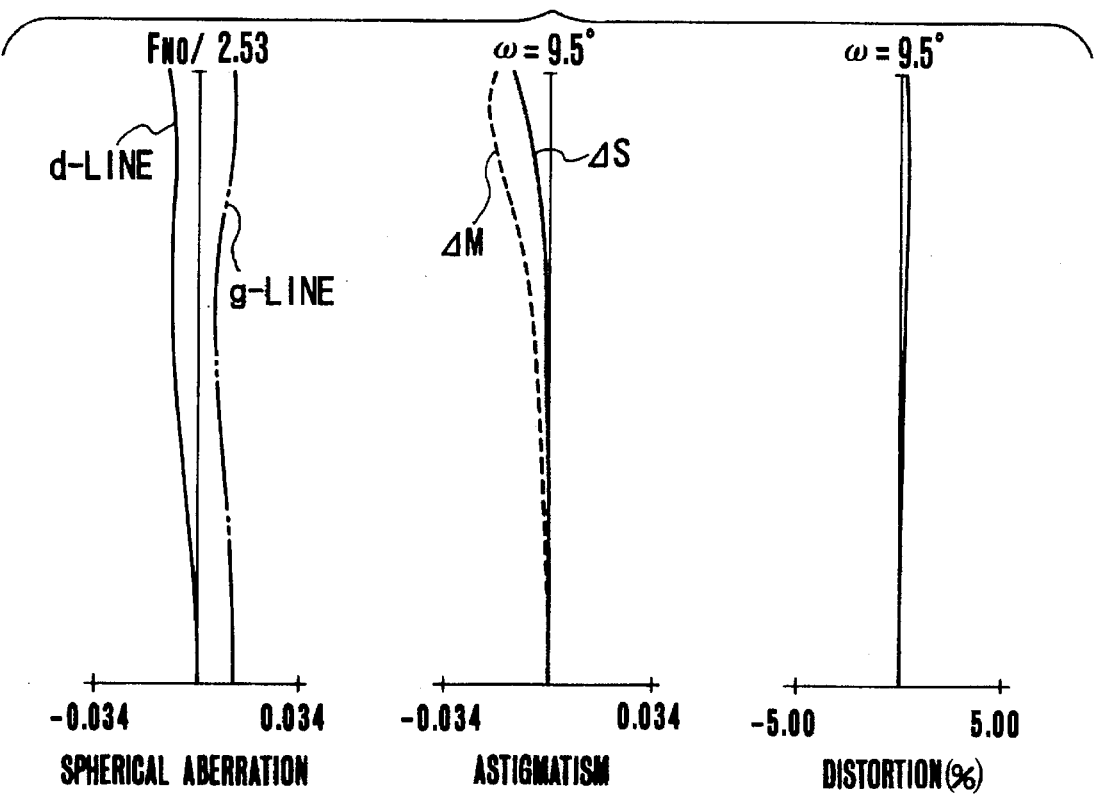
Figure 12A:
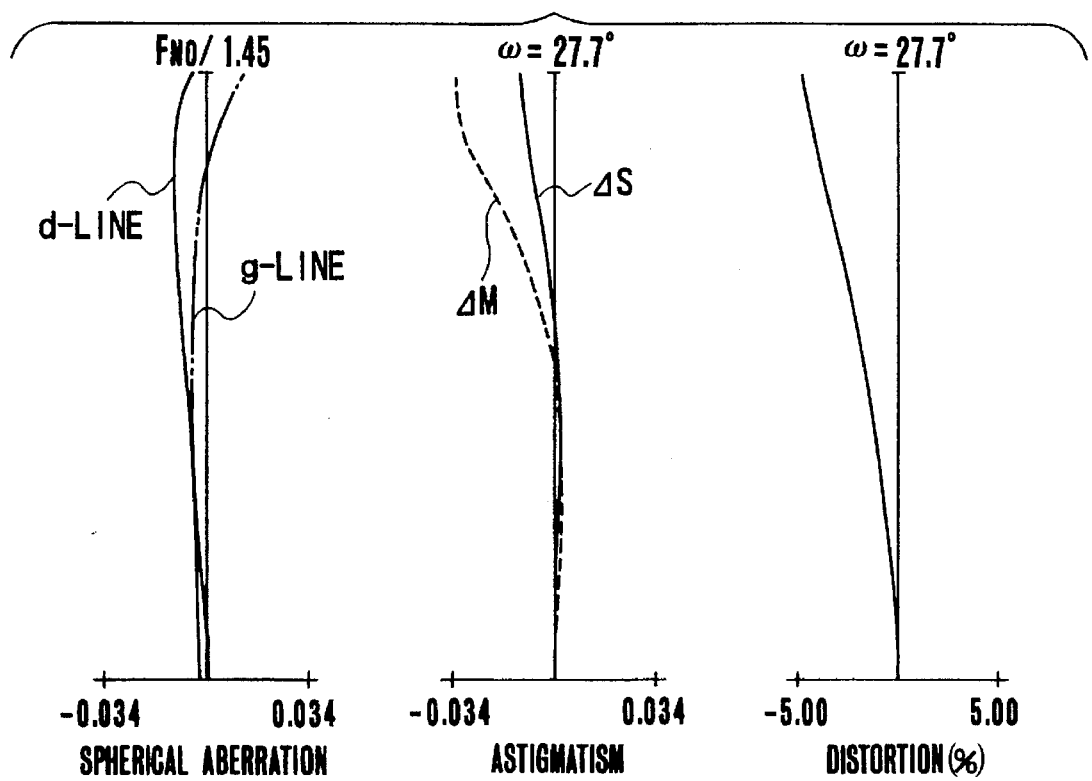
FIGS. 12(A), 12(B) and 12(C) are graphic representations of the various aberrations of the numerical example 6.
Figure 12B:
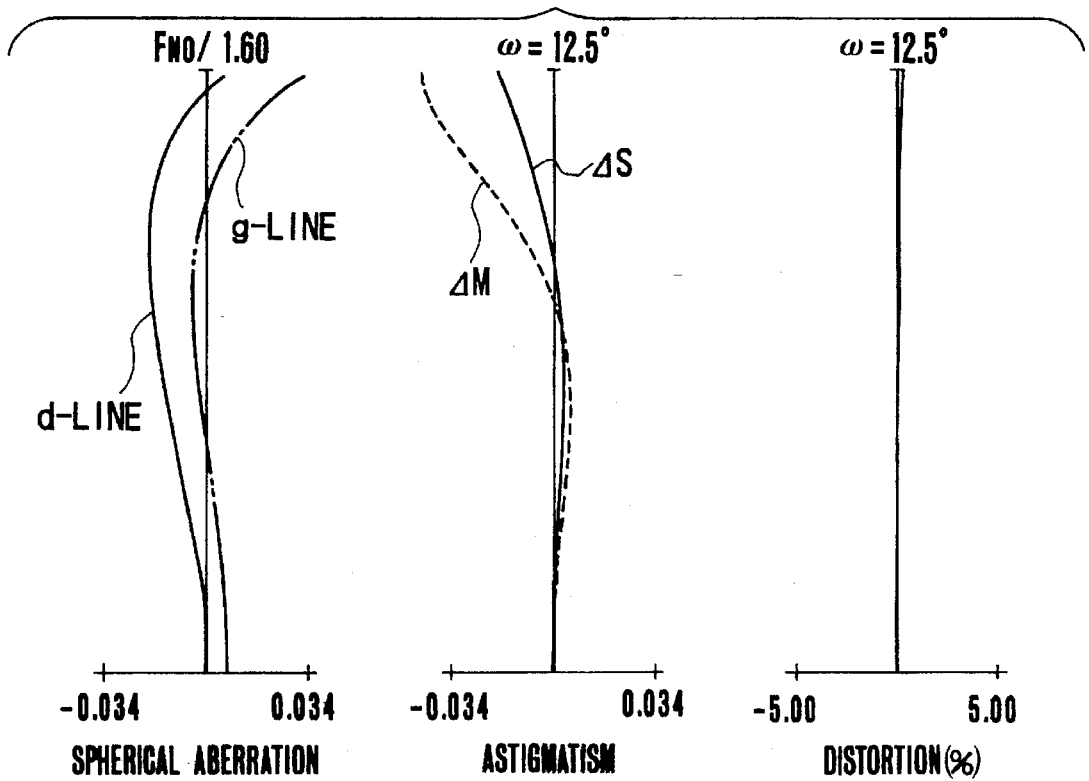
Figure 12C:
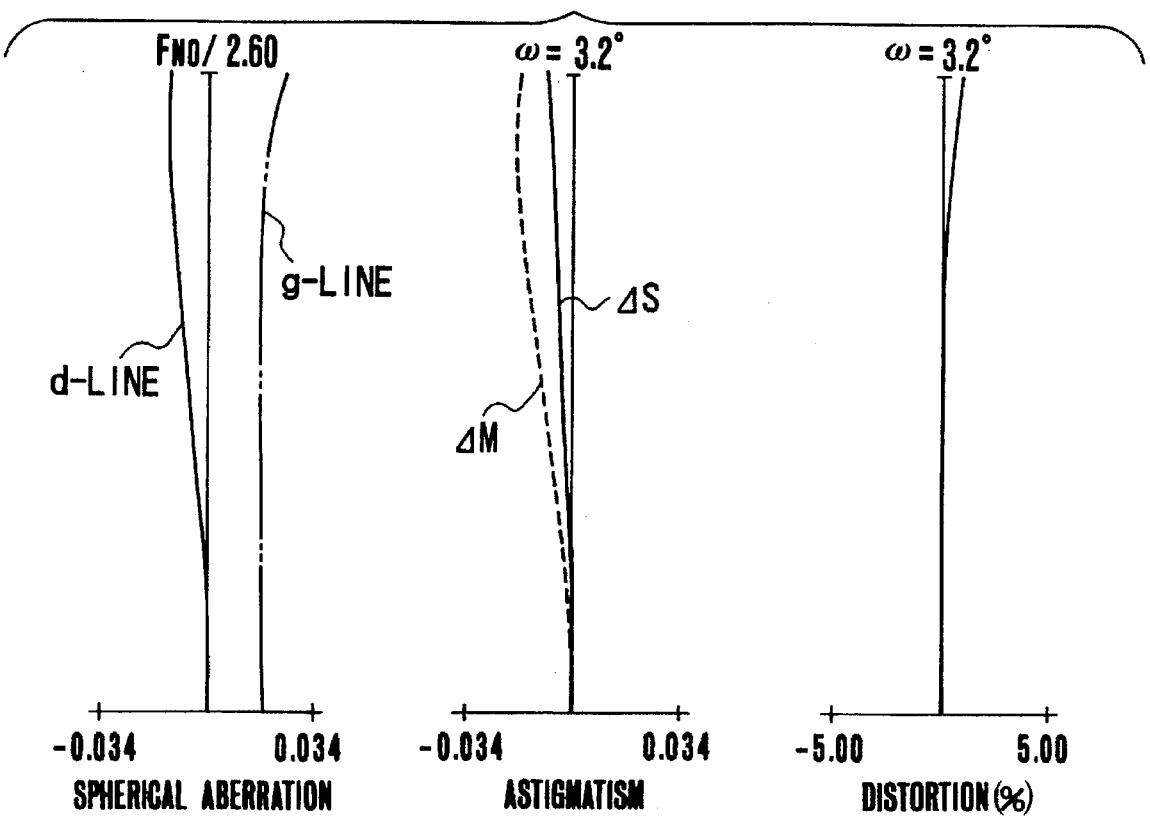

In this example, $\bar{N}_{IIU} = 1.73$, $|D_{II4}/f_2| = 0.167$, $(1/R_{II3} - 1/R_{II2})f_2 = 1.523$ FIG. 9 is a block diagram of a numerical example 5 of the invention. In order from the object side, the first lens unit of positive refractive power, the second lens unit of negative refractive power and the third lens unit of positive refractive power are similar in construction and arrangement to the numerical example 4. The fourth lens unit of positive refractive power is constructed from a negative meniscus lens convex toward the object side and a bi-convex lens cemented thereto. Aspheric surfaces are used in the same surfaces as in the numerical example 4.

In this example, $\bar{N}_{IIU} = 1.73$, $|D_{II4}/f_2| = 0.167$, $(1/R_{II3} - 1/R_{II2})f_2 = 1.433$ FIG. 11 is a block diagram of a numerical example 6 of the invention. In order from the object side, the first lens unit of positive refractive power and the second lens unit of negative refractive power are similar in construction and arrangement to the numerical example 1. The third lens unit of positive refractive power is constructed from two bi-convex lenses and a bi-concave lens. The fourth lens unit of positive refractive power is constructed from a negative meniscus lens convex toward the object side, a bi-convex lens and a positive lens having a convex surface facing the object side. The frontmost surface in the third lens unit is formed to an aspheric shape.

Figure 13:
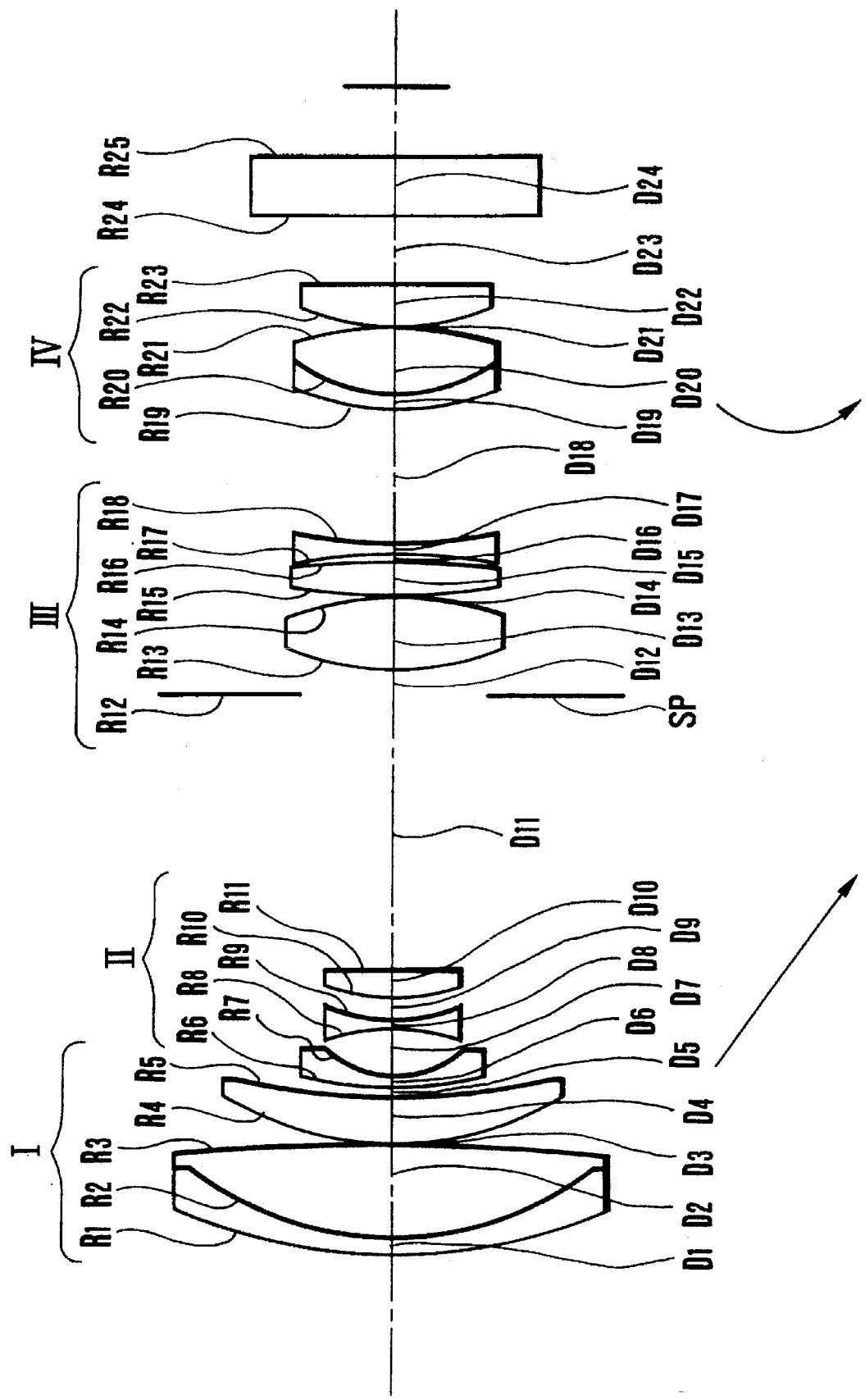
FIG. 13 is a longitudinal section view of a numerical example 7 of a zoom lens of the invention.
Figure 14A:
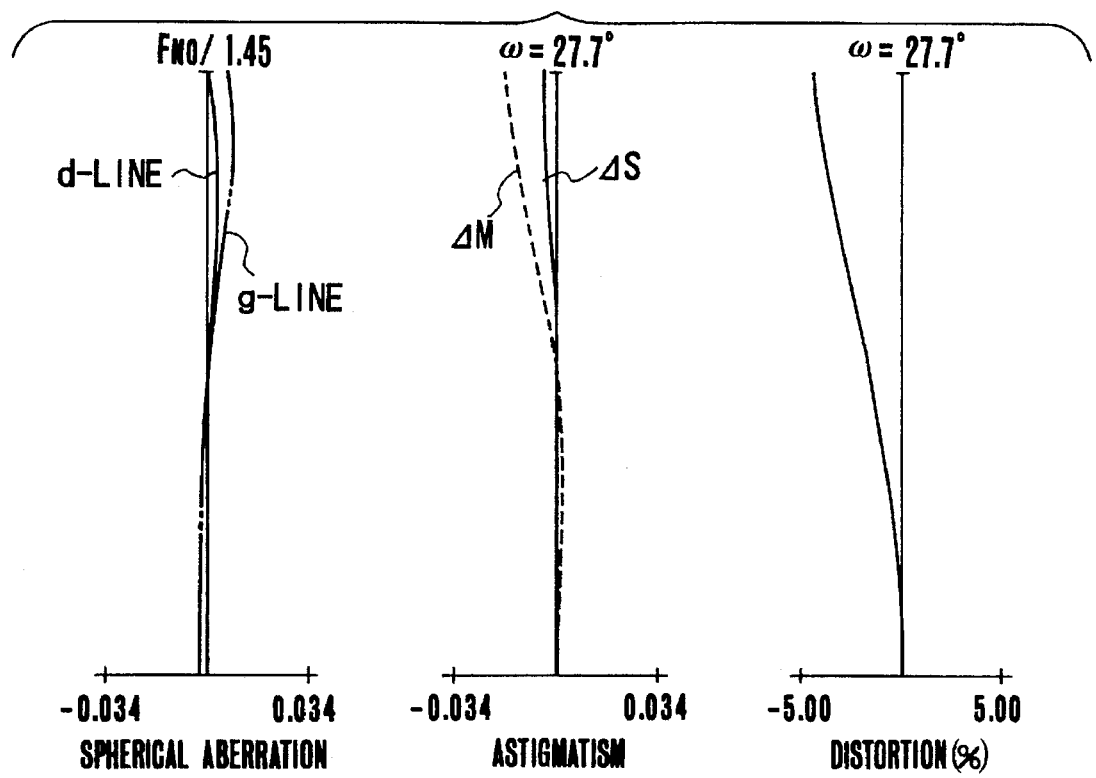
FIGS. 14(A), 14(B) and 14(C) are graphic representations of the various aberrations of the numerical example 7.
Figure 14B:
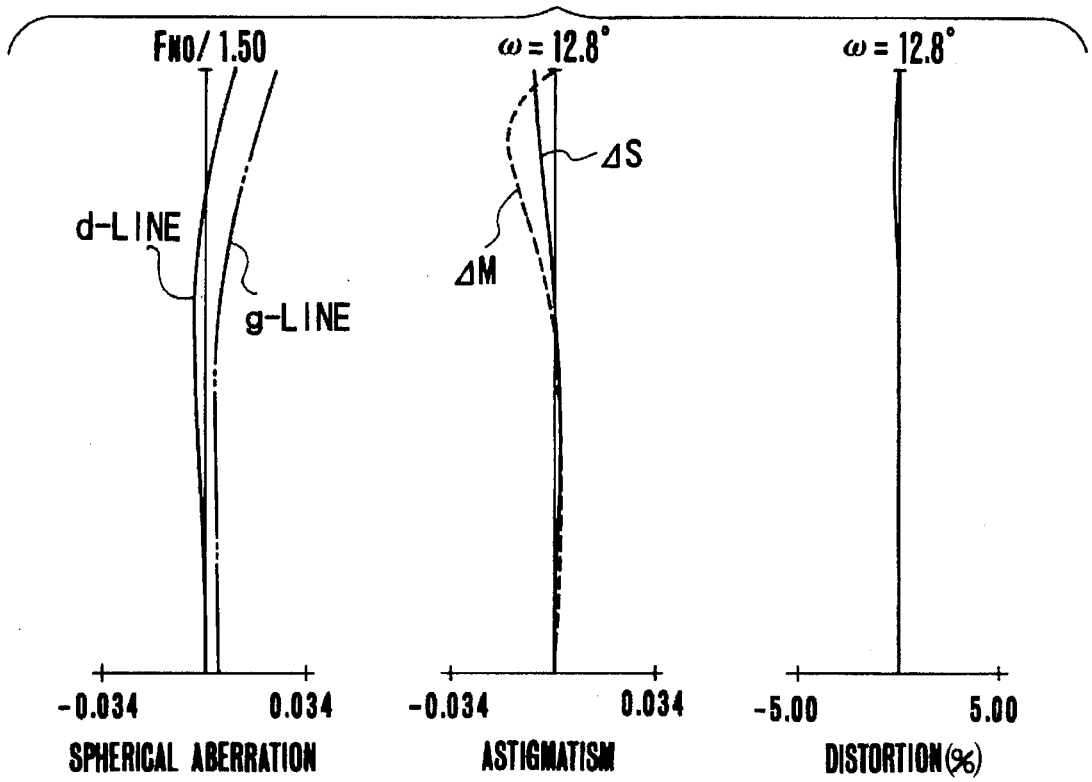
Figure 14C:
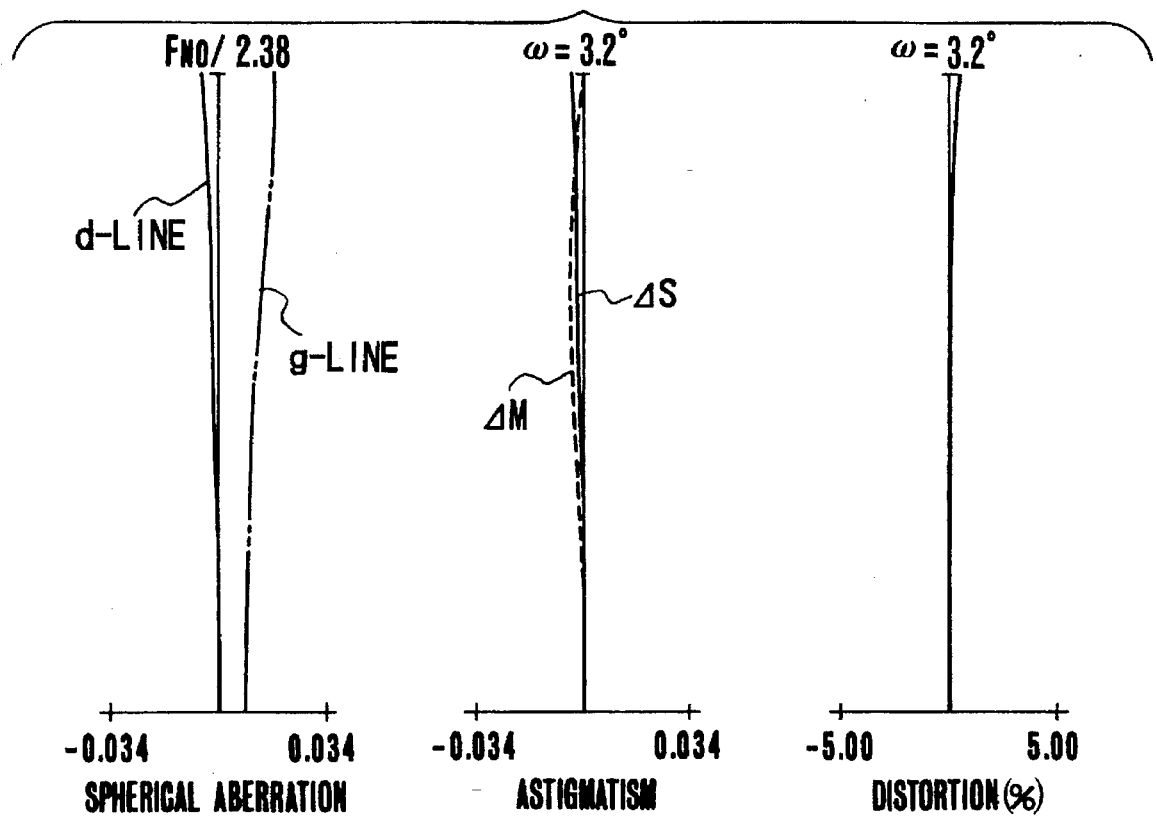

In this example, $\bar{N}_{IIU} = 1.73$, $|D_{II4}/f_2| = 0.143$, $(1/R_{II3} - 1/R_{II2})f_2 = 1.667$ FIG. 13 is a block diagram of a numerical example 7 of the invention. In order from the object side, the first lens unit of positive refractive power and the second lens unit of negative refractive power are similar in construction and arrangement to the numerical example 1. The third lens unit is of positive refractive power similar in construction and arrangement to the numerical example 6. The fourth lens unit of positive refractive power is constructed from a negative meniscus lens convex toward the object side, a bi-convex lens cemented thereto, and a positive lens having a convex surface facing the object side. The frontmost surface in the third lens unit is formed to an aspheric shape.

Figure 15:
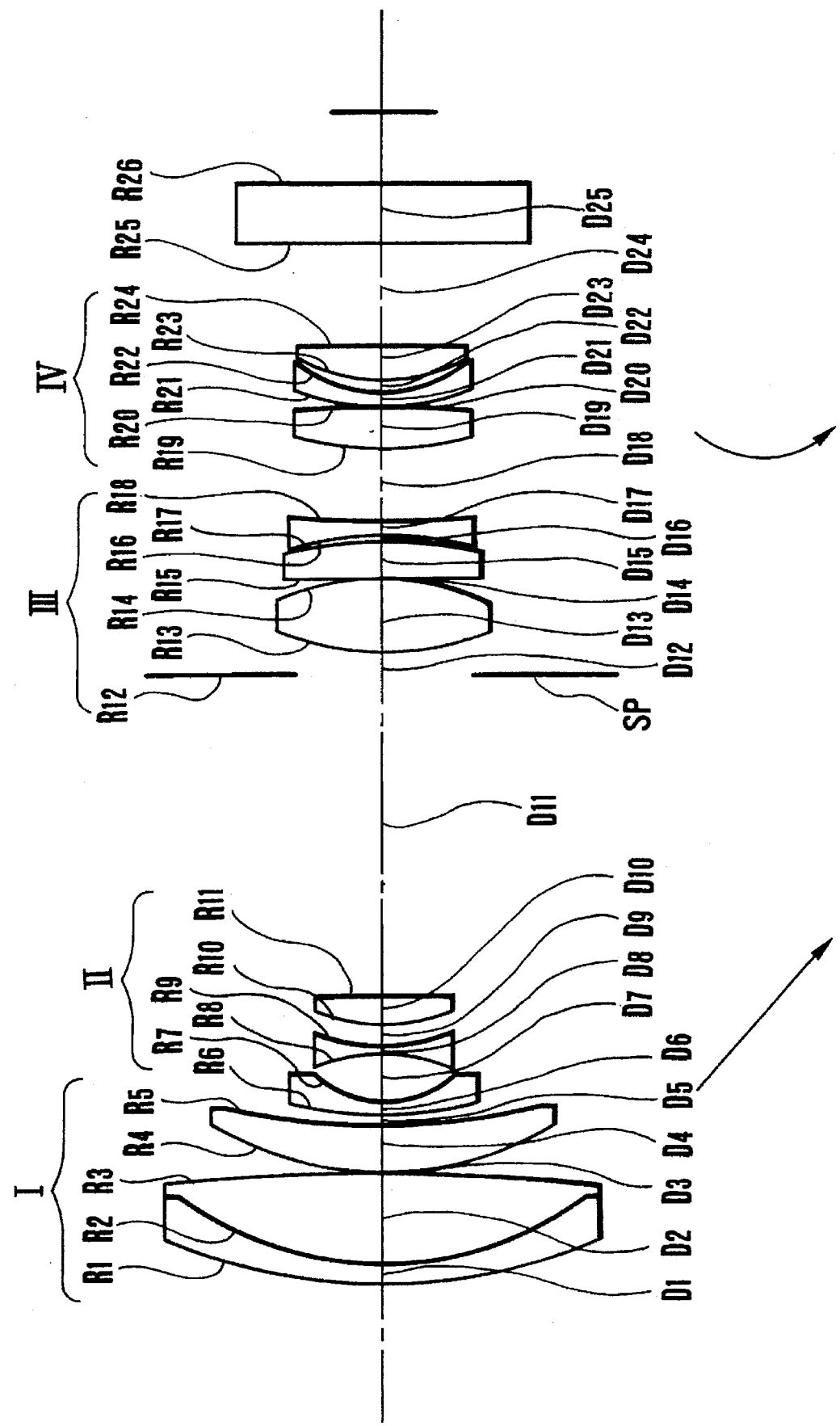
FIG. 15 is a longitudinal section view of a numerical example 8 of a zoom lens of the invention.
Figure 16A:
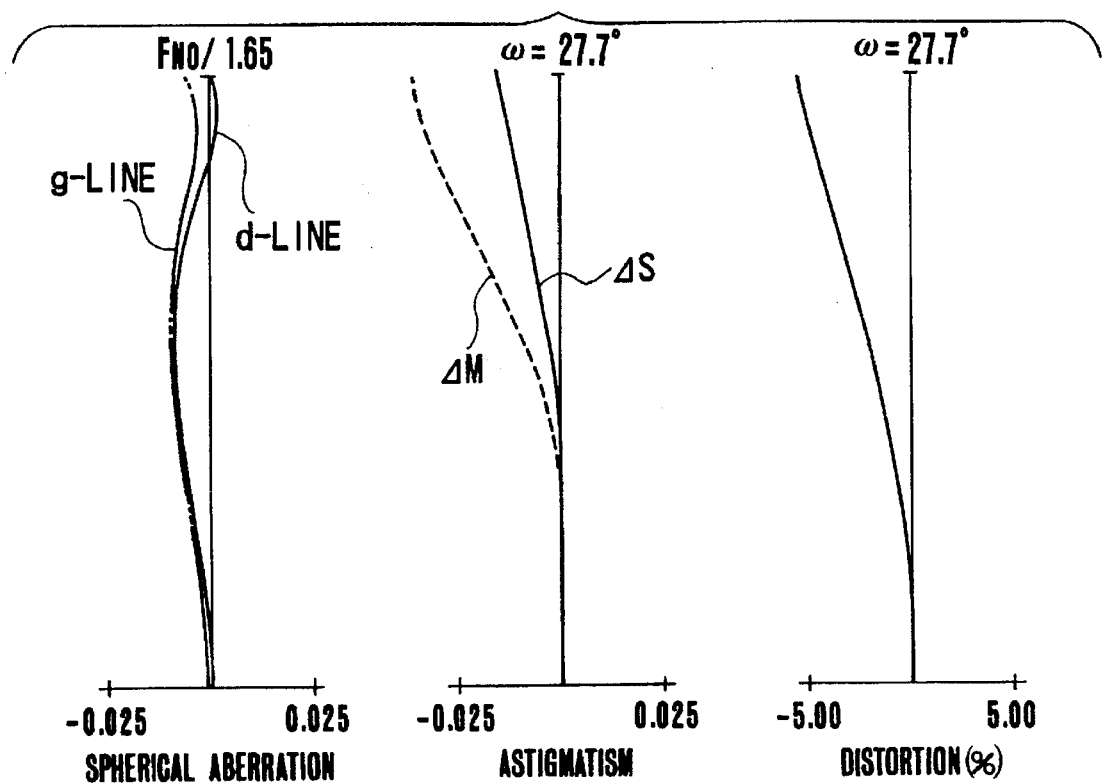
FIGS. 16(A), 16(B) and 16(C) are graphic representations of the various aberrations of the numerical example 8.
Figure 16B:
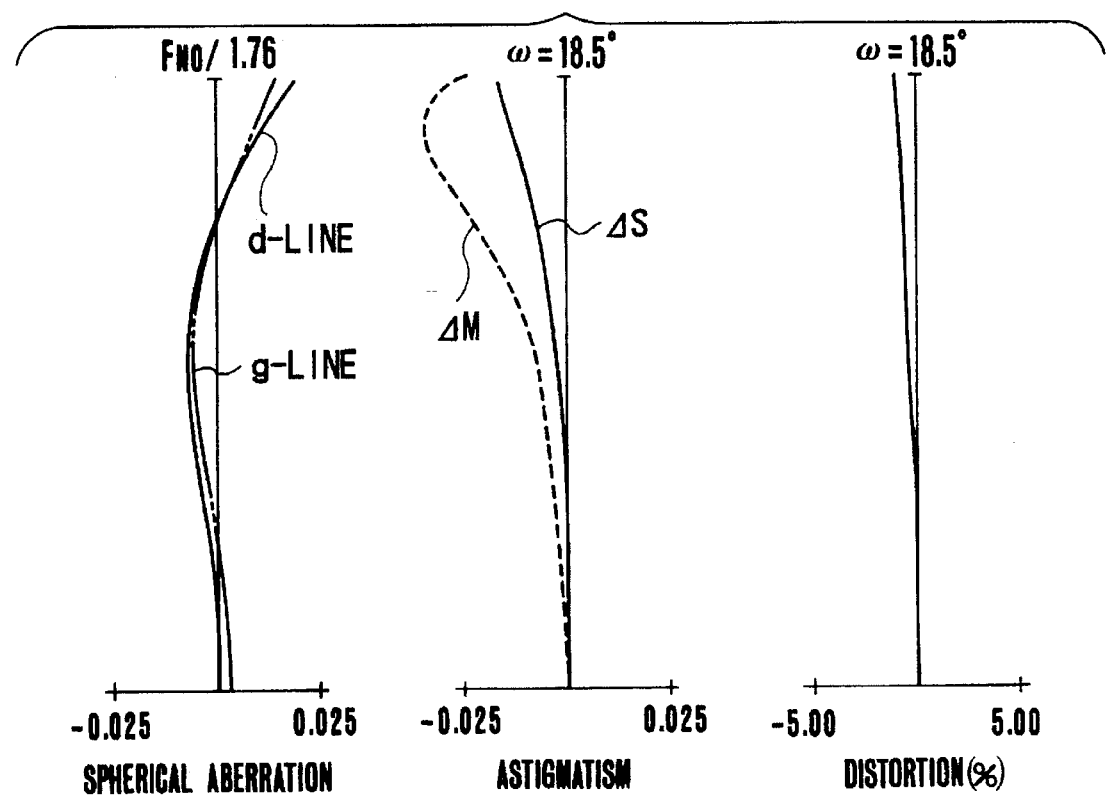
Figure 16C:
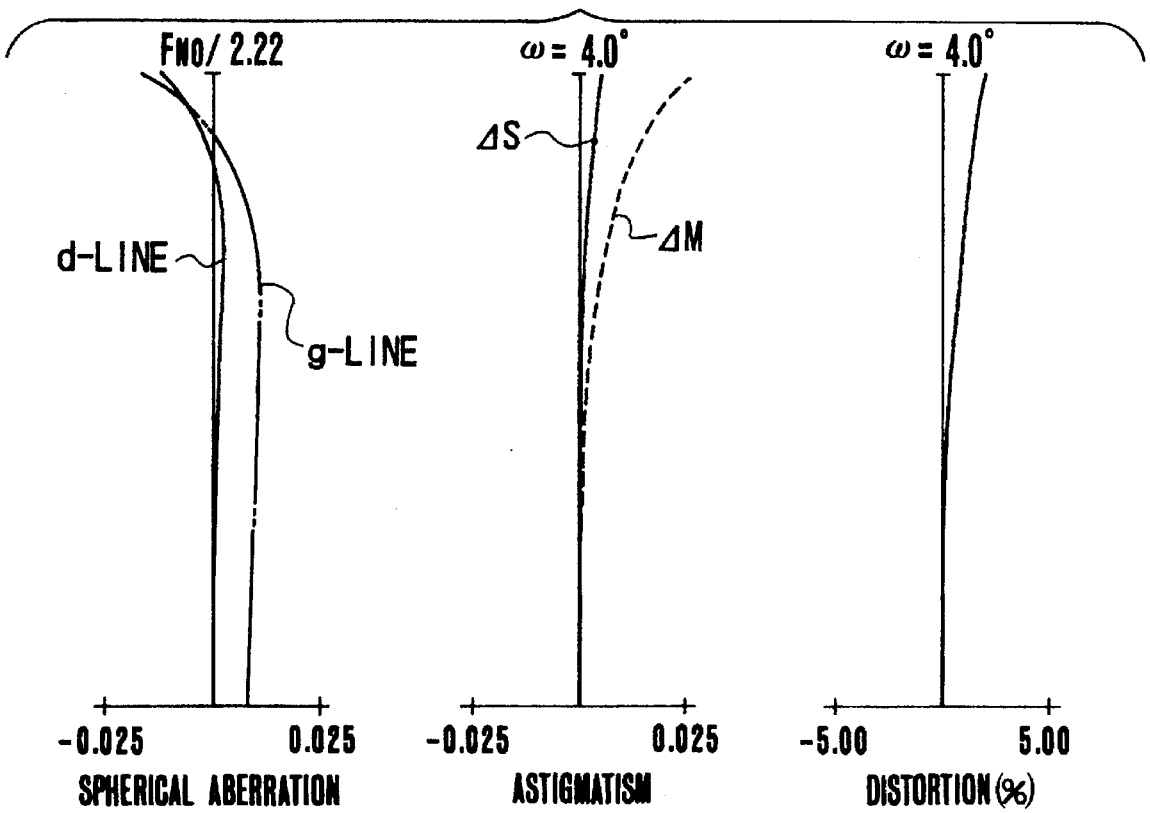

In this example, $\bar{N}_{IIU} = 1.73$ $|D_{II4}/f_2| = 0.171$, $(1/R_{II3} - 1/R_{II2})f_2 = 1.501$ FIG. 15 is a block diagram of a numerical example 8 of the invention. In order from the object side, the first lens unit of positive refractive power and the second lens unit of negative refractive power are similar in construction and arrangement to the numerical example 1. The third lens unit of positive refractive power is constructed from a bi-convex lens, a positive meniscus lens convex toward the image side and a bi-concave lens. The fourth lens unit of positive refractive power is constructed from a bi-convex lens, a negative meniscus lens convex toward the object side and a positive lens having a strong convex surface facing the object side. The frontmost surface in the third lens unit is formed to an aspheric shape.

Figure 17:
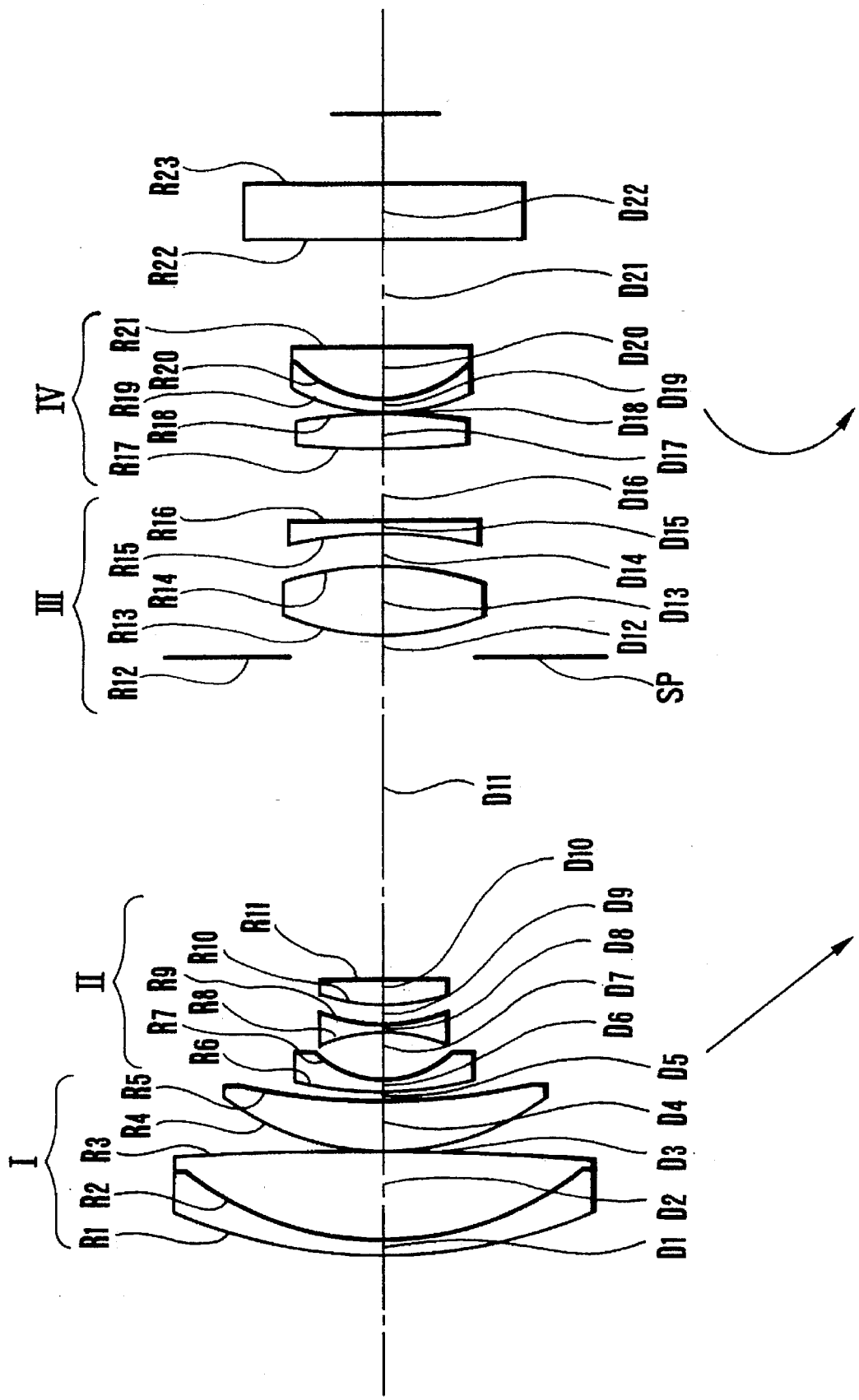
FIG. 17 is a longitudinal section view of a numerical example 9 of a zoom lens of the invention.
Figure 18A:
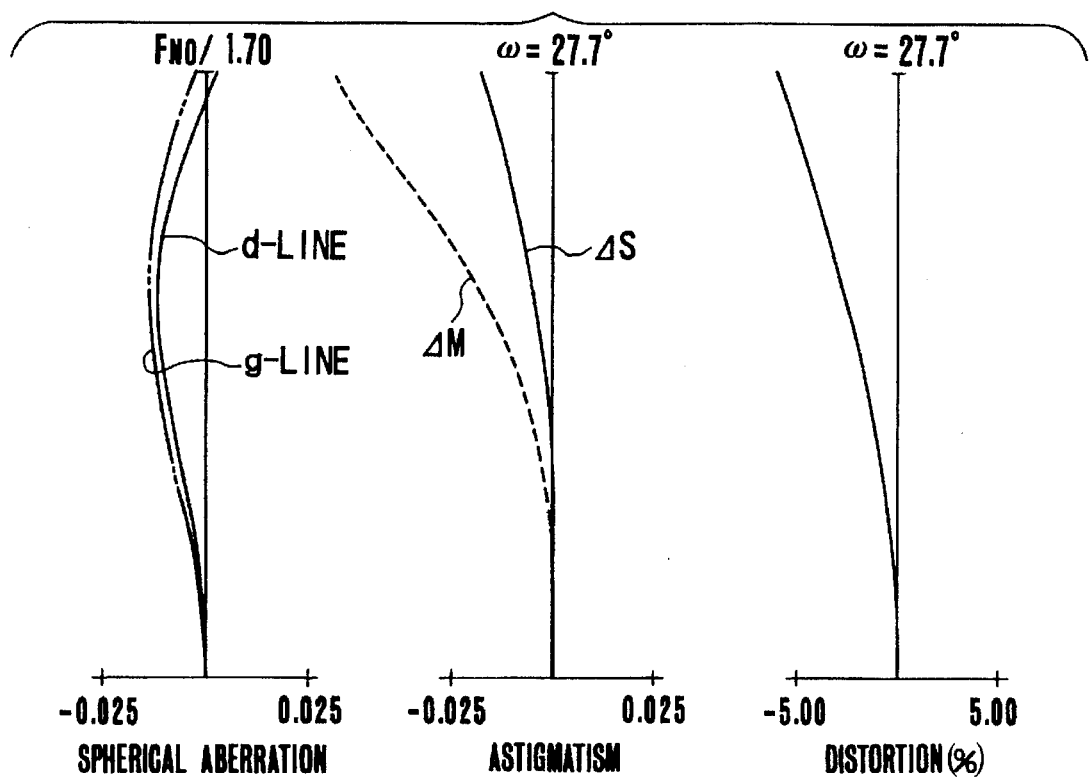
FIGS. 18(A), 18(B) and 18(C) are graphic representations of the various aberrations of the numerical example 9.
Figure 18B:
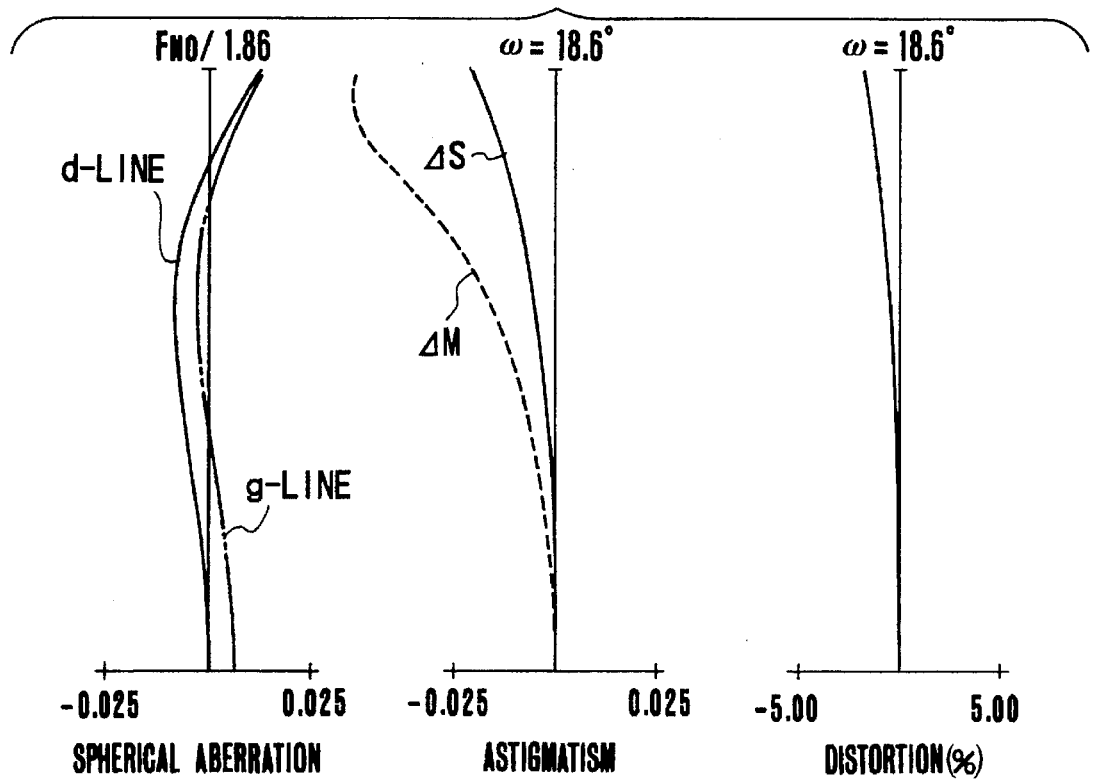
Figure 18C:
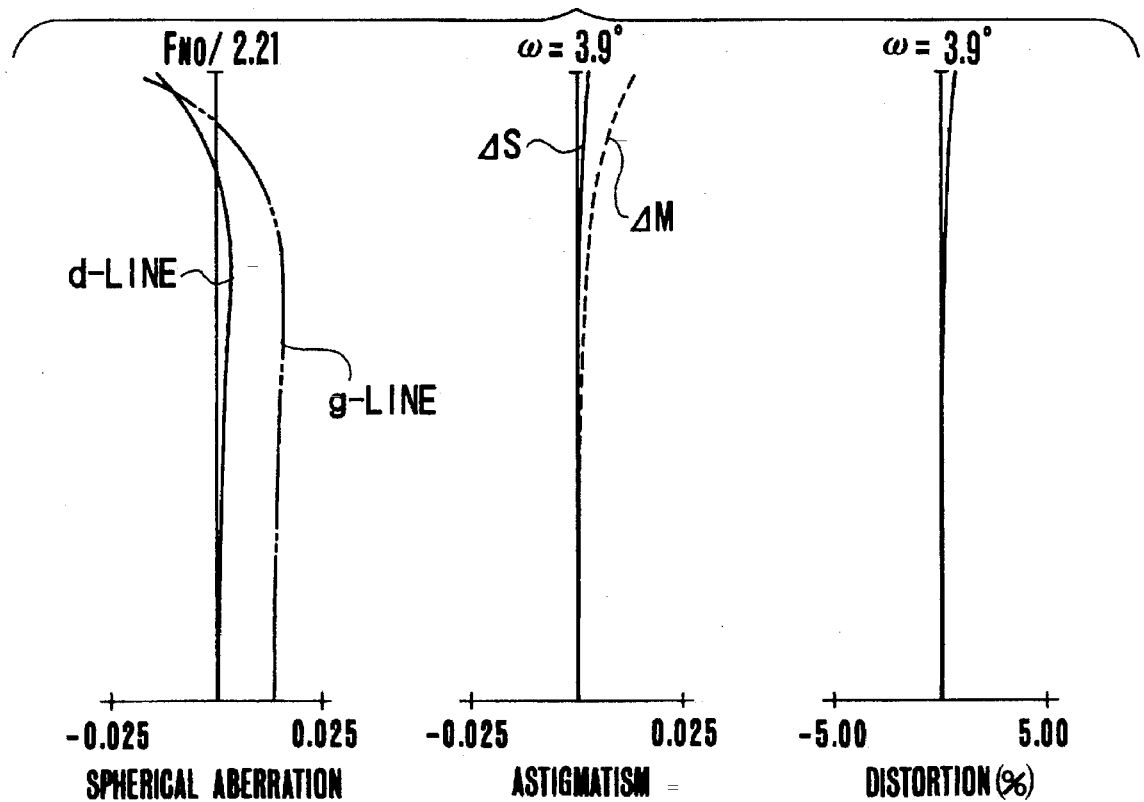

In this example, $\bar{N}_{IIU} = 1.73$ $|D_{II4}/f_2| = 0.119$, $(1/R_{II3} - 1/R_{II2})f_2 = 1.317$ FIG. 17 is a block diagram of a numerical example 9 of the invention. In order from the object side, the first lens unit of positive refractive power is similar in construction and arrangement to the numerical example 1. The second lens unit of negative refractive power is constructed from a negative meniscus lens having a strong concave surface facing the image side, a bi-concave lens having a strong concave surface facing the image side and a positive meniscus lens having a strong convex surface facing the object side. The third lens unit of positive refractive power is constructed from a bi-convex lens and a negative meniscus lens concave toward the object side. The fourth lens unit of positive refractive power is constructed from a positive lens having a strong convex surface facing the image side, a negative meniscus lens convex toward object side and a positive lens having a strong convex surface facing the object side and cemented thereto. The frontmost surface in the third lens unit is formed to an aspheric shape.

Figure 19:
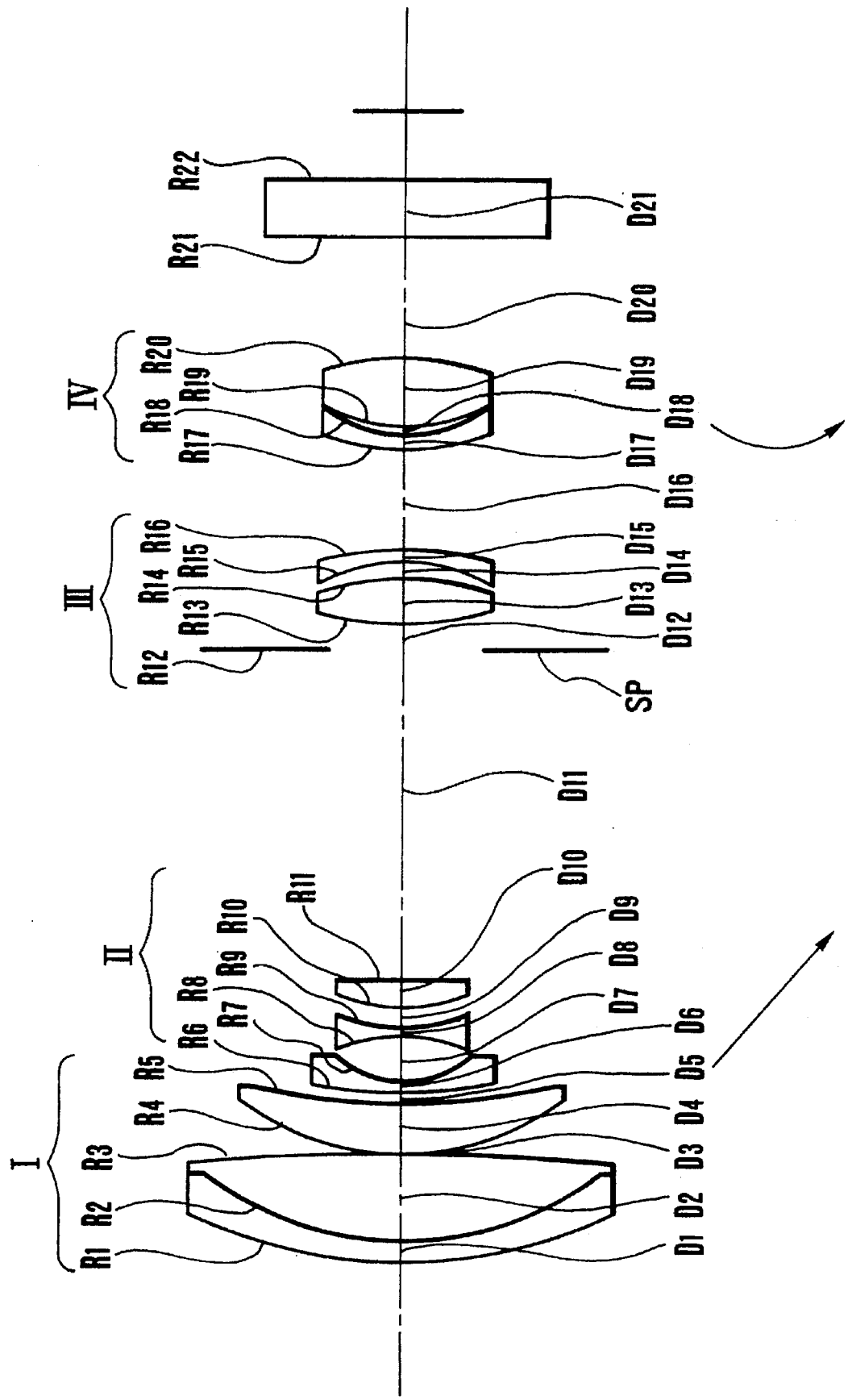
FIG. 19 is a longitudinal section view of a numerical example 10 of a zoom lens of the invention.
Figure 20A:
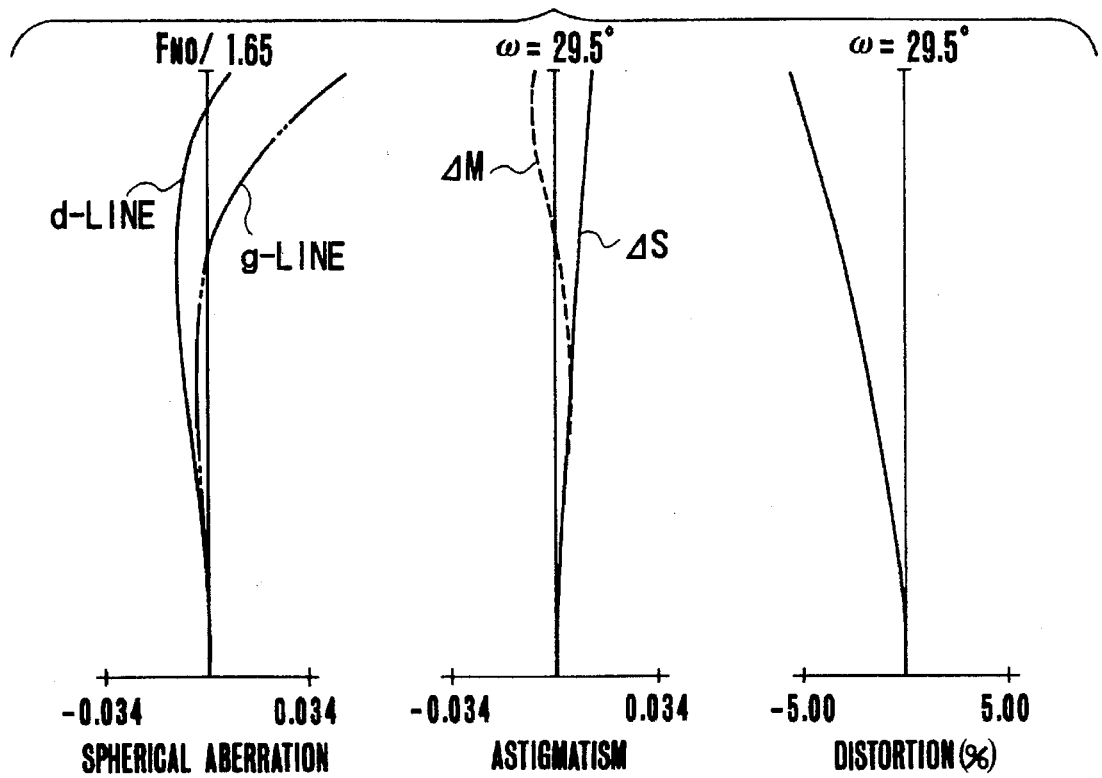
Figure 20B:
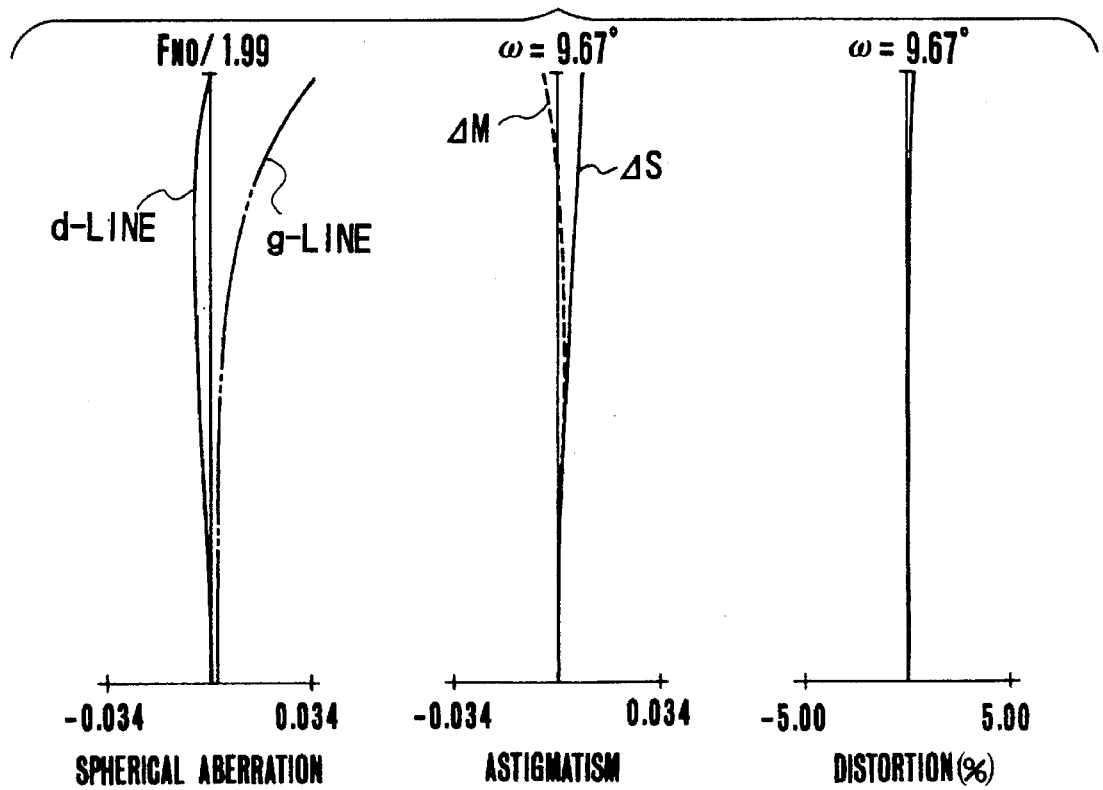

In this example, $\bar{N}_{IIU} = 1.73$ $|D_{II4}/f_2| = 0.119$, $(1/R_{II3} - 1/R_{II2})f_2 = 1.383$ FIG. 19 is a block diagram of a numerical example 10 of the invention. In order from the object side, the first lens unit of positive refractive power and the second lens unit of negative refractive power are similar in construction and arrangement to the numerical example 2. The third lens unit of positive refractive power is similar in construction and arrangement to the numerical example 1. The fourth lens unit of positive refractive power is constructed likewise as in the numerical example 4. The frontmost surface in the fourth lens unit is formed to an aspheric surface.

Figure 21:
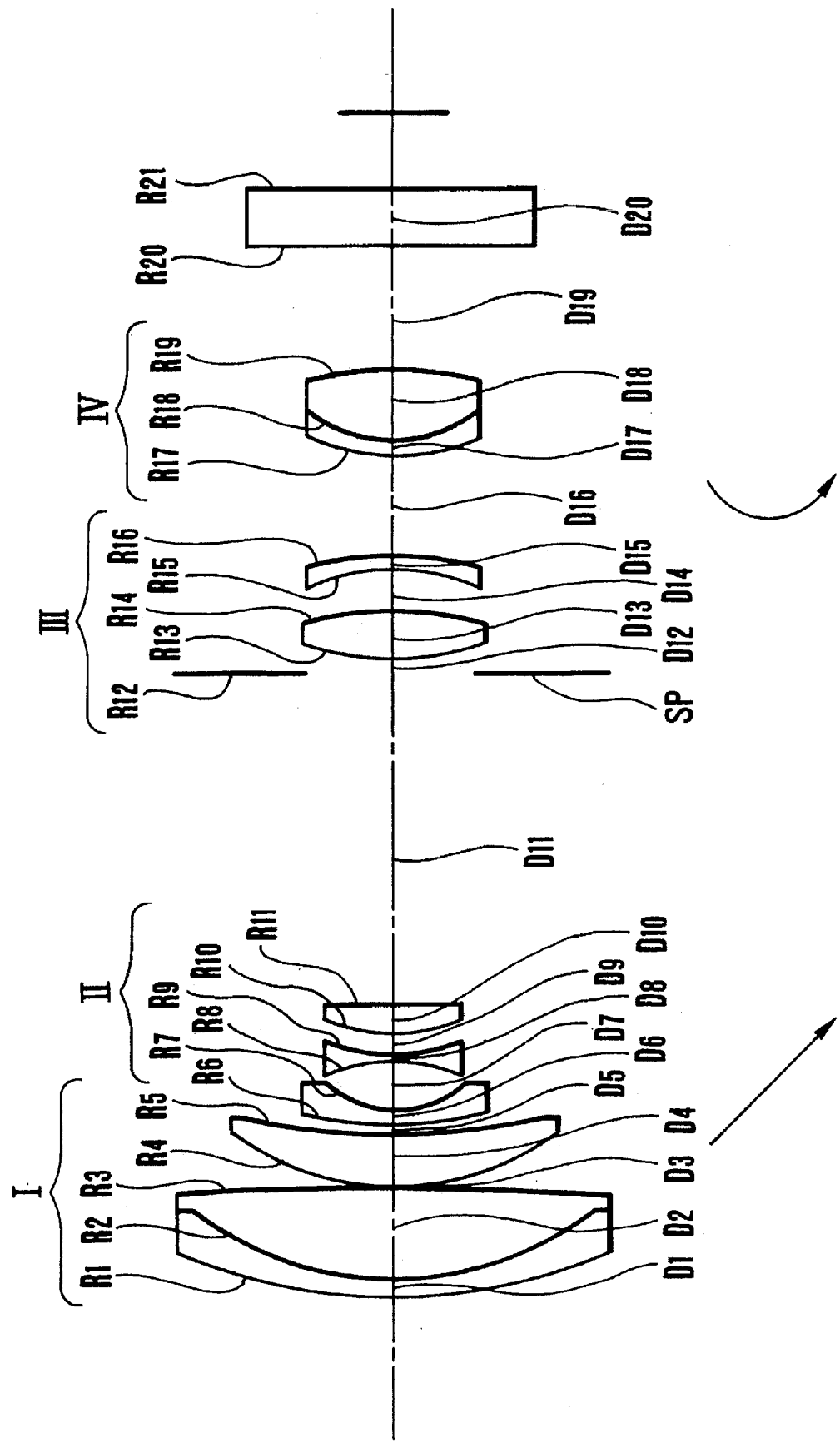
FIG. 21 is a longitudinal section view of a numerical example 11 of a zoom lens of the invention.
Figure 22A:
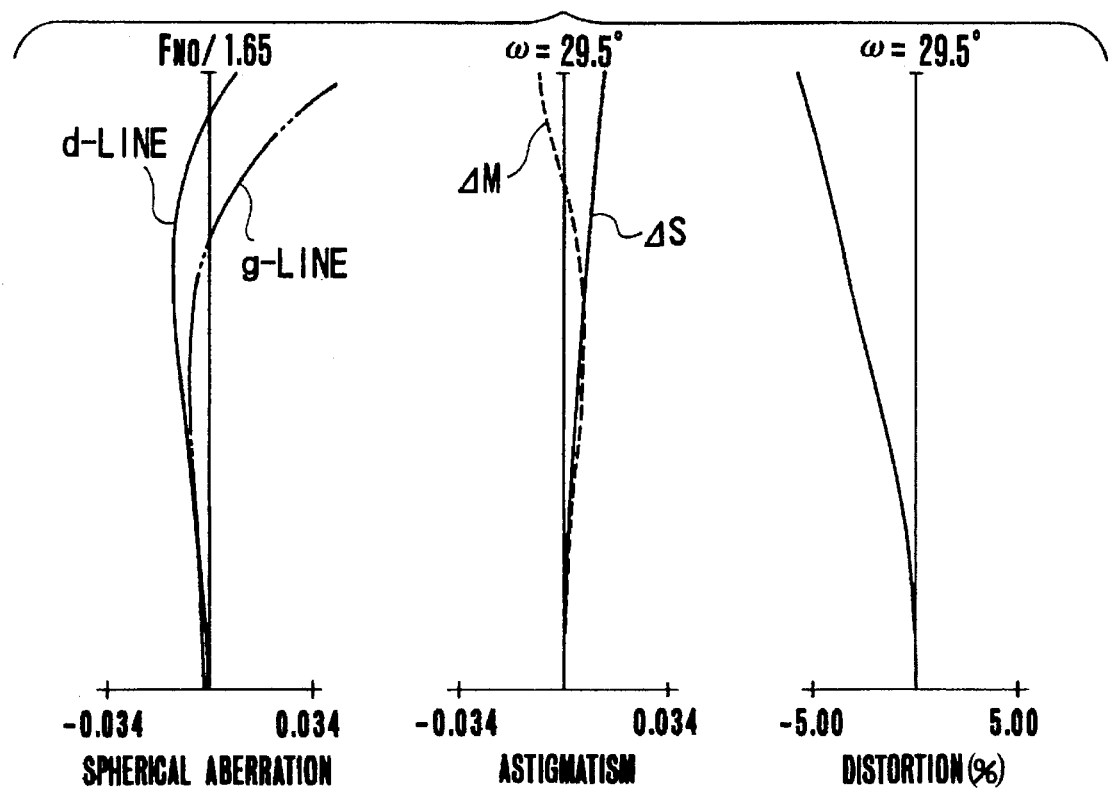
FIGS. 22(A), 22(B) and 22(C) are graphic representations of the various aberrations of the numerical example 11.
Figure 22B:
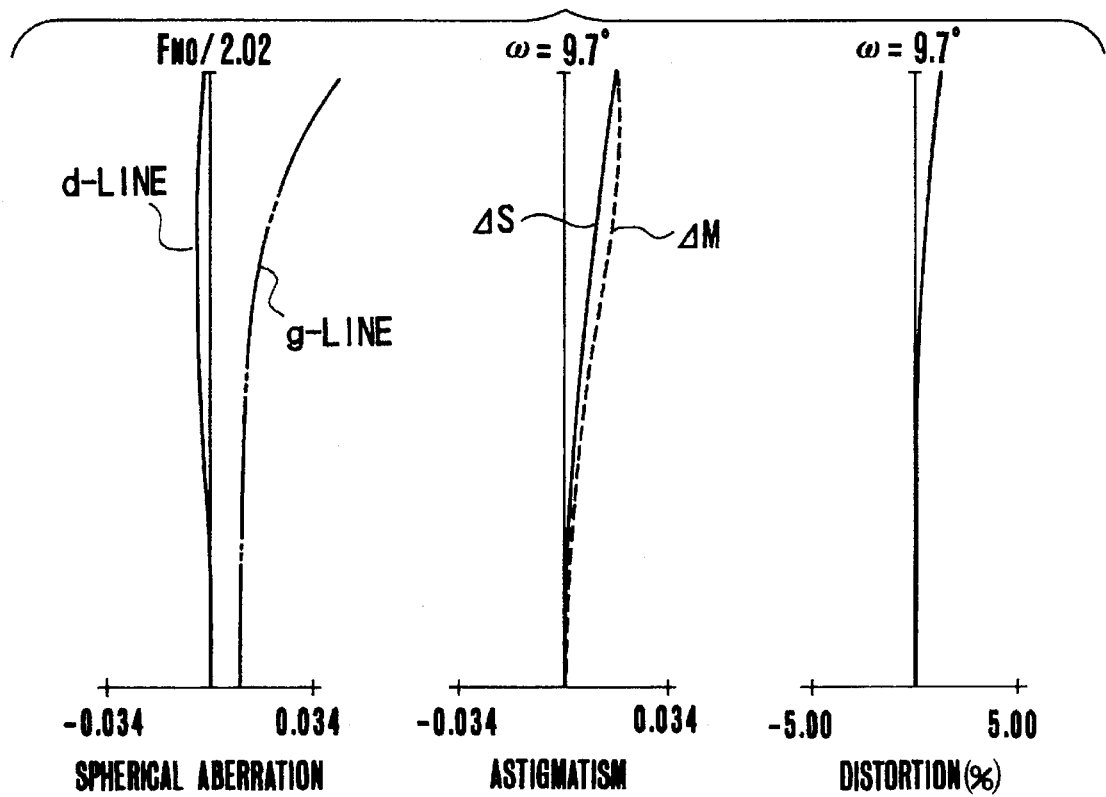
Figure 22C:
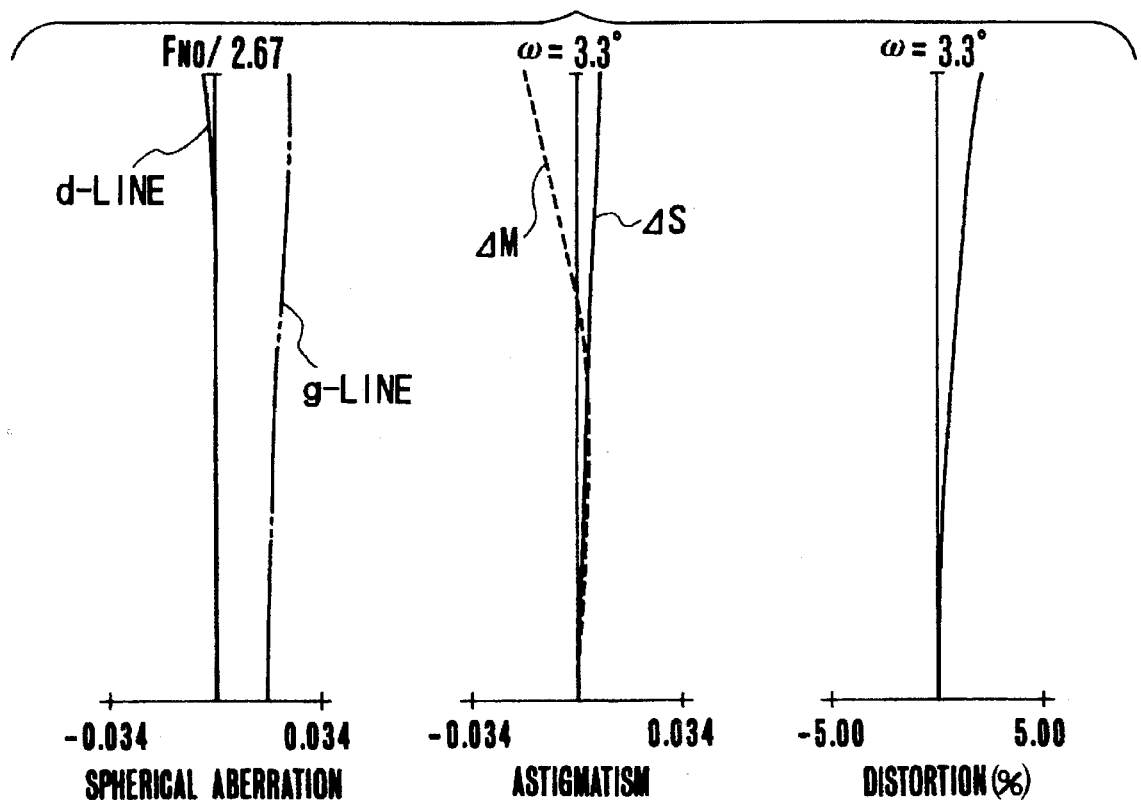

In this example, $\bar{N}_{IIU} = 1.73$ $|D_{II4}/f_2| = 0.169$, $(1/R_{II3} - 1/R_{II2})f_2 = 1.674$ FIG. 21 is a block diagram of a numerical example 11 of the invention. In order from the object side, the first lens unit of positive refractive power, the second lens unit of negative refractive power and the third lens unit of positive refractive power are similar in construction and arrangement to the numerical example 10. The fourth lens unit of positive refractive power is constructed likewise as in the numerical example 5. Aspherical surfaces, too, are used in the same surfaces as in the numerical example 5.

Figure 23:
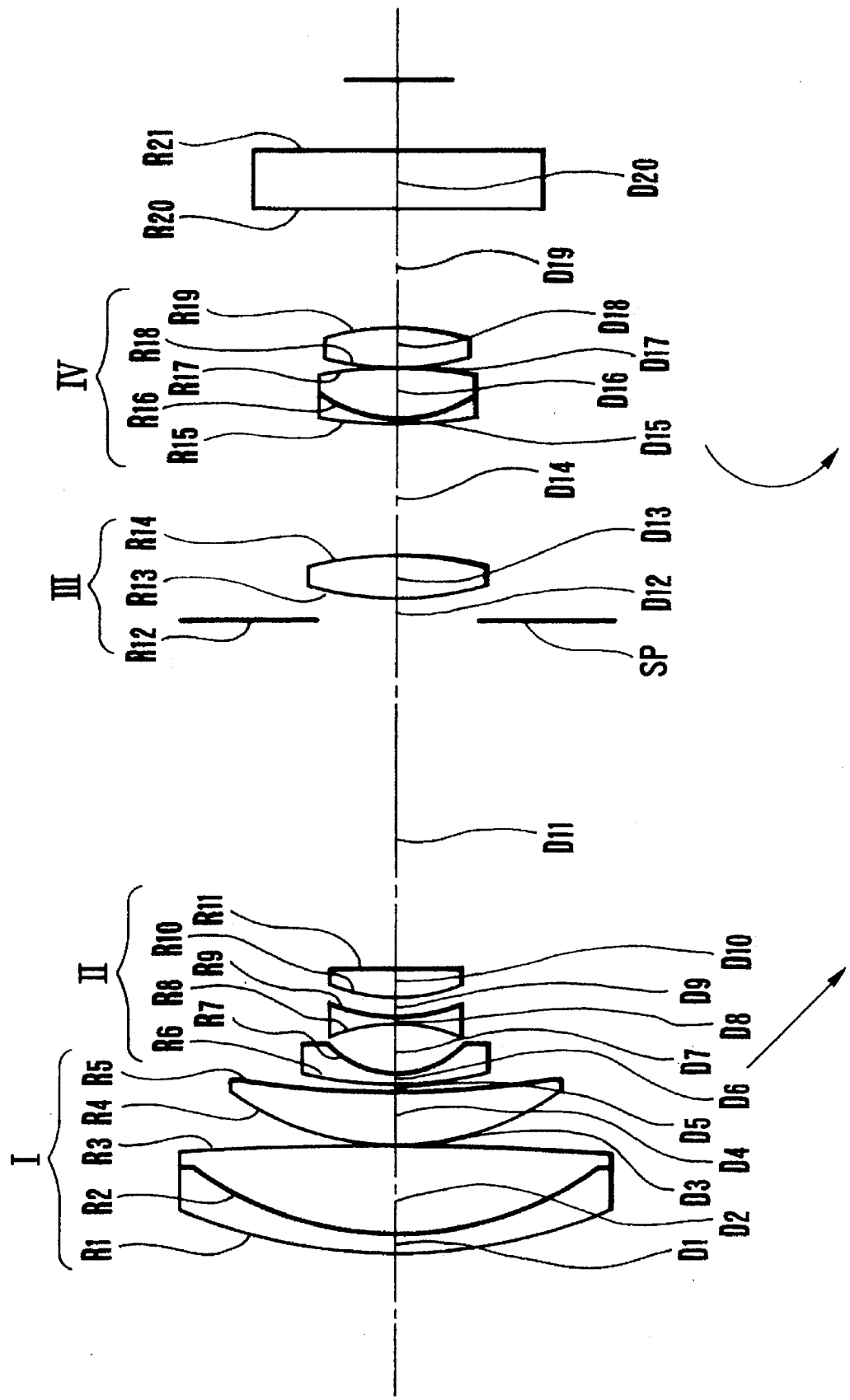
FIG. 23 is a longitudinal section view of a numerical example 12 of a zoom lens of the invention.
Figure 24A:
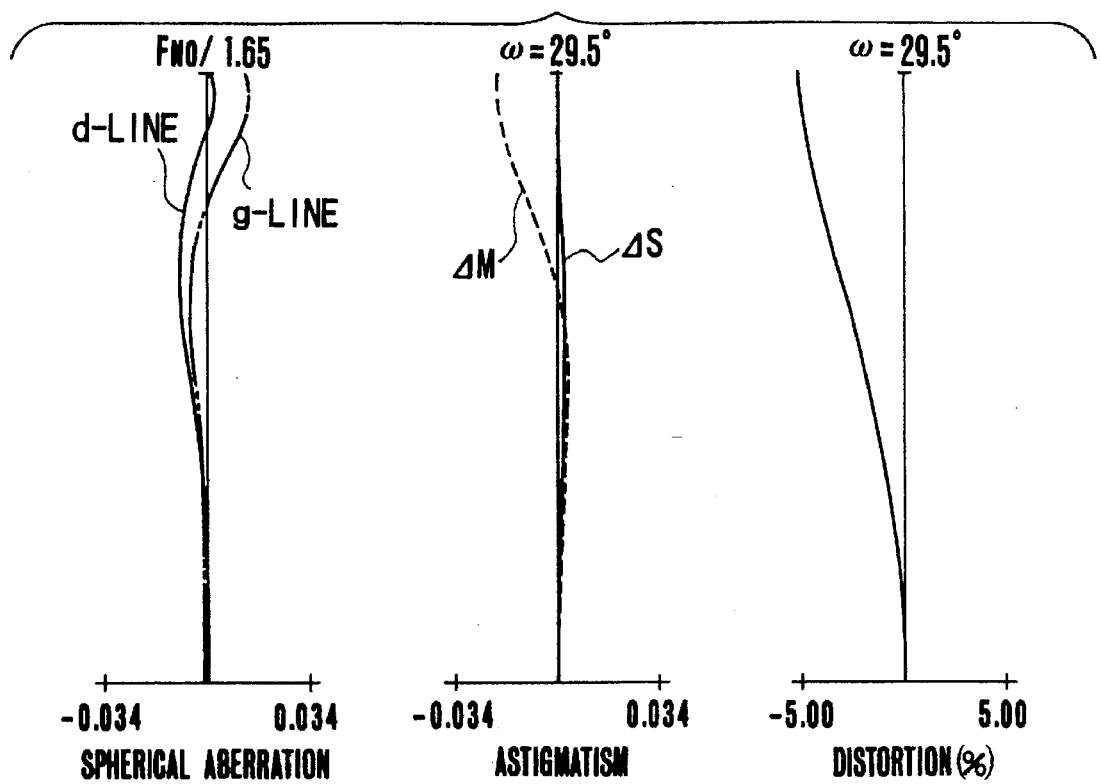
FIGS. 24(A), 24(B) and 24(C) are graphic representations of the various aberrations of the numerical example 12.
Figure 24B:
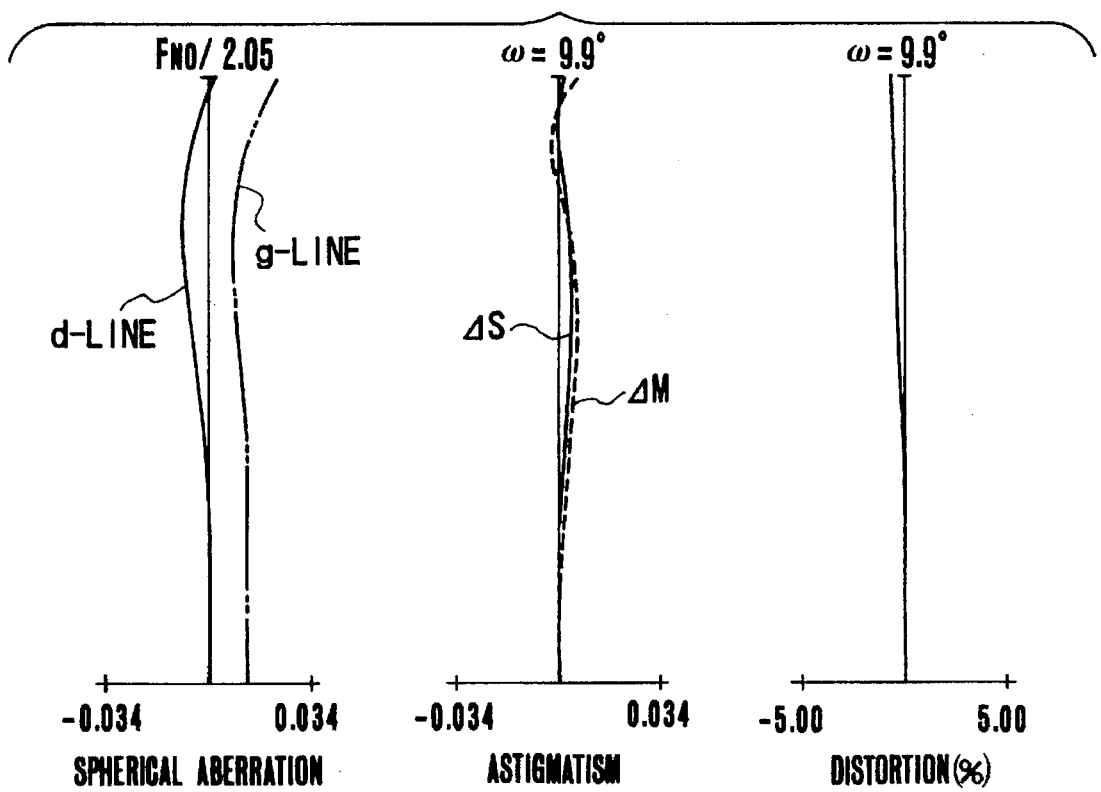
Figure 24C:
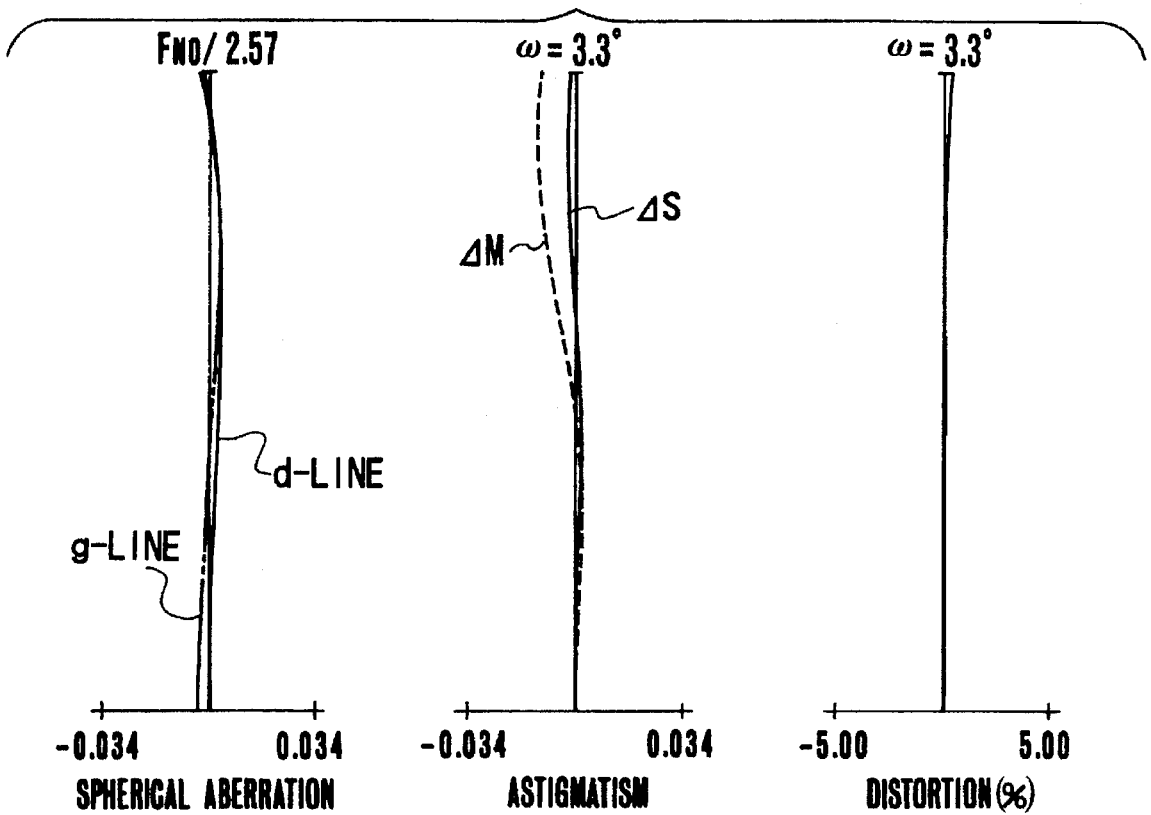
Figure 26A:
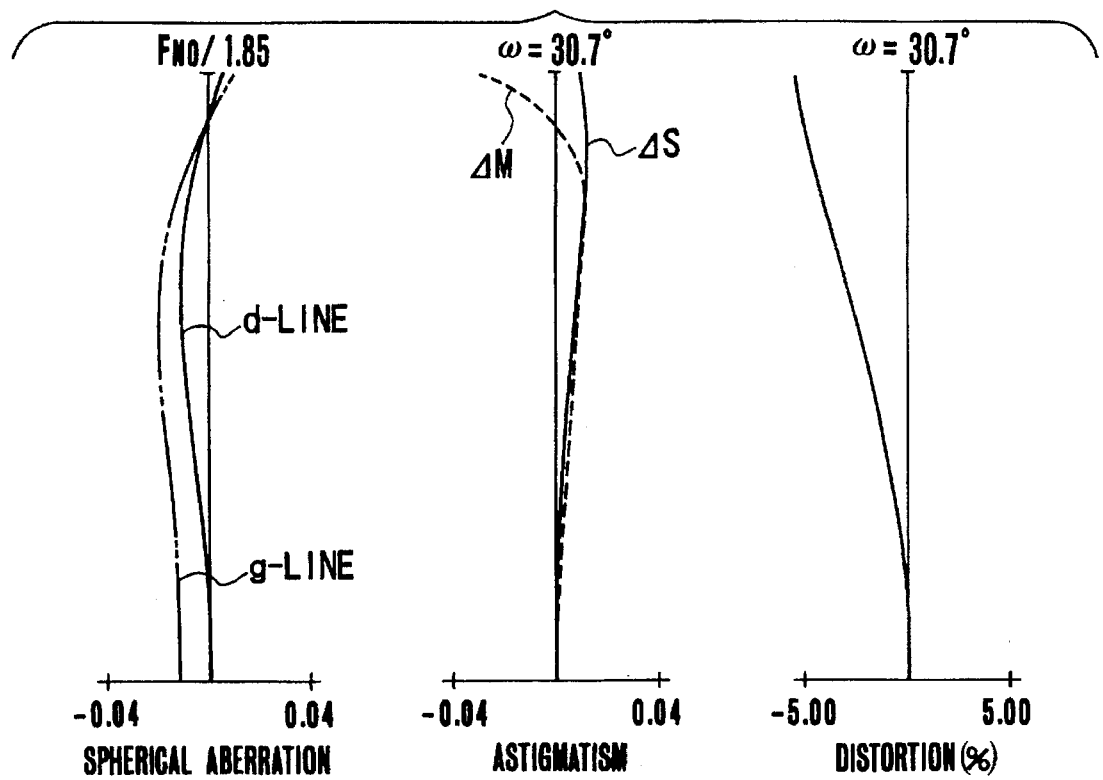
Figure 26B:
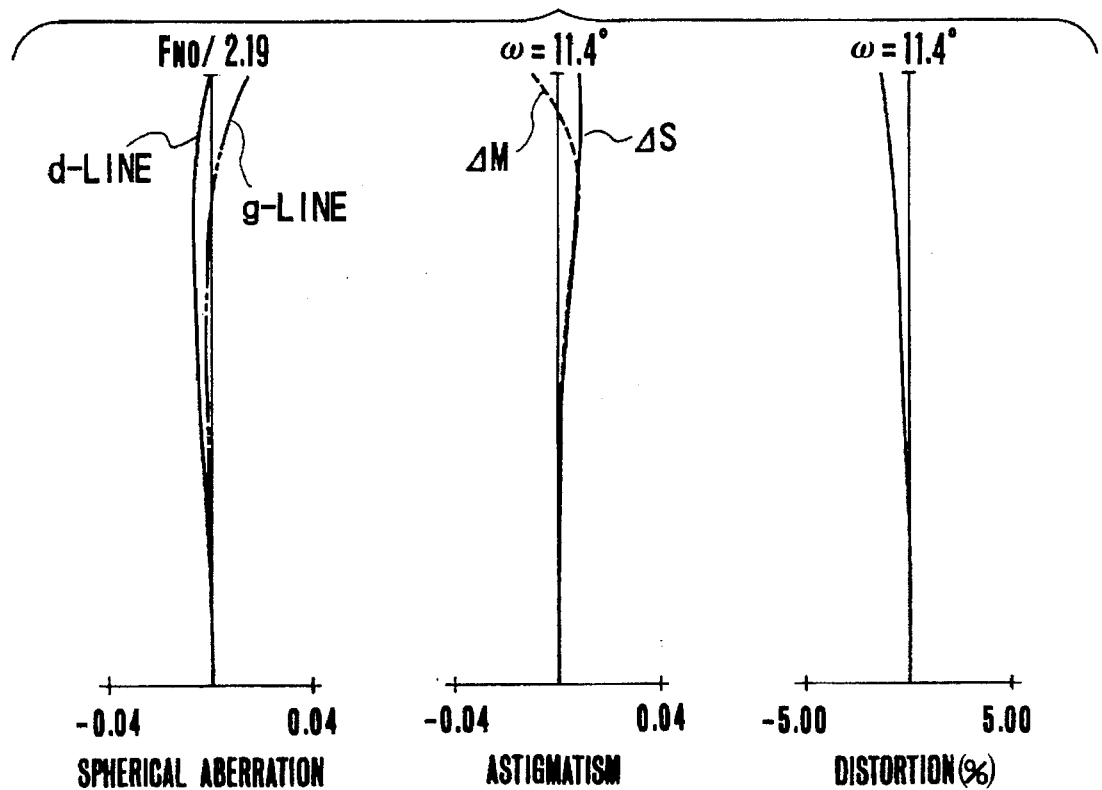
Figure 27B:
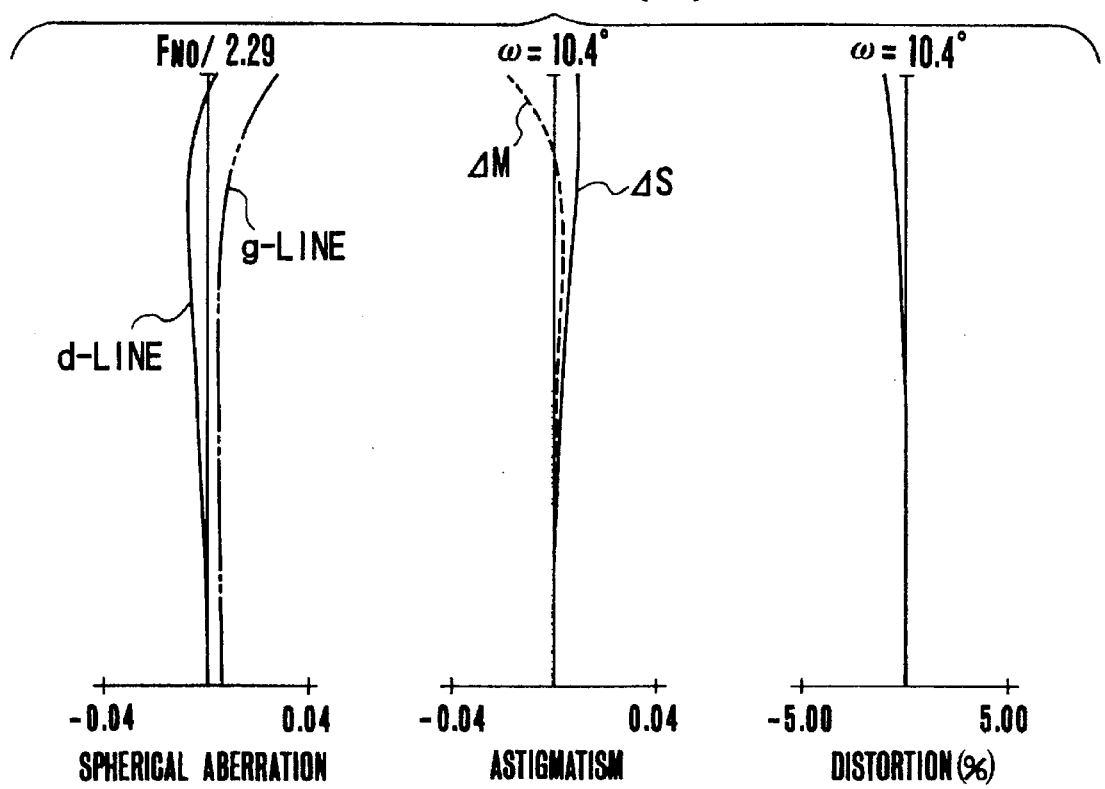
Figure 27C:
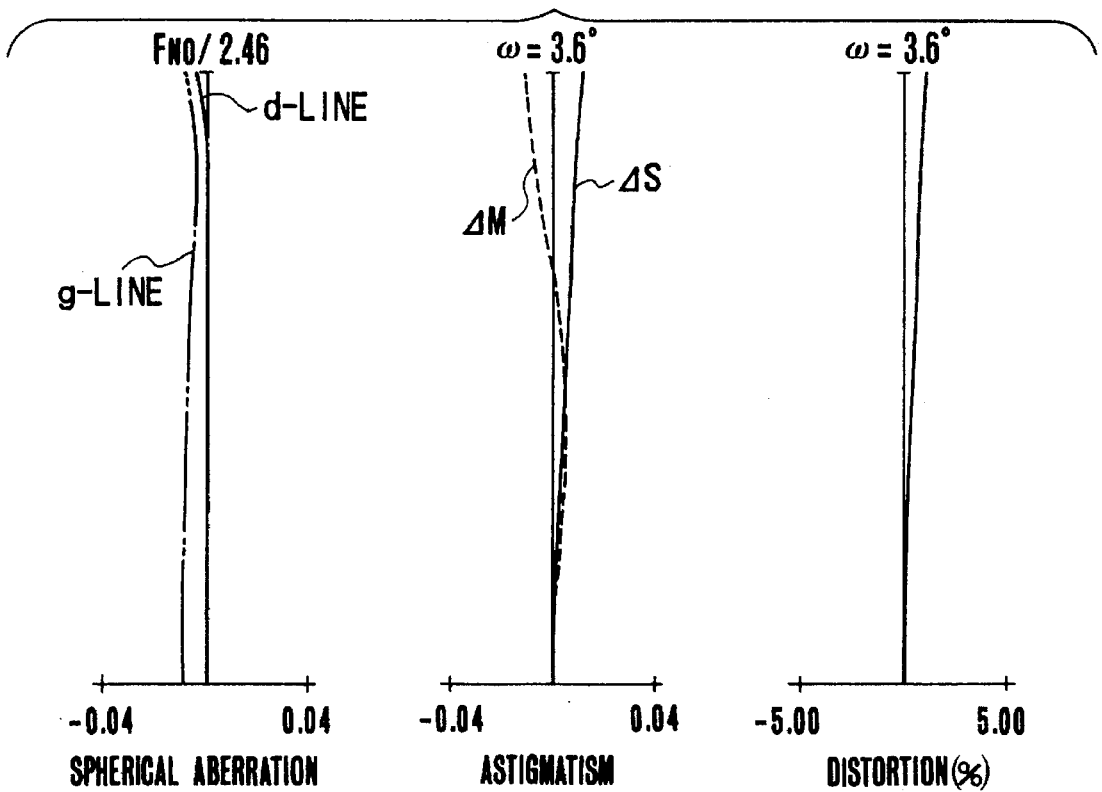
Figure 28A:
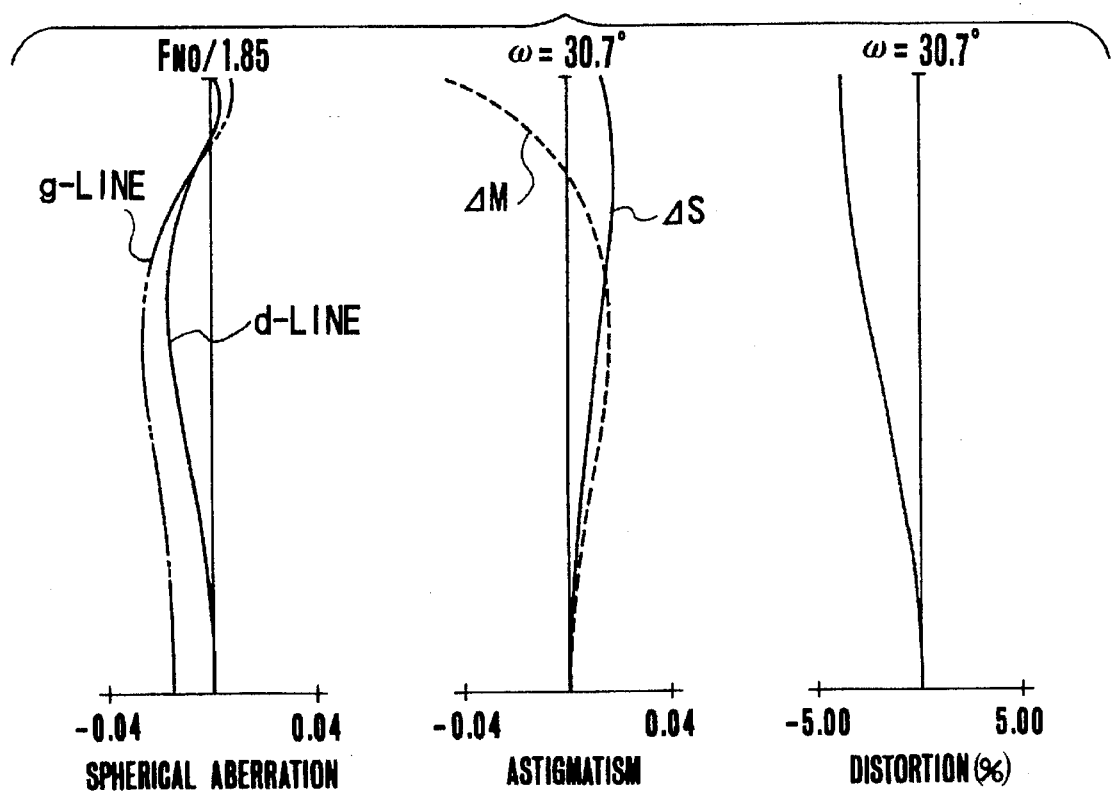
FIGS. 28(A), 28(B) and 28(C) are graphic representations of the various aberrations of a numerical example 15.
Figure 28B:
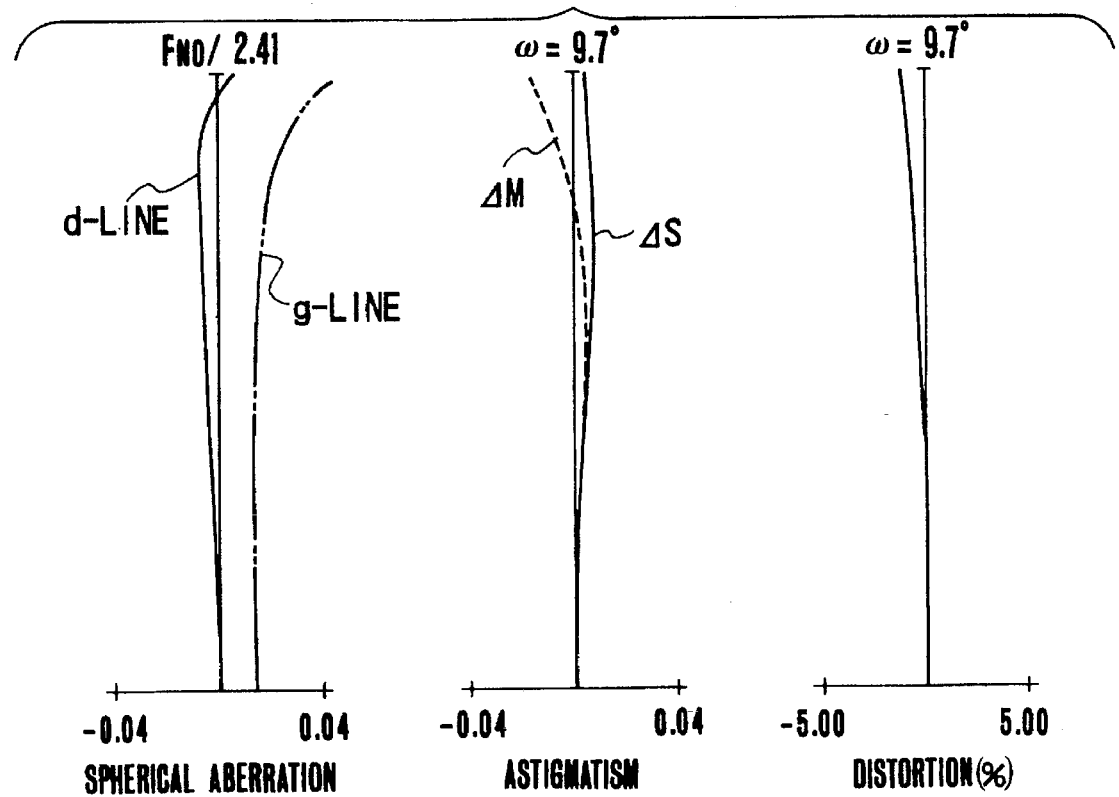
Figure 28C:
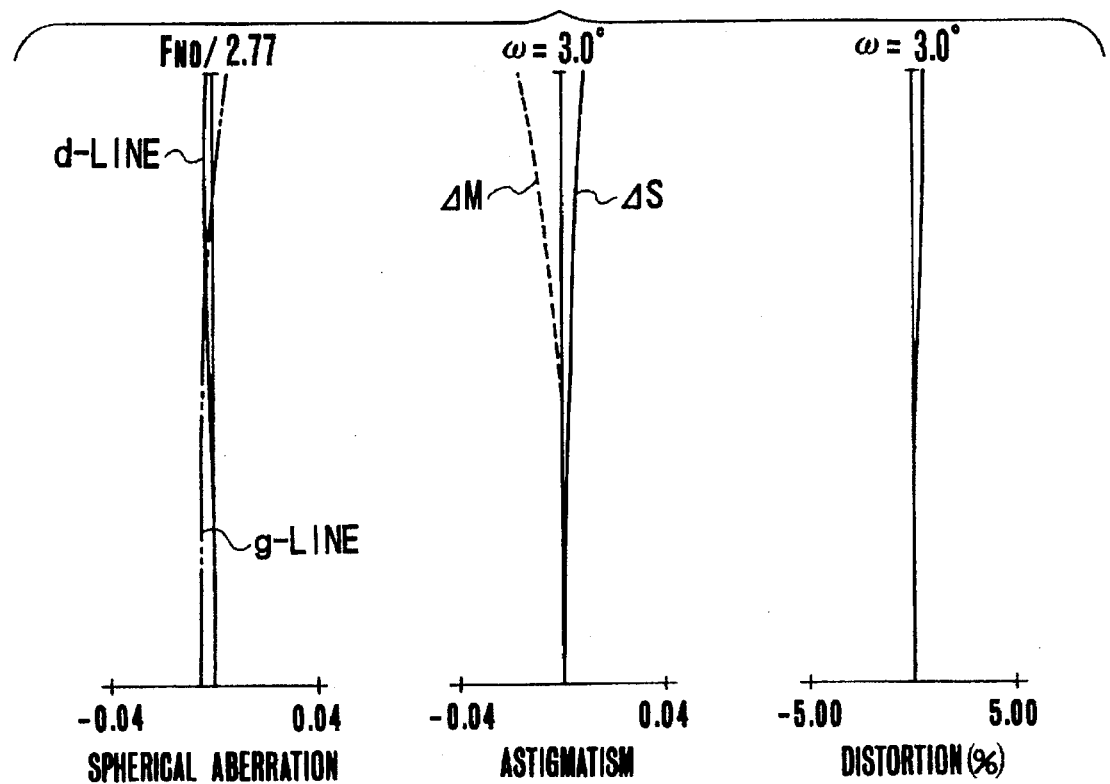
Figure 29A:
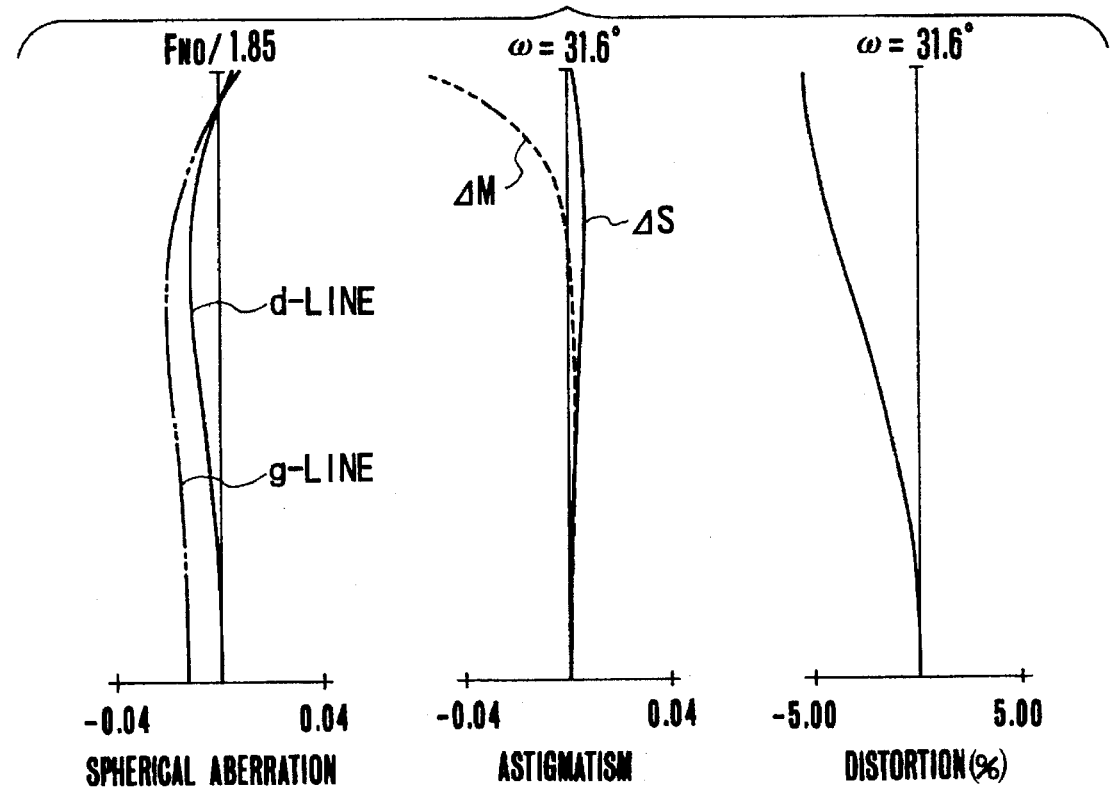
FIGS. 29(A), 29(B) and 29(C) are graphic representations of the various aberrations of a numerical example 16.
Figure 29B:
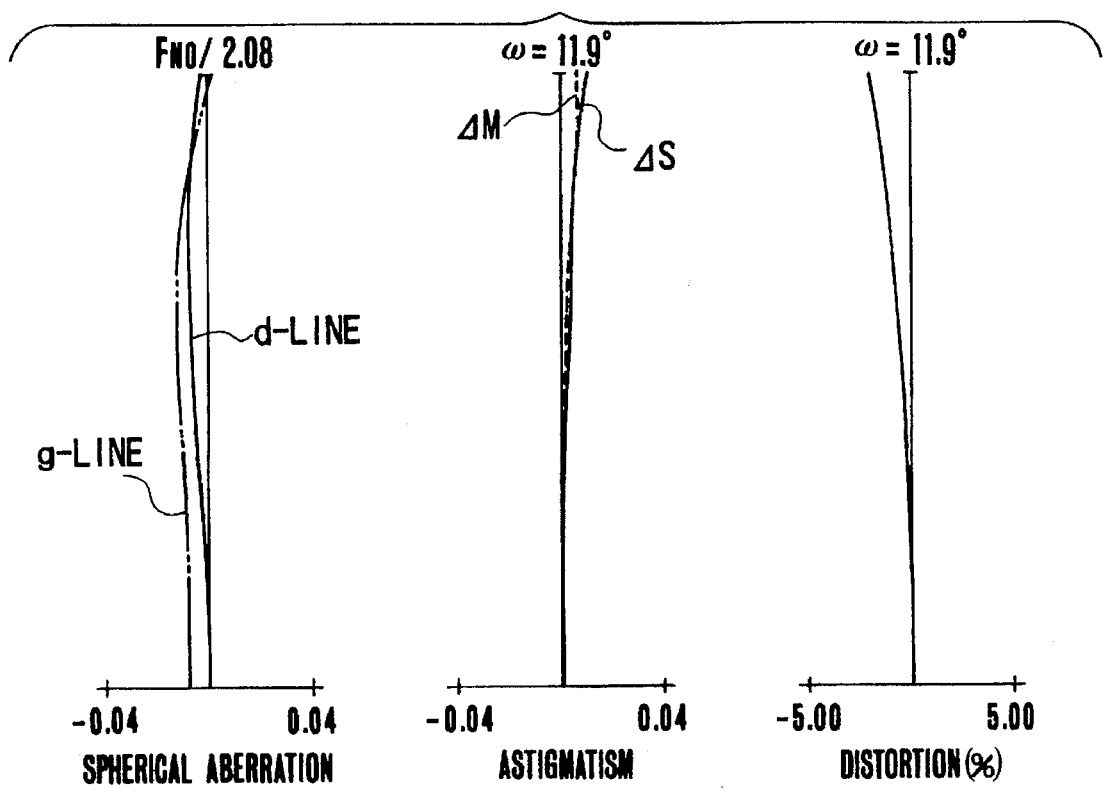
Figure 29C:
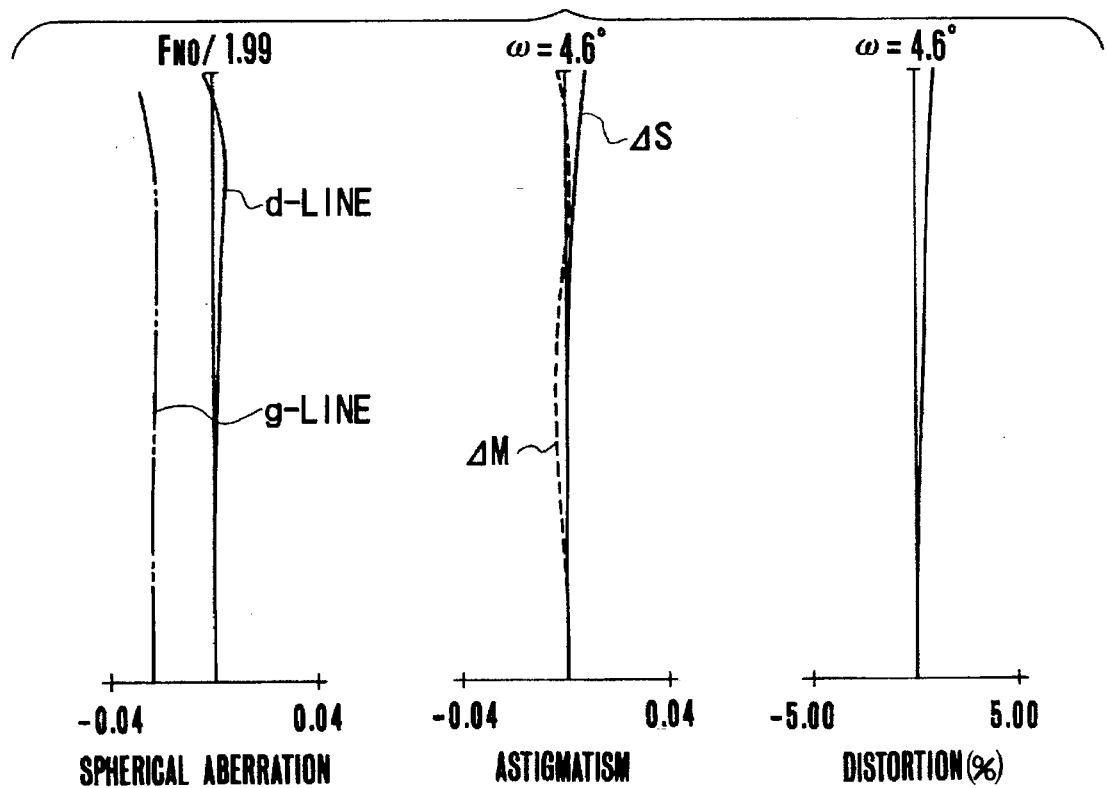
Figure 30A:
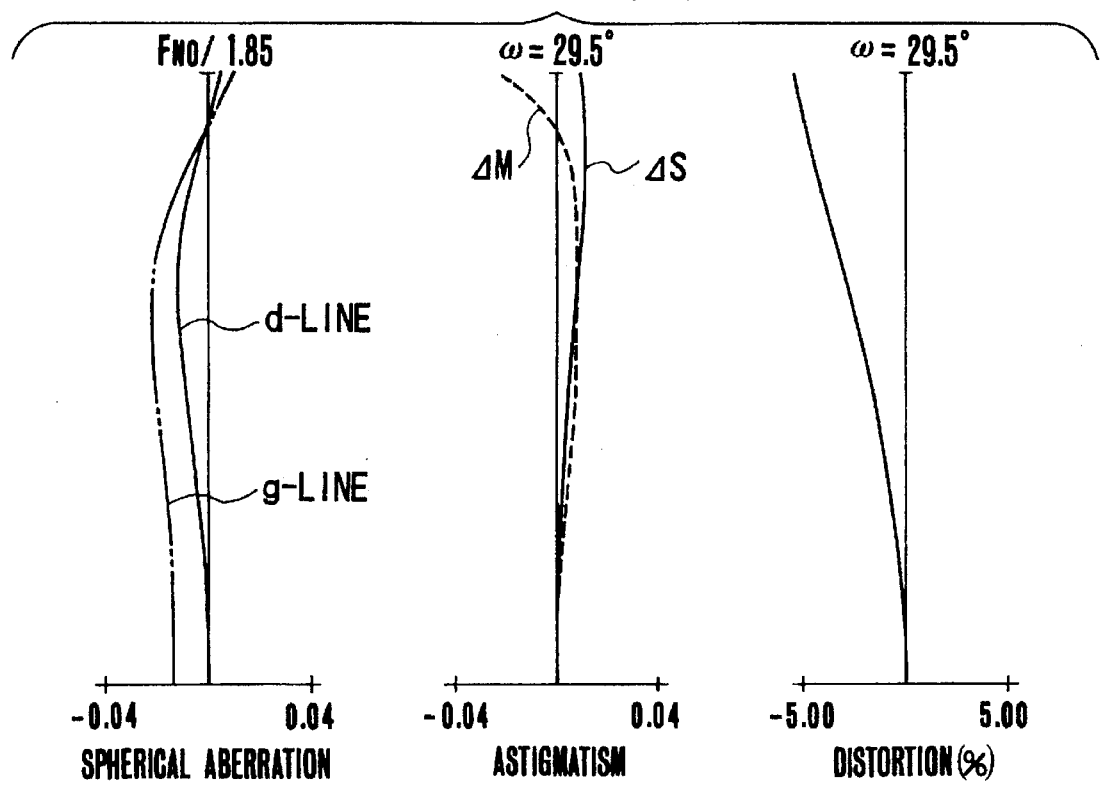
Figure 30B:
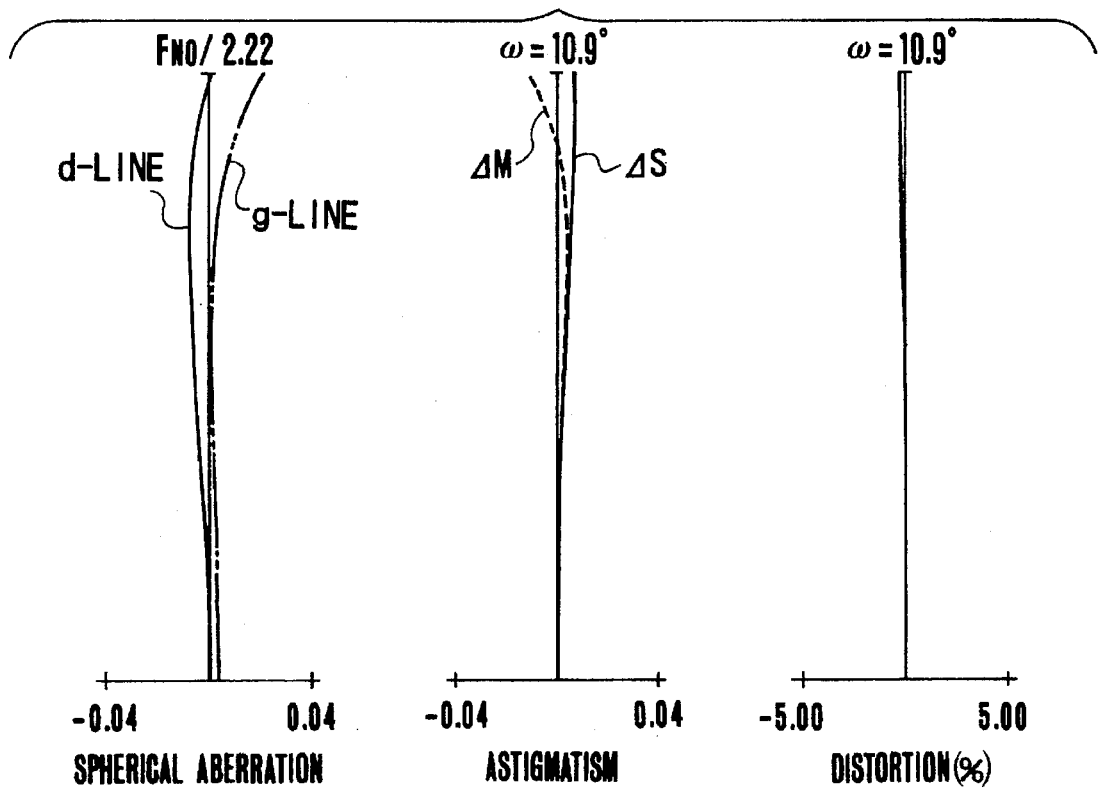
Figure 31:
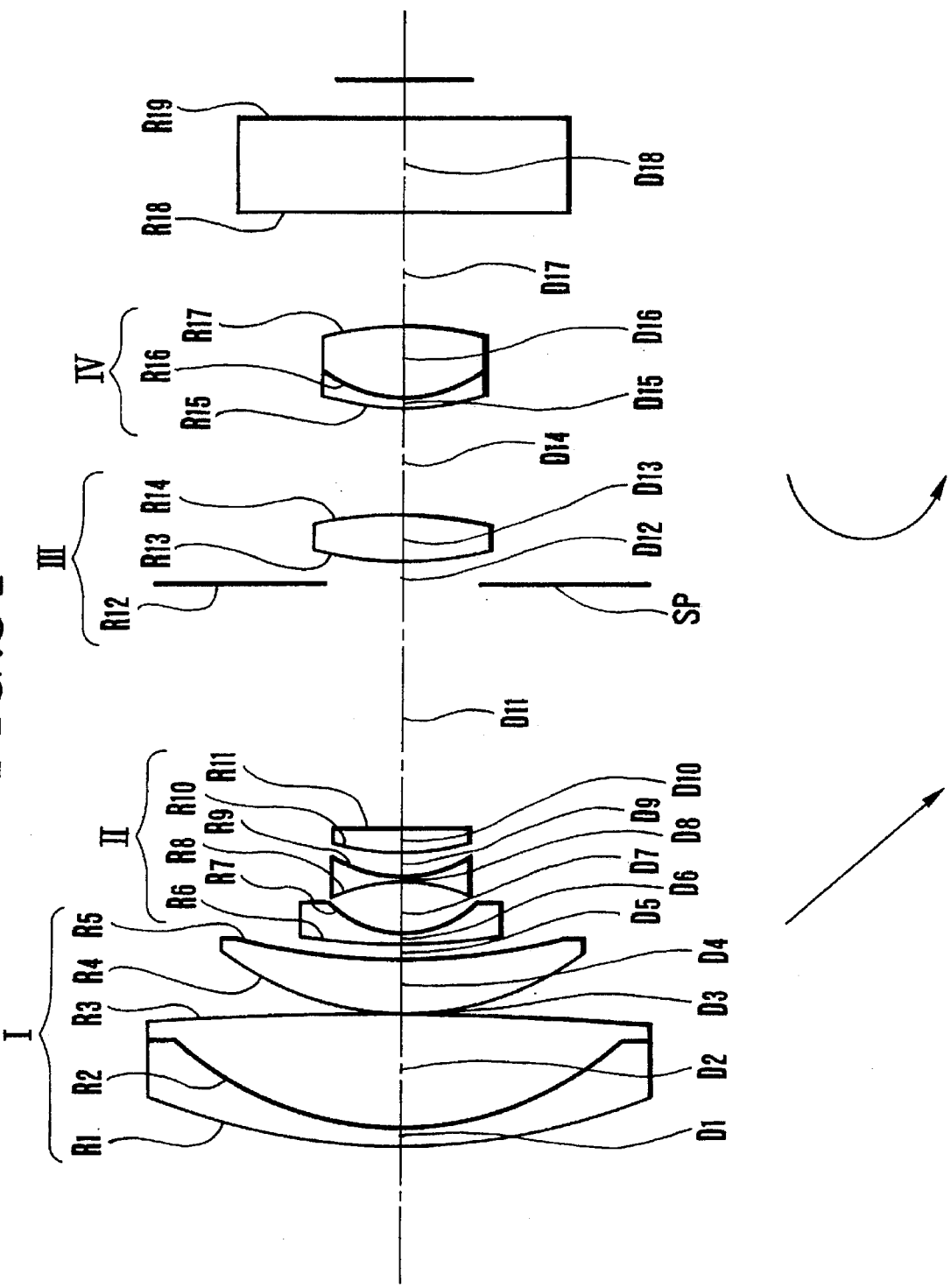
FIG. 31 is a longitudinal section view of a numerical example 18 of a zoom lens of the invention.
Figure 32A:
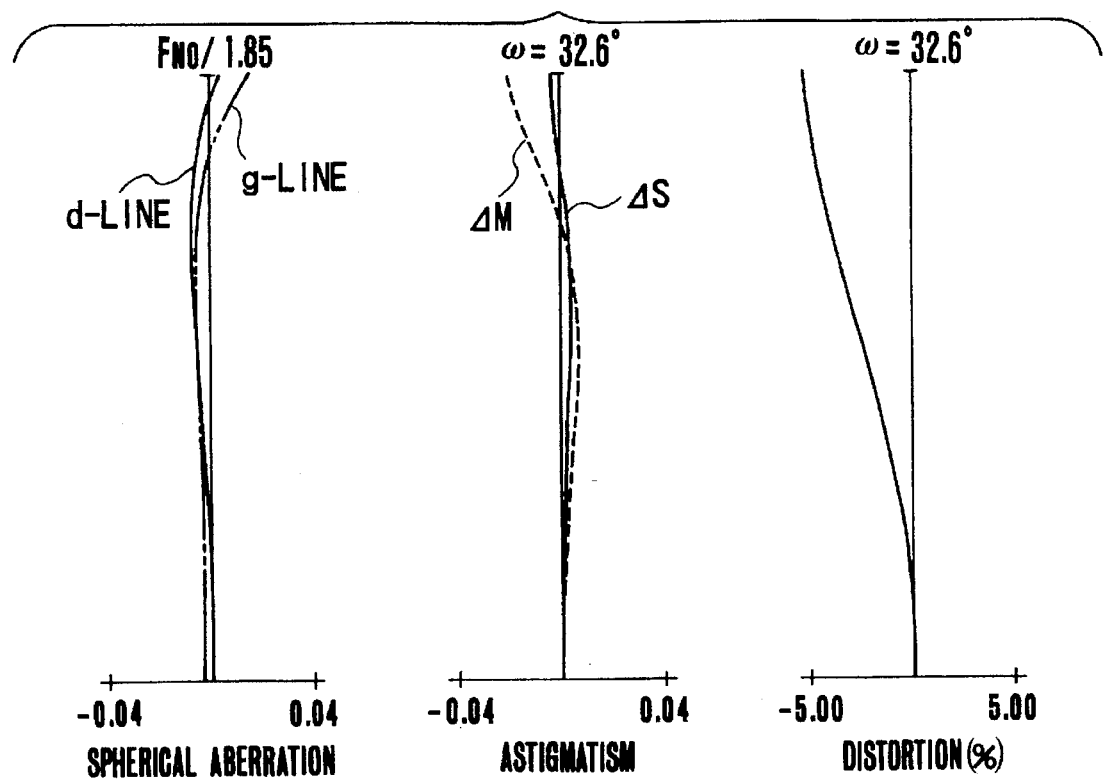
FIGS. 32(A), 32(B) and 32(C) are graphic representations of the various aberrations of a numerical example 18.
Figure 32B:
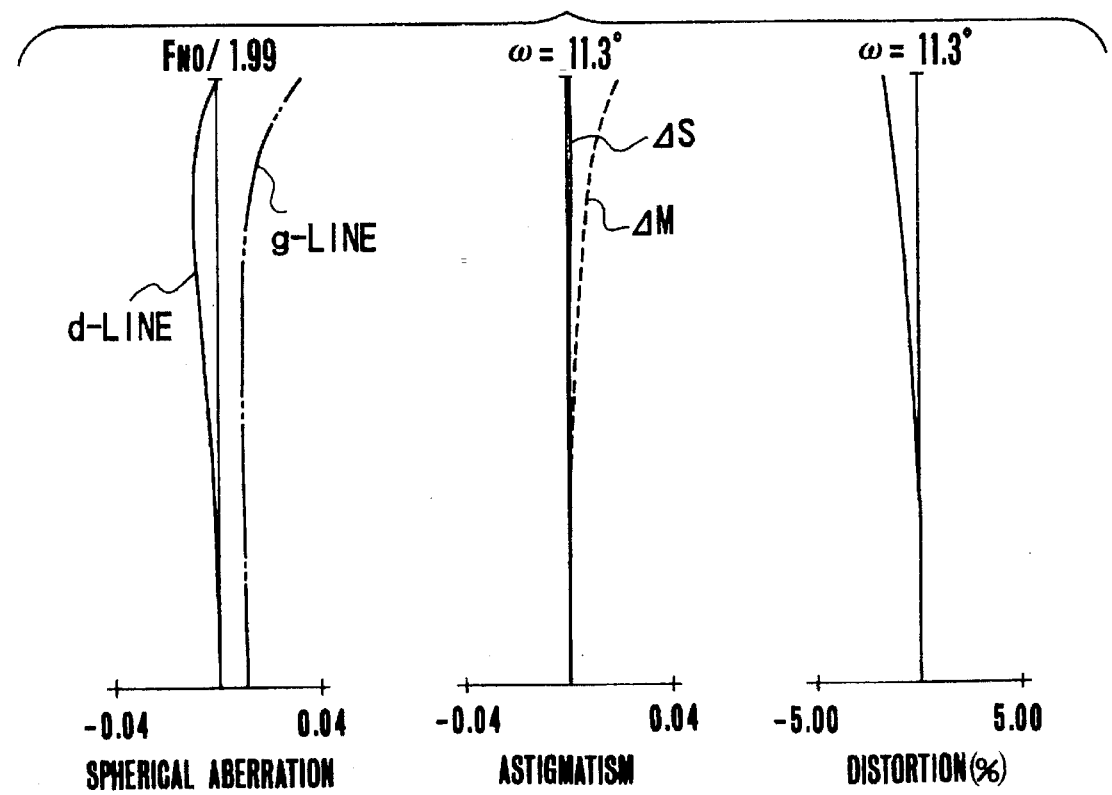
Figure 32C:
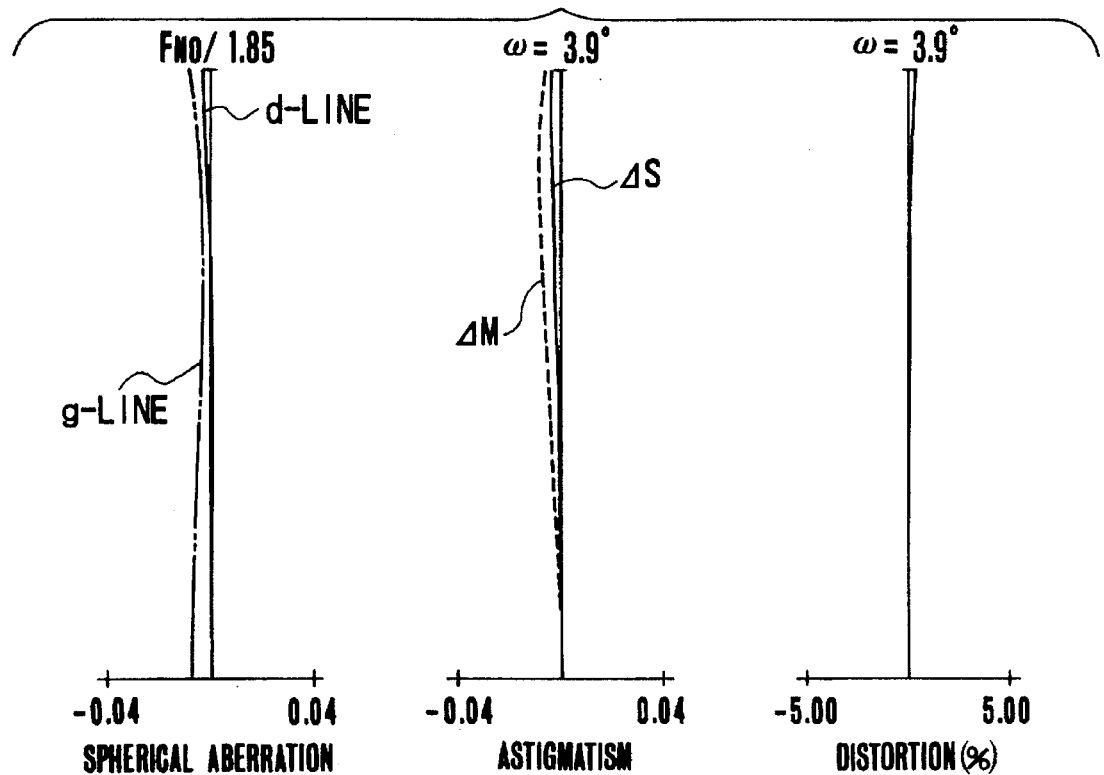
Figure 33A:
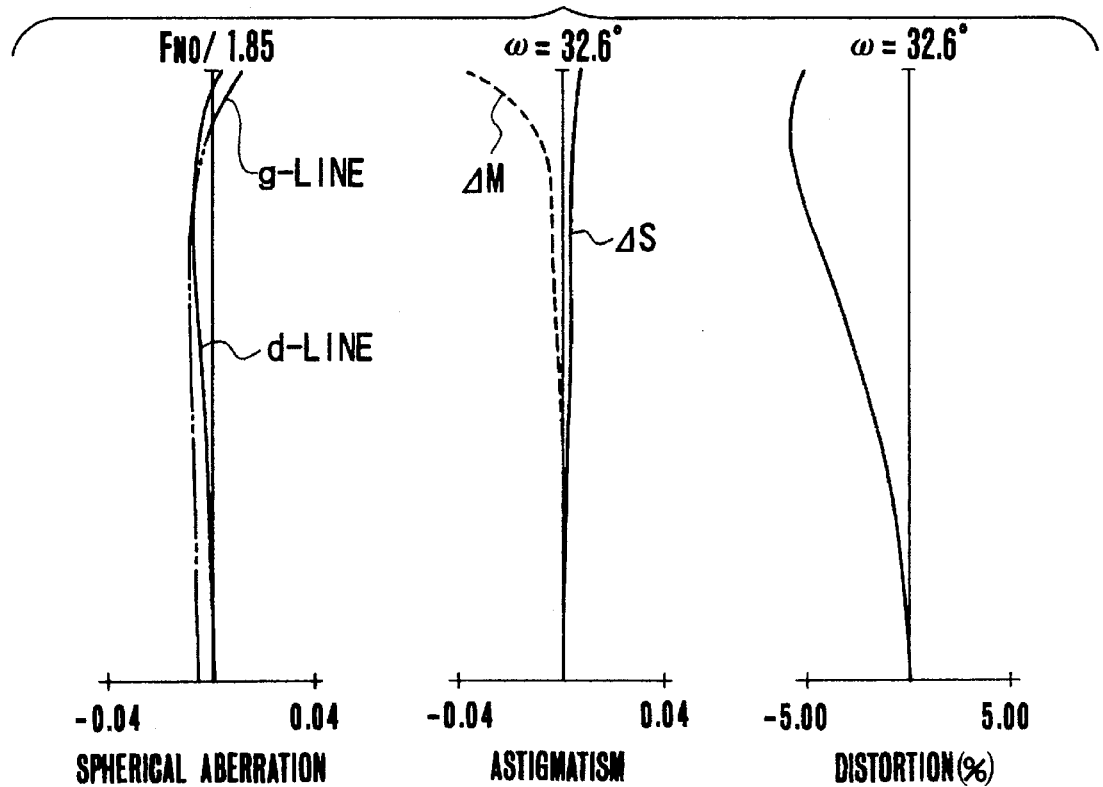
FIGS. 33(A), 33(B) and 33(C) are graphic representations of the various aberrations of a numerical example 19.
Figure 33B:
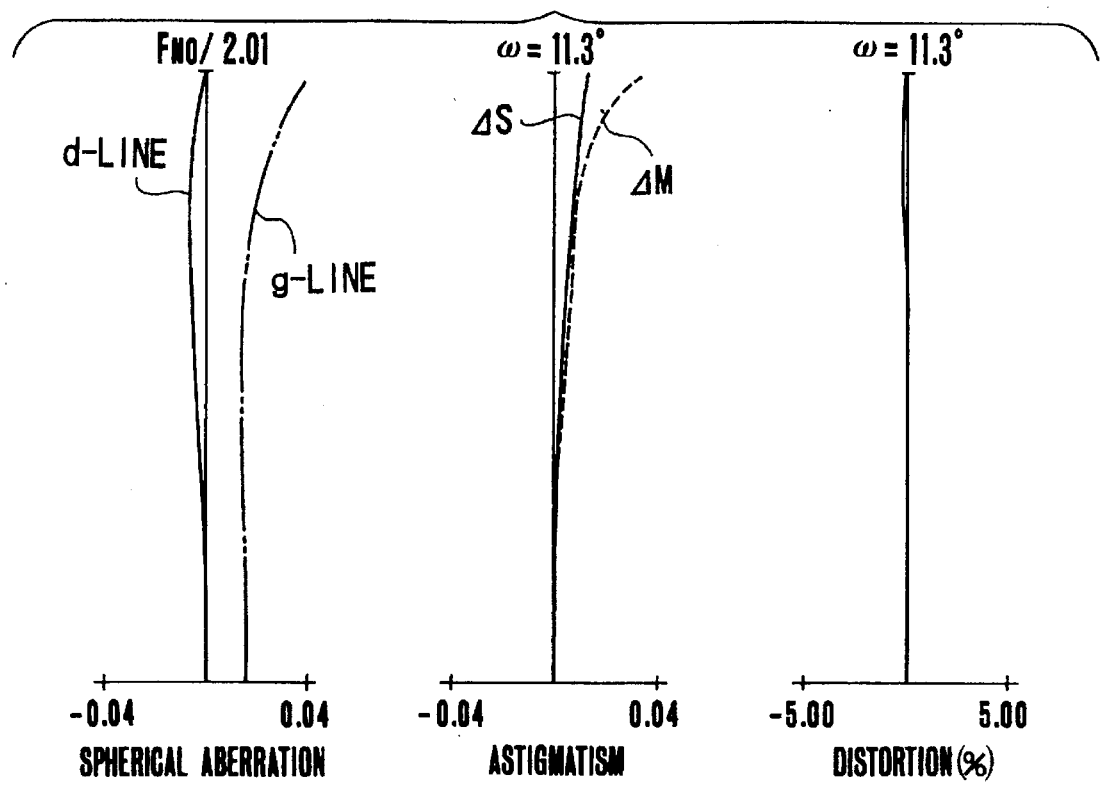
Figure 33C:
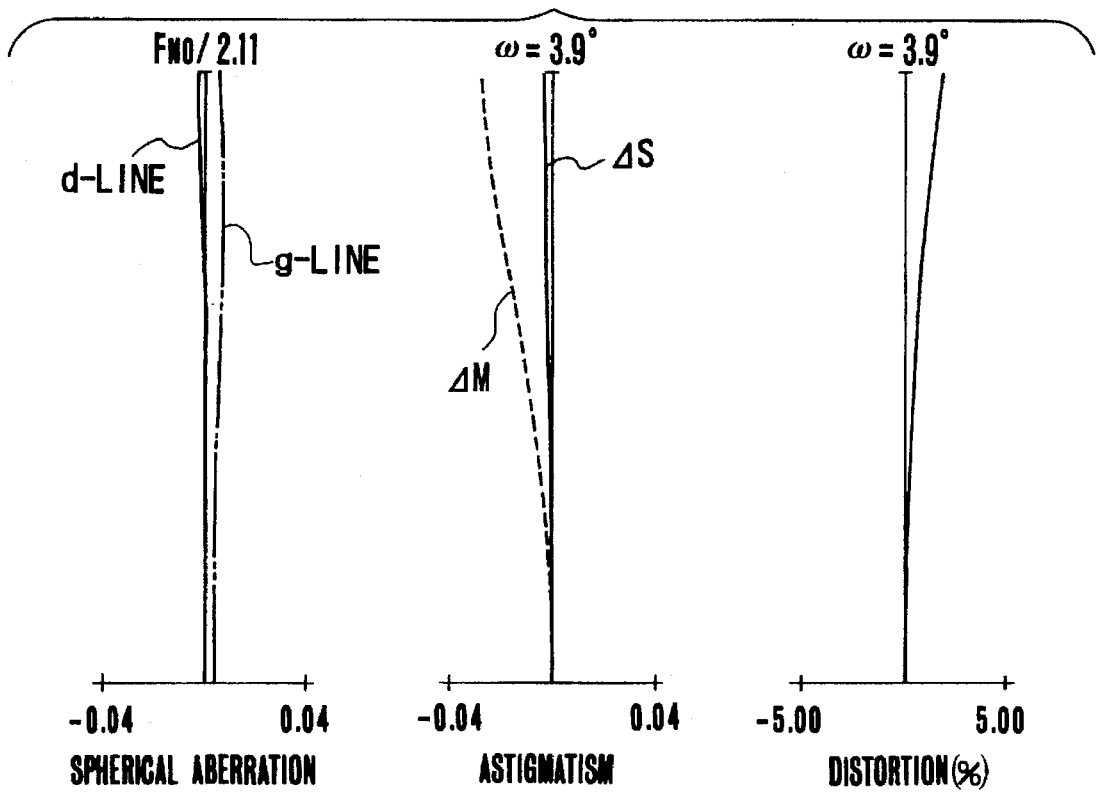
Figure 34A:
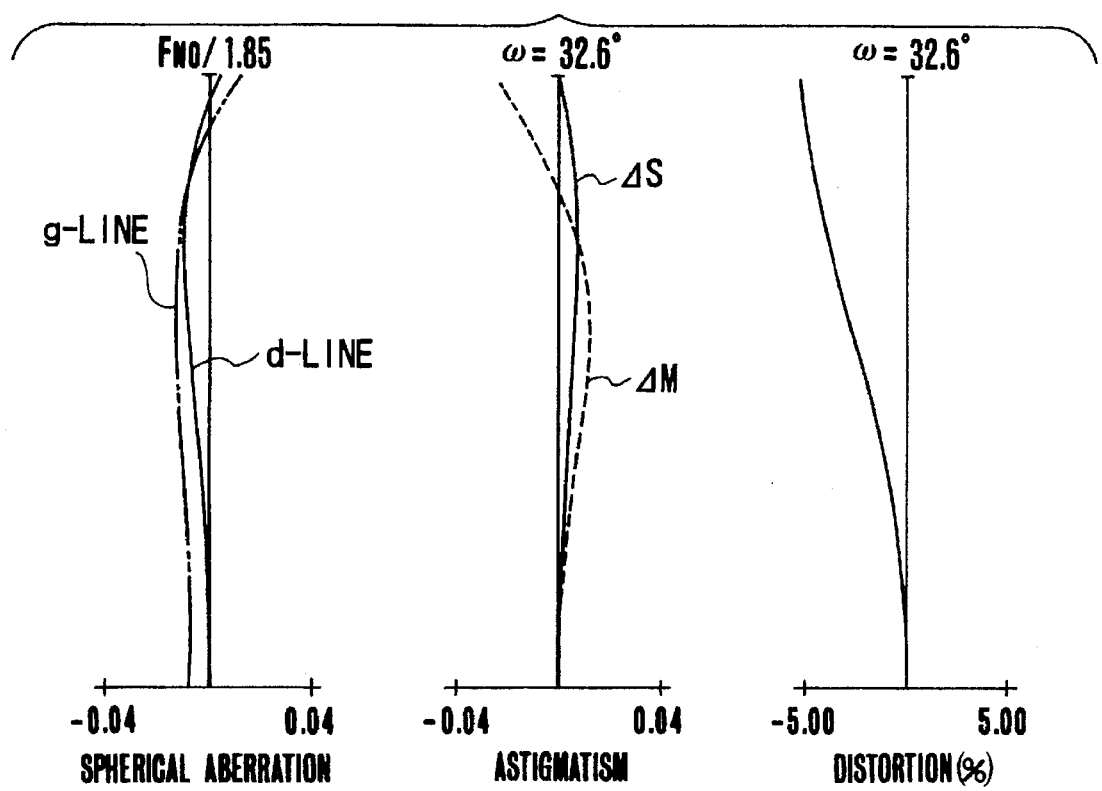
FIGS. 34(A), 34(B) and 34(C) are graphic representations of the various aberrations of a numerical example 20.
Figure 34B:
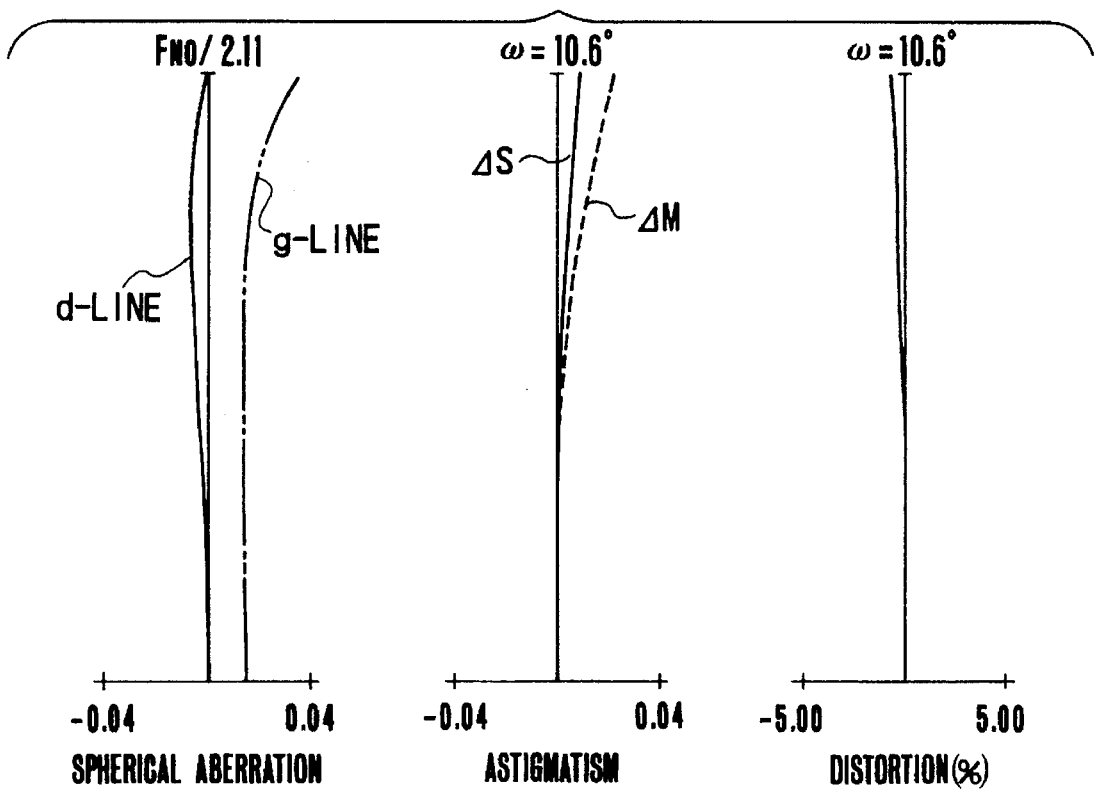
Figure 34C:
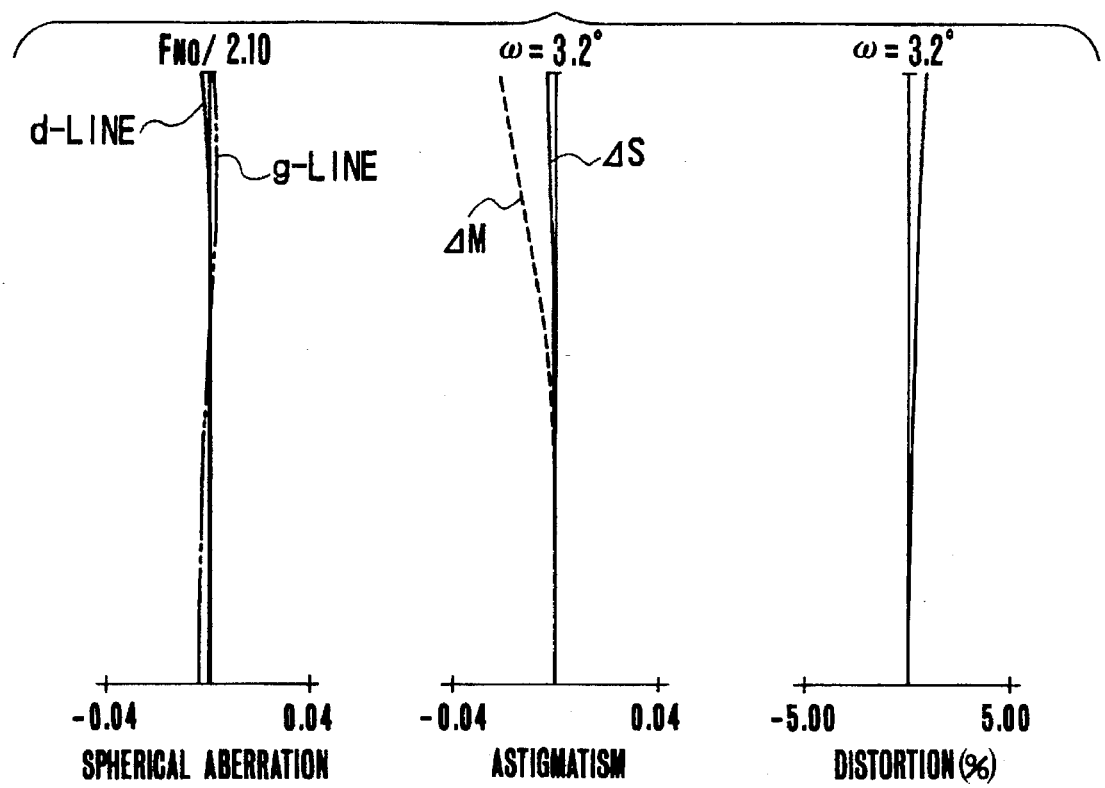
Figure 35A:
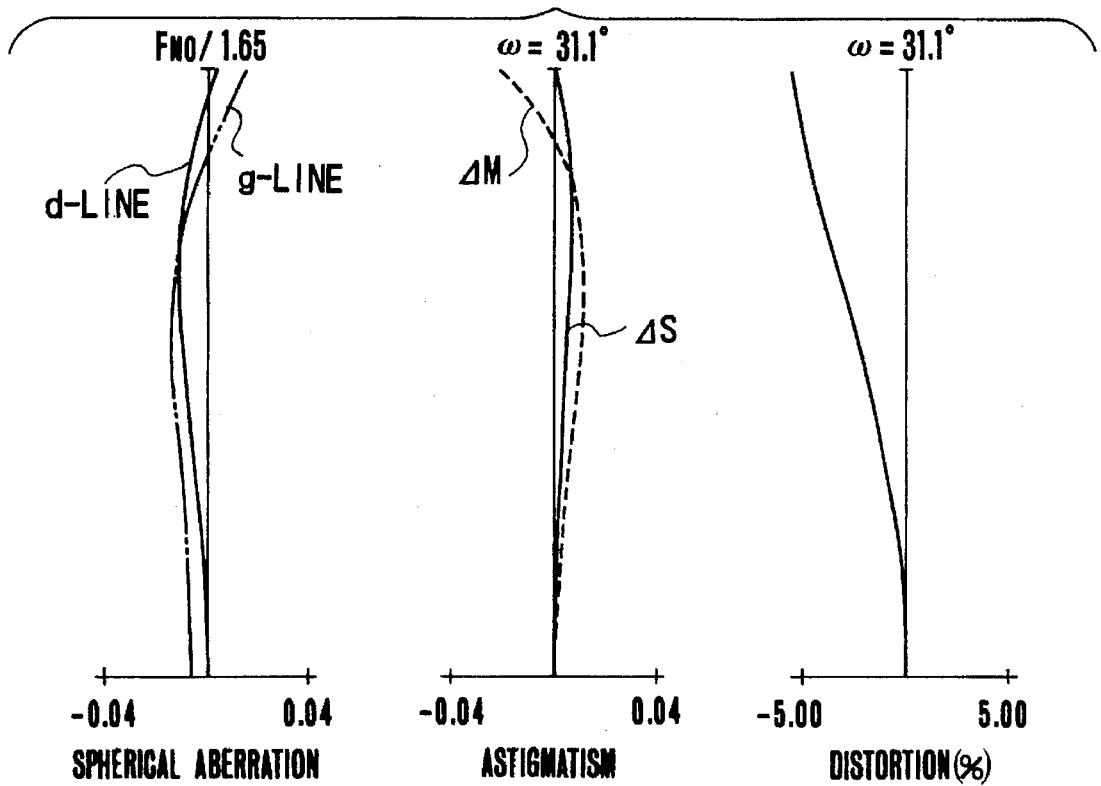
FIGS. 35(A), 35(B) and 35(C) are graphic representations of the various aberrations of a numerical example 21.
Figure 35B:
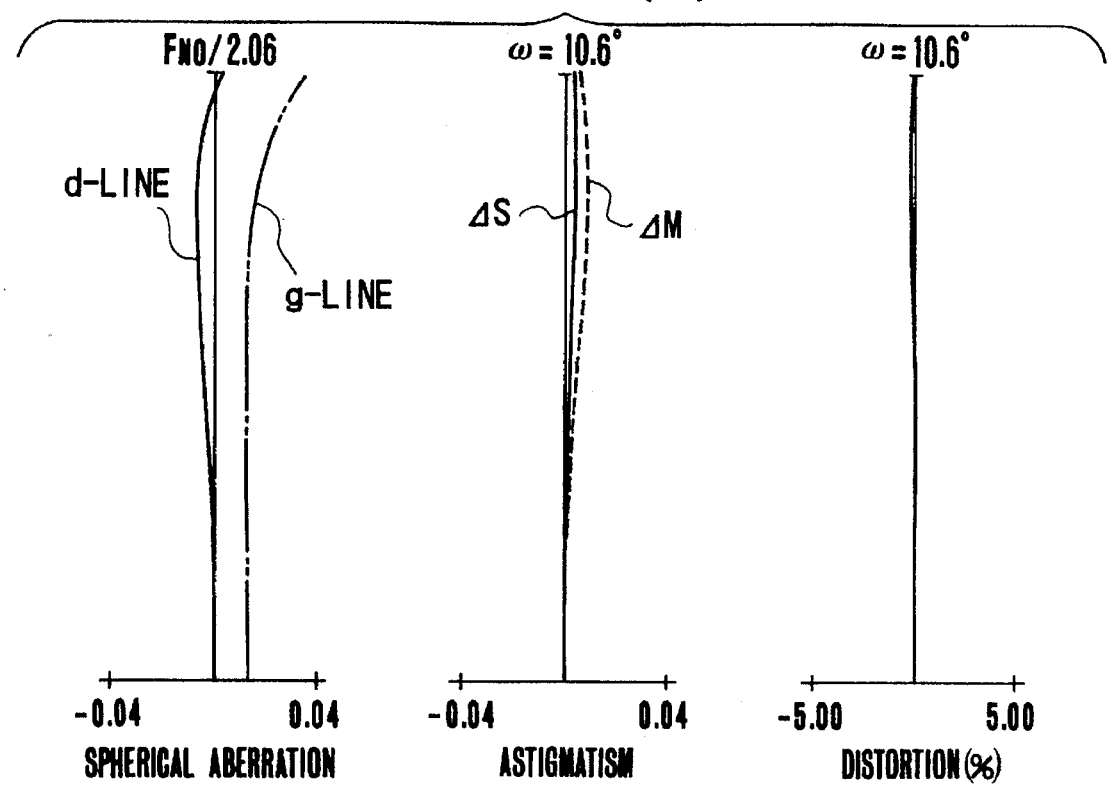
Figure 35C:
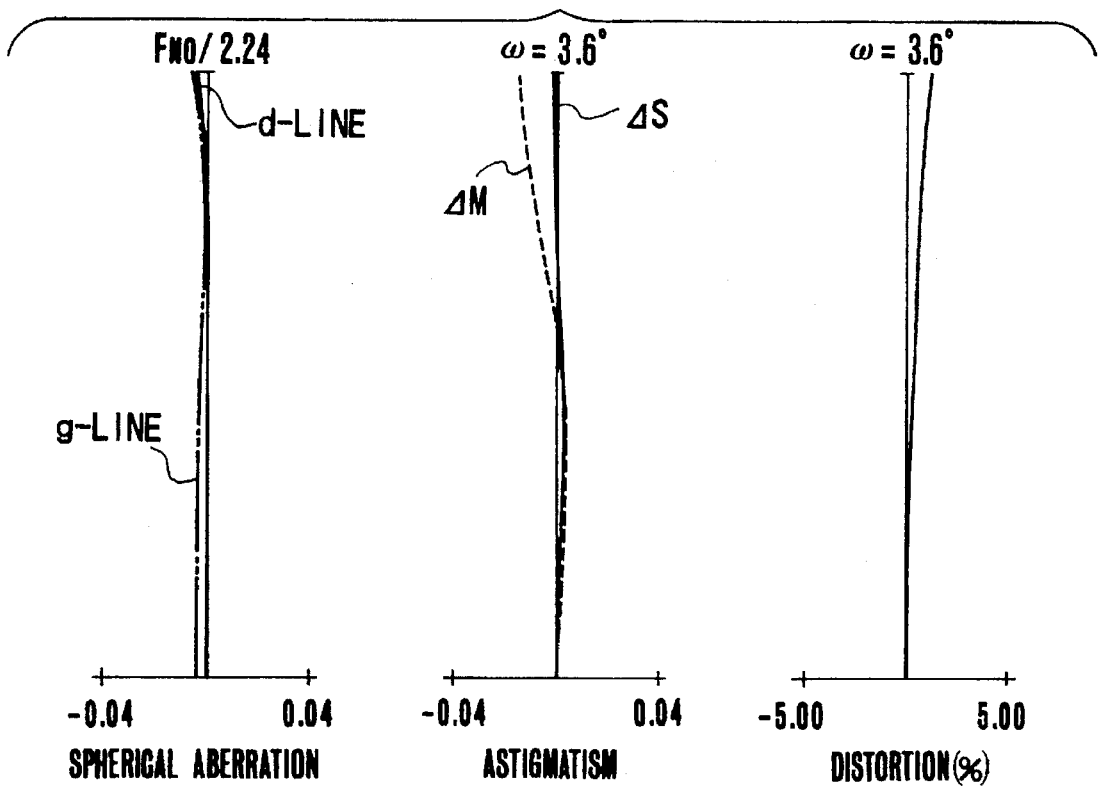
Figure 36:
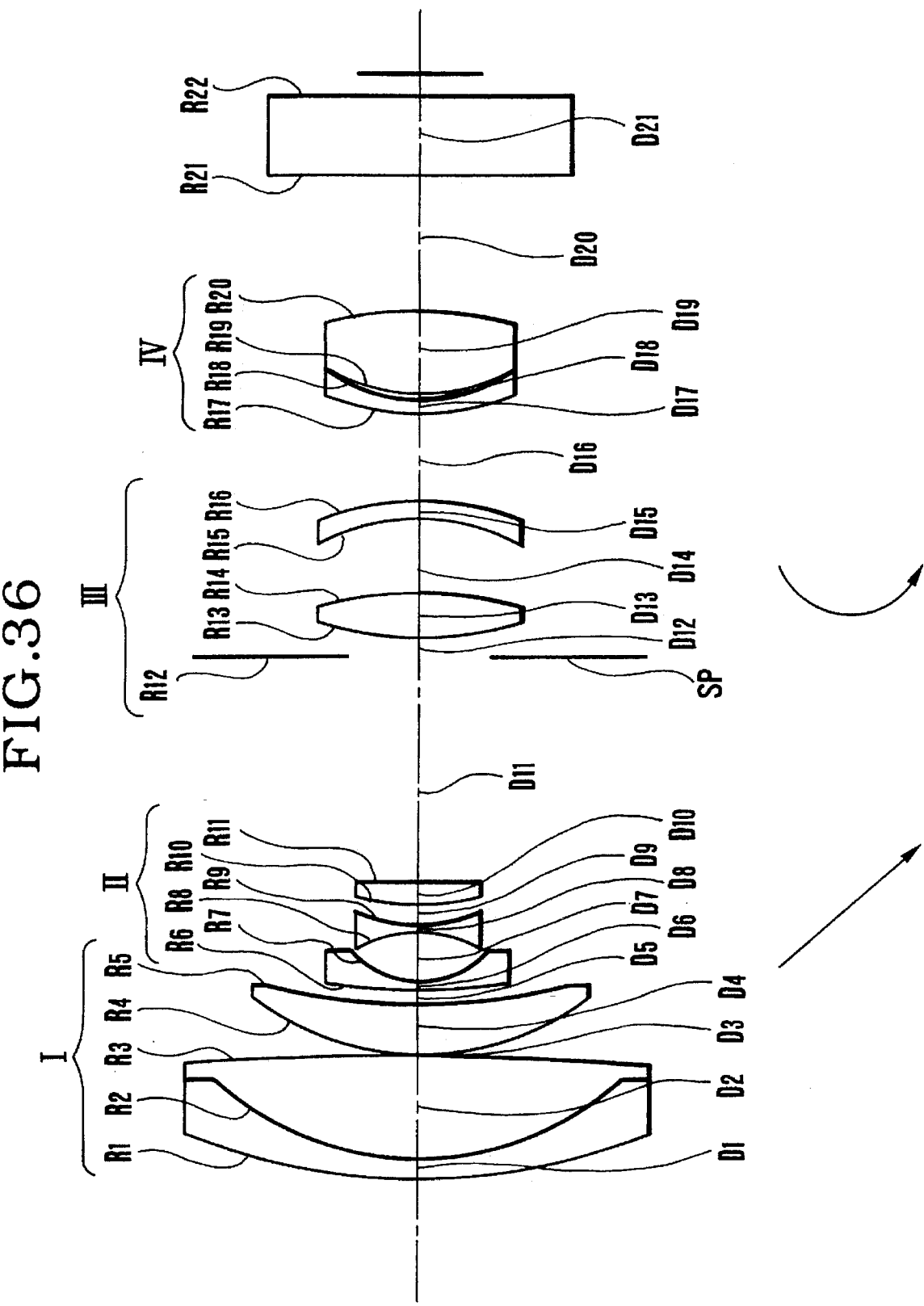
FIG. 36 is a longitudinal section view of a numerical example 22 of a zoom lens of the invention.
Figure 37A:
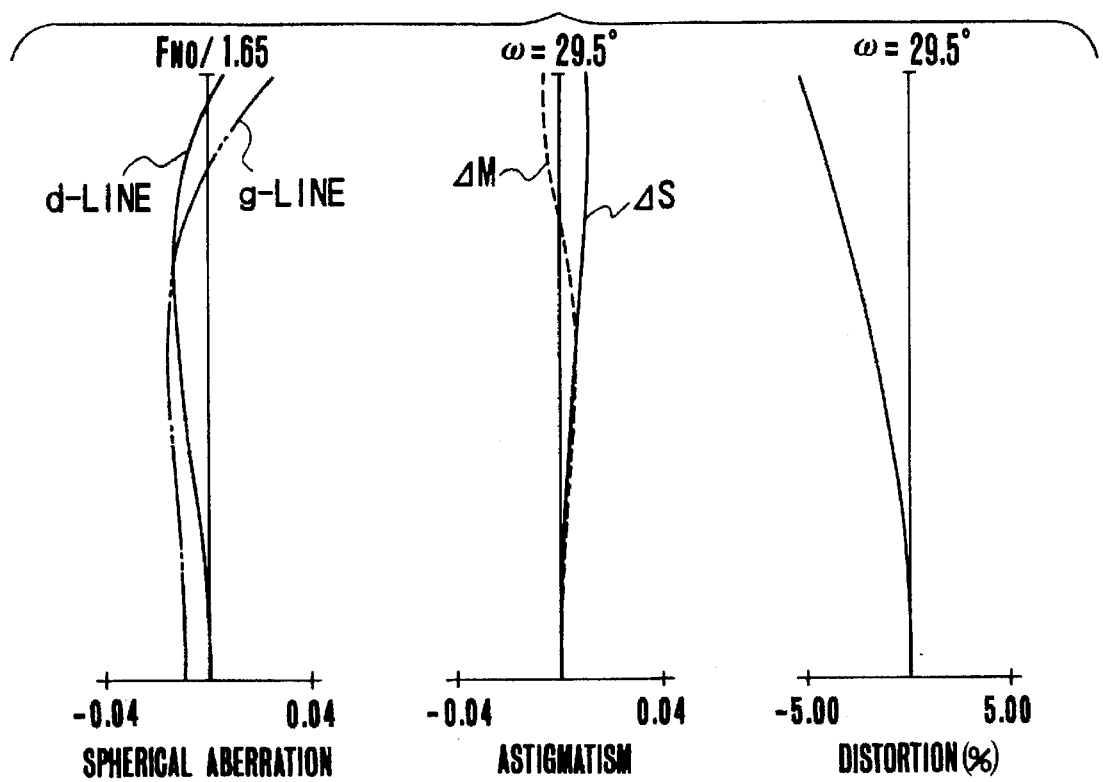
Figure 37B:
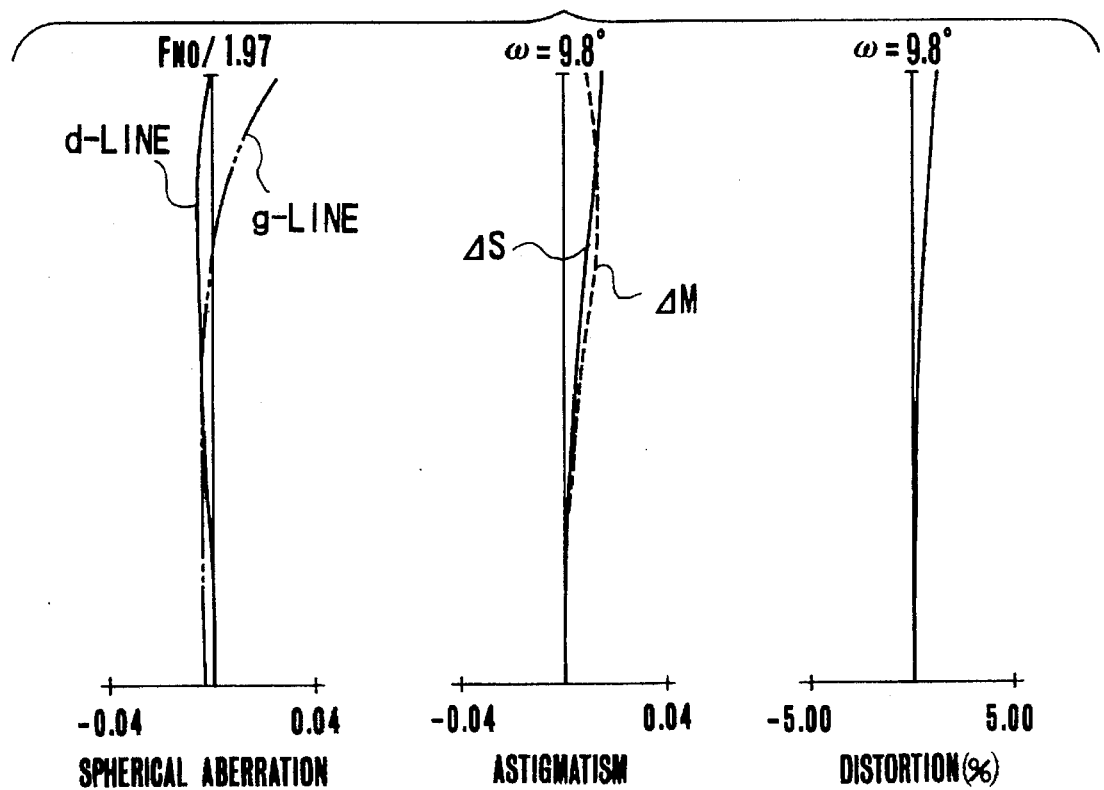
Figure 38:
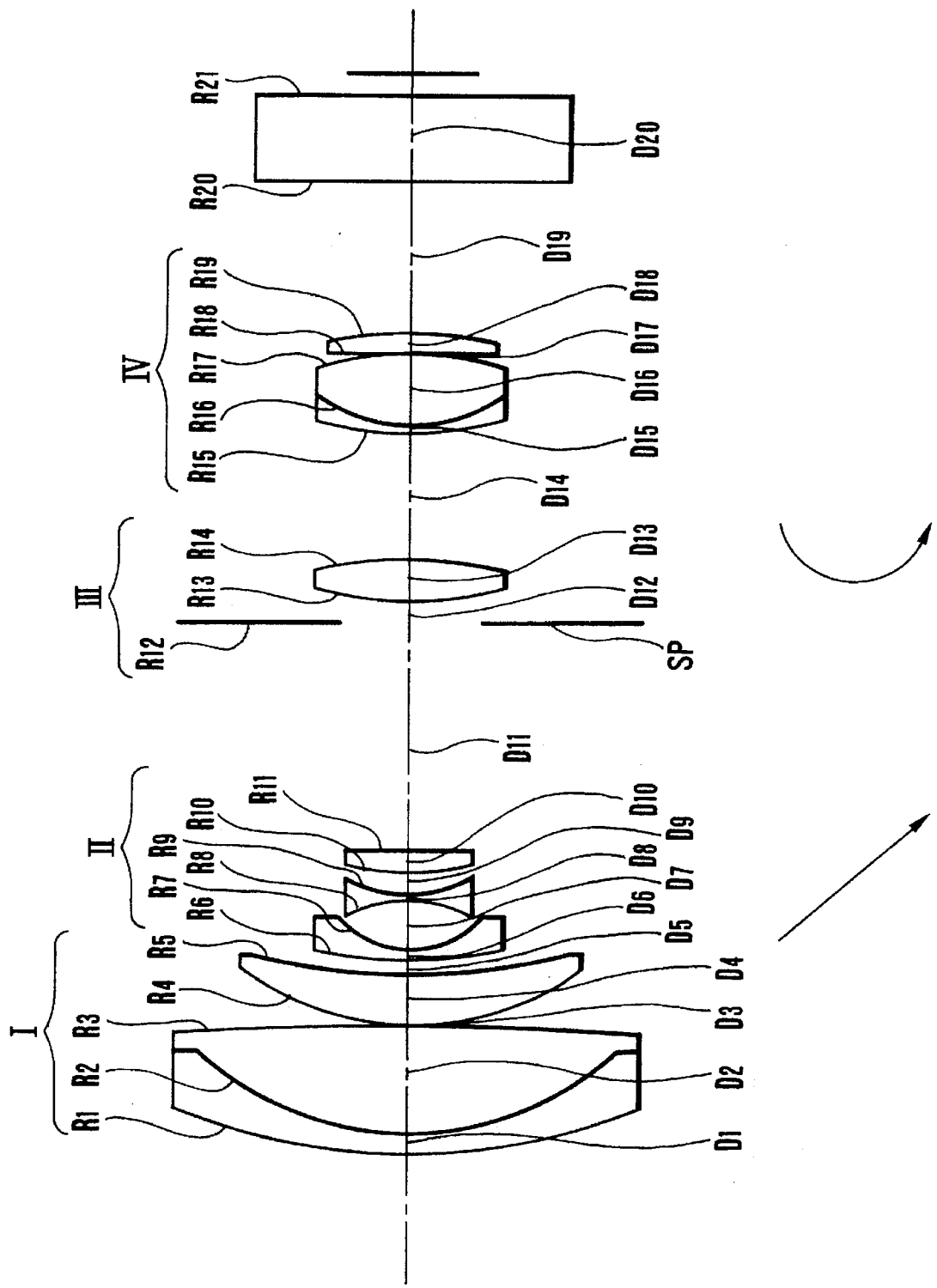
FIG. 38 is a longitudinal section view of a numerical example 23 of a zoom lens of the invention.
Figure 39A:
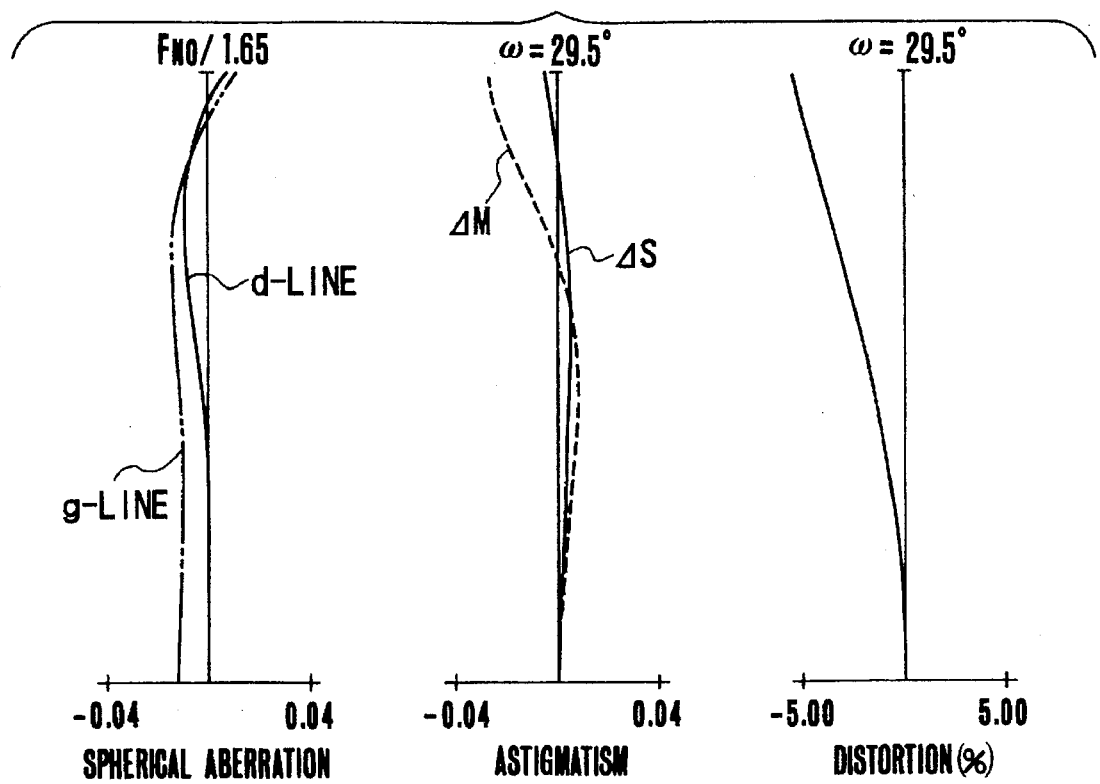
FIGS. 39(A), 39(B) and 39(C) are graphic representations of the numerical example 23.
Figure 39B:
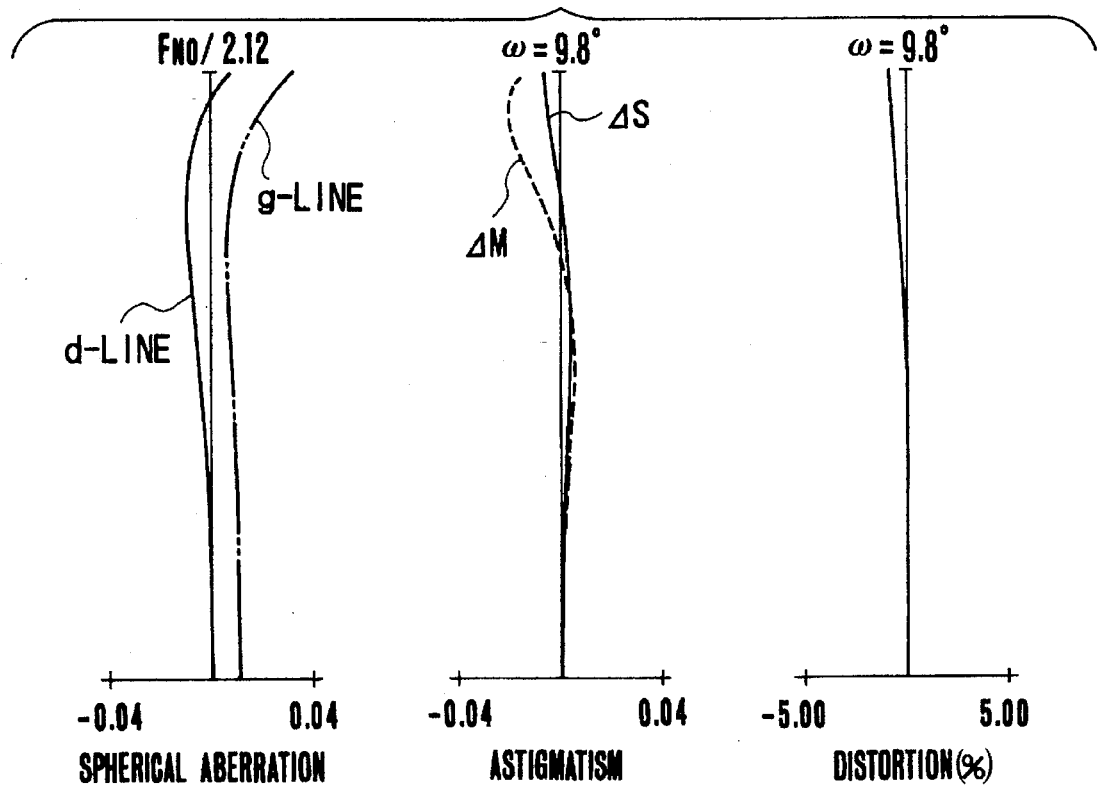
Figure 39C:
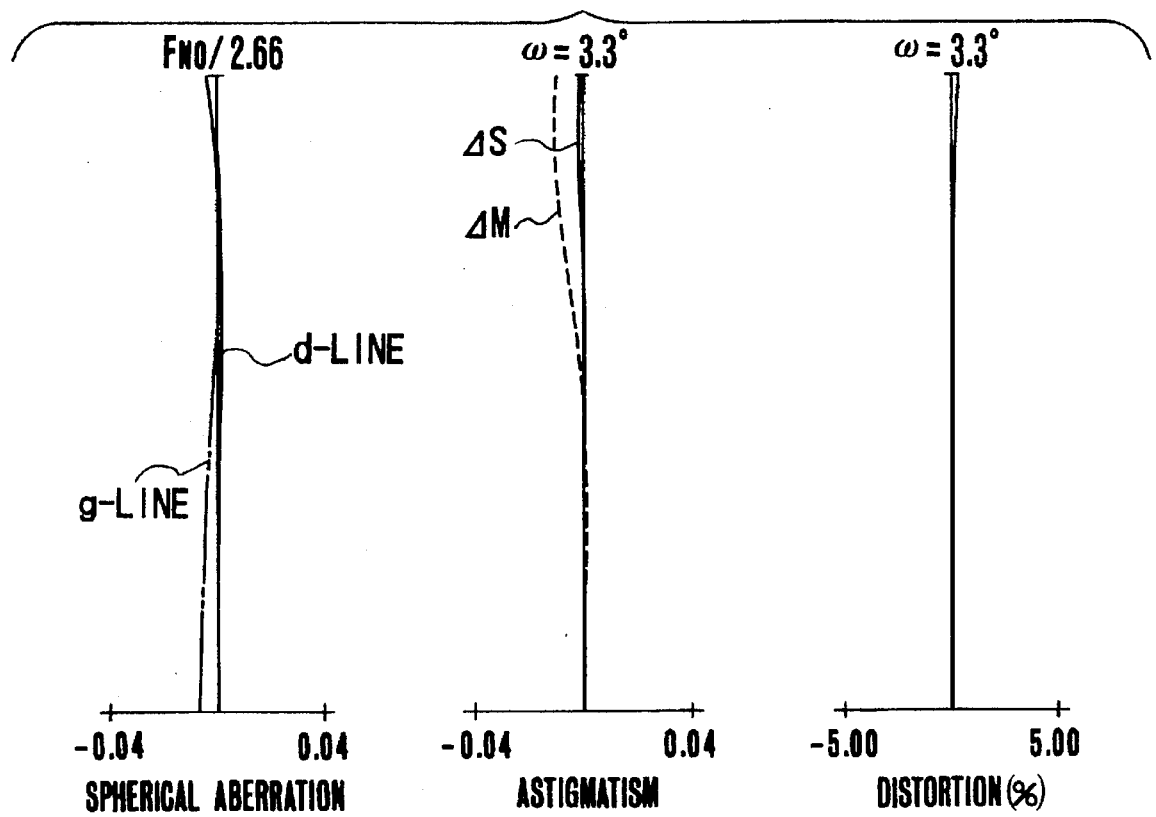
Figure 40:
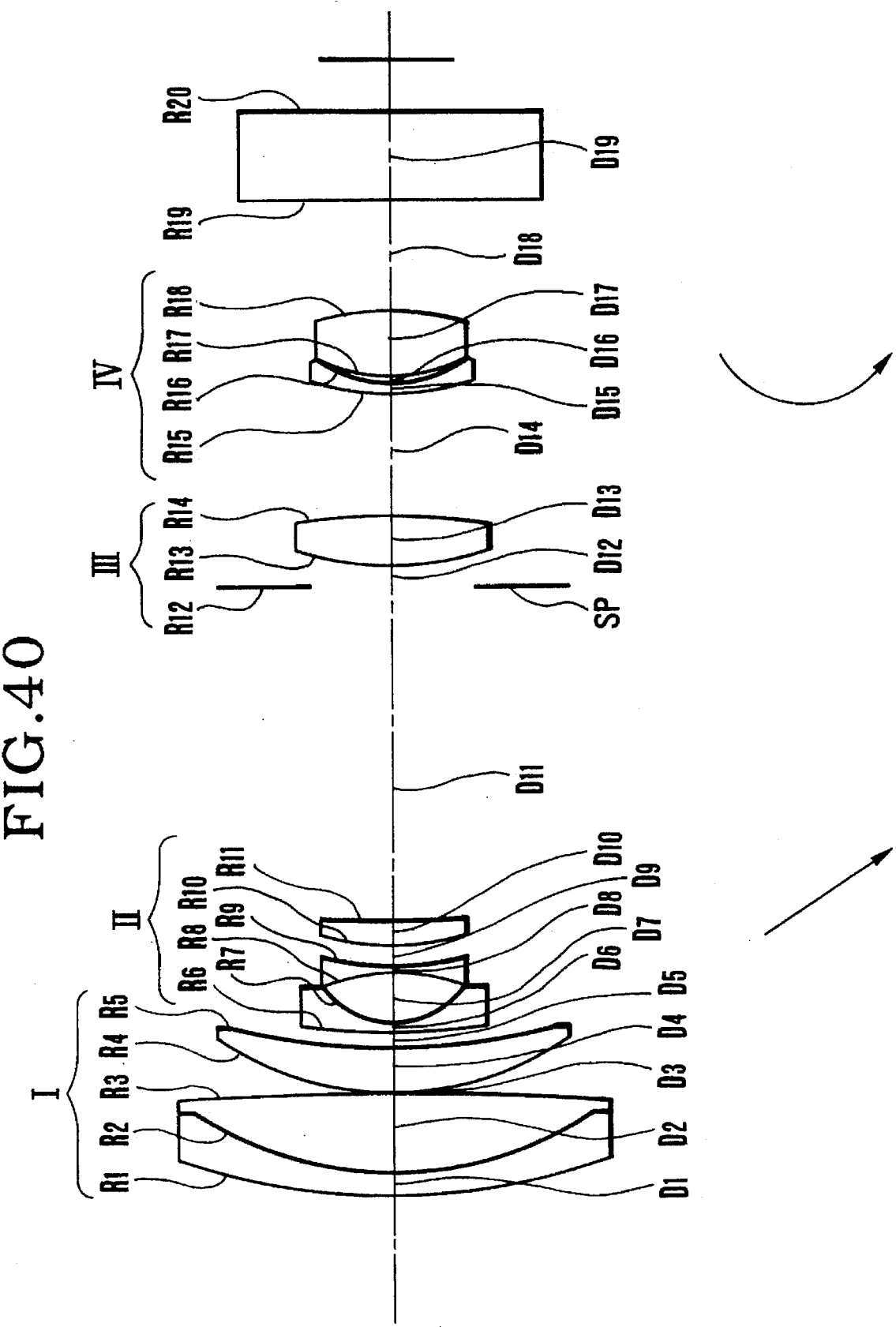
FIG. 40 is a longitudinal section view of a numerical example 24 of a zoom lens of the invention.
Figure 41A:
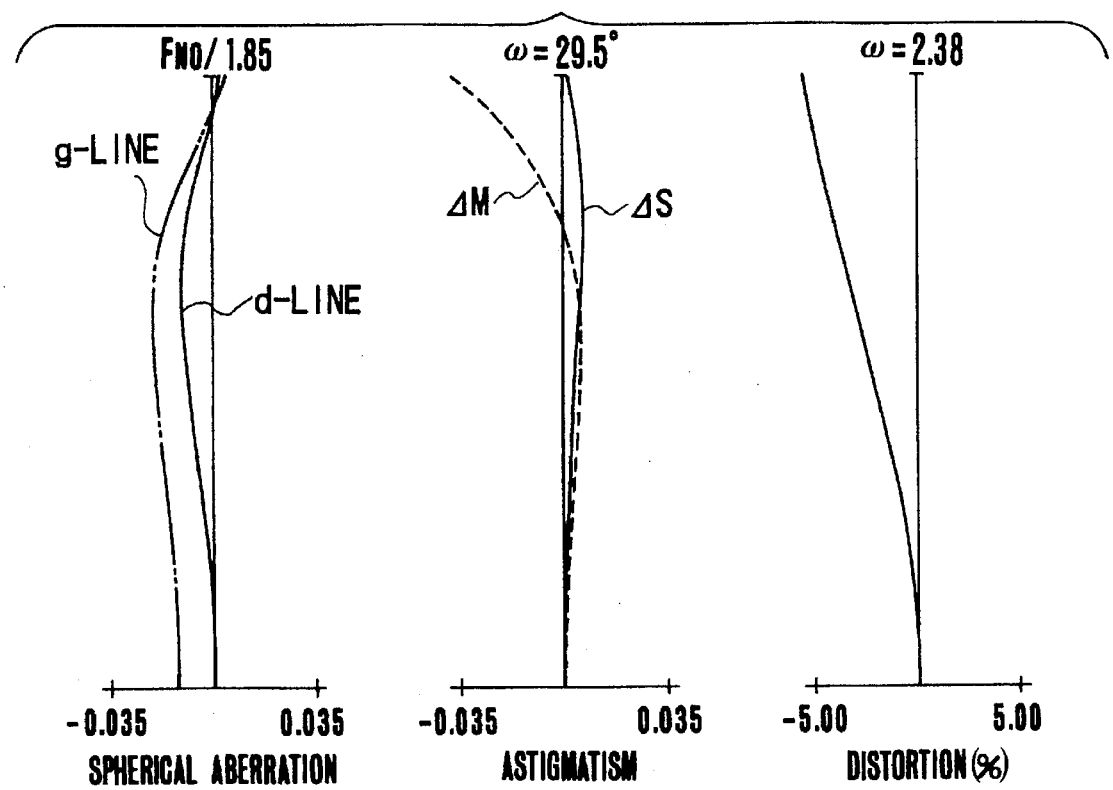
FIGS. 41(A), 41(B) and 41(C) are graphic representations of the various aberrations of the numerical example 24.
Figure 41B:
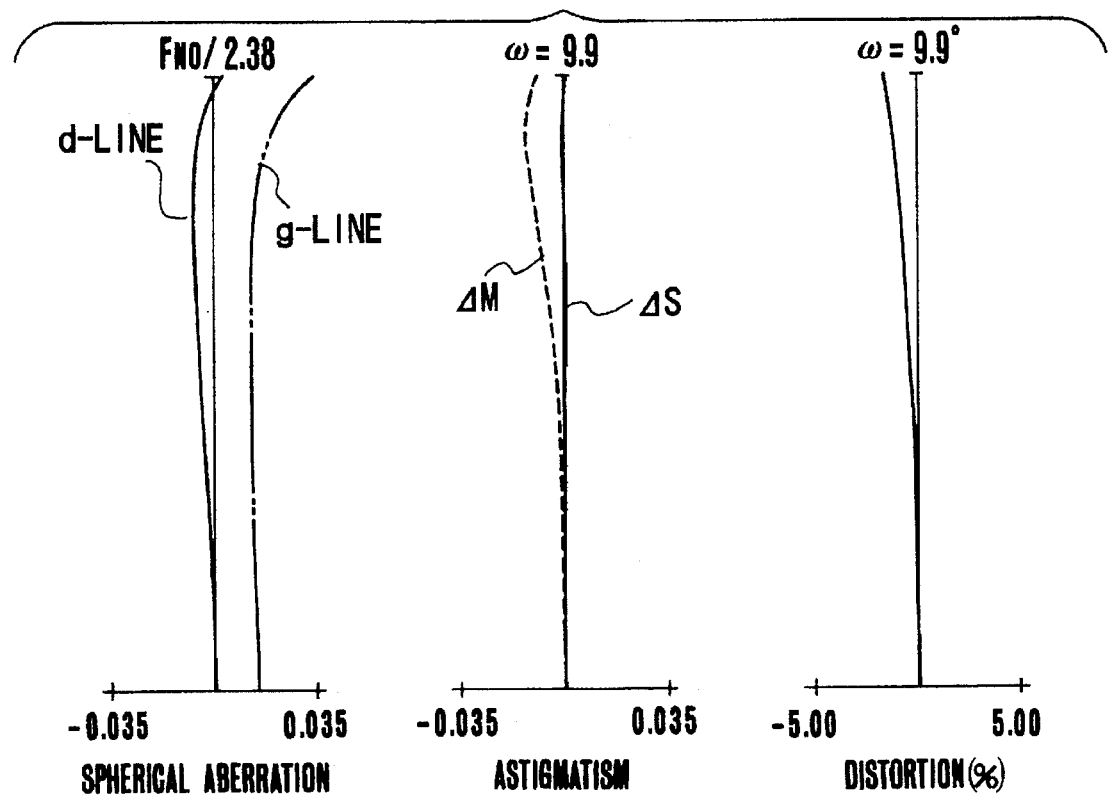
Figure 41C:
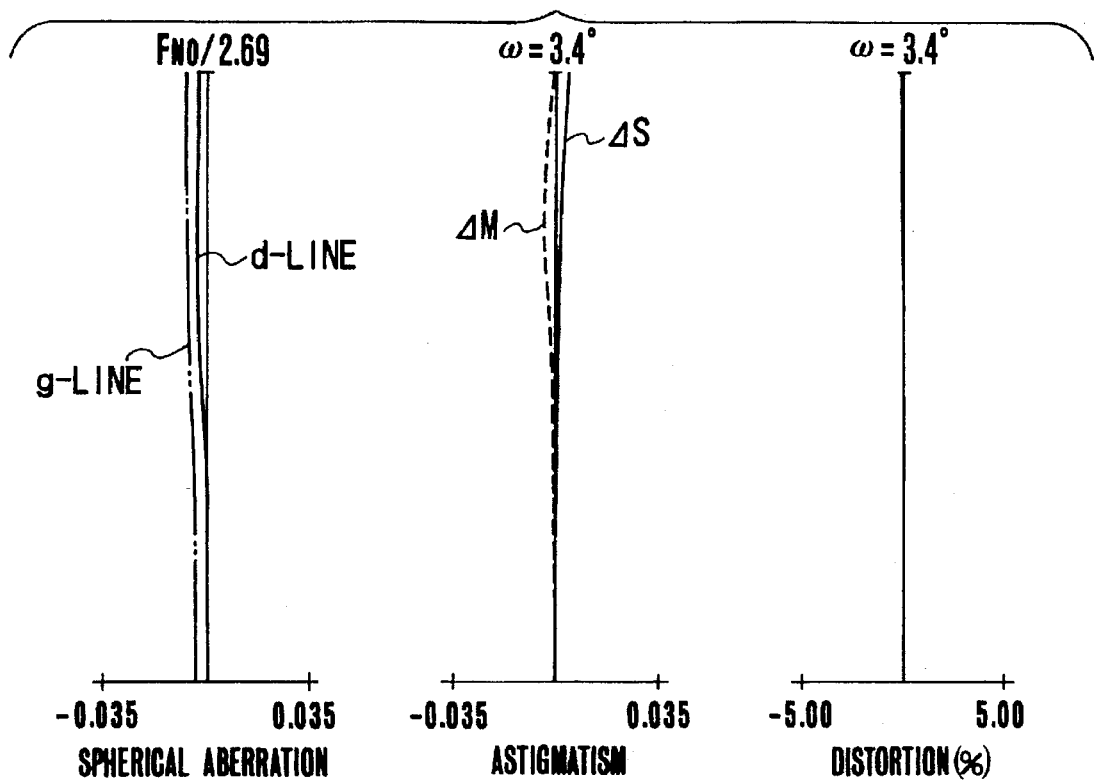
Figure 42A:
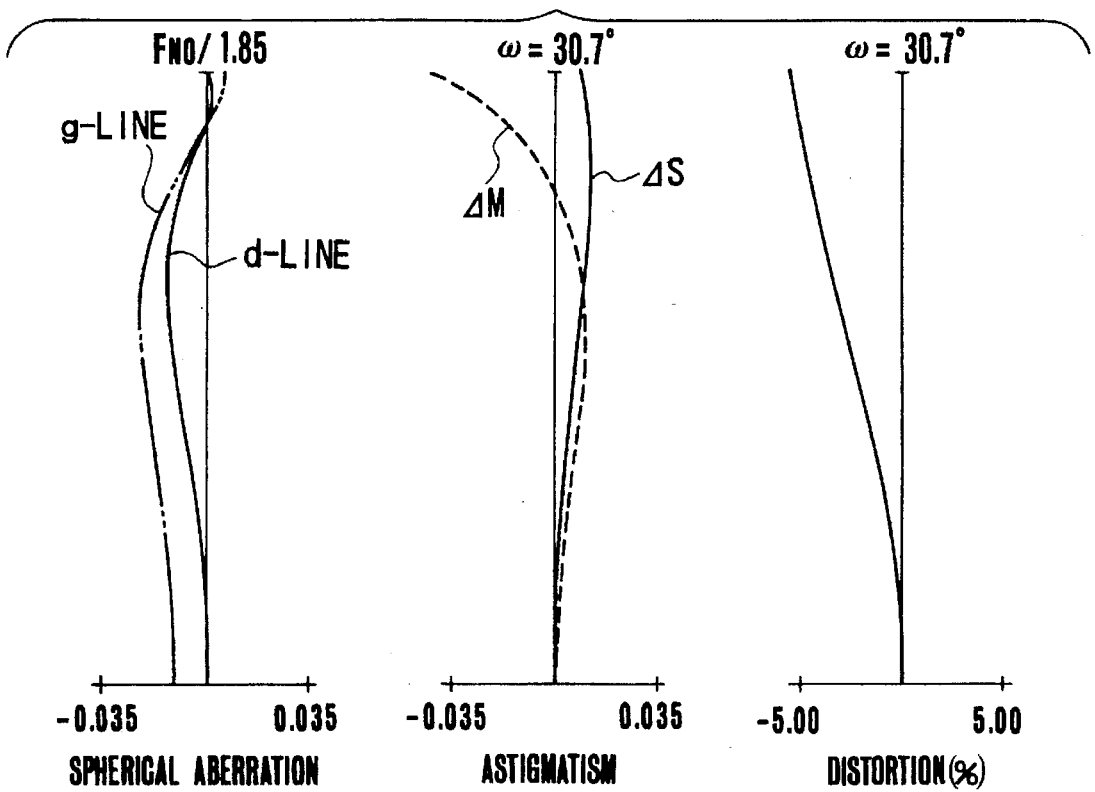
FIGS. 42(A), 42(B) and 42(C) are graphic representations of the various aberrations of a numerical example 25.
Figure 42B:
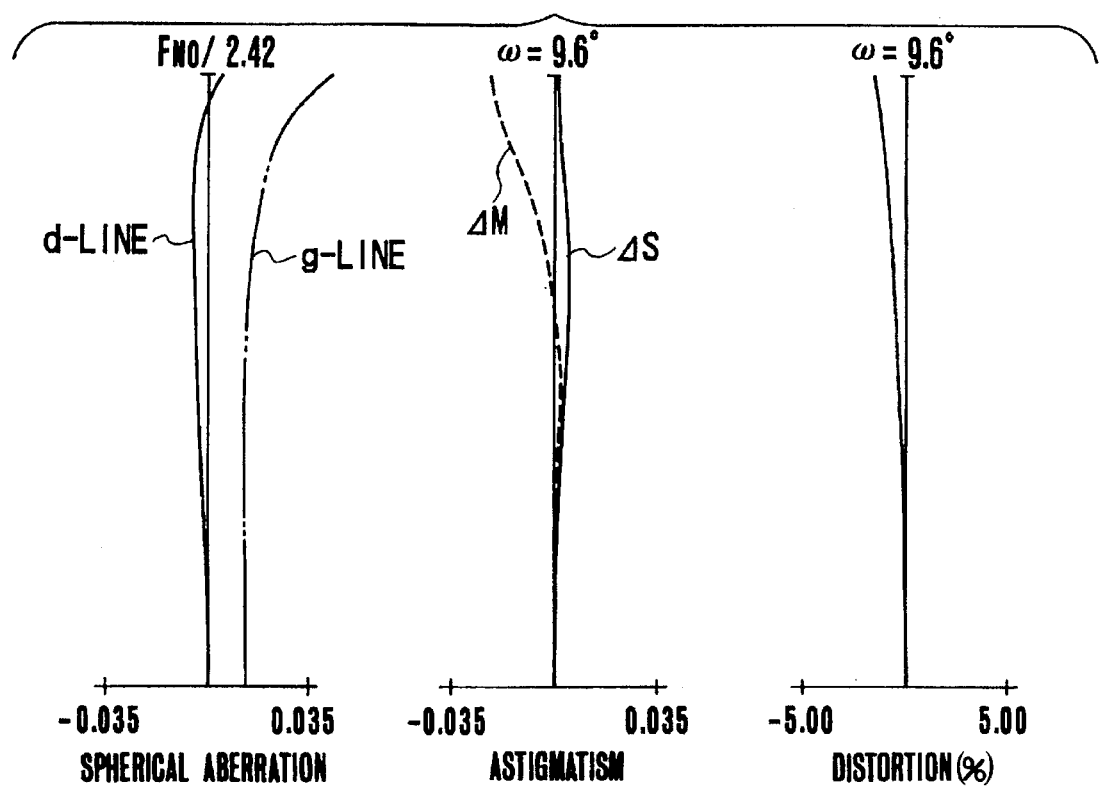
Figure 42C:
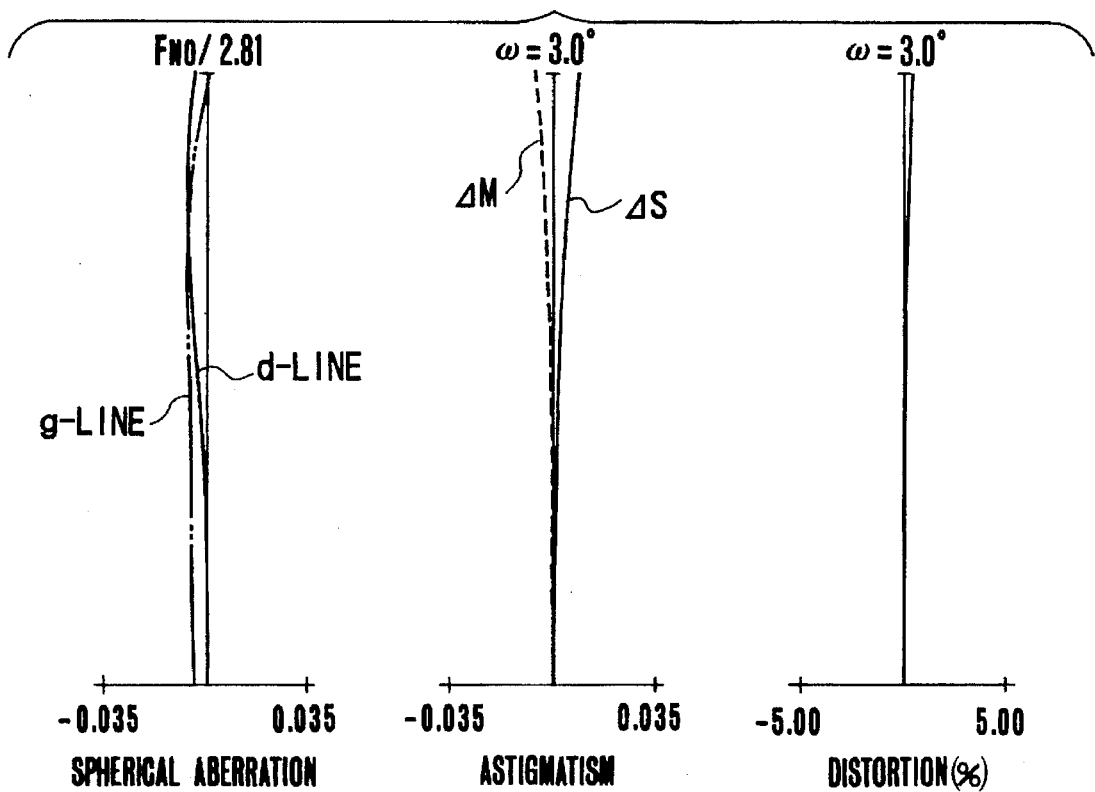
Figure 43A:
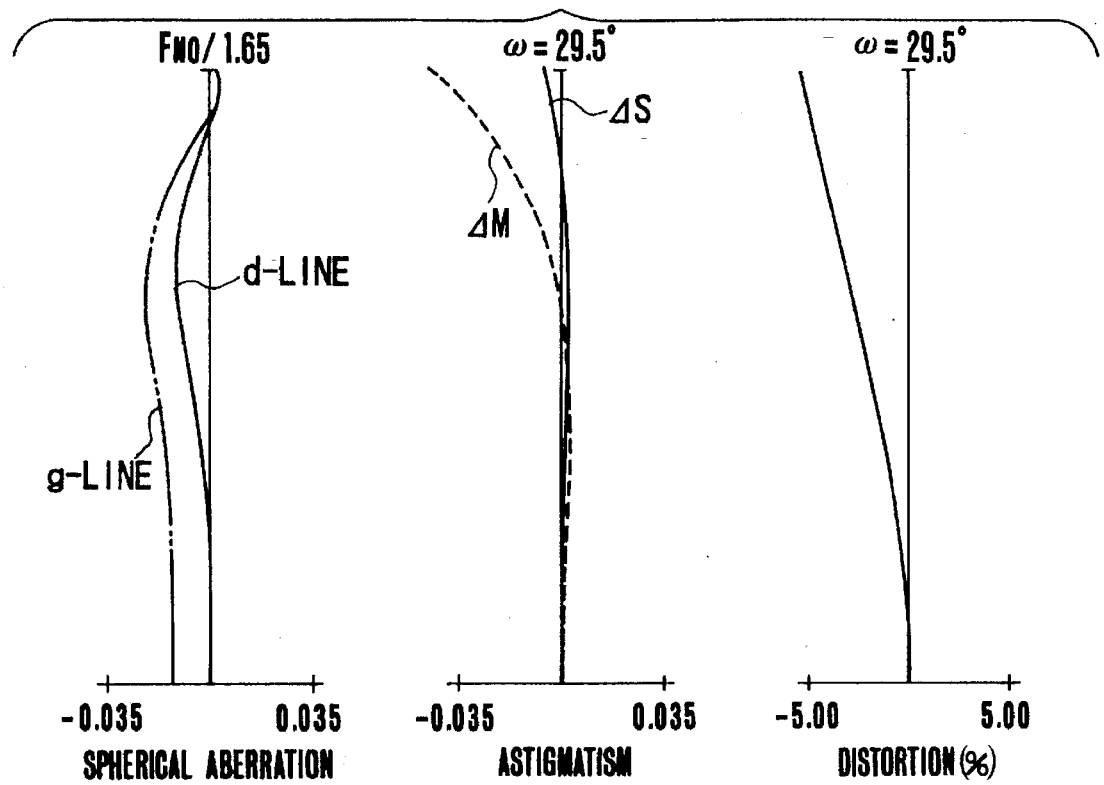
FIGS. 43(A), 43(B) and 43(C) are graphic representations of the various aberrations of a numerical example 26.
Figure 43B:
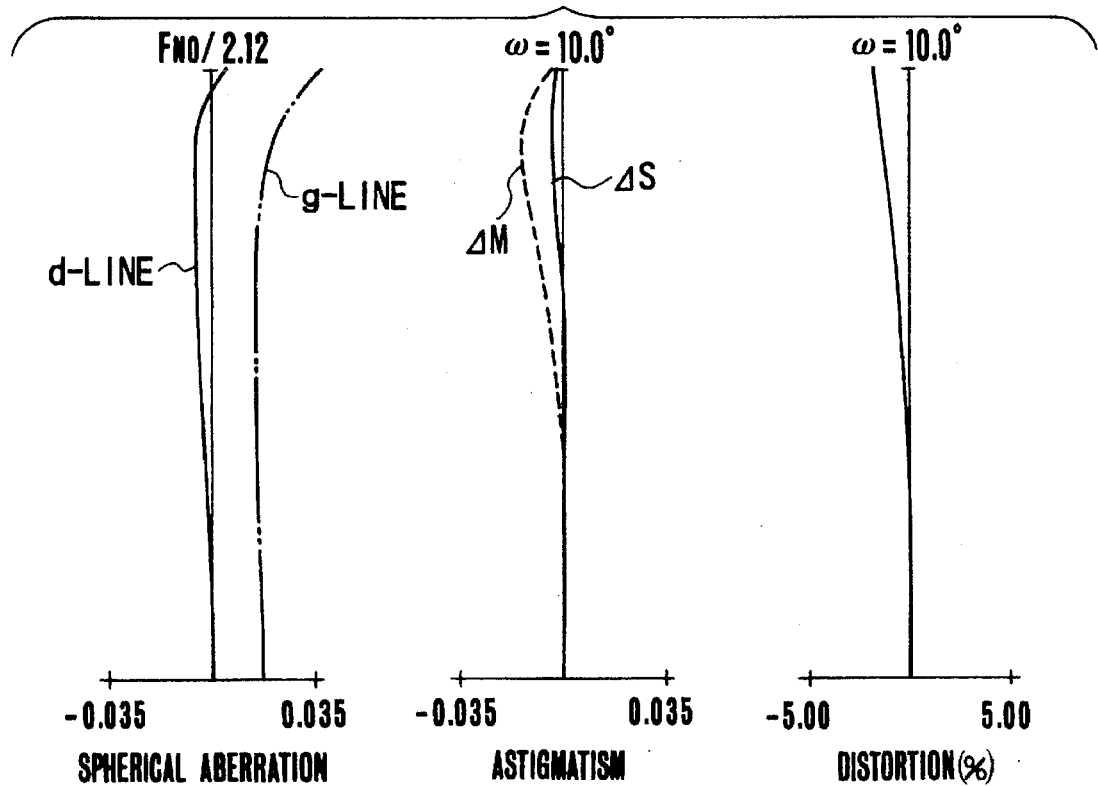
Figure 43C:
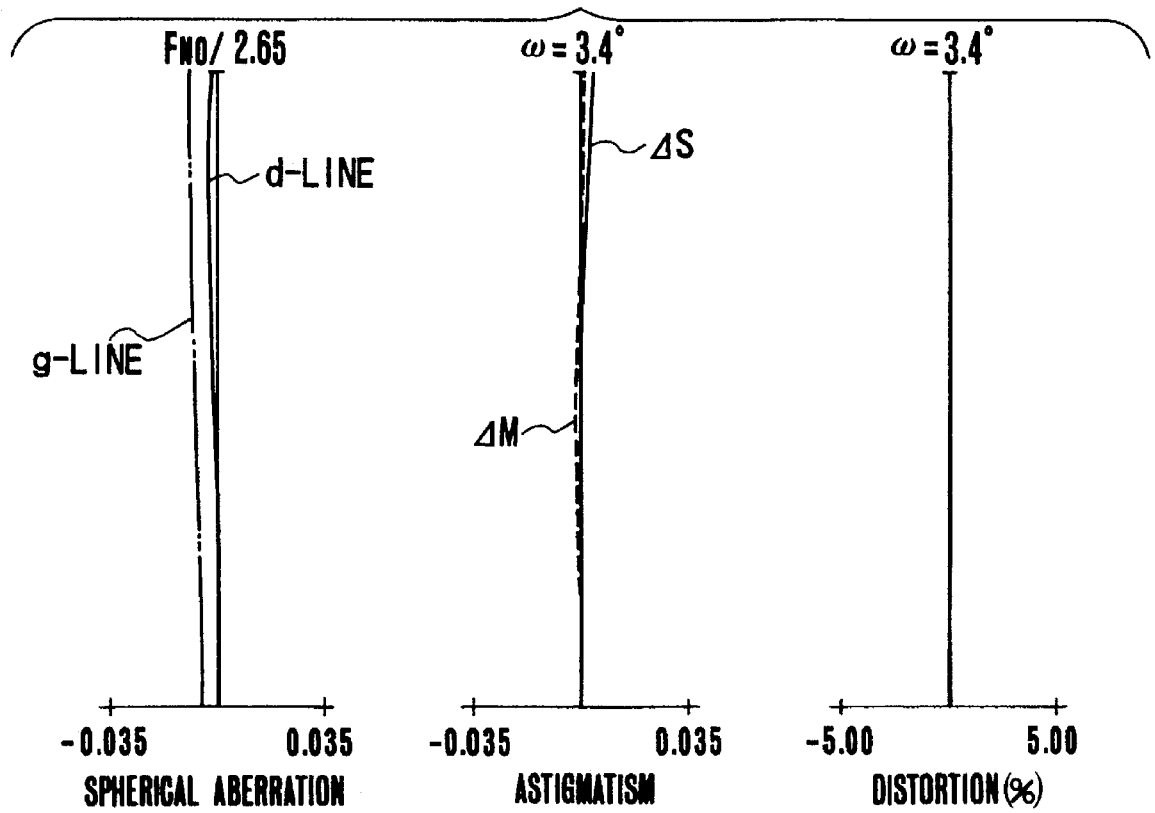
Figure 44:
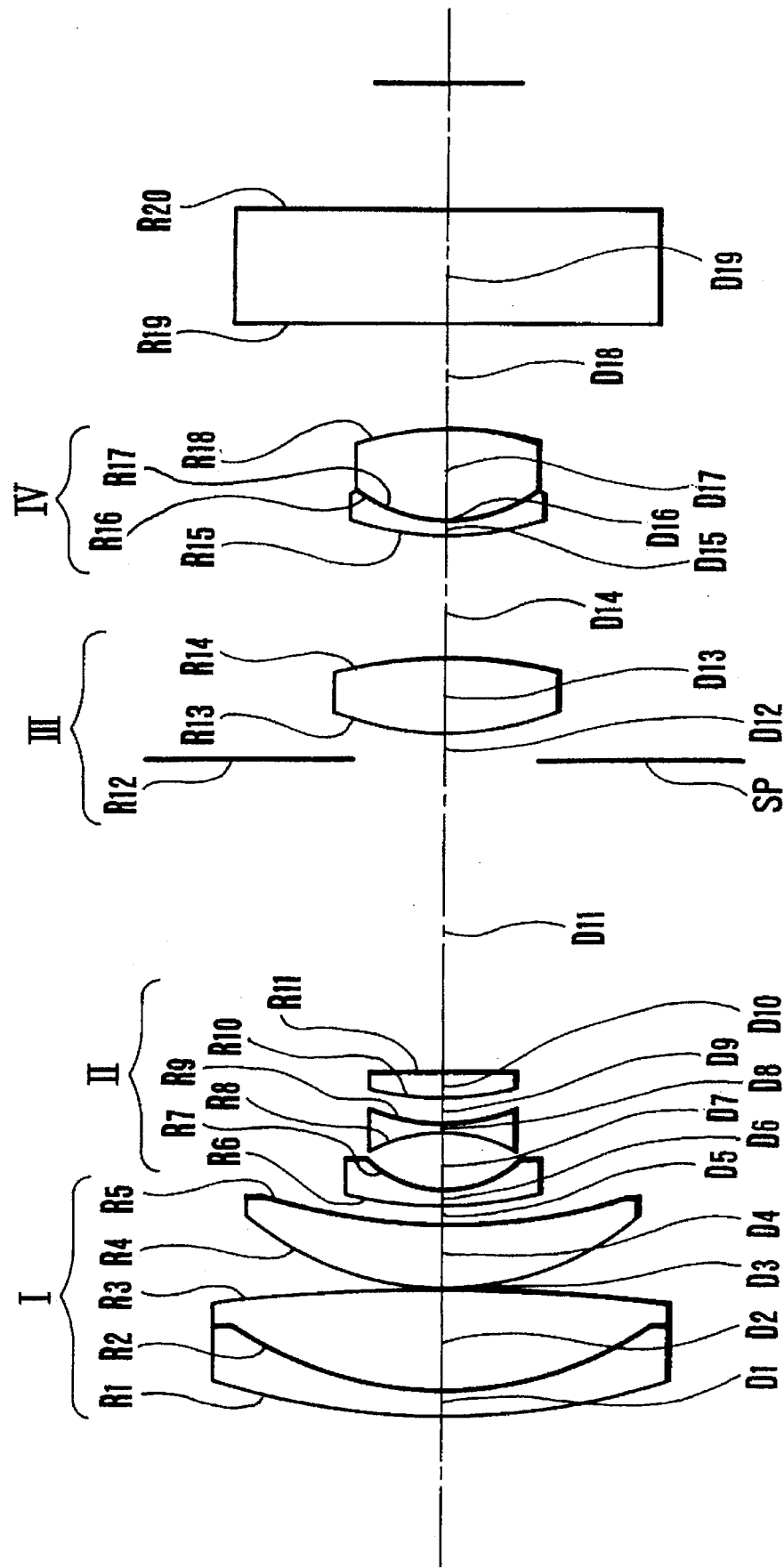
FIG. 44 is a longitudinal section view of a numerical example 27 of a zoom lens of the invention.
Figure 45A:
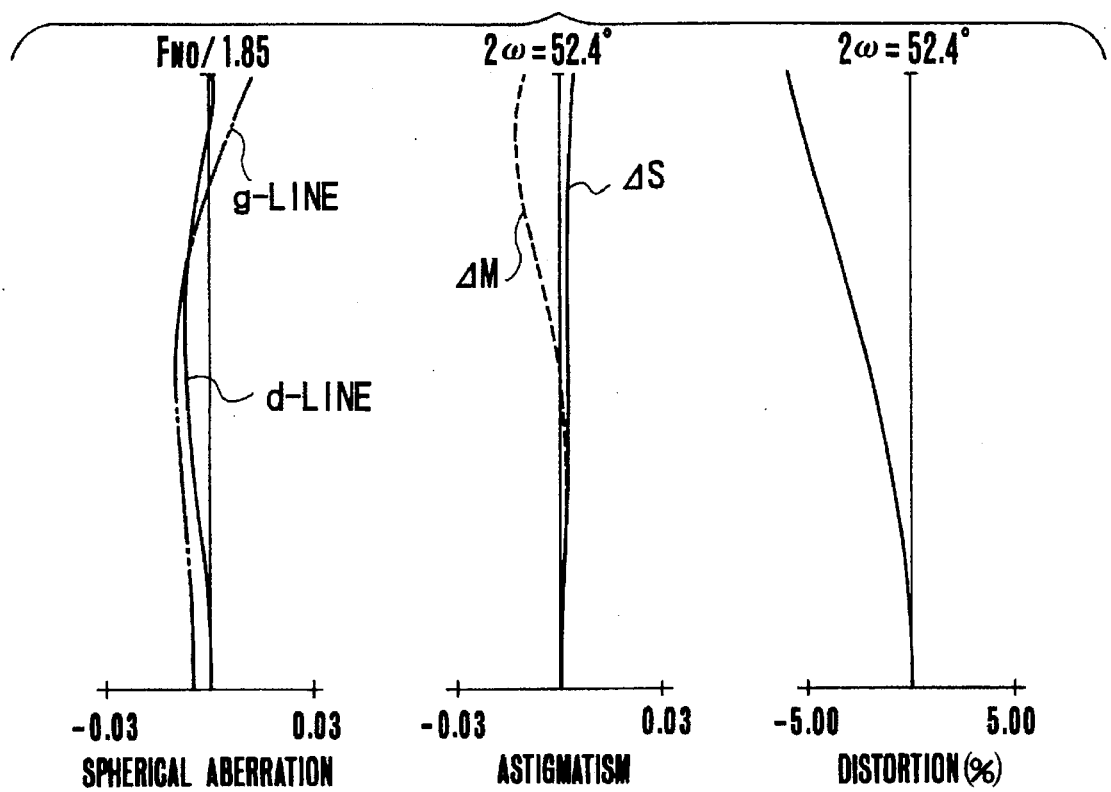
Figure 45B:
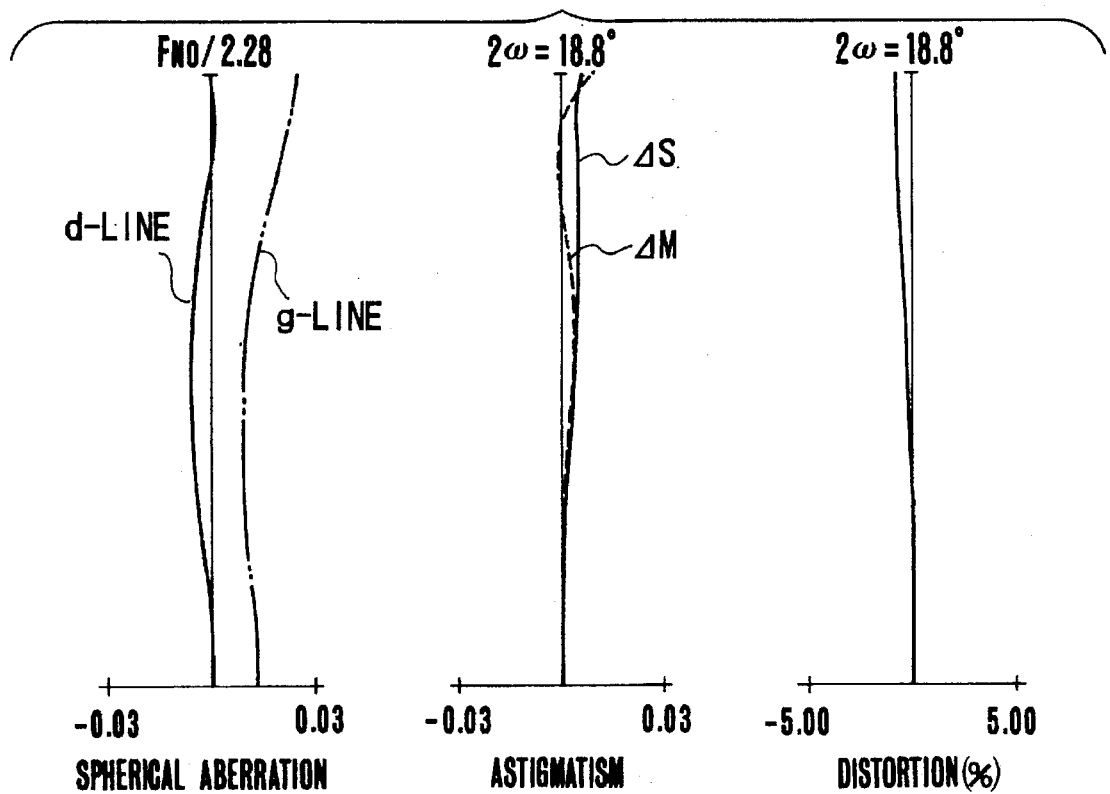
Figure 46:
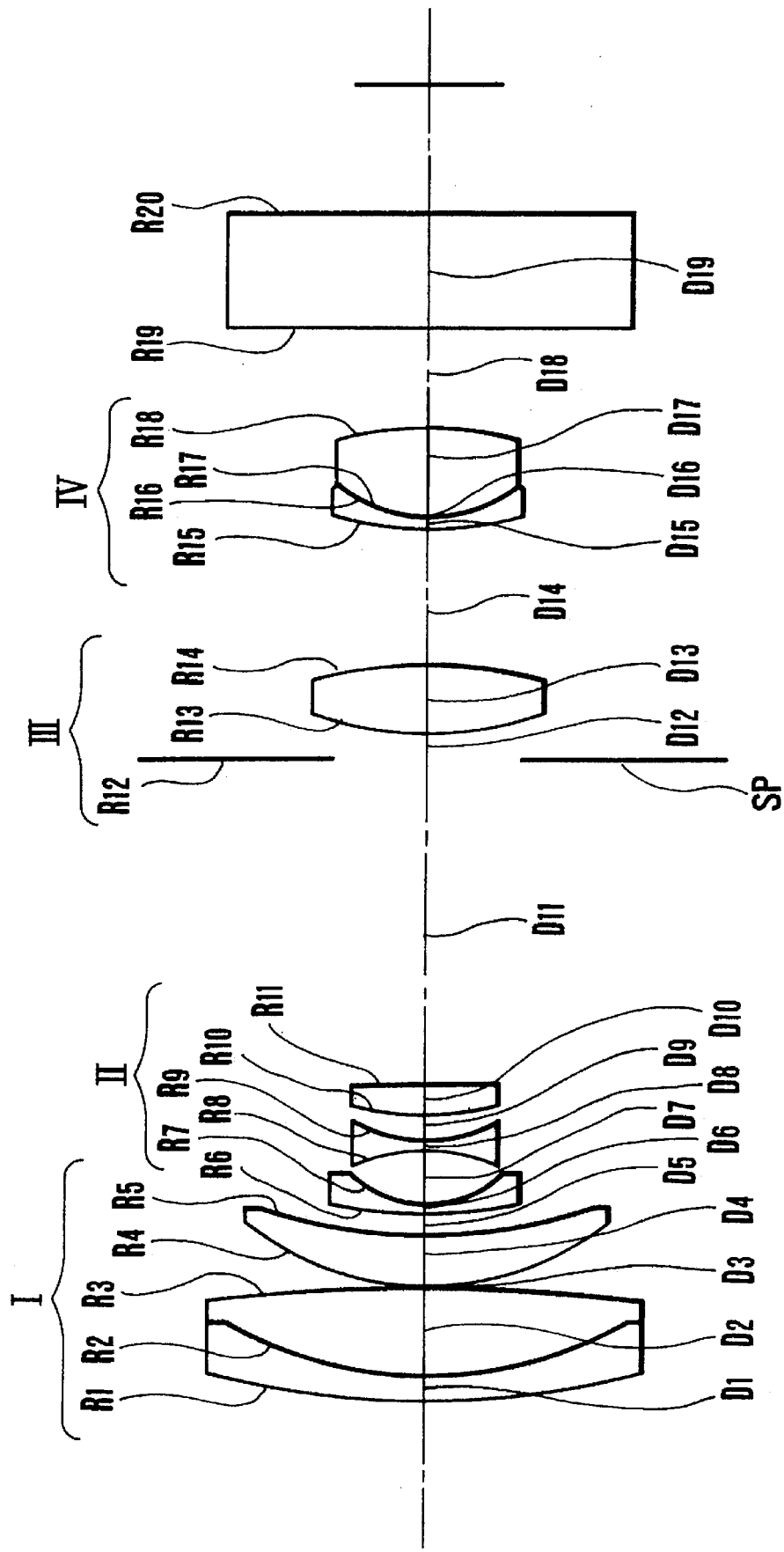
FIG. 46 is a longitudinal section view of a numerical example 28 of a zoom lens of the invention.
Figure 47A:
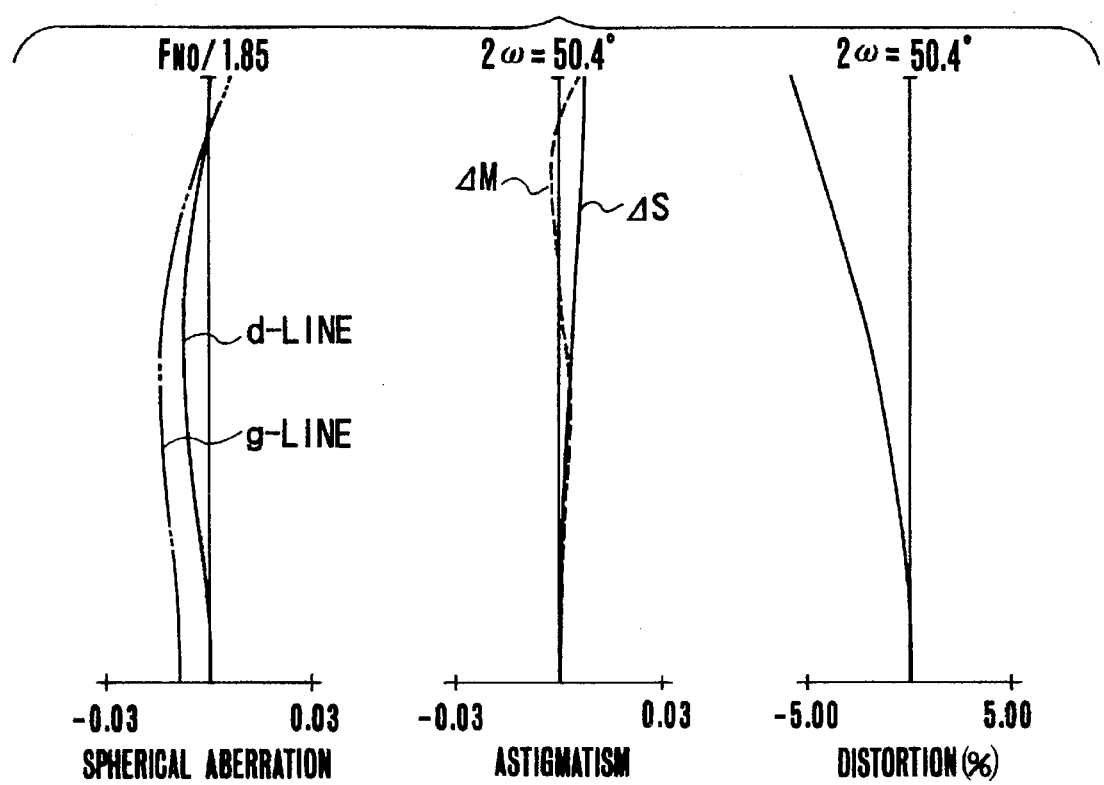
FIGS. 47(A), 47(B) and 47(C) are graphic representations of the various aberrations of the numerical example 28.
Figure 47B:
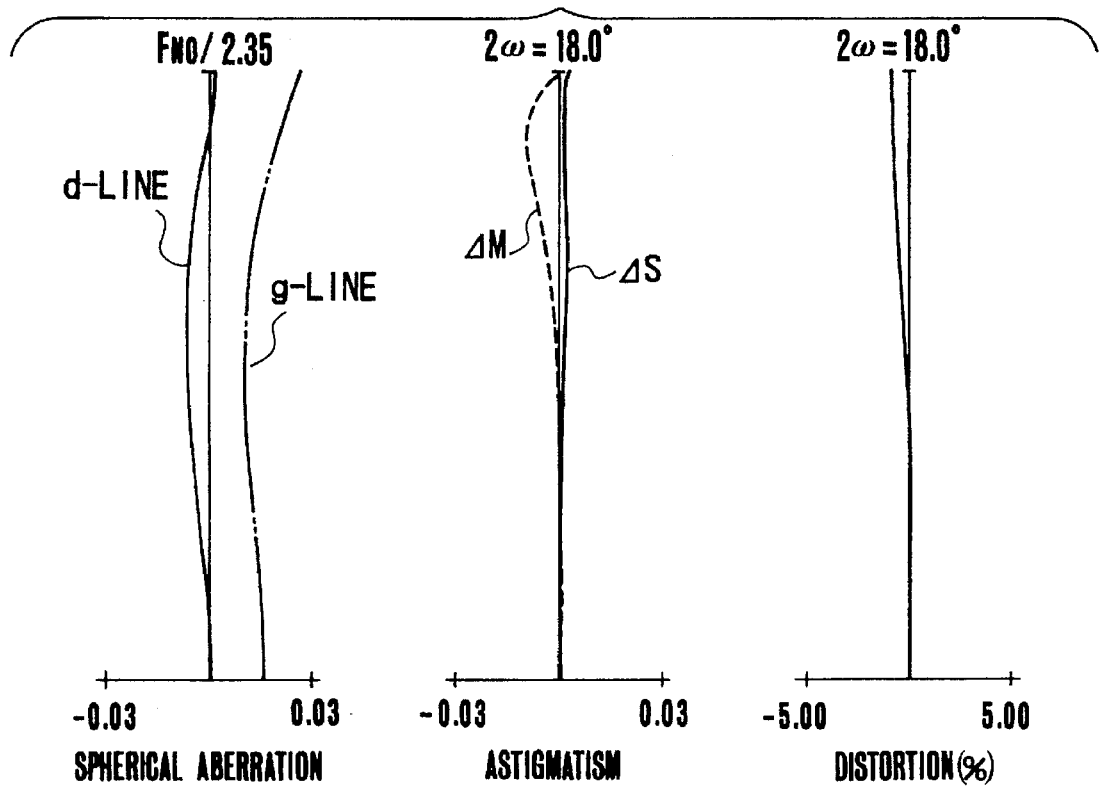
Figure 47C:
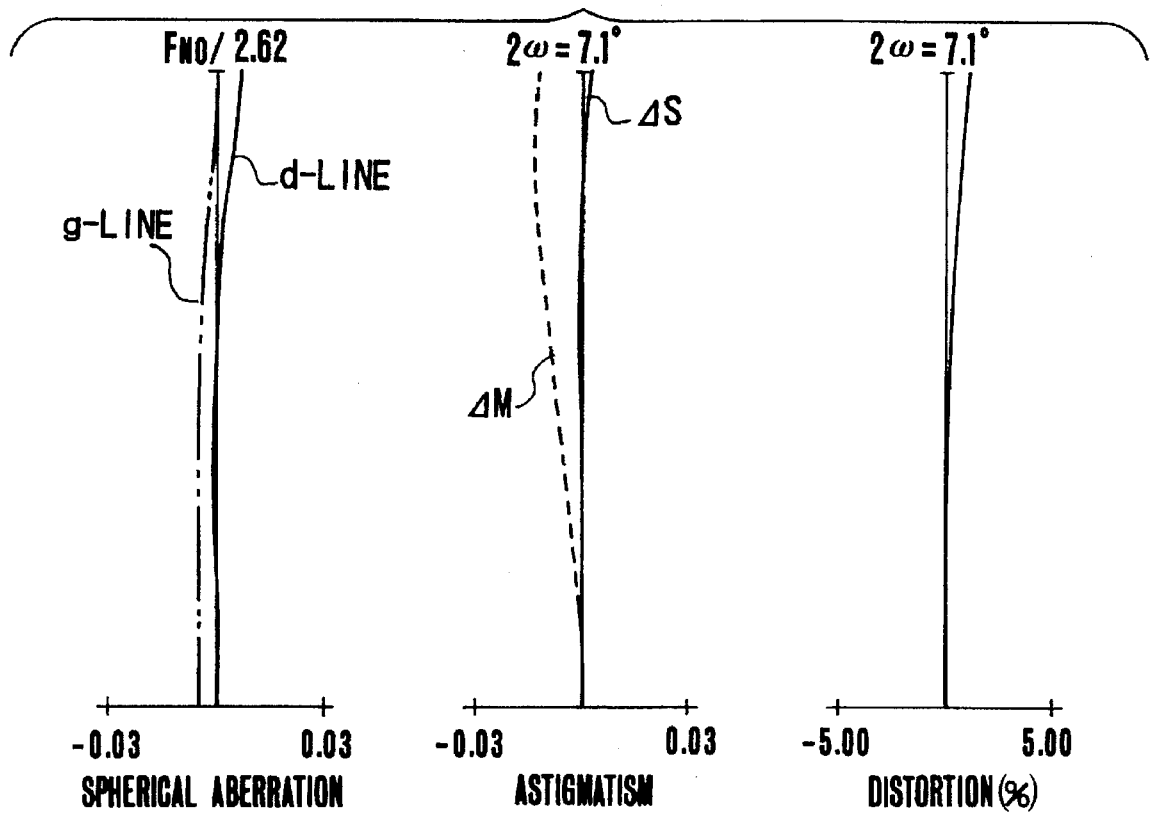
Figure 48:
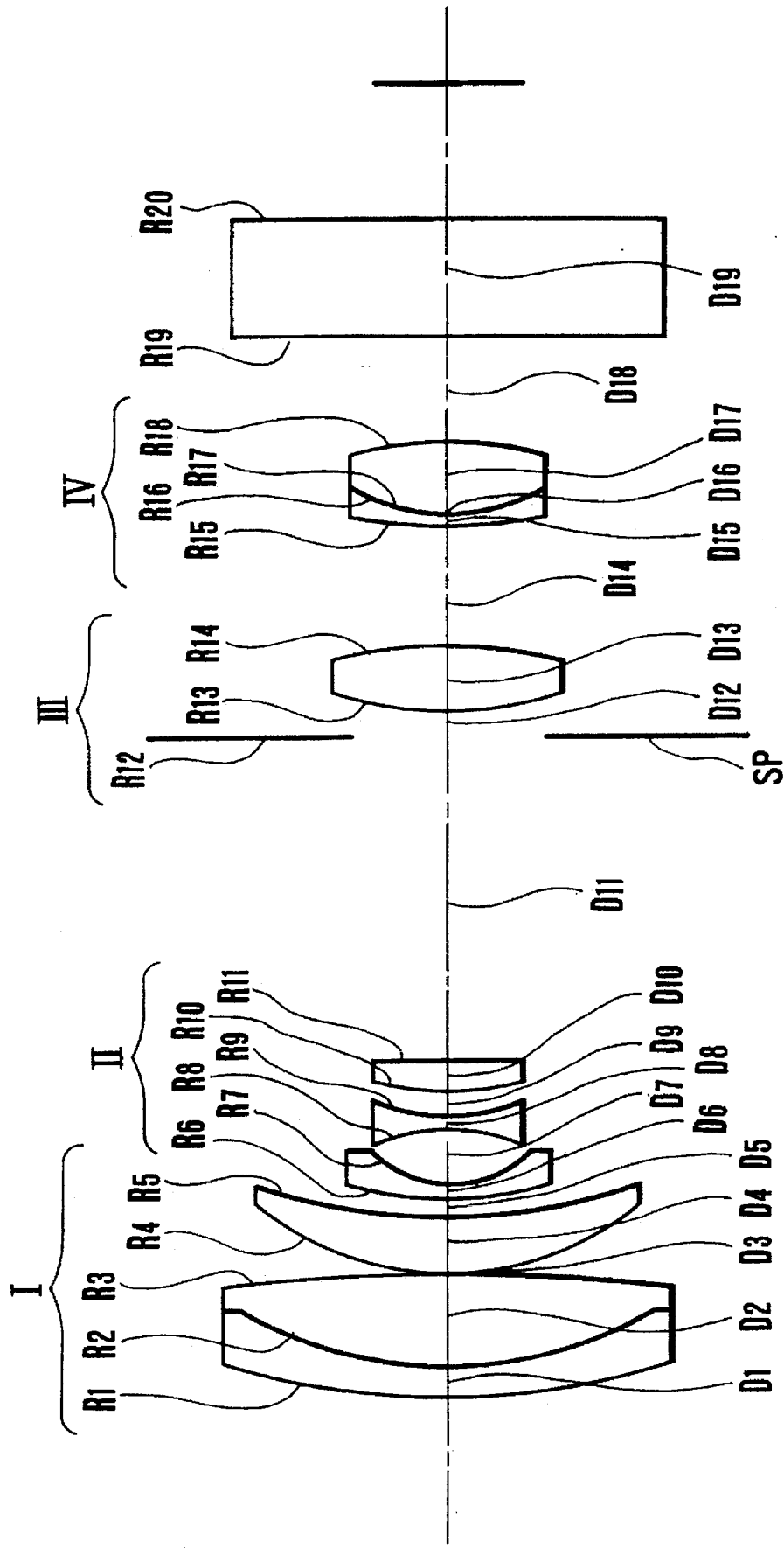
FIG. 48 is a longitudinal section view of a numerical example 29 of a zoom lens of the invention.
Figure 49A:
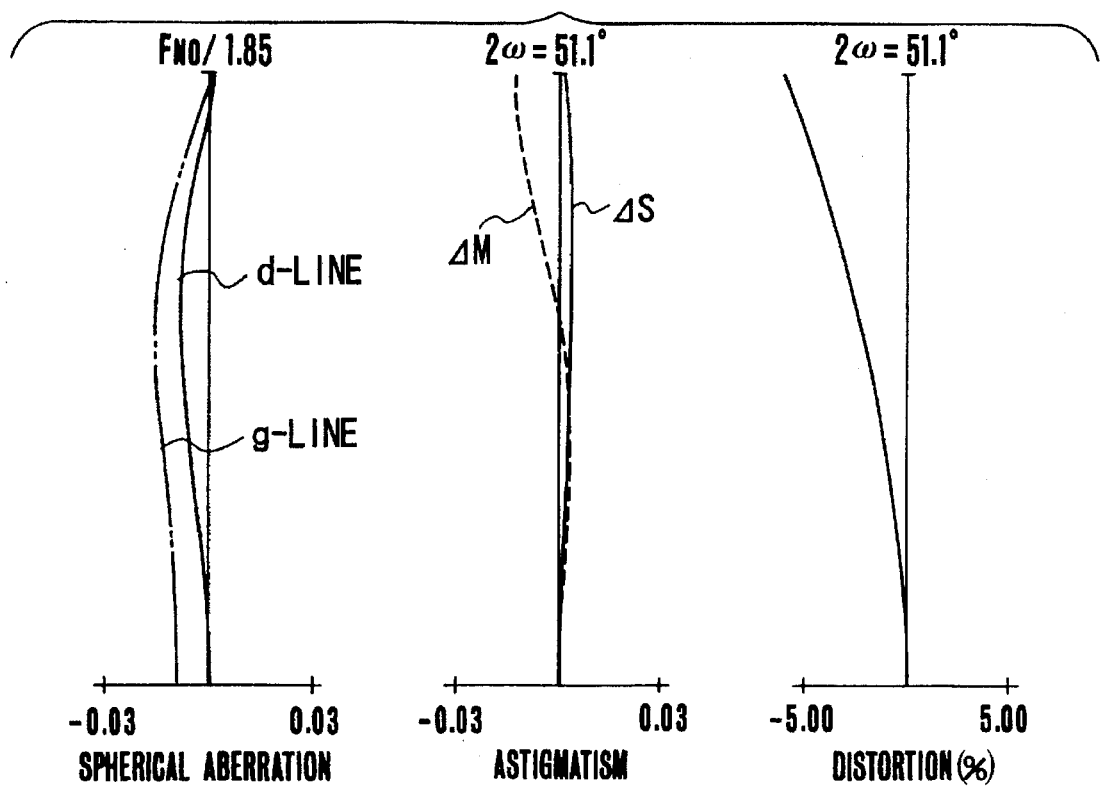
FIGS. 49(A), 49(B) and 49(C) are graphic representations of the various aberrations of the numerical example 29.
Figure 49B:
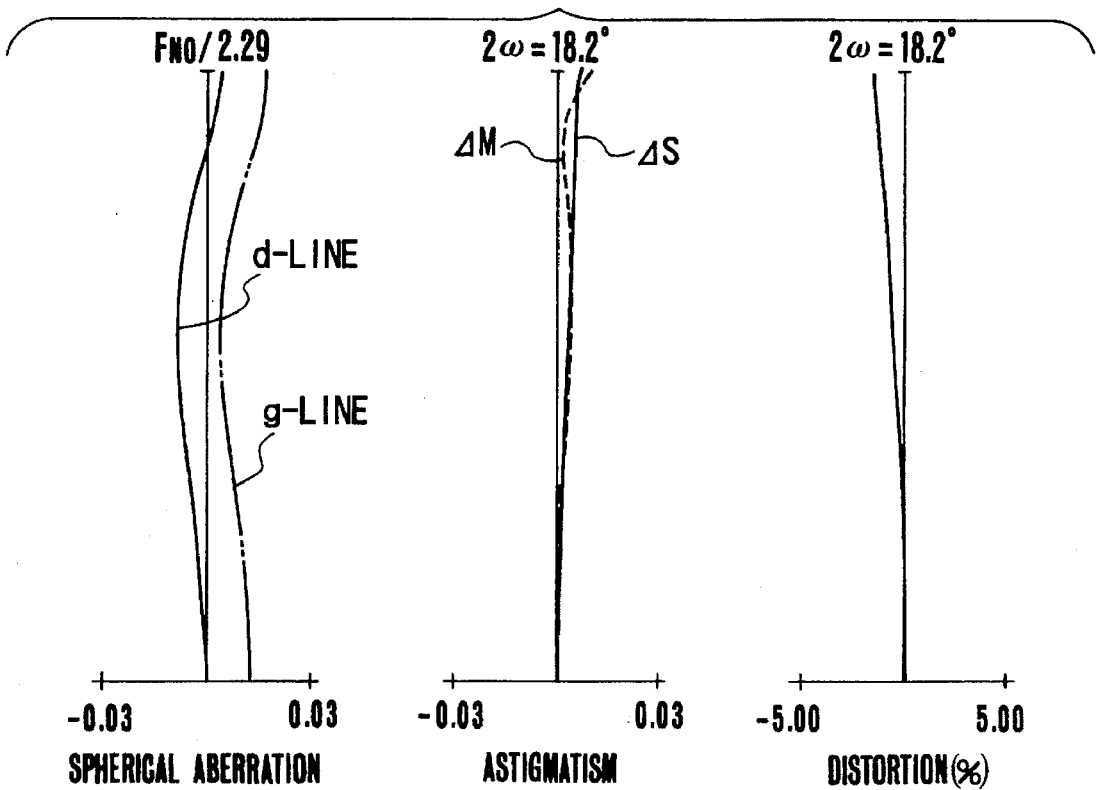
Figure 49C:
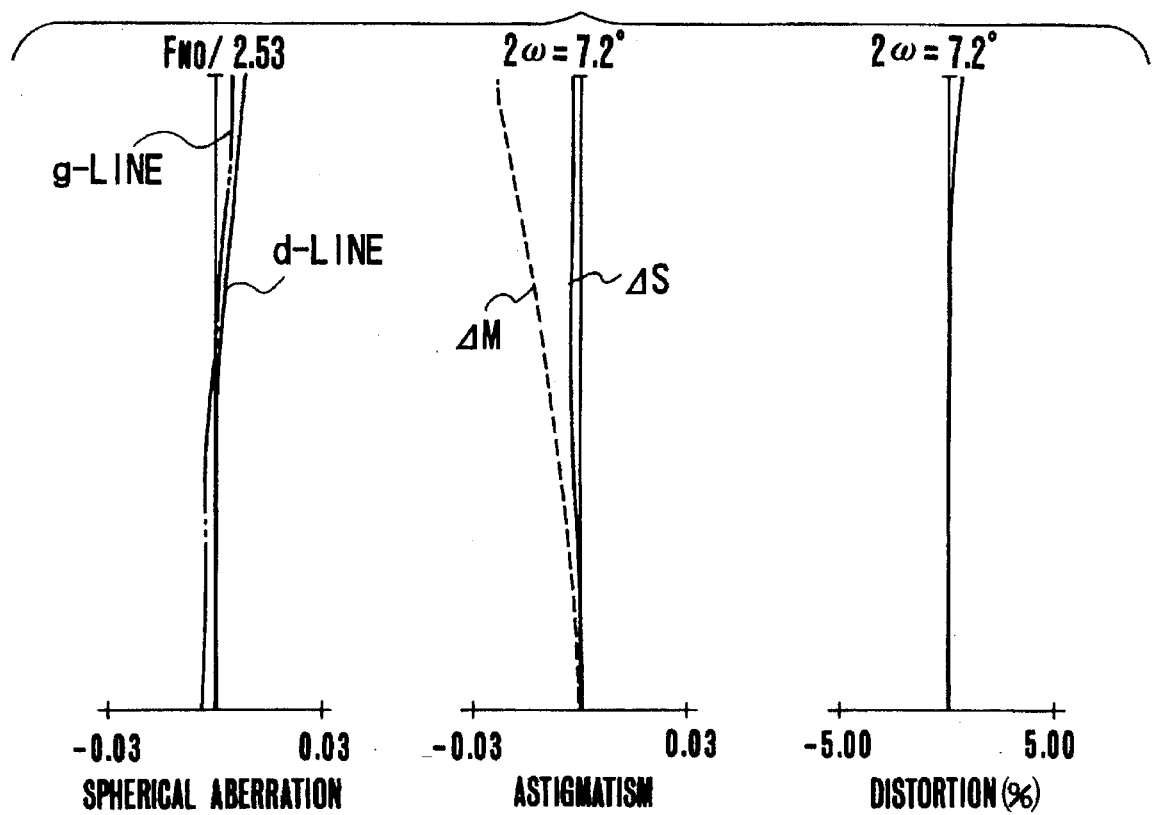

In this example, $\bar{N}_{IIU} = 1.73$ $|D_{II4}/f_2| = 0.169$, $(1/R_{II3} - 1/R_{II2})f_2 = 1.683$ FIG. 23 is a block diagram of a numerical example 12 of the invention. In order from the object side, the first lens unit of positive refractive power and the second lens unit of negative refractive power are similar in construction and arrangement to the numerical example 2. The third lens unit of positive refractive power is similar in construction and arrangement to the numerical example 4. The fourth lens unit of positive refractive power is constructed from a negative meniscus lens convex toward the object side, a bi-convex lens cemented thereto and a bi-convex lens. The frontmost surface in the third lens unit is formed to an aspheric shape.

In this example, $\bar{N}_{IIU} = 1.73$ $|D_{II4}/f_2| = 0.169$, $(1/R_{II3} - 1/R_{II2})f_2 = 1.556$ Next, the numerical data for the examples 1 to 12 concerning the invention are shown, where Ri is the radius of curvature of the i-th lens surface, when counted from the object side, Di is the i-th lens thickness or air separation, when counted from the object side, and Ni and vi are the refractive index and Abbe number of the glass of the i-th lens element, when counted from the object side. A parallel flat glass positioned closest to the image plane is a face plate or filter, which remains stationary during zooming.

The shape of the aspheric surface is expressed in coordinates with an X-axis in the axial direction from the object side to the image plane, an H-axis in the perpendicular direction to the optical axis, the direction in which light advances being taken as positive, by the following equation:

$$X = (H^2/R)/(1 + \sqrt{1-(1+K)(H/R)^2}) + BH^4 + CH^6 + DH^8 + EH^{10}$$

where R is the radius of the osculating sphere, K is the conic constant, and B, C, D and E are the aspheric coefficients.

Incidentally, in the aspheric coefficients, D-a connotes $10^a$.

Numerical Example 1:
F = 1–9.47   FNO = 1:1.4–2.3   2ω = 55.4°–6.3°

| | | | | |
|---|---|---|---|---|
| R1 = | 6.6030 | D1 = 0.1967 | N1 = 1.80518 | ν1 = 25.4 |
| R2 = | 3.8169 | D2 = 1.0328 | N2 = 1.60311 | ν2 = 60.7 |
| R3 = | −75.7805 | D3 = 0.0328 | | |
| R4 = | 3.4121 | D4 = 0.5574 | N3 = 1.51633 | ν3 = 64.2 |
| R5 = | 8.8864 | D5 = Variable | | |
| R6 = | 4.8227 | D6 = 0.1311 | N4 = 1.77250 | ν4 = 49.6 |
| R7 = | 1.2116 | D7 = 0.5492 | | |
| R8 = | −2.0406 | D8 = 0.1311 | N5 = 1.69680 | ν5 = 55.5 |
| R9 = | 2.0406 | D9 = 0.1967 | | |
| R10 = | 2.5445 | D10 = 0.3279 | N6 = 1.84666 | ν6 = 23.8 |
| R11 = | 27.7549 | D11 = Variable | | |
| R12 = | (Stop) | D12 = 0.3279 | | |
| *R13 = | 3.0949 | D13 = 0.8197 | N7 = 1.58313 | ν7 = 59.4 |
| R14 = | −4.2972 | D14 = 0.1639 | | |
| R15 = | −5.6670 | D15 = 0.1639 | N8 = 1.70154 | ν8 = 41.2 |
| R16 = | −19.0067 | D16 = Variable | | |
| R17 = | 4.3705 | D17 = 0.1311 | N9 = 1.84666 | ν9 = 23.8 |
| R18 = | 1.9434 | D18 = 0.9180 | N10 = 1.48749 | ν10 = 70.2 |
| R19 = | −4.4670 | D19 = 0.0246 | | |
| R20 = | 3.2347 | D20 = 0.4754 | N11 = 1.48749 | ν11 = 70.2 |
| R21 = | −22.6183 | D21 = 0.9836 | | |
| R22 = | ∞ | D22 = 0.6557 | N12 = 1.51633 | ν12 = 64.2 |
| R23 = | ∞ | | | |

| Variable | Focal Length | | |
|---|---|---|---|
| Separation | 1.00 | 2.31 | 9.47 |
| D5 | 0.15 | 1.73 | 3.30 |
| D11 | 3.57 | 1.99 | 0.41 |
| D16 | 1.24 | 0.79 | 1.25 |

"*" indicates the aspheric surface.

The values of the aspheric coefficients:

| R | K | B | C | D | E |
|---|---|---|---|---|---|
| 3.09487D+00 | 0.00000D+00 | −1.32723D−02 | −5.94487D−06 | 3.86631D−05 | 0.00000D+00 |

Numerical Example 2:
F = 1–9.5   FNO = 1:1.4–2.4   2ω = 55.4°–6.3°

| | | | | |
|---|---|---|---|---|
| R1 = | 6.2547 | D1 = 0.1967 | N1 = 1.80518 | ν1 = 25.4 |
| R2 = | 3.5759 | D2 = 1.0820 | N2 = 1.60311 | ν2 = 60.7 |
| R3 = | −30.3231 | D3 = 0.0328 | | |
| R4 = | 22.9832 | D4 = 0.4426 | N3 = 1.56384 | ν3 = 60.7 |
| R5 = | 5.0666 | D5 = Variable | | |
| R6 = | 4.0415 | D6 = 0.1311 | N4 = 1.77250 | ν4 = 49.6 |
| R7 = | 1.1823 | D7 = 0.5492 | | |
| R8 = | −2.0326 | D8 = 0.1311 | N5 = 1.77250 | ν5 = 49.6 |
| R9 = | 2.0326 | D9 = 0.1967 | | |
| R10 = | 2.5979 | D10 = 0.2787 | N6 = 1.84666 | ν6 = 23.8 |
| R11 = | 300.3997 | D11 = Variable | | |
| R12 = | (Stop) | D12 = 0.3279 | | |
| *R13 = | 2.8881 | D13 = 0.7705 | N7 = 1.58313 | ν7 = 59.4 |
| R14 = | −3.2787 | D14 = 0.1639 | N8 = 1.71300 | ν8 = 53.8 |
| R15 = | −6.1181 | D15 = Variable | | |
| R16 = | 4.2912 | D16 = 0.1311 | N9 = 1.84666 | ν9 = 23.8 |
| R17 = | 1.8060 | D17 = 0.7869 | N10 = 1.48749 | ν10 = 70.2 |
| R18 = | −3.5620 | D18 = 0.0246 | | |
| R19 = | 3.1950 | D19 = 0.3279 | N11 = 1.48749 | ν11 = 70.2 |
| R20 = | 9.8816 | D20 = 0.9836 | | |
| R21 = | ∞ | D21 = 0.6557 | N12 = 1.51633 | ν12 = 64.2 |
| R22 = | ∞ | | | |

-continued

| Variable Separation | Focal Length | | |
|---|---|---|---|
| | 1.00 | 2.36 | 9.53 |
| D5 | 0.15 | 1.69 | 3.23 |
| D11 | 3.49 | 1.95 | 0.41 |
| D15 | 1.03 | 0.52 | 1.02 |

"*" indicates the aspheric surface.

The values of the aspheric coefficients:

| R | K | B | C | D | E |
|---|---|---|---|---|---|
| 2.88805D+00 | 0.00000D+00 | −1.52936D−02 | 5.43699D−04 | −1.40802D−04 | 0.00000+00 |

Numerical Example 3:
$F = 1–9.7$   $FNO = 1:1.7–2.4$   $2\omega = 55.4°–6.2°$

| R1 = | 8.8952 | D1 = 0.1625 | N1 = 1.80518 | ν1 = 25.4 |
|---|---|---|---|---|
| R2 = | 4.1225 | D2 = 0.9375 | N2 = 1.60311 | ν2 = 60.7 |
| R3 = | −17.6887 | D3 = 0.0250 | | |
| R4 = | 3.2344 | D4 = 0.5000 | N3 = 1.63854 | ν3 = 55.4 |
| R5 = | 5.9277 | D5 = Variable | | |
| R6 = | 4.5269 | D6 = 0.1125 | N4 = 1.69680 | ν4 = 55.5 |
| R7 = | 1.1374 | D7 = 0.6000 | | |
| R8 = | −1.7644 | D8 = 0.1000 | N5 = 1.51633 | ν5 = 64.2 |
| R9 = | 1.5933 | D9 = 0.1500 | | |
| R10 = | 1.8639 | D10 = 0.3125 | N6 = 1.84666 | ν6 = 23.8 |
| R11 = | 4.8884 | D11 = Variable | | |
| R12 = | (Stop) | D12 = 0.2575 | | |
| *R13 = | 8.5679 | D13 = 0.5625 | N7 = 1.58313 | ν7 = 59.4 |
| R14 = | −2.9851 | D14 = 0.1250 | | |
| R15 = | −2.2031 | D15 = 0.1250 | N8 = 1.80518 | ν8 = 25.4 |
| R16 = | −3.2368 | D16 = 0.0187 | | |
| R17 = | 2.8620 | D17 = 0.3500 | N9 = 1.51602 | ν9 = 56.8 |
| R18 = | 6.9078 | D18 = Variable | | |
| R19 = | 4.6284 | D19 = 0.1125 | N10 = 1.84666 | ν10 = 23.8 |
| R20 = | 2.1355 | D20 = 0.1000 | | |
| R21 = | 2.7094 | D21 = 0.4375 | N11 = 1.51633 | ν11 = 64.2 |
| R22 = | −6.7489 | D22 = 0.0187 | | |
| R23 = | 2.9599 | D23 = 0.3750 | N12 = 1.48749 | ν12 = 70.2 |
| R24 = | −17.0381 | D24 = 1.3750 | | |
| R25 = | ∞ | D25 = 0.7500 | N13 = 1.51633 | ν13 = 64.2 |
| R26 = | ∞ | | | |

| Variable Separation | Focal Length | | |
|---|---|---|---|
| | 1.00 | 2.32 | 9.65 |
| D5 | 0.11 | 1.74 | 3.36 |
| D11 | 3.69 | 2.06 | 0.44 |
| D18 | 1.37 | 0.88 | 1.46 |

"*" indicates the aspheric surface.

The values of the aspheric coefficients:

| R | K | B | C | D | E |
|---|---|---|---|---|---|
| 8.56788D+00 | 0.00000D+00 | 8.47178D−04 | −8.29921D−04 | 6.18231D−04 | 0.00000D+00 |

Numerical Example 4:
$F = 1–9.5$   $FNO = 1:2.0–2.2$   $2\omega = 57.4°–6.6°$

| R1 = | 9.2104 | D1 = 0.1709 | N1 = 1.80518 | ν1 = 25.4 |
|---|---|---|---|---|
| R2 = | 4.2217 | D2 = 0.9658 | N2 = 1.60311 | ν2 = 60.7 |
| R3 = | −28.1894 | D3 = 0.0342 | | |
| R4 = | 3.4149 | D4 = 0.5641 | N3 = 1.69680 | ν3 = 55.5 |
| R5 = | 7.5484 | D5 = Variable | | |
| R6 = | 2.9365 | D6 = 0.1026 | N4 = 1.77250 | ν4 = 49.6 |
| R7 = | 1.1496 | D7 = 0.5897 | | |
| R8 = | −2.0583 | D8 = 0.0855 | N5 = 1.69680 | ν5 = 55.5 |
| R9 = | 1.6011 | D9 = 0.1880 | | |
| R10 = | 2.0214 | D10 = 0.2906 | N6 = 1.84666 | ν6 = 23.8 |
| R11 = | 8.3681 | D11 = Variable | | |
| R12 = | (Stop) | D12 = 0.2222 | | |
| *R13 = | 2.6892 | D13 = 0.4957 | N7 = 1.58313 | ν7 = 59.4 |
| R14 = | −5.9691 | D14 = Variable | | |
| R15 = | 2.2183 | D15 = 0.0855 | N8 = 1.84666 | ν8 = 23.8 |
| R16 = | 1.1137 | D16 = 0.0308 | | |
| R17 = | 1.2494 | D17 = 0.5470 | N9 = 1.58313 | ν9 = 59.4 |

| | | | | | |
|---|---|---|---|---|---|
| *R18 = | −3.8767 | D18 = 0.8034 | | | |
| R19 = | ∞ | D19 = 0.9060 | N10 = 1.51633 | ν10 = 64.2 | |
| R20 = | ∞ | | | | |

| Variable | Focal Length | | |
|---|---|---|---|
| Separation | 1.00 | 3.27 | 9.49 |
| D5 | 0.15 | 2.08 | 3.21 |
| D11 | 3.30 | 1.37 | 0.24 |
| D14 | 1.28 | 0.62 | 1.36 |

"*" indicates the aspheric surface.

The values of the aspheric coefficients:

| | R | K | B | C | D | E |
|---|---|---|---|---|---|---|
| R13 | 2.68918D+00 | 2.46977D+00 | −3.18999D−02 | −1.25593D−02 | 1.94273D−03 | −3.04251D−03 |

| | R | K | B | C | D | E |
|---|---|---|---|---|---|---|
| R18 | −3.87670D+00 | 9.61538D+00 | −1.75736D−03 | −1.77114D−02 | −4.14094D−02 | 2.02215D−02 |

Numerical Example 5:
F = 1–9.5   FNO = 1:2.0–2.1   2ω = 57.4°–6.6°

| | | | | | |
|---|---|---|---|---|---|
| R1 = | 9.6675 | D1 = 0.1709 | N1 = 1.80518 | ν1 = 25.4 | |
| R2 = | 0.9658 | D2 = 0.9658 | N2 = 1.60311 | ν2 = 60.7 | |
| R3 = | −18.6485 | D3 = 0.0342 | | | |
| R4 = | 3.3213 | D4 = 0.5641 | N3 = 1.69680 | ν3 = 55.5 | |
| R5 = | 6.3438 | D5 = Variable | | | |
| R6 = | 3.1118 | D6 = 0.1026 | N4 = 1.77250 | ν4 = 49.6 | |
| R7 = | 1.2375 | D7 = 0.5897 | | | |
| R8 = | −2.1401 | D8 = 0.0855 | N5 = 1.69680 | ν5 = 55.5 | |
| R9 = | 1.5253 | D9 = 0.1880 | | | |
| R10 = | 6.0293 | D10 = 0.2906 | N6 = 1.84666 | ν6 = 23.8 | |
| R11 = | 6.0293 | D11 = Variable | | | |
| R12 = | (Stop) | D12 = 0.2222 | | | |
| *R13 = | 2.7870 | D13 = 0.4957 | N7 = 1.58313 | ν7 = 59.4 | |
| R14 = | −6.1923 | D14 = Variable | | | |
| R15 = | 2.6978 | D15 = 0.0855 | N8 = 1.84666 | ν8 = 23.8 | |
| R16 = | 1.2534 | D16 = 0.4786 | N9 = 1.58313 | ν9 = 59.4 | |
| *R17 = | −3.6319 | D17 = 0.8034 | | | |
| R18 = | ∞ | D18 = 0.9060 | N10 = 1.51633 | ν10 = 64.2 | |
| R19 = | ∞ | | | | |

| Variable | Focal Length | | |
|---|---|---|---|
| Separation | 1.00 | 3.27 | 9.49 |
| D5 | 0.15 | 2.08 | 3.21 |
| D11 | 3.30 | 1.37 | 0.24 |
| D14 | 1.40 | 0.77 | 1.48 |

"*" indicates the aspheric surface.

The values of the aspheric coefficients:

| | R | K | B | C | D | E |
|---|---|---|---|---|---|---|
| R13 | 2.78699D+00 | 2.43605D+00 | −3.14640D−02 | −6.69812D−03 | 2.18811D−03 | −4.65840D−03 |

| | R | K | B | C | D | E |
|---|---|---|---|---|---|---|
| R17 | −3.63193D+00 | 6.47226D+02 | 1.68245D−02 | 2.37066D−02 | −2.69208D−02 | −6.67411D−03 |

Numerical Example 6:
F = 1–9.5   FNO = 1:1.4–2.6   2ω = 5.4°–6.3°

| | | | | | |
|---|---|---|---|---|---|
| R1 = | 8.1279 | D1 = 0.1967 | N1 = 1.80518 | ν1 = 25.4 | |
| R2 = | 3.9275 | D2 = 0.9016 | N2 = 1.60311 | ν2 = 60.7 | |
| R3 = | −16.4802 | D3 = 0.0328 | | | |
| R4 = | 3.0879 | D4 = 0.3934 | N3 = 1.69680 | ν3 = 55.5 | |
| R5 = | 5.1475 | D5 = Variable | | | |
| R6 = | 3.5208 | D6 = 0.1311 | N4 = 1.77250 | ν4 = 49.6 | |
| R7 = | 1.1252 | D7 = 0.5082 | | | |
| R8 = | −1.7734 | D8 = 0.1311 | N5 = 1.69680 | ν5 = 55.5 | |
| R9 = | 2.4201 | D9 = 0.1639 | | | |
| R10 = | 2.6919 | D10 = 0.2787 | N6 = 1.84666 | ν6 = 23.8 | |
| R11 = | 35.0345 | D11 = Variable | | | |
| R12 = | (Stop) | D12 = 0.3279 | | | |

-continued

| | | | | | |
|---|---|---|---|---|---|
| *R13 = | 2.3743 | D13 = 0.7869 | N7 = 1.58313 | ν7 = 59.4 | |
| R14 = | −4.8312 | D14 = 0.0246 | | | |
| R15 = | 6.1492 | D15 = 0.3770 | N8 = 1.65844 | ν8 = 50.9 | |
| R16 = | −8.9279 | D16 = 0.0738 | | | |
| R17 = | −4.6586 | D17 = 0.1311 | N9 = 1.83400 | ν9 = 37.2 | |
| R18 = | 4.0944 | D18 = Variable | | | |
| R19 = | 3.6198 | D19 = 0.1311 | N10 = 1.84666 | ν10 = 23.8 | |
| R20 = | 2.0183 | D20 = 0.0328 | | | |
| R21 = | 2.0183 | D21 = 0.6885 | N11 = 1.48749 | ν11 = 70.2 | |
| R22 = | −3.2654 | D22 = 0.0246 | | | |
| R23 = | 3.0467 | D23 = 0.3607 | N12 = 1.48749 | ν12 = 70.2 | |
| R24 = | −123.6000 | D24 = 0.9836 | | | |
| R25 = | ∞ | D25 = 0.6557 | N13 = 1.51633 | ν13 = 64.2 | |
| R26 = | ∞ | | | | |

| Variable | Focal Length | | |
|---|---|---|---|
| Separation | 1.00 | 2.37 | 9.51 |
| D5 | 0.15 | 1.69 | 3.23 |
| D11 | 3.52 | 1.98 | 0.44 |
| D18 | 1.00 | 0.54 | 1.14 |

"*" indicates the aspheric surface.

The values of the aspheric coefficients.

| R | K | B | C | D | E |
|---|---|---|---|---|---|
| 2.37432D+00 | 0.00000D+00 | −1.61515D+02 | −1.09657D−03 | 6.96318D−04 | −2.05125D−04 |

Numerical Example 7:
F = 1–9.5  FNO = 1:1.4–2.3  2ω = 55.3°–6.4°

| | | | | | |
|---|---|---|---|---|---|
| R1 = | 6.8723 | D1 = 0.1966 | N1 = 1.80518 | ν1 = 25.4 | |
| R2 = | 3.8593 | D2 = 1.0322 | N2 = 1.60311 | ν2 = 60.7 | |
| R3 = | −29.9795 | D3 = 0.0328 | | | |
| R4 = | 3.2543 | D4 = 0.5079 | N3 = 1.51633 | ν3 = 64.2 | |
| R5 = | 7.0248 | D5 = Variable | | | |
| R6 = | 6.1721 | D6 = 0.1311 | N4 = 1.77250 | ν4 = 49.6 | |
| R7 = | 1.1967 | D7 = 0.5243 | | | |
| R8 = | −2.1406 | D8 = 0.1311 | N5 = 1.69680 | ν5 = 55.5 | |
| R9 = | 2.1406 | D9 = 0.1966 | | | |
| R10 = | 2.5843 | D10 = 0.3277 | N6 = 1.84666 | ν6 = 23.8 | |
| R11 = | 44.4250 | D11 = Variable | | | |
| R12 = | (Stop) | D12 = 0.3277 | | | |
| *R13 = | 2.9868 | D13 = 0.8356 | N7 = 1.58313 | ν7 = 59.4 | |
| R14 = | −3.9633 | D14 = 0.0246 | | | |
| R15 = | 12.2877 | D15 = 0.3768 | N8 = 1.68250 | ν8 = 44.7 | |
| R16 = | −9.1728 | D16 = 0.0492 | | | |
| R17 = | −5.7406 | D17 = 0.1311 | N9 = 1.83400 | ν9 = 37.2 | |
| R18 = | 5.7406 | D18 = Variable | | | |
| R19 = | 3.6597 | D19 = 0.1311 | N10 = 1.84666 | ν10 = 23.8 | |
| R20 = | 1.9611 | D20 = 0.8028 | N11 = 1.48749 | ν11 = 70.2 | |
| R21 = | −4.2504 | D21 = 0.0246 | | | |
| R22 = | 2.7954 | D22 = 0.4587 | N12 = 1.48749 | ν12 = 70.2 | |
| R23 = | 71.7608 | D23 = 0.9830 | | | |
| R24 = | ∞ | D24 = 0.6553 | N13 = 1.51633 | ν13 = 64.2 | |
| R25 = | ∞ | | | | |

| Variable | Focal Length | | |
|---|---|---|---|
| Separation | 1.00 | 2.30 | 9.51 |
| D5 | 0.15 | 1.74 | 3.33 |
| D11 | 3.58 | 1.99 | 0.39 |
| D18 | 1.60 | 1.14 | 1.59 |

"*" indicates the aspheric surface.

The values of the aspheric coefficients:

| R | K | B | C | D | E |
|---|---|---|---|---|---|
| 2.98684D+00 | 0.00000D+00 | −1.46134D−02 | −9.43232D−05 | 1.04998D−04 | 0.00000D+00 |

Numerical Example 8:
F = 1–7.5  FNO = 1:1.6–2.2  2ω = 55.4°–8.0°

| | | | | | |
|---|---|---|---|---|---|
| R1 = | 8.8399 | D1 = 0.1750 | N1 = 1.80518 | ν1 = 25.4 | |
| R2 = | 3.4208 | D2 = 0.6625 | N2 = 1.62299 | ν2 = 58.2 | |
| R3 = | −22.2667 | D3 = 0.0250 | | | |
| R4 = | 2.7878 | D4 = 0.4875 | N3 = 1.69680 | ν3 = 55.5 | |

-continued

| | | | | |
|---|---|---|---|---|
| R5 = | 7.4166 | D5 = Variable | | |
| R6 = | 11.6424 | D6 = 0.1250 | N4 = 1.77250 | ν4 = 49.6 |
| R7 = | 1.0546 | D7 = 0.3600 | | |
| R8 = | −3.2669 | D8 = 0.1000 | N5 = 1.69680 | ν5 = 55.5 |
| R9 = | 1.4918 | D9 = 0.1250 | | |
| R10 = | 1.7228 | D10 = 0.3125 | N6 = 1.84666 | ν6 = 23.8 |
| R11 = | 9.0137 | D11 = Variable | | |
| R12 = | (Stop) | D12 = 0.1875 | | |
| R13 = | 1.9953 | D13 = 0.6625 | N7 = 1.58313 | ν7 = 59.4 |
| R14 = | −2.3549 | D14 = 0.0250 | | |
| R15 = | −16.7755 | D15 = 0.2875 | N8 = 1.60311 | ν8 = 60.7 |
| R16 = | −5.2583 | D16 = 0.0720 | | |
| R17 = | −2.5776 | D17 = 0.1125 | N9 = 1.69895 | ν9 = 30.1 |
| R18 = | −2.5776 | D18 = Variable | | |
| R19 = | 2.9101 | D19 = 0.3546 | N10 = 1.48749 | ν10 = 70.2 |
| R20 = | −17.6118 | D20 = 0.0188 | | |
| R21 = | 1.8604 | D21 = 0.1250 | N11 = 1.84666 | ν11 = 23.8 |
| R22 = | 1.2100 | D22 = 0.0615 | | |
| R23 = | 1.6192 | D23 = 0.3255 | N12 = 1.60311 | ν12 = 60.7 |
| R24 = | ∞ | D24 = 0.7500 | | |
| R25 = | ∞ | D25 = 0.7462 | N13 = 1.51633 | ν13 = 64.2 |
| R26 = | ∞ | | | |

| Variable | Focal Length | | |
|---|---|---|---|
| Separation | 1.00 | 1.58 | 7.51 |
| D5 | 0.10 | 0.81 | 2.46 |
| D11 | 2.60 | 1.90 | 0.25 |
| D18 | 0.67 | 0.45 | 1.01 |

"*" indicates the aspheric surface.

The values of the aspheric coefficients:

| R | K | B | C | D | E |
|---|---|---|---|---|---|
| 1.99533D+00 | 0.00000D+00 | −3.25762D−02 | −1.04980D−02 | 2.87590D−03 | 0.00000D+00 |

Numerical Example 9:
F = 1–7.5   FNO = 1:1.7–2.2   2ω = 55.4°–8.0°

| | | | | |
|---|---|---|---|---|
| R1 = | 8.4167 | D1 = 0.1750 | N1 = 1.80518 | ν1 = 25.4 |
| R2 = | 3.2697 | D2 = 0.6625 | N2 = 1.62299 | ν2 = 58.2 |
| R3 = | −26.3164 | D3 = 0.0250 | | |
| R4 = | 2.7402 | D4 = 0.4875 | N3 = 1.69680 | ν3 = 55.5 |
| R5 = | 7.2417 | D5 = Variable | | |
| R6 = | 9.7829 | D6 = 0.1250 | N4 = 1.77250 | ν4 = 49.6 |
| R7 = | 0.9925 | D7 = 0.3792 | | |
| R8 = | −3.2264 | D8 = 0.1000 | N5 = 1.69680 | ν5 = 55.5 |
| R9 = | 1.5510 | D9 = 0.1250 | | |
| R10 = | 1.7510 | D10 = 0.3125 | N6 = 1.84666 | ν6 = 23.8 |
| R11 = | 11.1848 | D11 = Variable | | |
| R12 = | (Stop) | D12 = 0.1875 | | |
| *R13 = | 2.3717 | D13 = 0.6625 | N7 = 1.58313 | ν7 = 59.4 |
| R14 = | −2.7237 | D14 = 0.2474 | | |
| R15 = | −4.8652 | D15 = 0.1125 | N8 = 1.69895 | ν8 = 30.1 |
| R16 = | −809.5881 | D16 = Variable | | |
| R17 = | 17.9351 | D17 = 0.3206 | N9 = 1.48749 | ν9 = 70.2 |
| R18 = | −4.6554 | D18 = 0.0188 | | |
| R19 = | 1.9707 | D19 = 0.1250 | N10 = 1.80518 | ν10 = 25.4 |
| R20 = | 0.9722 | D20 = 0.4335 | N11 = 1.60311 | ν11 = 60.7 |
| R21 = | 10.3091 | D21 = 0.7500 | | |
| R22 = | ∞ | D22 = 0.7462 | N12 = 1.51633 | ν12 = 64.2 |
| R23 = | ∞ | | | |

| Variable | Focal Length | | |
|---|---|---|---|
| Separation | 1.00 | 1.58 | 7.51 |
| D5 | 0.11 | 0.81 | 2.46 |
| D11 | 2.60 | 1.90 | 0.25 |
| D16 | 0.67 | 0.44 | 1.03 |

"*" indicates the aspheric surface.

-continued

| The values of the aspheric coefficients: | | | | | |
|---|---|---|---|---|---|
| R | K | B | C | D | E |
| 2.37167D+00 | 0.00000D+00 | −2.75955D−02 | −8.29204D−03 | 3.08326D−03 | 0.00000D+00 |

Numerical Example 10:
F = 1–9.90   FNO = 1:1.6–2.5   2ω = 59.1°–6.5°

| R1 = | 6.5060 | D1 = 0.2301 | N1 = 1.84666 | ν1 = 23.8 |
|---|---|---|---|---|
| R2 = | 3.9476 | D2 = 0.9027 | N2 = 1.51633 | ν2 = 64.2 |
| R3 = | −253.6943 | D3 = 0.0354 | | |
| R4 = | 3.8633 | D4 = 0.5310 | N3 = 1.69680 | ν3 = 55.5 |
| R5 = | 12.7886 | D5 = Variable | | |
| R6 = | 5.5589 | D6 = 0.1239 | N4 = 1.77250 | ν4 = 49.6 |
| R7 = | 1.0873 | D7 = 0.5235 | | |
| R8 = | −1.8677 | D8 = 0.1239 | N5 = 1.69680 | ν5 = 55.5 |
| R9 = | 2.9224 | D9 = 0.1947 | | |
| R10 = | 3.1207 | D10 = 0.3009 | N6 = 1.84666 | ν6 = 23.8 |
| R11 = | −25.9928 | D11 = Variable | | |
| R12 = | (Stop) | D12 = 0.1947 | | |
| R13 = | 4.6323 | D13 = 0.5664 | N7 = 1.69680 | ν7 = 55.5 |
| R14 = | −4.6323 | D14 = 0.2402 | | |
| R15 = | −2.2447 | D15 = 0.1770 | N8 = 1.78472 | ν8 = 25.7 |
| R16 = | −3.1971 | D16 = Variable | | |
| R17 = | 2.8546 | D17 = 0.1239 | N9 = 1.84666 | ν9 = 23.8 |
| R18 = | 1.6061 | D18 = 0.0555 | | |
| R19 = | 1.7781 | D19 = 0.9735 | N10 = 1.58313 | ν10 = 59.4 |
| *R20 = | −3.0631 | D20 = 1.1504 | | |
| R21 = | ∞ | D21 = 0.8850 | N11 = 1.51633 | ν11 = 64.2 |
| R22 = | ∞ | | | |

| Variable | Focal Length | | |
|---|---|---|---|
| Separation | 1.00 | 3.32 | 9.90 |
| D5 | 0.16 | 2.21 | 3.41 |
| D11 | 3.50 | 1.45 | 0.25 |
| D16 | 1.28 | 0.60 | 1.28 |

"*" indicates the aspheric surface.

The values of the aspheric coefficients:

R = −3.06312
K = −3.20616
B = −5.79505 × $10^{-3}$
C = −3.68211 × $10^{-3}$
D = 3.36520 × $10^{-4}$
E = −1.85440 × $10^{-3}$

Numerical Example 11:
F = 1–9.90   FNO = 1:1.6–2.6   2ω = 59.1°–6.5°

| R1 = | 7.3785 | D1 = 0.2301 | N1 = 1.84666 | ν1 = 23.8 |
|---|---|---|---|---|
| R2 = | 4.0961 | D2 = 0.8850 | N2 = 1.51633 | ν2 = 64.2 |
| R3 = | −45.4830 | D3 = 0.0354 | | |
| R4 = | 3.7684 | D4 = 0.5310 | N3 = 1.69680 | ν3 = 55.5 |
| R5 = | 12.9430 | D5 = Variable | | |
| R6 = | 6.7097 | D6 = 0.1239 | N4 = 1.77250 | ν4 = 49.6 |
| R7 = | 1.0902 | D7 = 0.5151 | | |
| R8 = | −1.8321 | D8 = 0.1239 | N5 = 1.69680 | ν5 = 55.5 |
| R9 = | 3.2507 | D9 = 0.1947 | | |
| R10 = | 3.3097 | D10 = 0.3009 | N6 = 1.84666 | ν6 = 23.8 |
| R11 = | −17.7829 | D11 = Variable | | |
| R12 = | (Stop) | D12 = 0.1947 | | |
| R13 = | 4.5583 | D13 = 0.5664 | N7 = 1.69680 | ν7 = 55.5 |
| R14 = | −4.6963 | D14 = 0.5284 | | |
| R15 = | −2.2258 | D15 = 0.1770 | N8 = 1.68893 | ν8 = 31.1 |
| R16 = | −3.6822 | D16 = Variable | | |
| R17 = | −3.6822 | D17 = 0.1239 | N9 = 1.84666 | ν9 = 23.8 |
| R18 = | 1.5300 | D18 = 0.9735 | N10 = 1.58313 | ν10 = 59.4 |
| *R19 = | −3.1400 | D19 = 1.1504 | | |
| R20 = | ∞ | D20 = 0.8850 | N11 = 1.51633 | ν11 = 64.2 |
| R21 = | ∞ | | | |

| Variable | Focal Length | | |
|---|---|---|---|
| Separation | 1.00 | 3.32 | 9.90 |
| D5 | 0.15 | 2.20 | 3.41 |
| D11 | 3.50 | 1.45 | 0.25 |
| D16 | 1.27 | 0.59 | 1.27 |

-continued

"*" indicates the aspheric surface.
The values of the aspheric coefficients:

| | |
|---|---|
| R = −3.14004 | C = −1.89186 × 10⁻³ |
| K = −3.31056 | D = −4.09005 × 10⁻⁴ |
| B = 1.02851 × 10⁻³ | E = −1.36302 × 10⁻⁴ |

Numerical Example 12:
F = 1–9.90  FNO = 1:1.6–2.5  2ω = 59.1°–6.5°

| | | | | | | | |
|---|---|---|---|---|---|---|---|
| R1 = | 8.1319 | D1 = 0.2301 | | N1 = 1.84666 | | ν1 = 23.8 | |
| R2 = | 4.4324 | D2 = 1.0088 | | N2 = 1.51633 | | ν2 = 64.2 | |
| R3 = | −17.0161 | D3 = 0.0354 | | | | | |
| R4 = | 3.3388 | D4 = 0.5133 | | N3 = 1.69680 | | ν3 = 55.5 | |
| R5 = | 7.0422 | D5 = Variable | | | | | |
| R6 = | 5.5115 | D6 = 0.1239 | | N4 = 1.77250 | | ν4 = 49.6 | |
| R7 = | 1.1516 | D7 = 0.5142 | | | | | |
| R8 = | −2.0636 | D8 = 0.1239 | | N5 = 1.69680 | | ν5 = 55.5 | |
| R9 = | 1.9461 | D9 = 0.1947 | | | | | |
| R10 = | 2.5188 | D10 = 0.3009 | | N6 = 1.84666 | | ν6 = 23.8 | |
| R11 = | −92.4364 | D11 = Variable | | | | | |
| R12 = | (Stop) | D12 = 0.1947 | | | | | |
| *R13 = | 4.1011 | D13 = 0.5487 | | N7 = 1.58313 | | ν7 = 59.4 | |
| R14 = | −5.0902 | D14 = Variable | | | | | |
| R15 = | 5.7893 | D15 = 0.1062 | | N8 = 1.84666 | | ν8 = 23.8 | |
| R16 = | 1.8449 | D16 = 0.6195 | | N9 = 1.51633 | | ν9 = 64.2 | |
| R17 = | −9.7958 | D17 = 0.0265 | | | | | |
| R18 = | 4.5354 | D18 = 0.4425 | | N10 = 1.49831 | | ν10 = 65.0 | |
| R19 = | −3.7448 | D19 = 1.2389 | | | | | |
| R20 = | ∞ | D20 = 0.8850 | | N11 = 1.51633 | | ν11 = 64.2 | |
| R21 = | ∞ | | | | | | |

| Variable | Focal Length | | |
|---|---|---|---|
| Separation | 1.00 | 3.23 | 9.90 |
| D5 | 0.15 | 2.20 | 3.40 |
| D11 | 3.50 | 1.45 | 0.25 |
| D14 | 1.57 | 0.89 | 1.57 |

"*" indicates the aspheric surface.
The values of the aspheric coefficients:

| | |
|---|---|
| R = 4.10114 | C = 3.26722 × 10⁻³ |
| K = 3.01451 | D = −5.27768 × 10⁻³ |
| B = −1.89148 × 10⁻² | E = 2.01088 × 10⁻³ |

Next, embodiments which take the principle of the design of the second lens unit as an advantage of making it easy to increase the angle of view in the wide-angle end to 60° or more are described by reference to FIGS. 25 to 39(A), 39(B) and 39((C).

In the embodiments, by constructing the first and second lens units in the forms described above, it becomes possible to make wider the angle of view in the wide-angle end than 60°. It also becomes possible to reduce the distortion which would increase largely in the conventional wide-angle lens.

In the general case of the zoom lenses of the rear focus type which have been heretofore proposed, the second lens unit of negative refractive power is usually constructed from a negative meniscus lens convex toward the object side and a cemented lens consisting of a negative lens of which both surfaces are concave and a positive lens, in this order from the object side. In the present invention, on the other hand, owing to the form and the construction and arrangement described above, the front principal point of the second lens unit can easily be put to a more forward position than in the conventional lens, so that its distance from the principal point of the first lens unit can decrease. This arrangement affords to put the first lens unit closer to the stop. Then, the height of incidence of the off-axial light beam on the first lens unit from the optical axis becomes lower, permitting the diameter of the first lens unit to decrease. Thus, the focal length in the wide-angle end can be so much shifted to the wider angle-of-view side.

In the invention, each of the negative second and positive third lenses in the second lens unit is constructed from a single lens, so that they also act as an air lens on correction of aberrations. Thus, spherical aberration, coma and longitudinal chromatic aberration are advantageously corrected. An on-axial light ray traveling the second lens unit, after having emerged from the negative second lens enters the positive third lens at a higher height from the optical axis than in the conventional cemented type. Therefore, the effect of aberrations, which are to be corrected by the positive third lens, becomes too strong. This arrangement provides a possibility of so much loosening of the curvatures of the lenses constituting the second lens unit, which possibility may be utilized in correcting distortion and other various aberrations which are difficult to correct with the wide-angle lens.

In the embodiments, for the zoom type described above, such features are set forth to thereby achieve the increase of the maximum angle of view. To obtain a better optical performance throughout the entire zooming range, an additional condition is set forth as follows:

$$3.1 < R_{HF}/f_2 < 12.9$$

where $R_{HF}$ is the radius of curvature of the front surface of the negative meniscus lens arranged in the frontmost position of the second lens unit and $f_2$ is the focal length of the second lens unit.

This condition is to regulate the radius of curvature of the front lens surface of the second lens unit, as this surface relates chiefly to distortion and the position of the front principal point of the second lens unit. When the lower limit is exceeded, the distortion becomes small, but, because the front principal point of the second lens unit is shifted to the image side, it physically approaches the first lens unit. To space it apart, the interval between the principal points of the first and second lens units may be increased. If so, the first lens unit in the paraxial region displaces itself farther from the stop, causing the height of incidence of the off-axial light beam on the first lens unit from the optical axis to increase largely. This involves an objectionably large increase of the diameter of the lens. When the upper limit is exceeded, the distortion increases largely, exceeding −5%.

Further, to increase the maximum angle of view of the zoom lens, the following condition is satisfied:

$$0.9 < R_{IL}/f_1 < 2.7$$

where $R_{IL}$ is the radius of curvature of the rear surface of the positive lens arranged in the rearmost position of the first lens unit and $f_1$ is the focal length of the first lens unit.

This condition is, like the preceding condition, to regulate the radius of curvature of the lens surface, as this surface relates to the position of the rear principal point of the first lens unit and distortion.

When it is smaller than the lower limit, the rear principal point of the first lens unit is caused to fall on the object side, giving rise to a problem similar to that with the lower limit of the preceding condition. When the upper limit is exceeded, the distortion of the pincushion type increases in the telephoto end objectionably.

To correct the spherical aberration and coma produced by the second lens unit, still another condition is satisfied, as given below:

$$0.3 < |(R_{IIS} - R_{II4})/f_2| < 1.4$$

where $R_{IIi}$ is the radius of curvature of the i-th lens surface, when counted from the object side, in the second lens unit.

This factor is concerned with the power of the air lens provided in between the negative second and positive third lenses in the second lens unit. When it is smaller than the lower limit, the air lens loses its function and the aberration correction becomes impossible. When the upper limit is exceeded, over-correction of spherical aberration and coma results. Particularly at or near the wide-angle end, the performance deteriorates.

The above-described features of the second lens unit suffice for achieving the increase of the maximum angle of view and the increase of the zoom ratio while maintaining the high optical performance. To allow a further reduction of the bulk and size and a further improvement of the performance to be achieved, the fourth lens unit, which moves during zooming is constructed from positive and negative lenses, each of which is at least one in number. Thus, the range of variation of the chromatic aberrations produced by the fourth lens unit is limited to a minimum. Further, an aspheric surface is introduced to thereby correct spherical aberration and distortion in the intermediate region of the zooming range.

Also, the third lens unit is constructed from a single lens having at least one aspheric surface to thereby reduce the number of constituent lenses. This affords to shorten the total length. The spherical aberration in the wide-angle end can be well corrected by the aspheric surface.

With the aims of reducing the bulk and size and of increasing the zoom ratio, as the refractive power of the second lens unit strengthens, the curvatures of the lenses constituting the second lens unit becomes small, causing aberrations to be produced. The variation of the aberrations with zooming is also increased, thus deteriorating the optical performance. On this account, it is desirable that the mean value of the refractive indices of the lenses constituting the second lens unit is not less than 1.65.

Next, numerical examples 13 to 23 of the invention are shown.

Further, the relationships between the above-described conditions and the various numerical values in the numerical examples are shown in Table-1.

| Numerical Example 13: |
| $F = 1–7.60$ $FNO = 1:1.8–2.1$ $2\omega = 61.3°–8.9°$ |

| | | | | |
|---|---|---|---|---|
| R1 = | 6.7230 | D1 = 0.2037 | N1 = 1.80518 | v1 = 25.4 |
| R2 = | 3.4459 | D2 = 1.1296 | N2 = 1.60311 | v2 = 60.7 |
| R3 = | −91.4821 | D3 = 0.0370 | | |
| R4 = | 2.9278 | D4 = 0.5926 | N3 = 1.69680 | v3 = 55.5 |
| R5 = | 8.0833 | D5 = Variable | | |
| R6 = | 5.4613 | D6 = 0.0926 | N4 = 1.77250 | v4 = 49.6 |
| R7 = | 1.0525 | D7 = 0.5123 | | |
| R8 = | −1.9518 | D8 = 0.0926 | N5 = 1.69680 | v5 = 55.5 |
| R9 = | 1.6605 | D9 = 0.2037 | | |
| R10 = | 2.1870 | D10 = 0.2778 | N6 = 1.84666 | v6 = 23.8 |
| R11 = | 13.4730 | D11 = Variable | | |
| R12 = | (Stop) | D12 = 0.2037 | | |
| *R13 = | 2.5325 | D13 = 0.5000 | N7 = 1.58313 | v7 = 59.4 |
| R14 = | −5.5070 | D14 = Variable | | |
| R15 = | 2.5870 | D15 = 0.0926 | N8 = 1.84666 | v8 = 23.8 |
| R16 = | 1.2129 | D16 = 0.0574 | | |
| R17 = | 1.3950 | D17 = 0.6852 | N9 = 1.58313 | v9 = 59.4 |
| *R18 = | −2.5629 | D18 = Variable | | |
| R19 = | ∞ | D19 = 0.9815 | N10 = 1.51633 | v10 = 64.2 |
| R20 = | ∞ | | | |

-continued

| Variable Separation | Focal Length | | |
|---|---|---|---|
| | 1.00 | 2.93 | 7.60 |
| D5 | 0.14 | 1.53 | 2.35 |
| D11 | 2.48 | 1.08 | 0.26 |
| D14 | 1.06 | 0.55 | 1.06 |
| D18 | 1.39 | 1.91 | 1.39 |

"*" indicates the aspheric surface.
The values of the aspheric coefficients:

| 13th Surface | 18th Surface |
|---|---|
| $R = 2.5325$ | $R = -2.5629$ |
| $K = 2.9673$ | $K = -1.2148 \times 10^{-1}$ |
| $B = -4.5657 \times 10^{-2}$ | $B = -4.2022 \times 10^{-3}$ |
| $C = -1.1328 \times 10^{-2}$ | $C = -1.5840 \times 10^{-2}$ |
| $D = -1.2529 \times 10^{-2}$ | $D = -1.9380 \times 10^{-2}$ |
| $E = 3.7822 \times 10^{-3}$ | $E = -3.6156 \times 10^{-3}$ |

Numerical Example 14:
$F = 1-9.50 \quad FNO = 1:1.8-2.4 \quad 2\omega = 61.3°-7.1°$

| R1 = | 7.3721 | D1 = 0.2037 | N1 = 1.80518 | ν1 = 25.4 |
|---|---|---|---|---|
| R2 = | 3.6898 | D2 = 1.0741 | N2 = 1.60311 | ν2 = 60.7 |
| R3 = | -102.0935 | D3 = 0.0370 | | |
| R4 = | 3.2827 | D4 = 0.5926 | N3 = 1.69680 | ν3 = 55.5 |
| R5 = | 9.1512 | D5 = Variable | | |
| R6 = | 5.8526 | D6 = 0.0926 | N4 = 1.77250 | ν4 = 49.6 |
| R7 = | 1.0841 | D7 = 0.5241 | | |
| R8 = | -2.0633 | D8 = 0.0926 | N5 = 1.69680 | ν5 = 55.5 |
| R9 = | 1.7306 | D9 = 0.2037 | | |
| R10 = | 2.2528 | D10 = 0.2963 | N6 = 1.84666 | ν6 = 23.8 |
| R11 = | 17.3050 | D11 = Variable | | |
| R12 = | (Stop) | D12 = 0.2037 | | |
| *R13 = | 2.8223 | D13 = 0.5370 | N7 = 1.58313 | ν7 = 59.4 |
| R14 = | -6.0918 | D14 = Variable | | |
| R15 = | 2.7375 | D15 = 0.0926 | N8 = 1.84666 | ν8 = 23.8 |
| R16 = | 1.2898 | D16 = 0.0590 | | |
| R17 = | 1.4738 | D17 = 0.7222 | N9 = 1.58313 | ν9 = 59.4 |
| *R18 = | -2.9458 | D18 = Variable | | |
| R19 = | ∞ | D19 = 0.9815 | N10 = 1.51633 | ν10 = 64.2 |
| R20 = | ∞ | | | |

| Variable Separation | Focal Length | | |
|---|---|---|---|
| | 1.00 | 3.32 | 9.50 |
| D5 | 0.15 | 1.86 | 2.86 |
| D11 | 2.97 | 1.26 | 0.26 |
| D14 | 1.33 | 0.62 | 1.33 |
| D18 | 1.57 | 2.29 | 1.57 |

"*" indicates the aspheric surface.
The values of the aspheric coefficients:

| 13th Surface | 18th Surface |
|---|---|
| $R = 2.8223$ | $R = -2.9458$ |
| $K = 2.9248$ | $K = -1.7452 \times 10^{-1}$ |
| $B = -3.1661 \times 10^{-2}$ | $B = -5.2192 \times 10^{-3}$ |
| $C = -7.3074 \times 10^{-3}$ | $C = -1.4009 \times 10^{-2}$ |
| $D = -6.5265 \times 10^{-3}$ | $D = -9.4874 \times 10^{-3}$ |
| $E = 2.5889 \times 10^{-3}$ | $E = -1.6398 \times 10^{-3}$ |

Numerical Example 15:
$F = 1-11.40 \quad FNO = 1:1.8-2.7 \quad 2\omega = 61.3°-6.0°$

| R1 = | 8.0440 | D1 = 0.2222 | N1 = 1.80518 | ν1 = 25.4 |
|---|---|---|---|---|
| R2 = | 4.1639 | D2 = 1.0185 | N2 = 1.60311 | ν2 = 60.7 |
| R3 = | -119.2950 | D3 = 0.0370 | | |
| R4 = | 3.6632 | D4 = 0.5556 | N3 = 1.69680 | ν3 = 55.5 |
| R5 = | 8.7398 | D5 = Variable | | |
| R6 = | 4.2892 | D6 = 0.0926 | N4 = 1.77250 | ν4 = 49.6 |
| R7 = | 0.9801 | D7 = 0.6119 | | |
| R8 = | -1.7759 | D8 = 0.0926 | N5 = 1.69680 | ν5 = 55.5 |
| R9 = | 4.7096 | D9 = 0.2037 | | |
| R10 = | 3.3715 | D10 = 0.2963 | N6 = 1.84666 | ν6 = 23.8 |
| R11 = | -85.1174 | D11 = Variable | | |

-continued

| | | | | |
|---|---|---|---|---|
| R12 = | (Stop) | D12 = 0.2037 | | |
| *R13 = | 2.6760 | D13 = 0.5556 | N7 = 1.58313 | ν7 = 59.4 |
| R14 = | −10.0581 | D14 = Variable | | |
| R15 = | 2.9875 | D15 = 0.0926 | N8 = 1.84666 | ν8 = 23.8 |
| R16 = | 1.4119 | D16 = 0.0696 | | |
| R17 = | 1.6419 | D17 = 0.7222 | N9 = 1.58313 | ν9 = 59.4 |
| *R18 = | −3.4420 | D18 = Variable | | |
| R19 = | ∞ | D19 = 0.9815 | N10 = 1.51633 | ν10 = 64.2 |
| R20 = | ∞ | | | |

| Variable | Focal Length | | |
|---|---|---|---|
| Separation | 1.00 | 3.48 | 11.40 |
| D5 | 0.16 | 2.32 | 3.59 |
| D11 | 3.68 | 1.53 | 0.26 |
| D14 | 1.35 | 0.46 | 1.35 |
| D18 | 1.85 | 2.75 | 1.85 |

"*" indicates the aspheric surface.
The values of the aspheric coefficients:

| 13th Surface | 18th Surface |
|---|---|
| R = 2.6760 | R = −3.4420 |
| K = 2.2575 | K = 2.6314 |
| B = −2.7322 × 10$^{-2}$ | B = 4.4120 × 10$^{-3}$ |
| C = −4.8957 × 10$^{-3}$ | C = −3.8176 × 10$^{-3}$ |
| D = −4.7115 × 10$^{-3}$ | D = −1.2067 × 10$^{-2}$ |
| E = 8.1345 × 10$^{-4}$ | E = −3.2148 × 10$^{-3}$ |

Numerical Example 16:
F = 1–7.60    FNO = 1:1.8–2.0    2ω = 63.2°–9.3°

| | | | | |
|---|---|---|---|---|
| R1 = | 6.7015 | D1 = 0.2692 | N1 = 1.84666 | ν1 = 23.8 |
| R2 = | 3.8647 | D2 = 1.2885 | N2 = 1.60311 | ν2 = 60.7 |
| R3 = | −115.3846 | D3 = 0.0385 | | |
| R4 = | 3.0533 | D4 = 0.6538 | N3 = 1.69680 | ν3 = 55.5 |
| R5 = | 7.7511 | D5 = Variable | | |
| R6 = | 11.2059 | D6 = 0.0926 | N4 = 1.77250 | ν4 = 49.6 |
| R7 = | 1.0798 | D7 = 0.5128 | | |
| R8 = | −3.0897 | D8 = 0.0926 | N5 = 1.69680 | ν5 = 55.5 |
| R9 = | 1.6229 | D9 = 0.2115 | | |
| R10 = | 2.0052 | D10 = 0.2885 | N6 = 1.84666 | ν6 = 23.8 |
| R11 = | 6.9130 | D11 = Variable | | |
| R12 = | (Stop) | D12 = 0.2115 | | |
| *R13 = | 2.8817 | D13 = 0.4808 | N7 = 1.58313 | ν1 = 59.4 |
| R14 = | −5.2215 | D14 = Variable | | |
| R15 = | 2.7961 | D15 = 0.0926 | N8 = 1.84666 | ν8 = 23.8 |
| R16 = | 1.3276 | D16 = 0.0597 | | |
| R17 = | 1.5395 | D17 = 0.7692 | N9 = 1.58313 | ν9 = 59.4 |
| *R18 = | −2.3654 | D18 = Variable | | |
| R19 = | ∞ | D19 = 1.0192 | N10 = 1.51633 | ν10 = 64.2 |
| R20 = | ∞ | | | |

| Variable | Focal Length | | |
|---|---|---|---|
| Separation | 1.00 | 2.93 | 7.60 |
| D5 | 0.16 | 1.61 | 2.46 |
| D11 | 2.57 | 1.12 | 0.27 |
| D14 | 0.96 | 0.49 | 0.96 |
| D18 | 1.25 | 1.72 | 1.25 |

"*" indicates the aspheric surface.
The values of the aspheric coefficients:

| 13th Surface | 18th surface |
|---|---|
| R = 2.8817 | R = −2.3654 |
| K = 3.3764 | K = −1.0264 |
| B = −4.1581 × 10$^{-2}$ | B = −1.0878 × 10$^{-2}$ |
| C = −2.8497 × 10$^{-3}$ | C = −2.4844 × 10$^{-3}$ |
| D = −1.7508 × 10$^{-2}$ | D = −2.4351 × 10$^{-2}$ |
| E = 7.3576 × 10$^{-3}$ | E = 1.6656 × 10$^{-3}$ |

Numerical Example 17:
F = 1–7.60    FNO = 1:1.8–2.3    2ω = 59.1°–8.5°

| | | | | |
|---|---|---|---|---|
| R1 = | 6.3240 | D1 = 0.1947 | N1 = 1.80518 | ν1 = 25.4 |

-continued

| | | | | | |
|---|---|---|---|---|---|
| R2 = | 3.1650 | D2 = 0.9027 | N2 = 1.60311 | v2 = 60.7 |
| R3 = | −87.4342 | D3 = 0.0354 | | |
| R4 = | 2.8222 | D4 = 0.5133 | N3 = 1.69680 | v3 = 55.5 |
| R5 = | 8.4830 | D5 = Variable | | |
| R6 = | 4.9314 | D6 = 0.0885 | N4 = 1.77250 | v4 = 49.6 |
| R7 = | 0.9856 | D7 = 0.4729 | | |
| R8 = | −1.6895 | D8 = 0.0885 | N5 = 1.69680 | v5 = 55.5 |
| R9 = | 1.6999 | D9 = 0.1593 | | |
| R10 = | 2.1174 | D10 = 0.2655 | N6 = 1.84666 | v6 = 23.8 |
| R11 = | 20.3479 | D11 = Variable | | |
| R12 = | (Stop) | D12 = 0.1947 | | |
| *R13 = | 2.4625 | D13 = 0.5133 | N7 = 1.58313 | v7 = 59.4 |
| R14 = | −5.2581 | D14 = Variable | | |
| R15 = | 2.5970 | D15 = 0.0885 | N8 = 1.84666 | v8 = 23.8 |
| R16 = | 1.2012 | D16 = 0.0524 | | |
| R17 = | 1.3721 | D17 = 0.6903 | N9 = 1.58313 | v9 = 59.4 |
| *R18 = | −2.5520 | D18 = Variable | | |
| R19 = | ∞ | D19 = 0.9381 | N10 = 1.51633 | v10 = 64.2 |
| R20 = | ∞ | | | |

| Variable | Focal Length | | |
|---|---|---|---|
| Separation | 1.00 | 2.94 | 7.60 |
| D5 | 0.13 | 1.47 | 2.25 |
| D11 | 2.37 | 1.03 | 0.25 |
| D14 | 1.15 | 0.59 | 1.15 |
| D18 | 1.42 | 1.98 | 1.42 |

"*" indicates the aspheric surface.
The values of the aspheric coefficients:

| 13th Surface | 18th Surface |
|---|---|
| R = 2.4625 | R = −2.5520 |
| K = 3.1043 | K = −9.4375 × $10^{-2}$ |
| B = −5.1272 × $10^{-2}$ | B = −4.8662 × $10^{-3}$ |
| C = −1.0953 × $10^{-2}$ | C = −1.2034 × $10^{-2}$ |
| D = −1.5897 × $10^{-2}$ | D = −2.7018 × $10^{-2}$ |
| E = 3.1265 × $10^{-3}$ | E = −1.2075 × $10^{-3}$ |

Numerical Example 18:
F = 1–9.50   FNO = 1:1.8–1.8   2ω = 65.2°–7.7°

| | | | | | |
|---|---|---|---|---|---|
| R1 = | 9.0390 | D1 = 0.3200 | N1 = 1.80518 | v1 = 25.4 |
| R2 = | 4.6091 | D2 = 1.4600 | N2 = 1.60311 | v2 = 60.7 |
| R3 = | −863.9961 | D3 = 0.0400 | | |
| R4 = | 4.0840 | D4 = 0.7800 | N3 = 1.69350 | v3 = 53.2 |
| R5 = | 10.4993 | D5 = Variable | | |
| R6 = | 5.8369 | D6 = 0.1000 | N4 = 1.88300 | v4 = 40.8 |
| R7 = | 1.3353 | D7 = 0.6546 | | |
| R8 = | −2.4875 | D8 = 0.1000 | N5 = 1.69680 | v5 = 55.5 |
| R9 = | 2.1798 | D9 = 0.2200 | | |
| R10 = | 2.8608 | D10 = 0.3600 | N6 = 1.84666 | v6 = 23.8 |
| R11 = | −29.2014 | D11 = Variable | | |
| R12 = | (Stop) | D12 = 0.2200 | | |
| *R13 = | 2.9331 | D13 = 0.5200 | N7 = 1.58313 | v7 = 59.4 |
| R14 = | −8.3634 | D14 = Variable | | |
| R15 = | 3.1747 | D15 = 0.1000 | N8 = 1.84666 | v8 = 23.8 |
| R16 = | 1.3735 | D16 = 0.8400 | N9 = 1.58313 | v9 = 59.4 |
| R17 = | −3.3396 | D17 = Variable | | |
| *R18 = | ∞ | D18 = 1.0600 | N10 = 1.51633 | v10 = 64.2 |
| R19 = | ∞ | | | |

| Variable | Focal Length | | |
|---|---|---|---|
| Separation | 1.00 | 3.21 | 9.50 |
| D5 | 0.15 | 2.41 | 3.74 |
| D11 | 3.87 | 1.61 | 0.28 |
| D14 | 1.19 | 0.62 | 1.19 |
| D17 | 1.30 | 1.87 | 1.30 |

"*" indicates the aspheric surface.
The values of the aspheric coefficients:

| 13th Surface | 17th Surface |
|---|---|
| R = 2.9331 | R = −3.3396 |
| K = 7.6614 × $10^{-1}$ | K = −2.3941 |

B = -1.7306 × 10$^{-2}$
C = -4.1836 × 10$^{-4}$
D = -1.4341 × 10$^{-3}$
E = -9.4548 × 10$^{-5}$

B = -7.3507 × 10$^{-4}$
C = -4.1854 × 10$^{-3}$
D = -1.7938 × 10$^{-4}$
E = -1.1969 × 10$^{-3}$

Numerical Example 19:
F = 1–9.50   FNO = 1:1.8–2.1   2ω = 65.2°–7.7°

| | | | |
|---|---|---|---|
| R1 = 8.2029 | D1 = 0.3000 | N1 = 1.84666 | ν1 = 23.8 |
| R2 = 4.4892 | D2 = 1.4800 | N2 = 1.60311 | ν2 = 60.7 |
| R3 = -43.4681 | D3 = 0.0400 | | |
| R4 = 3.5123 | D4 = 0.7200 | N3 = 1.69680 | ν3 = 55.5 |
| R5 = 8.6680 | D5 = Variable | | |
| R6 = 7.0409 | D6 = 0.1000 | N4 = 1.88300 | ν4 = 40.8 |
| R7 = 1.2364 | D7 = 0.5417 | | |
| R8 = -1.9027 | D8 = 0.1000 | N5 = 1.69680 | ν5 = 55.5 |
| R9 = 2.2563 | D9 = 0.2200 | | |
| R10 = 3.0019 | D10 = 0.3200 | N6 = 1.84666 | ν6 = 23.8 |
| R11 = -34.0880 | D11 = Variable | | |
| R12 = (Stop) | D12 = 0.2200 | | |
| *R13 = 3.0542 | D13 = 0.5200 | N7 = 1.58313 | ν7 = 59.4 |
| R14 = -6.0637 | D14 = Variable | | |
| R15 = 2.9936 | D15 = 0.1000 | N8 = 1.84666 | ν8 = 23.8 |
| R16 = 1.3464 | D16 = 0.8400 | N9 = 1.58313 | ν9 = 59.4 |
| *R17 = -3.2823 | D17 = Variable | | |
| R18 = ∞ | D18 = 1.0600 | N10 = 1.51633 | ν10 = 64.2 |
| R19 = ∞ | | | |

| Variable | Focal Length | | |
|---|---|---|---|
| Separation | 1.00 | 3.19 | 9.50 |
| D5 | 0.15 | 1.96 | 3.02 |
| D11 | 3.15 | 1.34 | 0.28 |
| D14 | 1.38 | 0.74 | 1.38 |
| D17 | 1.30 | 1.94 | 1.30 |

"*" indicates the aspheric surface.
The values of the aspheric coefficients:

| 13th Surface | 17th Surface |
|---|---|
| R = 3.0542 | R = -3.2823 |
| K = 7.1419 × 10$^{-1}$ | K = -2.2656 |
| B = -1.8713 × 10$^{-2}$ | B = -1.1298 × 10$^{-3}$ |
| C = -6.2148 × 10$^{-5}$ | C = -1.4836 × 10$^{-3}$ |
| D = -5.9060 × 10$^{-4}$ | D = -2.8468 × 10$^{-3}$ |
| E = -5.2016 × 10$^{-4}$ | E = -7.5170 × 10$^{-4}$ |

Numerical Example 20:
F = 1–11.40   FNO = 1:1.8–2.1   2ω = 65.2°–6.4°

| | | | |
|---|---|---|---|
| R1 = 9.3789 | D1 = 0.3200 | N1 = 1.80518 | ν1 = 25.4 |
| R2 = 4.7799 | D2 = 1.4200 | N2 = 1.60311 | ν2 = 60.7 |
| R3 = -1958.8153 | D3 = 0.0400 | | |
| R4 = 4.4274 | D4 = 0.7600 | N3 = 1.69350 | ν3 = 53.2 |
| R5 = 11.8724 | D5 = Variable | | |
| R6 = 5.2203 | D6 = 0.1000 | N4 = 1.88300 | ν4 = 40.8 |
| R7 = 1.3294 | D7 = 0.6969 | | |
| R8 = -2.2055 | D8 = 0.1000 | N5 = 1.69680 | ν5 = 55.5 |
| R9 = 2.4676 | D9 = 0.2200 | | |
| R10 = 3.1846 | D10 = 0.3600 | N6 = 1.84666 | ν6 = 23.8 |
| R11 = -17.8021 | D11 = Variable | | |
| R12 = (Stop) | D12 = 0.2200 | | |
| *R13 = 2.9619 | D13 = 0.5400 | N7 = 1.58313 | ν7 = 59.4 |
| R14 = -9.3072 | D14 = Variable | | |
| R15 = 3.4498 | D15 = 0.1000 | N8 = 1.84666 | ν8 = 23.8 |
| R16 = 1.4681 | D16 = 0.8200 | N9 = 1.58313 | ν9 = 59.4 |
| *R17 = -3.7291 | D17 = Variable | | |
| R18 = ∞ | D18 = 1.0600 | N10 = 1.51633 | V10 = 64.2 |
| R19 = ∞ | | | |

| Variable | Focal Length | | |
|---|---|---|---|
| Separation | 1.00 | 3.43 | 11.40 |
| D5 | 0.16 | 2.68 | 4.16 |
| D11 | 4.28 | 1.76 | 0.28 |
| D14 | 1.44 | 0.68 | 1.44 |
| D17 | 1.50 | 2.26 | 1.50 |

-continued

"*" indicates the aspheric surface.
The values of the aspheric coefficients:

| 13th Surface | 17th Surface |
|---|---|
| R = 2.9619 | R = −3.7291 |
| K = 1.1367 | K = −2.9337 |
| B = −1.6291 × $10^{-2}$ | B = 6.4953 × $10^{-4}$ |
| C = −1.1777 × $10^{-3}$ | C = −4.1835 × $10^{-3}$ |
| D = −1.3402 × $10^{-3}$ | D = 7.1471 × $10^{-4}$ |
| E = 3.3400 × $10^{-4}$ | E = −5.8849 × $10^{-4}$ |

Numerical Example 21:
F = 1−9.50   FNO = 1:1.6−2.2   2ω = 62.2°−7.3°

| R1 = | 10.0709 | D1 = 0.1887 | N1 = 1.80518 | ν1 = 25.4 |
|---|---|---|---|---|
| R2 = | 4.6092 | D2 = 1.1132 | N2 = 1.60311 | ν2 = 60.7 |
| R3 = | −27.1166 | D3 = 0.0377 | | |
| R4 = | 3.5795 | D4 = 0.5849 | N3 = 1.69350 | ν3 = 53.2 |
| R5 = | 7.6910 | D5 = Variable | | |
| R6 = | 5.0452 | D6 = 0.0943 | N4 = 1.88300 | ν4 = 40.8 |
| R7 = | 1.2947 | D7 = 0.5821 | | |
| R8 = | −2.1578 | D8 = 0.0943 | N5 = 1.69680 | ν5 = 55.5 |
| R9 = | 2.0488 | D9 = 0.2075 | | |
| R10 = | 2.7487 | D10 = 0.3396 | N6 = 1.84666 | ν6 = 23.8 |
| R11 = | −27.2922 | D11 = Variable | | |
| R12 = | (Stop) | D12 = 0.2075 | | |
| *R13 = | 2.8884 | D13 = 0.5849 | N7 = 1.58313 | ν7 = 59.4 |
| R14 = | −7.7802 | D14 = Variable | | |
| R15 = | 3.1726 | D15 = 0.0943 | N8 = 1.84666 | ν8 = 23.8 |
| R16 = | 1.3771 | D16 = 0.7925 | N9 = 1.58313 | ν9 = 59.4 |
| *R17 = | −3.4779 | D17 = Variable | | |
| R18 = | ∞ | D18 = 1.0000 | N10 = 1.51633 | ν10 = 64.2 |
| R19 = | ∞ | | | |

| Variable | Focal Length | | |
|---|---|---|---|
| Separation | 1.00 | 3.22 | 9.50 |
| D5 | 0.15 | 2.28 | 3.53 |
| D11 | 3.65 | 1.52 | 0.26 |
| D14 | 1.34 | 0.68 | 1.34 |
| D17 | 1.42 | 2.07 | 1.42 |

"*" indicates the aspheric surface.
The values of the aspheric coefficients:

| 13th Surface | 17th Surface |
|---|---|
| R = 2.8884 | R = −3.4779 |
| K = 1.9535 | K = −4.7076 |
| B = −2.3095 × $10^{-2}$ | B = −5.8418 × $10^{-3}$ |
| C = −3.0600 × $10^{-3}$ | C = −2.0602 × $10^{-3}$ |
| D = −1.9363 × $10^{-3}$ | D = −5.3147 × $10^{-3}$ |
| E = 4.5636 × $10^{-4}$ | E = −4.6424 × $10^{-3}$ |

Numerical Example 22:
F = 1−9.90   FNO = 1:1.6−2.5   2ω = 59.1°−6.5°

| R1 = | 6.5907 | D1 = 0.2301 | N1 = 1.84666 | ν1 = 23.8 |
|---|---|---|---|---|
| R2 = | 3.9488 | D2 = 0.9204 | N2 = 1.51633 | ν2 = 64.2 |
| R3 = | −198.5269 | D3 = 0.0354 | | |
| R4 = | 3.9297 | D4 = 0.5310 | N3 = 1.69680 | ν3 = 55.5 |
| R5 = | 13.9472 | D5 = Variable | | |
| R6 = | 4.8395 | D6 = 0.1239 | N4 = 1.77250 | ν4 = 49.6 |
| R7 = | 1.1285 | D7 = 0.5398 | | |
| R8 = | −1.8261 | D8 = 0.1239 | N5 = 1.69680 | ν5 = 55.5 |
| R9 = | 2.6615 | D9 = 0.1947 | | |
| R10 = | 3.0356 | D10 = 0.3009 | N6 = 1.84666 | ν6 = 23.8 |
| R11 = | −41.7270 | D11 = Variable | | |
| R12 = | (Stop) | D12 = 0.1947 | | |
| R13 = | 4.3484 | D13 = 0.5664 | N7 = 1.69680 | ν7 = 55.5 |
| R14 = | −4.7176 | D14 = 0.6823 | | |
| R15 = | −2.0171 | D15 = 0.1770 | N8 = 1.78472 | ν8 = 25.7 |
| R16 = | −3.0620 | D16 = Variable | | |
| R17 = | 2.7390 | D17 = 0.1239 | N9 = 1.84666 | ν9 = 23.8 |
| R18 = | 1.6136 | D18 = 0.0492 | | |
| R19 = | 1.7763 | D19 = 0.9735 | N10 = 1.58313 | ν10 = 59.4 |
| *R20 = | −2.7965 | D20 = Variable | | |

-continued

| | | | | |
|---|---|---|---|---|
| R21 = | ∞ | D21 = 08 8 50 | N11 = 1.51633 | v11 = 64.2 |
| R22 = | ∞ | | | |

| Variable | Focal Length | | |
|---|---|---|---|
| Separation | 1.00 | 3.28 | 9.90 |
| D5 | 0.14 | 2.19 | 3.39 |
| D11 | 3.50 | 1.45 | 0.25 |
| D16 | 1.17 | 0.51 | 1.17 |
| D20 | 1.77 | 2.43 | 1.77 |

"*" indicates the aspheric surface.
The values of the aspheric coefficients:

$R = -2.7965$  $C = -3.5262 \times 10^{-3}$
$K = -3.4331$  $D = 4.4575 \times 10^{-4}$
$B = -6.7152 \times 10^{-3}$  $E = -1.8190 \times 10^{-3}$ Numerical Example 23:
$F = 1-9.90$  $FNO = 1:1.6-2.6$  $2\omega = 59.1°-6.5°$

| R1 = | 9.0539 | D1 = 0.2301 | N1 = 1.80518 | v1 = 25.4 |
|---|---|---|---|---|
| R2 = | 4.2474 | D2 = 0.9558 | N2 = 1.60311 | v2 = 60.7 |
| R3 = | −23.0090 | D3 = 0.0354 | | |
| R4 = | 3.2644 | D4 = 0.4602 | N3 = 1.69350 | v3 = 53.2 |
| R5 = | 6.2931 | D5 = Variable | | |
| R6 = | 4.2876 | D6 = 0.1239 | N4 = 1.88300 | v4 = 40.8 |
| R7 = | 1.1941 | D7 = 0.5301 | | |
| R8 = | −1.9465 | D8 = 0.1239 | N5 = 1.69680 | v5 = 55.5 |
| R9 = | 1.9767 | D9 = 0.1947 | | |
| R10 = | 2.6439 | D10 = 0.3009 | N6 = 1.84666 | v6 = 23.8 |
| R11 = | −25.1150 | D11 = Variable | | |
| R12 = | (Stop) | D12 = 0.1947 | | |
| *R13 = | 2.9181 | D13 = 0.5664 | N7 = 1.58313 | v7 = 59.4 |
| R14 = | −6.6244 | D14 = Variable | | |
| R15 = | 3.6972 | D15 = 0.1062 | N8 = 1.84666 | v8 = 23.8 |
| R16 = | 1.5624 | D16 = 0.6903 | N9 = 1.51633 | v9 = 64.2 |
| R17 = | −4.7589 | D17 = 0.0265 | | |
| R18 = | −1096.8046 | D18 = 0.2124 | N10 = 1.60311 | v10 = 60.7 |
| R19 = | −5.4821 | D19 = Variable | | |
| R20 = | ∞ | D20 = 0.8850 | N11 = 1.51633 | v11 = 64.2 |
| R21 = | ∞ | | | |

| Variable | Focal Length | | |
|---|---|---|---|
| Separation | 1.00 | 3.28 | 9.90 |
| D5 | 0.16 | 2.21 | 3.42 |
| D11 | 3.50 | 1.45 | 0.25 |
| D14 | 1.28 | 0.54 | 1.28 |
| D19 | 1.59 | 2.33 | 1.59 |

"*" indicates the aspheric surface.
The values of the aspheric coefficients:

$R = 2.9181$  $C = -7.6167 \times 10^{-4}$
$K = 2.5389$  $D = -3.0263 \times 10^{-3}$
$B = -3.0087 \times 10^{-2}$  $E = 1.9403 \times 10^{-5}$

TABLE 1

| | Numerical Example | | | | |
|---|---|---|---|---|---|
| Condition | 13 | 14 | 15 | 16 | 17 |
| $R_{IIF}/f_2$ | 5.96 | 3.86 | 11.65 | 5.57 | |
| $R_{II}/f_1$ | 1.78 | 1.80 | 1.47 | 1.61 | 1.99 |
| $|(R_{IIS}/f_{II4})/f_2|$ | 0.57 | 0.53 | 1.20 | 0.40 | 0.47 |
| Mean Refractive Index of Second Lens Unit | 1.772 | 1.772 | 1.772 | 1.772 | 1.772 |

TABLE 1-continued

| | Numerical Example | | | | | |
|---|---|---|---|---|---|---|
| Condition | 18 | 19 | 20 | 21 | 22 | 23 |
| $R_{IIF}/f_2$ | 4.49 | 6.77 | 4.02 | 4.11 | 4.21 | 3.73 |
| $R_{II}/f_1$ | 1.58 | 1.57 | 1.69 | 1.27 | 2.42 | 1.09 |
| $|(R_{IIS}/f_{II4})/f_2|$ | 0.52 | 0.72 | 0.55 | 0.57 | 0.33 | 0.58 |
| Mean Refractive Index of Second Lens Unit | 1.809 | 1.809 | 1.809 | 1.809 | 1.772 | 1.809 |

Another zoom lens which has been further improved is described by reference to FIGS. 40 to 43(A), 43(B), and 43(C) in particular. For the zoom lens disclosed here, letting $R_{IIi}$ denote the radius of curvature of the i-th surface, when counted from the object side in the second lens unit, the following condition is set forth:

$$0.39 < R_{II5}/R_{II4} < 0.92$$

When this condition is satisfied, a valuable increase of the zoom ratio is achieved with the limitation of the bulk and size of the zoom lens to a minimum.

This condition is concerned with the curvature of the air lens provided in between the second and third lenses in the second lens unit. When the radius $R_{II5}$ is so large as the upper limit is exceeded, spherical aberration in the telephoto end is over-corrected. When the lower limit is exceeded, coma is produced, causing the performance at or near the wide-angle end to deteriorate.

The above-described feature of the second lens unit suffices for achieving the reduction of the bulk and size and the increase of the zoom ratio while maintaining the high optical performance. In the present embodiment, however, to further reduce the bulk and size and further heighten the performance, the fourth lens unit, which is moved by zooming, is constructed from at least one positive lens and at least one negative lens. The variation of chromatic aberrations produced by the fourth lens unit is thus suppressed. Further, an aspheric surface is introduced to correct spherical aberration and distortion in the intermediate region of the zooming range.

Further, the third lens unit is constructed from a single lens having at least one aspheric surface. As the number of constituent lenses is reduced, a shortening of the total length is attained. The spherical aberration in the wide-angle end is well corrected by the aspheric surface.

With the aims of reducing the bulk and size and of increasing the zoom ratio, as the refractive power of the second lens unit strengthens, the curvature of the lenses constituting the second lens unit is caused to be small, which in turn causes production of aberrations. So, the variation of aberrations with zooming is increased and the optical performance deteriorates. It is, therefore, desirable that the mean value of the refractive indices of the lenses constituting the second lens unit is not less than 1.65.

Next, numerical examples 24 to 26 of the invention are shown.

The values of the factors in the above-described conditions for these numerical examples are also listed in Table-2.

| Numerical Example 24: | | | |
|---|---|---|---|
| F = 1–7.60 | FNO = 1:1.8–2.1 | 2ω = 61.3°–8.9° | |
| R1 = 8.0125 | D1 = 0.1947 | N1 = 1.80518 | ν1 = 25.4 |
| R2 = 3.9081 | D2 = 0.7965 | N2 = 1.60311 | ν2 = 60.7 |
| R3 = –79.1316 | D3 = 0.0354 | | |
| R4 = 3.3528 | D4 = 0.4779 | N3 = 1.69350 | ν3 = 53.2 |
| R5 = 8.1798 | D5 = Variable | | |
| R6 = 6.6431 | D6 = 0.1062 | N4 = 1.77250 | ν4 = 49.6 |
| R7 = 0.9619 | D7 = 0.5004 | | |
| R8 = –2.3172 | D8 = 0.0885 | N5 = 1.69680 | ν5 = 55.5 |
| R9 = 4.0956 | D9 = 0.1947 | | |
| R10 = 2.7039 | D10 = 0.2832 | N6 = 1.84666 | ν6 = 23.8 |
| R11 = 22.6643 | D11 = Variable | | |
| R12 = (Stop) | D12 = 0.1947 | | |
| *R13 = 2.6805 | D13 = 0.5310 | N7 = 1.58313 | ν7 = 59.4 |
| R14 = –6.5530 | D14 = Variable | | |
| R15 = 2.9010 | D15 = 0.0885 | N8 = 1.84666 | ν8 = 23.8 |
| R16 = 1.3226 | D16 = 0.0635 | | |
| R17 = 1.5311 | D17 = 0.6726 | N9 = 1.58313 | ν9 = 59.4 |
| *R18 = –3.3696 | D18 = 1.1504 | | |
| R19 = ∞ | D19 = 0.9381 | N10 = 1.51633 | ν10 = 64.2 |
| R20 = ∞ | | | |

| Variable | Focal Length | | |
|---|---|---|---|
| Separation | 1.0 | 3.2 | 9.5 |
| D5 | 0.14 | 2.14 | 3.31 |
| D11 | 3.42 | 1.42 | 0.25 |
| D14 | 1.25 | 0.49 | 1.25 |

"*" indicates the aspheric surface.
The values of the aspheric coefficients:

| 13th Surface | 18th Surface |
|---|---|
| R = 2.6805 | R = –3.3696 |
| K = 2.4724 | K = –1.4619 × $10^{-1}$ |
| B = –4.5657 × $10^{-2}$ | B = –9.0513 × $10^{-3}$ |
| C = –5.9972 × $10^{-3}$ | C = –8.0602 × $10^{-3}$ |
| D = –4.4875 × $10^{-3}$ | D = –1.4422 × $10^{-2}$ |
| E = 6.7041 × $10^{-4}$ | E = 4.2927 × $10^{-3}$ |

| Numerical Example 25: | | | |
|---|---|---|---|
| F = 1–11.40 | FNO = 1:1.8–2.8 | 2ω = 61.3°–6.0° | |
| R1 = 7.3289 | D1 = 0.2222 | N1 = 1.84666 | ν1 = 23.8 |
| R2 = 4.2564 | D2 = 0.9444 | N2 = 1.60311 | ν2 = 60.7 |
| R3 = –1257.6119 | D3 = 0.0370 | | |
| R4 = 3.7131 | D4 = 0.5556 | N3 = 1.69680 | ν3 = 55.5 |
| R5 = 8.8384 | D5 = Variable | | |

-continued

| | | | | |
|---|---|---|---|---|
| R6 = | 6.2649 | D6 = 0.0926 | N4 = 1.77250 | v4 = 49.6 |
| R7 = | 0.9921 | D7 = 0.5706 | | |
| R8 = | −2.0295 | D8 = 0.0926 | N5 = 1.69680 | v5 = 55.5 |
| R9 = | 4.9998 | D9 = 0.2037 | | |
| R10 = | 3.1169 | D10 = 0.2963 | N6 = 1.84666 | v6 = 23.8 |
| R11 = | 36.3877 | D11 = Variable | | |
| R12 = | (Stop) | D12 = 0.2037 | | |
| *R13 = | 2.7176 | D13 = 0.5556 | N7 = 1.58313 | v7 = 59.4 |
| R14 = | −9.5600 | D14 = Variable | | |
| R15 = | 2.9672 | D15 = 0.0926 | N8 = 1.84666 | v8 = 23.8 |
| R16 = | 1.4196 | D16 = 0.0707 | | |
| R17 = | 1.6523 | D17 = 0.7222 | N9 = 1.58313 | v9 = 59.4 |
| *R18 = | −3.5114 | D18 = 1.2037 | | |
| R19 = | ∞ | D19 = 0.9815 | N10 = 1.51633 | v10 = 64.2 |
| R20 = | ∞ | | | |

| Variable | Focal Length | | |
|---|---|---|---|
| Separation | 1.0 | 3.5 | 11.4 |
| D5 | 0.16 | 2.32 | 3.58 |
| D11 | 3.68 | 1.53 | 0.26 |
| D14 | 1.35 | 0.45 | 1.35 |

"*" indicates the aspheric surface.
The values of the aspheric coefficients:

| 13th Surface | 18th Surface |
|---|---|
| R = 2.7176 | R = −3.5114 |
| K = 2.2539 | K = 2.5205 |
| B = −2.6949 × $10^{-2}$ | B = 2.6150 × $10^{-3}$ |
| C = −3.4612 × $10^{-3}$ | C = −2.0156 × $10^{-3}$ |
| D = −5.2691 × $10^{-3}$ | D = −1.2918 × $10^{-2}$ |
| E = 1.0941 × $10^{-3}$ | E = 3.1896 × $10^{-3}$ |

Numerical Example 26:
F = 1–9.5   FNO = 1:1.6–2.6   2ω = 59.1°–6.8°

| | | | | |
|---|---|---|---|---|
| R1 = | 7.0009 | D1 = 0.1770 | N1 = 1.80518 | v1 = 25.4 |
| R2 = | 3.8488 | D2 = 0.8142 | N2 = 1.60311 | v2 = 60.7 |
| R3 = | 197.4586 | D3 = 0.0354 | | |
| R4 = | 3.4593 | D4 = 0.4956 | N3 = 1.69350 | v3 = 53.2 |
| R5 = | 8.4416 | D5 = Variable | | |
| R6 = | 6.2214 | D6 = 0.0885 | N4 = 1.88300 | v4 = 40.8 |
| R7 = | 0.9967 | D7 = 0.4620 | | |
| R8 = | −2.2273 | D8 = 0.0885 | N5 = 1.69680 | v5 = 55.5 |
| R9 = | 6.1217 | D9 = 0.1947 | | |
| R10 = | 2.9634 | D10 = 0.3009 | N6 = 1.84666 | v6 = 23.8 |
| R11 = | 57.0023 | D11 = Variable | | |
| R12 = | (Stop) | D12 = 0.1947 | | |
| *R13 = | 2.6139 | D13 = 0.5841 | N7 = 1.58313 | v7 = 59.4 |
| R14 = | −6.5823 | D14 = Variable | | |
| R15 = | 3.0013 | D15 = 0.0885 | N8 = 1.84666 | v8 = 23.8 |
| R16 = | 1.3629 | D16 = 0.0757 | | |
| R17 = | 1.5854 | D17 = 0.7257 | N9 = 1.58313 | v9 = 59.4 |
| *R18 = | −3.3155 | D18 = 1.1504 | | |
| R19 = | ∞ | D19 = 0.9381 | N10 = 1.51633 | v10 = 64.2 |
| R20 = | ∞ | | | |

| Variable | Focal Length | | |
|---|---|---|---|
| Separation | 1.0 | 3.2 | 9.5 |
| D5 | 0.16 | 2.16 | 3.34 |
| D11 | 3.42 | 1.42 | 0.25 |
| D14 | 1.25 | 0.49 | 1.25 |

"*" indicates the aspheric surface.
The values of the aspheric coefficients:

| 13th Surface | 18th Surface |
|---|---|
| R = 2.6139 | R = −3.3155 |
| K = 2.3198 | K = 2.6967 |
| B = −3.3984 × $10^{-2}$ | B = −5.8794 × $10^{-3}$ |
| C = −3.7102 × $10^{-3}$ | C = −1.6763 × $10^{-3}$ |
| D = −3.8384 × $10^{-3}$ | D = −1.2876 × $10^{-2}$ |
| E = −7.7012 × $10^{-4}$ | E = 8.7071 × $10^{-4}$ |

TABLE 2

| Condition | Numerical Example | | |
|---|---|---|---|
| | 24 | 25 | 26 |
| $R_{II3}/R_{II4}$ | 0.66 | 0.62 | 0.48 |
| Mean Refractive Index of Second Lens Unit | 1.77 | 1.77 | 1.81 |

Other zoom lenses which, though their total length is shortened, get good stability of aberration correction throughout the entire zooming range are described by reference to FIGS. 44 to 49(A), 49(B) and 49(C). To this end, the second lens unit is constructed from three lenses in spaced relation, of which the first is a negative lens having a concave rear surface of stronger refracting power than that of the front surface thereof, the second is a bi-concave lens and the third is a positive lens having a convex front surface of stronger refracting power than that of the rear surface thereof, wherein letting the air separation between the second and third lenses be denoted by DA, the radii of curvature of the rear surface of the second lens and the front surface of the third lens by RA and RB, respectively, and the focal length of the second lens unit by $f_2$, the following conditions are satisfied:

$$0.1 < |DA/f_2| < 0.5$$

$$1.2 < RB/RA < 2$$

The first of these conditions is to appropriately determine the axial thickness DA of the air lens formed by the second and third lenses in the second lens unit and has an aim chiefly to correct on-axial and off-axial aberrations in a good balance.

When the thickness DA is too short as exceeding the lower limit, the air lens gets a lesser effect of correcting aberrations. When the thickness DA is too long as exceeding the upper limit, the Petzval sum increases in the negative direction. So, it becomes difficult to correct on-axial and off-axial aberrations in a good balance.

The second condition is to appropriately determine the ratio of the curvatures of both surface of the air lens, that is, its form, and has an aim chiefly to correct spherical aberration.

When the value of RB/RA exceeds the lower limit and nears "1", the air lens gets a lesser effect of correcting aberrations. As the value of RB/RA further decreases, the spherical aberration ascribable to that air lens becomes under-corrected. When the upper limit is exceeded, conversely, over-correction of spherical aberration results.

The invention in the zoom lens of the rear focus type is achieved by satisfying the conditions described above. Further, in the invention, the zoom ratio is increased, while the total length of the entire lens is shortened. To secure a high optical performance throughout the entire zooming range, it is preferred to set forth the following features:

(i) The third lens unit comprises one positive lens and the fourth lens unit comprises one negative lens and one positive lens;

(ii) The third lens unit has at least one aspheric surface of such shape that the positive refractive power gets progressively weaker toward the marginal zone of the lens. The fourth lens unit, in a case where the fourth lens unit is a cemented lens, has at least one aspheric surface of such shape that the positive refractive power gets progressively weaker toward the marginal zone of the lens, or in another case where the fourth lens unit is a lens of separate elements, has at least one aspheric surface of such shape that the positive refractive power gets progressively stronger toward the marginal zone of the lens; and (iii) The fourth lens unit is constructed from a negative lens of meniscus form convex toward the object side and a positive lens of which both surfaces are convex.

Next, numerical examples 27 to 29 of the invention are shown. The relationships of the numerical examples with the conditions are also shown in Table-3.

Numerical Example 27:
F = 1–7.6  FNO = 1:1.85–2.49  2ω = 52.4°–6.2°

| | | | | |
|---|---|---|---|---|
| R1 = | 7.719 | D1 = 0.1639 | N1 = 1.80518 | ν1 = 25.4 |
| R2 = | 3.289 | D2 = 0.7377 | N2 = 1.60311 | ν2 = 60.7 |
| R3 = | −15.845 | D3 = 0.0328 | | |
| R4 = | 2.461 | D4 = 0.4590 | N3 = 1.69350 | ν3 = 53.2 |
| R5 = | 5.307 | D5 = Variable | | |
| R6 = | 4.329 | D6 = 0.0820 | N4 = 1.77250 | ν4 = 49.6 |
| R7 = | 0.937 | D7 = 0.4167 | | |
| R8 = | −1.504 | D8 = 0.0820 | N5 = 1.69680 | ν5 = 55.5 |
| R9 = | 1.791 | D9 = 0.1803 | | |
| R10 = | 2.348 | D10 = 0.2295 | N6 = 1.84666 | ν6 = 23.8 |
| R11 = | −40.324 | D11 = Variable | | |
| R12 = | (Stop) | D12 = 0.1967 | | |
| R13 = | 2.521 | D13 = 0.5410 | N7 = 1.58313 | ν7 = 59.4 |
| R14 = | −4.353 | D14 = Variable | | |
| R15 = | 3.377 | D15 = 0.0820 | N8 = 1.84666 | ν8 = 23.8 |
| R16 = | 1.292 | D16 = 0.0207 | | |
| R17 = | 1.372 | D17 = 0.6885 | N9 = 1.58313 | ν9 = 59.4 |
| R18 = | −2.538 | D18 = 0.7705 | | |
| R19 = | ∞ | D19 = 0.8689 | N10 = 1.51633 | ν10 = 64.1 |
| R20 = | ∞ | | | |

-continued

The 13th and 18th surfaces are aspherical.
The values of the aspheric coefficients:

| 13th Surface | 18th Surface |
|---|---|
| R = 2.521 | R = −2.538 |
| K = 3.854 × 10⁻² | K = 1.331 × 10⁻¹ |
| B = −3.128 × 10⁻² | B = −1.383 × 10⁻³ |
| C = −1.286 × 10⁻³ | C = 9.410 × 10⁻³ |
| D = −4.591 × 10⁻⁴ | D = −2.994 × 10² |

| Variable | Focal Length | | |
|---|---|---|---|
| Separation | 1.00 | 2.97 | 7.60 |
| D5 | 0.16 | 1.51 | 2.29 |
| D11 | 2.36 | 1.02 | 0.23 |
| D14 | 0.93 | 0.35 | 1.02 |

Numerical Example 28:
F = 1–7.6   FNO = 1:1.85–2.62   2ω = 50.4°–7.1°

| R1 = | 7.351 | D1 = 0.1570 | N1 = 1.80518 | ν1 = 25.4 |
|---|---|---|---|---|
| R2 = | 3.291 | D2 = 0.6436 | N2 = 1.60311 | ν2 = 60.7 |
| R3 = | −15.236 | D3 = 0.0314 | | |
| R4 = | 2.421 | D4 = 0.3925 | N3 = 1.69350 | ν3 = 53.2 |
| R5 = | 4.835 | D5 = Variable | | |
| R6 = | 3.499 | D6 = 0.0785 | N4 = 1.88300 | ν4 = 40.8 |
| R7 = | 0.981 | D7 = 0.3913 | | |
| R8 = | −1.422 | D8 = 0.0785 | N5 = 1.60311 | ν5 = 60.7 |
| R9 = | 1.422 | D9 = 0.1727 | | |
| R10 = | 1.944 | D10 = 0.2198 | N6 = 1.84666 | ν6 = 23.8 |
| R11 = | 18.426 | D11 = Variable | | |
| R12 = | (Stop) | D12 = 0.1884 | | |
| R13 = | 2.472 | D13 = 0.5181 | N7 = 1.58313 | ν7 = 59.4 |
| R14 = | −3.938 | D14 = Variable | | |
| R15 = | 3.144 | D15 = 0.0785 | N8 = 1.84666 | ν8 = 23.8 |
| R16 = | 1.251 | D16 = 0.0286 | | |
| R17 = | 1.393 | D17 = 0.6593 | N9 = 1.58313 | ν9 = 59.4 |
| R18 = | −2.660 | D18 = 0.7378 | | |
| R19 = | ∞ | D19 = 0.8320 | N10 = 1.51633 | ν10 = 64.1 |
| R20 = | ∞ | | | |

The 13th and 18th surfaces are aspherical.
The values of the aspheric coefficients:

| 13th Surface | 18th Surface |
|---|---|
| R = 2.473 | R = −2.660 |
| K = −2.521 × 10⁻³ | K = 1.254 × 10⁻¹ |
| B = −3.042 × 10⁻² | B = −9.416 × 10⁻³ |
| C = −5.987 × 10⁻³ | C = −4.522 × 10⁻⁴ |
| D = 2.808 × 10⁻³ | D = −3.136 × 10⁻² |

| Variable | Focal Length | | |
|---|---|---|---|
| Separation | 1.00 | 2.98 | 7.60 |
| D5 | 0.16 | 1.53 | 2.34 |
| D11 | 2.40 | 1.03 | 0.22 |
| D14 | 1.00 | 0.33 | 1.00 |

Numerical Example 29:
F = 1–7.6   FNO = 1:1.85–2.53   2ω = 51.1°–7.2°

| R1 = | 7.171 | D1 = 0.1592 | N1 = 1.80518 | ν1 = 25.4 |
|---|---|---|---|---|
| R2 = | 3.192 | D2 = 0.6688 | N2 = 1.60311 | ν2 = 60.7 |
| R3 = | −18.159 | D3 = 0.0318 | | |
| R4 = | 2.408 | D4 = 0.4140 | N3 = 1.69350 | ν3 = 53.2 |
| R5 = | 5.032 | D5 = Variable | | |
| R6 = | 3.487 | D6 = 0.0796 | N4 = 1.88300 | ν4 = 40.8 |
| R7 = | 0.966 | D7 = 0.4051 | | |
| R8 = | −1.463 | D8 = 0.0796 | N5 = 1.60311 | ν5 = 60.7 |
| R9 = | 1.463 | D9 = 0.1752 | | |
| R10 = | 2.017 | D10 = 0.2229 | N6 = 1.84666 | ν6 = 23.8 |
| R11 = | 28.480 | D11 = Variable | | |
| R12 = | (Stop) | D12 = 0.1911 | | |
| R13 = | 2.539 | D13 = 0.4936 | N7 = 1.58313 | ν7 = 59.4 |
| R14 = | −3.802 | D14 = Variable | | |
| R15 = | 5.525 | D15 = 0.0796 | N8 = 1.84666 | ν8 = 23.8 |

-continued

| R16 = | 1.567 | D16 = 0.5573 | N9 = 1.58313 | ν9 = 59.4 |
| R17 = | −2.347 | D17 = 0.7484 | | |
| R18 = | ∞ | D18 = 0.8439 | N10 = 1.51633 | ν10 = 64.1 |
| R19 = | ∞ | | | |

The 13th and 17th surfaces are aspherical.
The values of the aspheric coefficients:

| 13th Surface | 17th Surface |
|---|---|
| R = 2.450 | R = −2.347 |
| K = −2.521 × 10$^{-3}$ | K = 1.254 × 10$^{-1}$ |
| B = −3.515 × 10$^{-2}$ | B = 1.253 × 10$^{-2}$ |
| C = −8.875 × 10$^{-4}$ | C = 1.413 × 10$^{-2}$ |
| D = 8.008 × 10$^{-4}$ | D = −1.560 × 10$^{-2}$ |

| Variable | | Focal Length | |
|---|---|---|---|
| Separation | 1.00 | 2.99 | 7.60 |
| D5 | 0.16 | 1.52 | 2.32 |
| D11 | 2.38 | 1.02 | 0.22 |
| D14 | 0.88 | 0.29 | 1.05 |

TABLE 3

| | Numerical Example | | |
|---|---|---|---|
| Condition | 27 | 28 | 29 |
| $D_A/|f_2|$ | 0.200 | 0.190 | 0.190 |
| $R_B/R_A$ | 1.311 | 1.366 | 1.378 |
| $f_1$ | 4.18 | 4.21 | 4.18 |
| $f_2$ | −0.90 | −0.91 | −0.92 |
| $f_3$ | 2.82 | 2.69 | 2.69 |
| $f_4$ | 3.95 | 4.22 | 4.27 |

Figure 50:
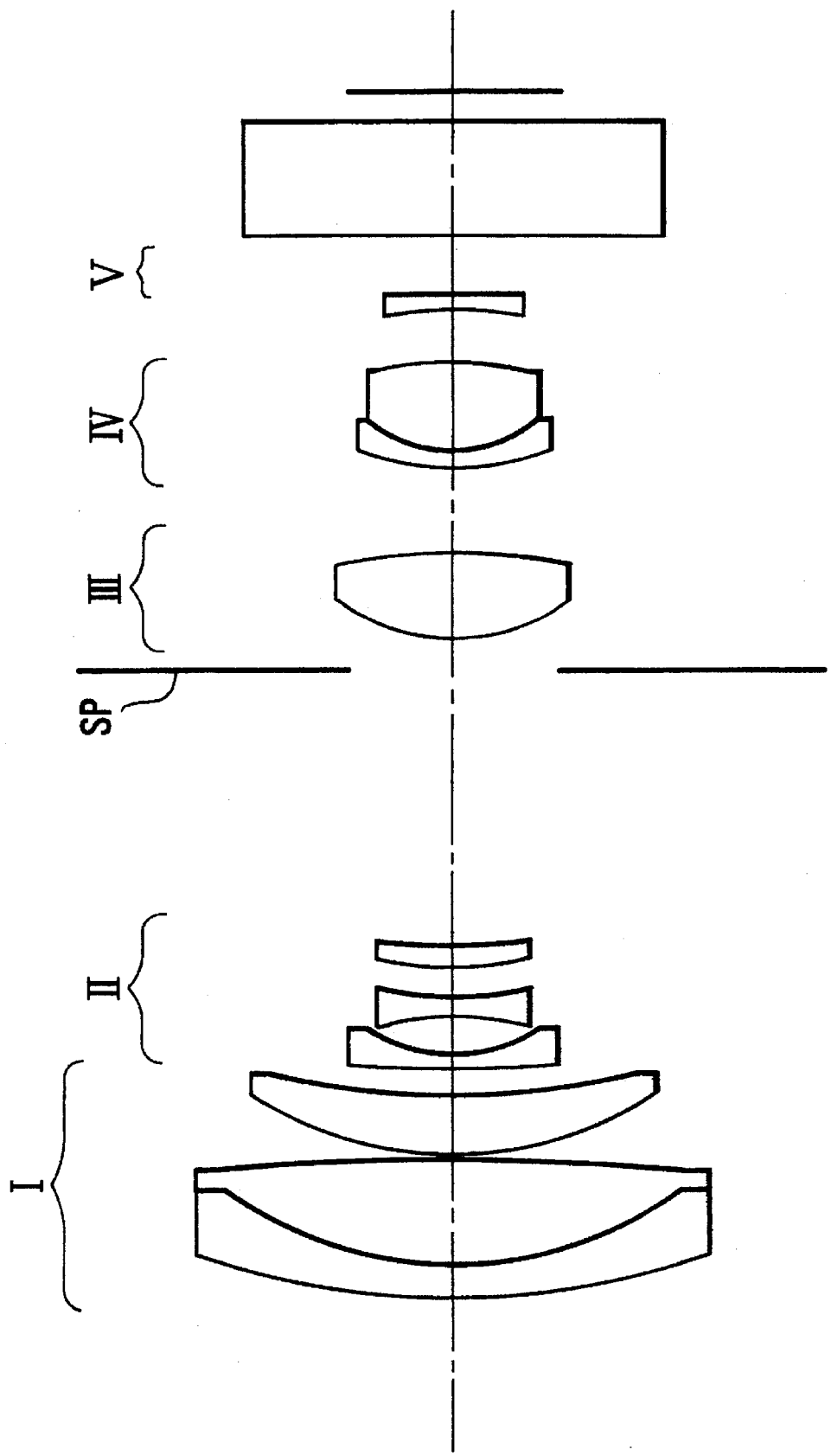
FIG. 50 is a longitudinal section view of a numerical example 30 of a zoom lens of the invention.
Figure 51A:
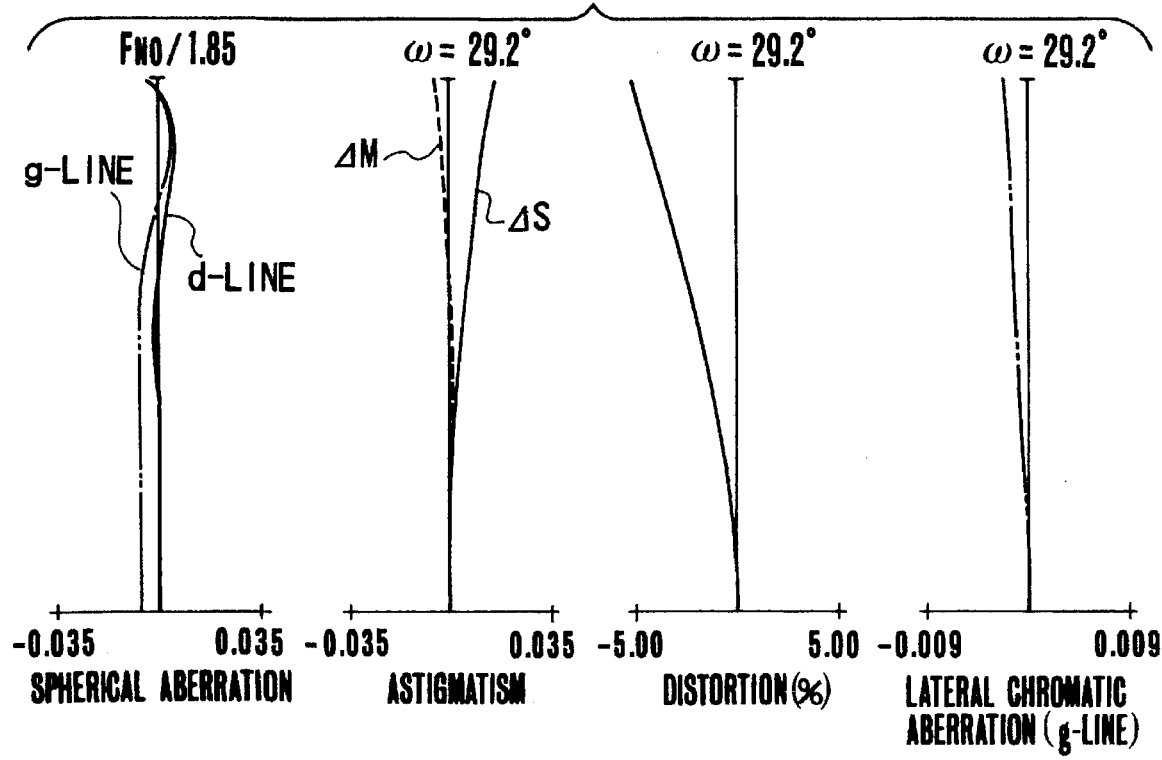
FIGS. 51(A), 51(B) and 51(C) are graphic representations of the various aberrations of the numerical example 30.
Figure 51B:
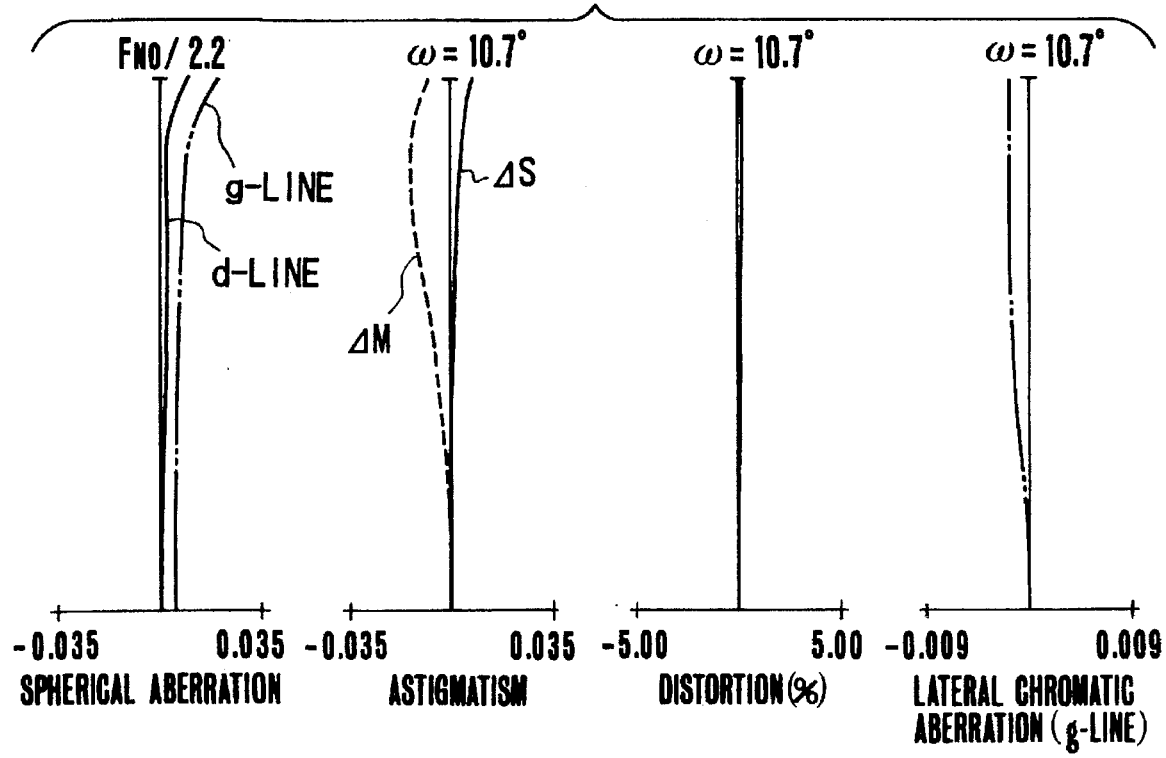
Figure 51C:
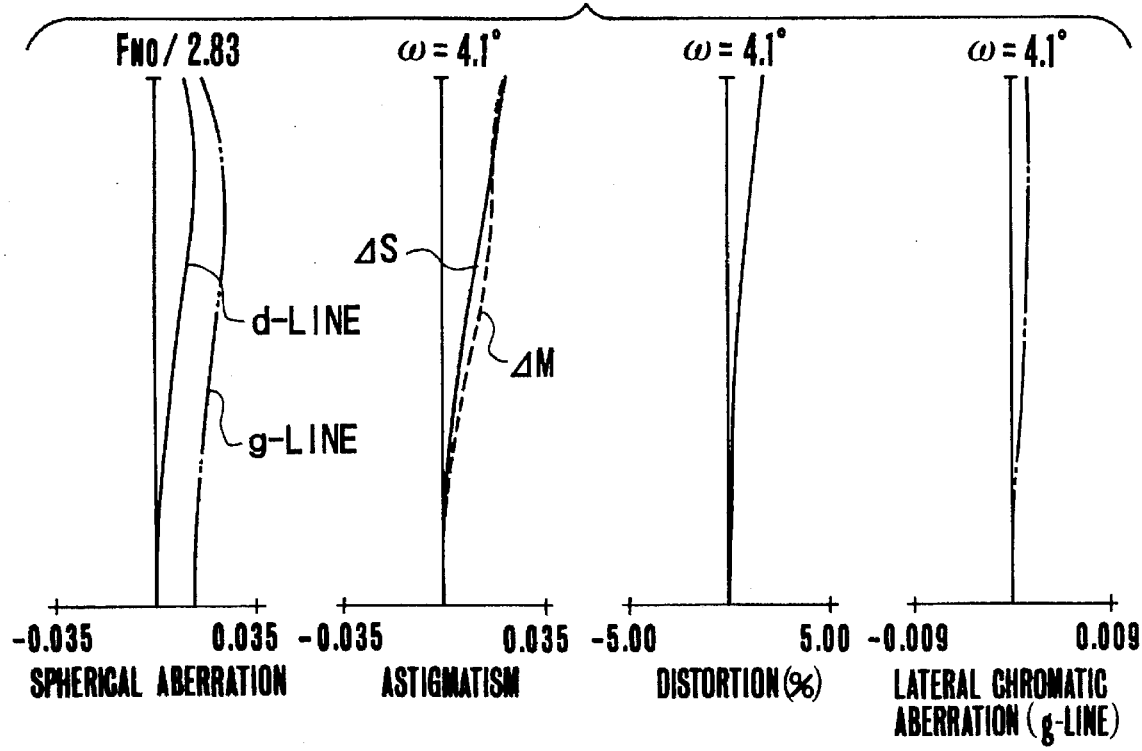
Figure 52A:
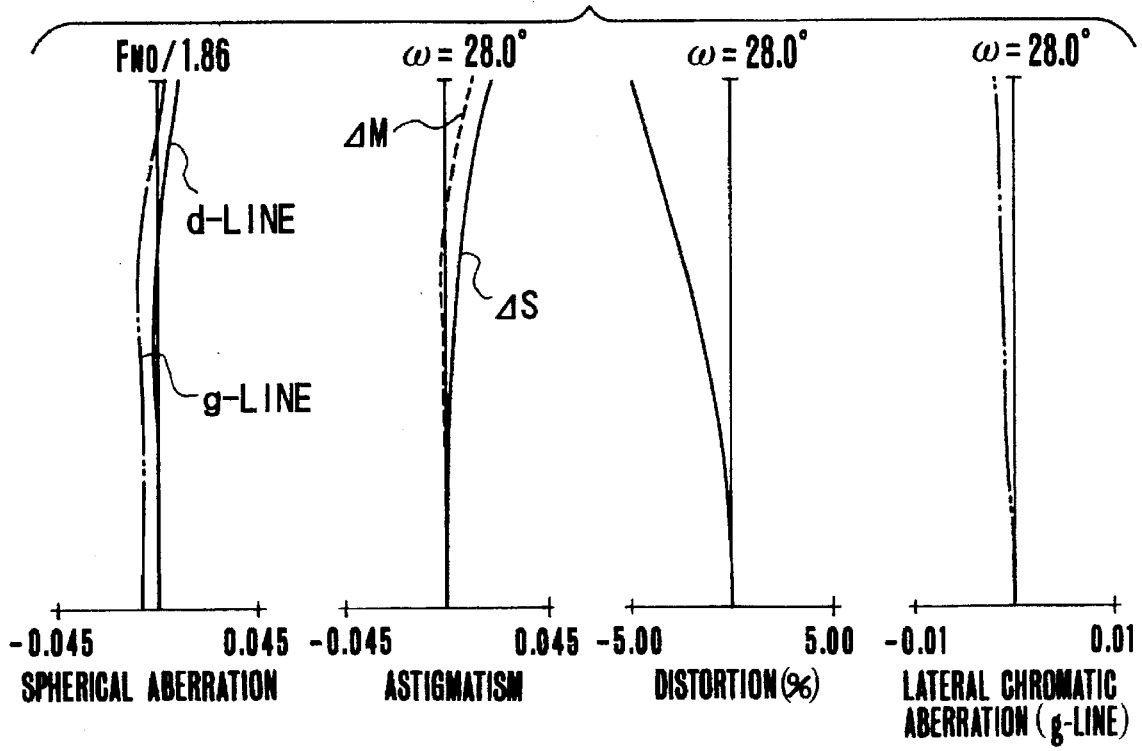
FIGS. 52(A), 52(B) and 52(C) are graphic representations of the various aberrations of a numerical example 31.
Figure 52B:
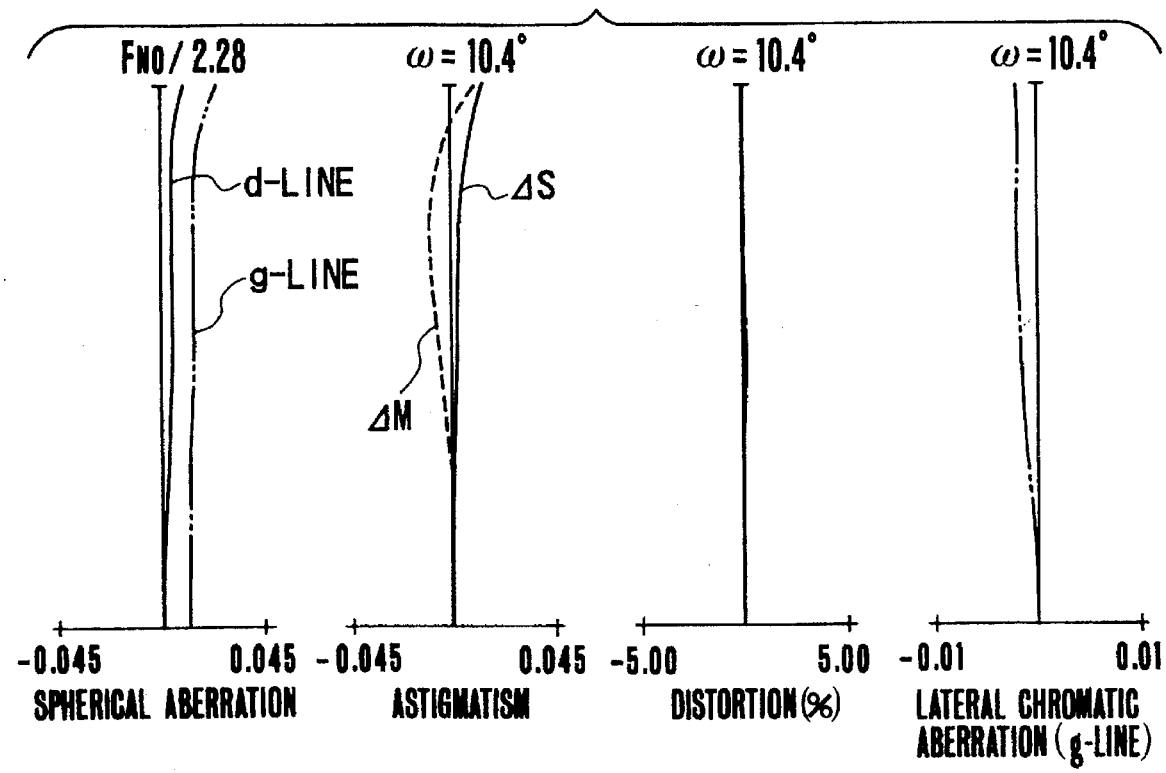
Figure 52C:
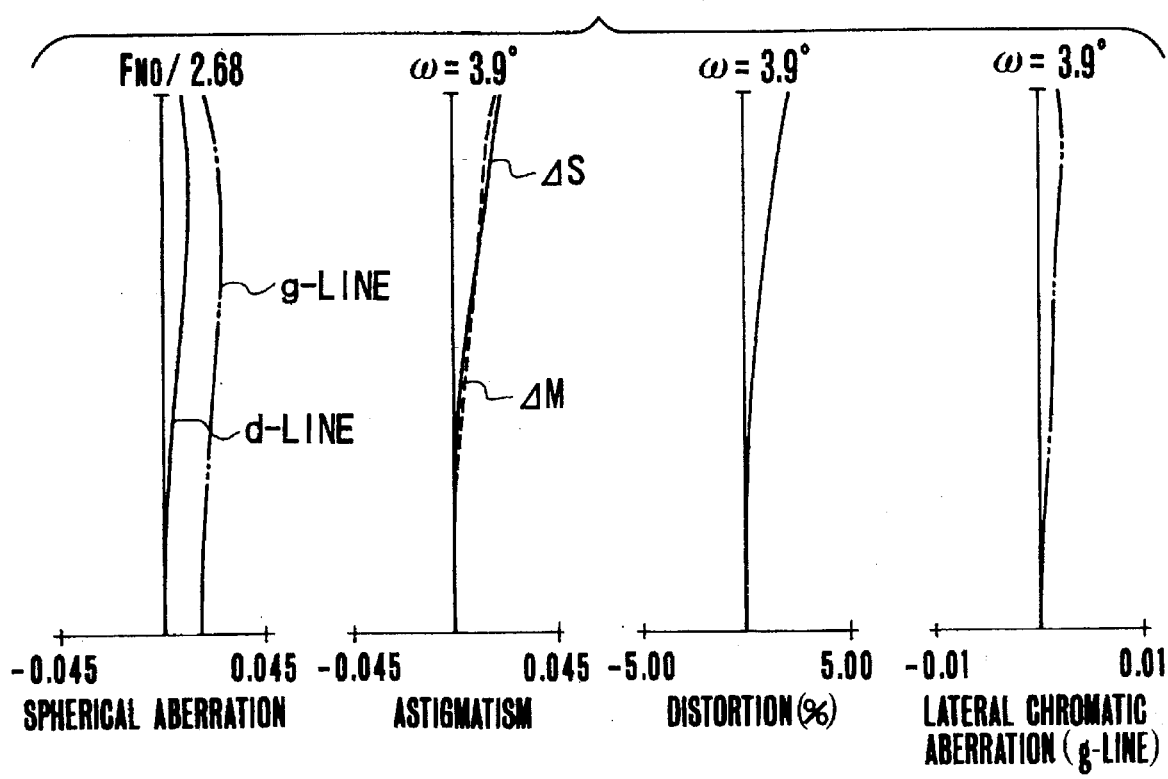
Figure 53A:
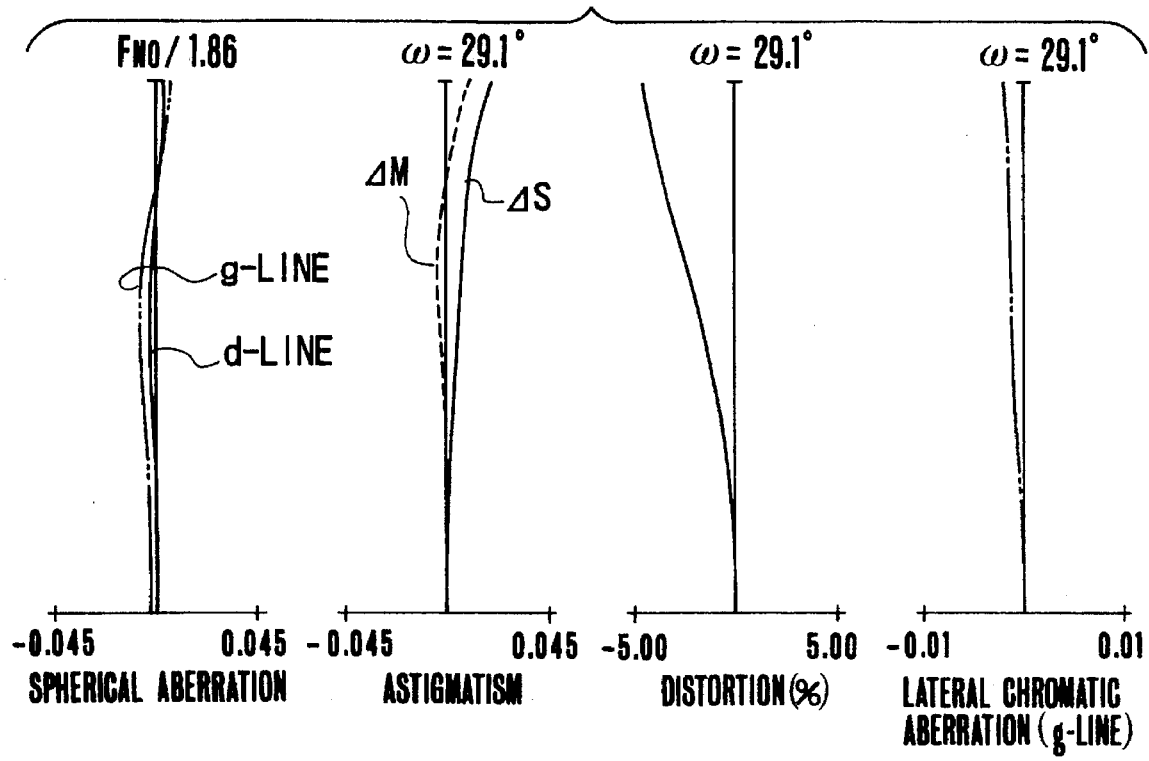
FIGS. 53(A), 53(B) and 53(C) are graphic representations of the various aberrations of a numerical example 32.
Figure 53B:
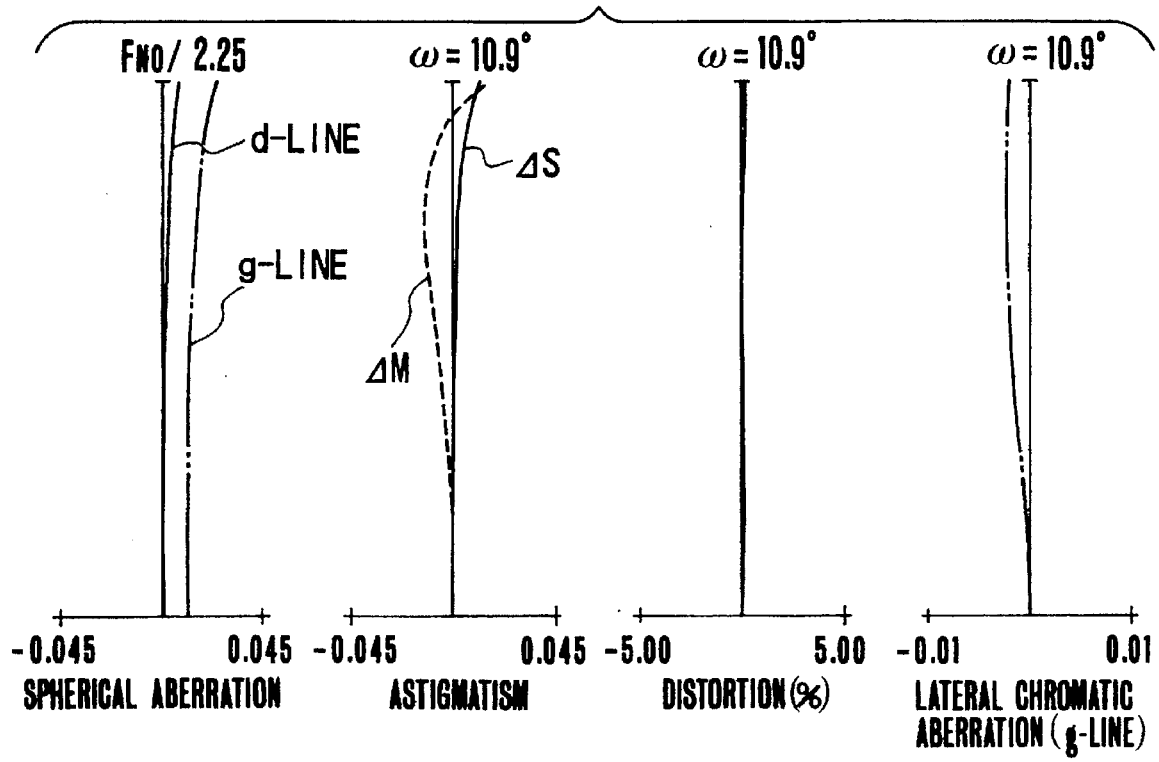
Figure 53C:
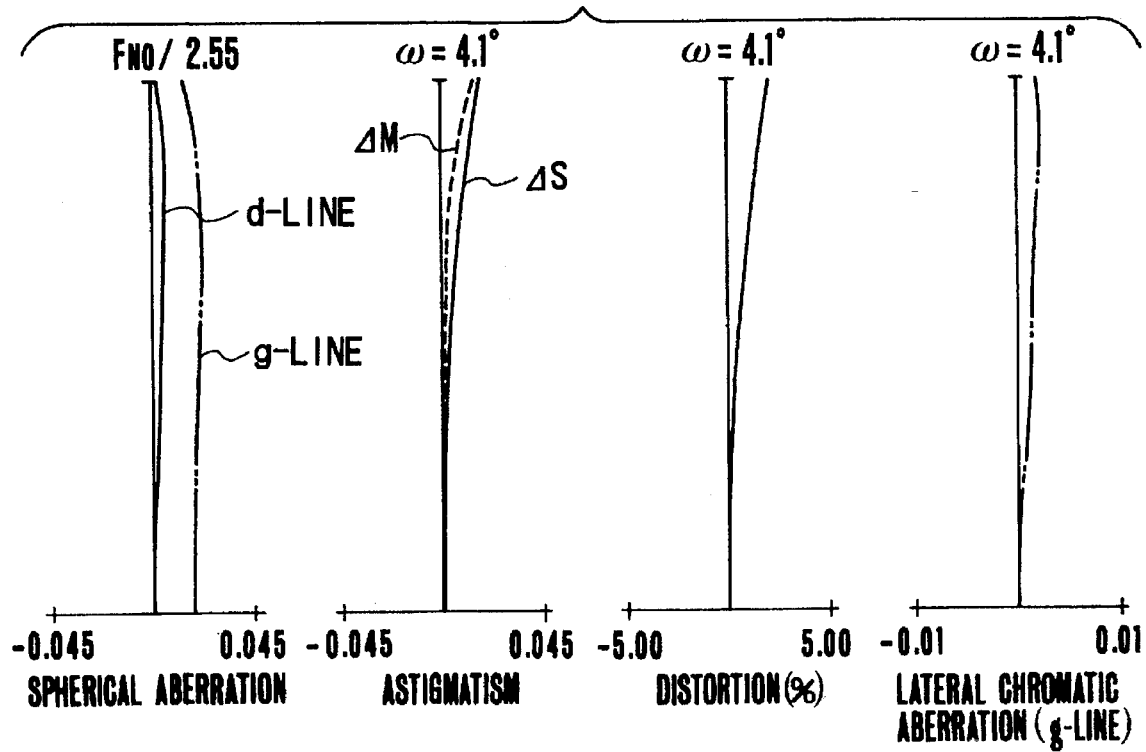

Next, a further improved embodiment of the invention is described by reference to the longitudinal section view of the zoom lens of FIG. 50.

In the drawing, reference character I denotes a first lens unit of positive refractive power; II denotes a second lens unit of negative refractive power; III denotes a third lens unit of positive refractive power; IV denotes a fourth lens unit of positive refractive power; V denotes a fifth lens unit of negative refractive power. SP denotes an aperture stop arranged in front of the third lens unit III.

In the present embodiment, while giving a high zoom ratio, it has a small number of constituent lenses, to minimize the variation of aberrations for good optical performance. For this purpose, the second lens unit is constructed from three single lenses, of which the first, when counted from the object side, a negative lens having a strong concave surface facing the image side, the second is a negative lens of bi-concave form and the third is a positive lens having a strong convex surface facing the object side.

In the zoom lens of the invention, the overall length of the third lens unit and those that follow have to be shortened. For this purpose, letting the focal lengths of the third and fifth lens units be denoted by $f_3$ and $f_5$, respectively, and the magnification of the fifth lens unit with an object at infinity by $\beta_5$, it is desirable to satisfy the following conditions:

$$0.8 < |f_5/f_3| < 2.20$$

$$1.2 < \beta_5 < 1.6$$

The first condition is concerned with the ratio of the focal lengths of the third and fifth lens units and has an aim chiefly to maintain good optical performance, while shortening the overall length of the third lens unit and those that follow. When the refractive power of the fifth lens unit is too strong as exceeding the lower limit, the negative Petzval sum increases and it becomes difficult to correct the curvature of field. Meanwhile, when the refractive power of the fifth lens unit is too weak as exceeding the upper limit, it becomes difficult to sufficiently shorten the total length of the entire lens system.

The second condition is concerned with the magnification of the fifth lens unit and has an aim to obtain a predetermined optical performance, while shortening the total length of the entire lens system. When the magnification of the fifth lens unit is smaller than the lower limit, it becomes difficult to shorten the total length of the entire lens system. Meanwhile, when the magnification is larger than the upper limit, the resultant form is advantageous at shortening the total length of the entire lens system. But, in some cases, it becomes difficult to secure a predetermined back focal distance. In other cases, the distance between the exit pupil and the image plane becomes short, in other words, the telecentric property considerably collapses. So, this zoom lens can hardly be applied to the video camera.

Also, the curvature $R_{II2}$ of the rear surface of the first negative lens in the second lens unit and the curvature $R_{II3}$ of the front surface of the second negative lens may be loosened. To achieve a further improvement of the aberration correction for a higher optical performance, it is desirable to satisfy the following condition:

$$0.9 < (1/R_{II3} - 1/R_{II2})f_2 < 1.75$$

When the lower limit is exceeded, the distortion in the wide-angle end tends to be of the barrel type. Meanwhile, when the upper limit is exceeded, the distortion in the telephoto end tends conversely to be of the pincushion type.

Further, as has been described before, the space between the negative second and positive third lenses in the second lens unit acts as the air lens on the correction of aberrations. Letting this air separation be denoted by $D_{II4}$ and the focal length of the second lens unit by $f_2$, when the following condition:

$$0.10 < |D_{II4}/f_2| < 0.45$$

is satisfied, better correction of longitudinal chromatic aberration and coma results.

Here, when the lower limit of this condition is exceeded, inward coma, in particular, is produced. Meanwhile, when the upper limit is exceeded, conversely, outward coma is produced and longitudinal chromatic aberration tends to be under-corrected. So, it is no good.

In the invention, the fourth lens unit is made to include at least one convex lens of which both surfaces are aspherical. With this arrangement, the variation of spherical aberration during zooming is minimized and higher order flare in the marginal zone of the picture frame is removed, thereby making it possible to construct the fifth lens unit by one spherical lens.

Next, numerical examples 30 to 32 of the invention are shown. The relationships of the numerical examples with the conditions are also shown in Table-4.

Numerical Example 30:
F = 1–7.88   FNO = 1:1.85–2.83   2ω = 58.4°–8.1°

| | | | | |
|---|---|---|---|---|
| R1 = | 7.8938 | D1 = 0.1571 | N1 = 1.84666 | ν1 = 23.8 |
| R2 = | 3.3610 | D2 = 0.6632 | N2 = 1.60311 | ν2 = 60.7 |
| R3 = | –19.4128 | D3 = 0.0349 | | |
| R4 = | 2.6594 | D4 = 0.4188 | N3 = 1.77250 | ν3 = 49.6 |
| R5 = | 7.0372 | D5 = Variable | | |
| R6 = | 7.6805 | D6 = 0.0873 | N4 = 1.77250 | ν4 = 49.6 |
| R7 = | 0.9721 | D7 = 0.3619 | | |
| R8 = | –2.0784 | D8 = 0.0873 | N5 = 1.69680 | ν5 = 55.5 |
| R9 = | 1.5080 | D9 = 0.2063 | | |
| R10 = | 1.9801 | D10 = 0.2967 | N6 = 1.84666 | ν6 = 23.8 |
| R11 = | 9.8576 | D11 = Variable | | |
| R12 = | (Stop) | D12 = 0.1900 | | |
| R13 = | Aspheric | D13 = 0.5759 | N7 = 1.58313 | ν7 = 59.4 |
| R14 = | –103.1418 | D14 = Variable | | |
| R15 = | 1.9131 | D15 = 0.1047 | N8 = 1.84666 | ν8 = 23.8 |
| R16 = | 1.0111 | D16 = 0.0279 | | |
| R17 = | Aspheric | D17 = 0.7417 | N9 = 1.58313 | ν9 = 59.4 |
| R18 = | Aspheric | D18 = Variable | | |
| R19 = | –3.6422 | D19 = 0.1047 | N10 = 1.83400 | ν10 = 37.2 |
| R20 = | 30.0019 | D20 = 0.5236 | | |
| R21 = | ∞ | D21 = 0.9250 | N11 = 1.51633 | ν11 = 64.2 |
| R22 = | ∞ | | | |

| Variable | Focal Length | | |
|---|---|---|---|
| Separation | 1.00 | 2.95 | 7.88 |
| D5 | 0.13 | 1.46 | 2.25 |
| D11 | 2.36 | 1.03 | 0.24 |
| D14 | 0.69 | 0.34 | 0.69 |
| D18 | 0.37 | 0.71 | 0.37 |

R13: Aspheric Surface $R_0$ = 1.55395       K = –2.47719D–01   B = –2.29792D–02
C = –1.04836D–02   D = –2.04795D–03   E = 3.12741D–03

R17: Aspheric Surface $R_0$ = 1.07126       K = –2.60827D–01   B = –1.85863D–03
C = 3.22762D–02    D = 6.34142D–02    E = –7.95425D–03

R18: Aspheric Surface $R_0$ = –2.46575      K = –5.69574D+00   B = –2.01185D–02
C = 8.17666D–03    D = 5.61454D–02    E = –1.21430D–01

Numerical Example 31:
F = 1–7.79   FNO = 1:1.86–2.68   2ω = 56.0°–7.8°

| | | | | |
|---|---|---|---|---|
| R1 = | 6.7772 | D1 = 0.1739 | N1 = 1.84666 | ν1 = 23.8 |
| R2 = | 3.1453 | D2 = 0.7609 | N2 = 1.60311 | ν2 = 60.7 |
| R3 = | –36.7529 | D3 = 0.0326 | | |
| R4 = | 2.7433 | D4 = 0.4891 | N3 = 1.77250 | ν3 = 49.6 |
| R5 = | 8.3269 | D5 = Variable | | |
| R6 = | 6.5847 | D6 = 0.1087 | N4 = 1.77250 | ν4 = 49.6 |
| R7 = | 0.9898 | D7 = 0.3478 | | |
| R8 = | –1.8354 | D8 = 0.1087 | N5 = 1.69680 | ν5 = 55.5 |
| R9 = | 1.4686 | D9 = 0.2174 | | |
| R10 = | 1.9545 | D10 = 0.2391 | N6 = 1.84666 | ν6 = 3.8 |
| R11 = | 7.0798 | D11 = Variable | | |
| R12 = | (Stop) | D12 = 0.2400 | | |
| R13 = | Aspheric | D13 = 0.6304 | N7 = 1.58313 | ν7 = 59.4 |
| R14 = | –14.1577 | D14 = Variable | | |
| R15 = | 1.9870 | D15 = 0.1087 | N8 = 1.84666 | ν8 = 23.8 |
| R16 = | 0.9927 | D16 = 0.0283 | | |
| R17 = | Aspheric | D17 = 0.7609 | N9 = 1.58313 | ν9 = 59.4 |
| R18 = | Aspheric | D18 = Variable | | |

-continued

| | | | |
|---|---|---|---|
| R19 = | −2.8966 | D19 = 0.1304 | N10 = 1.83400 | ν10 = 37.2 |
| R20 = | −29.9496 | D20 = 0.5000 | | |
| R21 = | ∞ | D21 = 0.8696 | N11 = 1.51633 | ν11 = 64.1 |
| R22 = | ∞ | | | |

| Variable | Focal Length | | |
|---|---|---|---|
| Separation | 1.00 | 2.90 | 7.79 |
| D5 | 0.16 | 1.41 | 2.14 |
| D11 | 2.24 | 0.99 | 0.26 |
| D14 | 0.68 | 0.32 | 0.68 |
| D18 | 0.39 | 0.74 | 0.38 |

R13: Aspheric Surface $R_0$ = 1.52137    K = −2.99301D−01    B = −2.52283D−02
C = −8.96295D−03    D = −3.54838D−03    E = 3.15122D−03

R17: Aspheric Surface $R_0$ = 1.04193    K = −2.81863D−01    B = −1.56598D−02
C = 3.22462D−02    D = 6.44363D−02    E = −5.41075D−02

R18: Aspheric Surface $R_0$ = −2.52232    K = −5.37213D+00    B = −3.74260D−02
C = 2.30585D−02    D = −2.67079D−03    E = −1.44925D−01

Numerical Example 32:
F = 1–7.80    FNO = 1:1.86–2.55    2ω = 58.2°–8.2°

| | | | | |
|---|---|---|---|---|
| R1 = | 6.8897 | D1 = 0.1932 | N1 = 1.80518 | ν1 = 25.4 |
| R2 = | 2.9456 | D2 = 0.8977 | N2 = 1.60311 | ν2 = 60.7 |
| R3 = | −61.6571 | D3 = 0.0341 | | |
| R4 = | 2.8150 | D4 = 0.5227 | N3 = 1.77250 | ν3 = 49.6 |
| R5 = | 9.4706 | D5 = Variable | | |
| R6 = | 6.4358 | D6 = 0.1136 | N4 = 1.80400 | ν4 = 49.6 |
| R7 = | 1.0032 | D7 = 0.3636 | | |
| R8 = | −1.8795 | D8 = 0.1136 | N5 = 1.69680 | ν5 = 55.5 |
| R9 = | 1.4444 | D9 = 0.2045 | | |
| R10 = | 1.9168 | D10 = 0.2386 | N6 = 1.84666 | ν6 = 23.8 |
| R11 = | 7.6532 | D11 = Variable | | |
| R12 = | (Stop) | D12 = 0.2500 | | |
| R13 = | Aspheric | D13 = 0.6477 | N7 = 1.58313 | ν7 = 59.4 |
| R14 = | −19.2196 | D14 = Variable | | |
| R15 = | 1.9545 | D15 = 0.1136 | N8 = 1.84666 | ν8 = 23.8 |
| R16 = | 0.9991 | D16 = 0.0295 | | |
| R17 = | Aspheric | D17 = 0.7727 | N9 = 1.60311 | ν9 = 60.7 |
| R18 = | Aspheric | D18 = Variable | | |
| R19 = | −4.1195 | D19 = 0.1364 | N10 = 1.80100 | ν10 = 35.0 |
| R20 = | 12.8651 | D20 = 0.5227 | | |
| R21 = | ∞ | D21 = 0.9091 | N11 = 1.51633 | ν11 = 64.2 |
| R22 = | ∞ | | | |

| Variable | Focal Length | | |
|---|---|---|---|
| Separation | 1.00 | 2.90 | 7.80 |
| D5 | 0.17 | 1.42 | 2.16 |
| D11 | 2.26 | 1.01 | 0.27 |
| D14 | 0.71 | 0.37 | 0.71 |
| D18 | 0.39 | 0.72 | 0.38 |

R13: Aspheric Surface $R_0$ = 1.58153    K = −2.84974D−01    B = −2.23352D−02
C = −8.54922D−03    D = −3.41060D−03    E = 3.09926D−03

R17: Aspheric Surface $R_0$ = 1.05683    K = −2.62806D−01    B = −9.71989D−03
C = 1.79110D−02    D = 6.49206D−02    E = −1.73419D−02

R18: Aspheric Surface $R_0$ = −2.62575    K = −4.95403D+00    B = −2.42624D−02
C = 8.41309D−03    D = 1.40425D−02    E = −1.21634D−01

TABLE 4

| Condition | Numerical Example | | |
|---|---|---|---|
| | 30 | 31 | 32 |
| $f_5/f_2$ | 1.478 | 1.612 | 1.531 |
| $\beta_5$ | 1.408 | 1.366 | 1.362 |
| $1/R_{II3}-1/R_{II2}$ | 1.304 | 1.268 | 1.251 |
| $R_{II4}/f_2$ | 0.239 | 0.267 | 0.250 |

As has been described above, according to the invention, particularly for the second and fourth lens units, the above-described conditions are set forth. The fourth lens unit is then made movable for focusing and the second lens unit is made to employ the proper design rules. In such a manner, an advance in the compactness of the entire lens system is achieved. With this, arrangement the zoom ratio is increased to 8 to 10 or thereabout. Throughout the entirety of such a wide zooming range, good correction of aberrations is maintained. Moreover, the variation of aberrations with focusing is also minimized. Thus, the invention makes it possible to achieve a zoom lens of the rear focus type having a high optical performance at a large relative aperture of 1.8 or thereabout in F-number.

What is claimed is:

1. A zoom lens comprising, along an optical axis in order from an object side, at least a first lens unit having a positive refractive power, a second lens unit having a negative refractive power, a third lens unit having a positive refractive power and a fourth lens unit having a positive refractive power, said second lens unit comprising, in order from the object side, a negative first lens having a strong concave surface facing an image side, a negative second lens of bi-concave form and a positive third lens having a strong convex surface facing the object side, wherein all of the lenses of said second lens unit are uncemented, and said first lens unit and said third lens unit remain stationary, as zooming is performed by moving said second lens unit and said fourth lens unit along the optical axis.

2. A zoom lens according to claim 1, satisfying the following condition:

$$0.42 < (1/R_{II3} - 1/R_{II2})f_2 < 1.89$$

where $R_{II2}$ and $R_{II3}$ are the radii of curvature of a rear surface of said negative first lens and a front surface of negative second lens, respectively, and $f_2$ is the focal length of said second lens unit.

3. A zoom lens according to claim 1, satisfying the following condition:

$$\bar{N}_{IIU} > 1.6$$

where $\bar{N}_{IIU}$ is the mean refractive index of said negative first lens and said negative second lens.

4. A zoom lens according to claim 1, satisfying the following condition:

$$0.10 < |D_{II4}/f_2| < 0.83$$

where $D_{II4}$ is an air separation between said negative second lens and said positive third lens, and $f_2$ is the focal length of said second lens unit.

5. A zoom lens according to claim 1, satisfying the following condition:

$$0.39 < R_{II5}/R_{II4} < 0.92$$

where $R_{II4}$ and $R_{II5}$ are the radii of curvature of a rear surface of said negative second lens and a front surface of said positive third lens, respectively.

6. A zoom lens according to claim 1, satisfying the following condition:

$$3.1 < R_{IIF}/f_2 < 12.9$$

where $R_{IIF}$ is the radius of curvature of a frontmost surface of said second lens unit, and $f_2$ is the focal length of said second lens unit.

7. A zoom lens according to claim 1, satisfying the following condition:

$$0.9 < R_{IL}/f_1 < 2.7$$

where $R_{IL}$ is the radius of curvature of a rearmost surface of said first lens unit, and $f_1$ is the focal length of said first lens unit.

8. A zoom lens according to claim 1, satisfying the following conditions:

$$0.1 < |DA/f_2| < 0.5$$

$$1.2 < RB/RA < 2$$

where DA is an air separation between said negative second lens and said positive third lens, RA and RB are the radii of curvature of a rear surface of said negative second lens and a front surface of said positive third lens, respectively, and $f_2$ is the focal length of said second lens unit.

9. A zoom lens according to claim 1, further comprising a fifth lens unit having a negative refractive power arranged on the image side of said fourth lens unit.

10. A zoom lens according to claim 9, satisfying the following conditions:

$$0.8 < |f_5/f_3|51 < 2.20$$

$$1.2 < \beta_5 < 1.6$$

where $f_3$ and $f_5$ are the focal lengths of said third lens unit and said fifth lens unit, respectively, and $\beta_5$ is the magnification of said fifth lens unit.

11. A zoom lens according to claim 9, satisfying the following condition:

$$0.10 < |D_{II4}/f_2| < 0.45$$

where $D_{II4}$ is an air separation between said negative second lens and said positive third lens, and $f_2$ is the focal length of said second lens unit.

12. A zoom lens comprising, along an optical axis, in order from an object side:

a first lens unit having a positive refractive power;

a second lens unit having a negative refractive power;

a third lens unit having a positive refractive power; and a fourth lens unit having a positive refractive power, wherein said second lens unit consists of, in order from the object side, a negative first lens, an air space, a negative second lens, an air space, and a positive third lens, and wherein said first lens unit and said third lens unit remain stationary, and wherein zooming is performed by moving said second lens unit and said fourth lens unit along the optical axis.

13. A zoom lens according to claim 12, satisfying the following condition:

$$0.42 < (1/R_{II3} - 1/R_{II2})f_2 < 1.89$$

where $R_{II2}$ and $R_{II3}$ are the radii of curvature of a rear surface of said negative first lens and a front surface of said negative second lens, respectively, and $f_2$ is the focal length of said second lens unit.

14. A zoom lens according to claim 12, satisfying the following condition:

$$\overline{N}_{IIU} > 1.6$$

where $\overline{N}_{IIU}$ is the mean refractive index of said negative first lens and said negative second lens.

15. A zoom lens according to claim 12, satisfying the following condition:

$$0.10 < |D_{II4}/f_2| < 0.83$$

where $D_{II4}$ is an air separation between said negative second lens and said positive third lens, and $f_2$ is the focal length of said second lens unit.

16. A zoom lens according to claim 12, satisfying the following condition:

$$0.39 < R_{II5}/R_{II4} < 0.92$$

where $R_{II4}$ and $R_{II5}$ are the radii of curvature of a rear surface of said negative second lens and a front surface of said positive third lens, respectively.

17. A zoom lens according to claim 12, satisfying the following condition:

$$3.1 < R_{IIF}/f_2 < 12.9$$

where $R_{IIF}$ is the radius of curvature of a frontmost surface of said second lens unit, and $f_2$ is the focal length of said second lens unit.

18. A zoom lens according to claim 12, satisfying the following condition:

$$0.9 < R_{IL}/f_1 < 2.7$$

where $R_{IL}$ is the radius of curvature of a rearmost surface of said first lens unit, and $f_1$ is the focal length of said first lens unit.

19. A zoom lens according to claim 12, satisfying the following conditions:

$$0.1 < DA/f_2 < 0.5$$

$$1.2 < RB/RA < 2$$

where DA is an air separation between said negative second lens and said positive third lens, RA and RB are the radii of curvature of a rear surface of said negative second lens and a front surface of said positive third lens, respectively, and $f_2$ is the focal length of said second lens unit.

20. A zoom lens according to claim 12, further comprising a fifth lens unit having a negative refractive power arranged on the image side of said fourth lens unit.

21. A zoom lens according to claim 19, satisfying the following conditions:

$$0.8 < |f_5/f_3| < 2.20$$

$$1.2 < \beta_5 < 1.6$$

where $f_3$ and $f_5$ are the focal lengths of said third lens unit and said fifth lens unit, respectively, and $\beta_5$ is the magnification of said fifth lens unit.

22. A zoom lens according to claim 19, satisfying the following condition:

$$0.10 < |D_{II4}/f_2| < 0.45$$

where $D_{II4}$ is an air separation between said negative second lens and said positive third lens, and $f_2$ is the focal length of said second lens unit.

23. A zoom lens, along an optical axis, in order from an object side, comprising:

a first lens unit having a positive refractive power;

a second lens unit having a negative refractive power;

a third lens unit having a positive refractive power; and a fourth lens unit having a positive refractive power, wherein said second lens unit comprises, in order from the object side, a negative first lens, an air space, a negative second lens, an air space, and a positive third lens, and wherein zooming is performed by moving said second lens unit and said fourth lens unit along the optical axis, and focusing is performed by said fourth lens unit.

24. A zoom lens according to claim 23, wherein said first lens unit and said third lens unit are stationary.

25. A zoom lens according to claim 23, satisfying the following condition:

$$0.42 < (1/R_{II3} - 1/R_{II2})f_2 < 1.89,$$

where $R_{II2}$ and $R_{II3}$ are the radii of curvature of a rear surface of said negative first lens and a front surface of said negative second lens, respectively, and $f_2$ is the focal length of said second lens unit.

26. A zoom lens according to claim 23, satisfying the following condition:

$$\overline{N}_{IIU} > 1.6,$$

where $\overline{N}_{IIU}$ is the mean refractive index of said negative first lens and said negative second lens.

27. A zoom lens according to claim 23, satisfying the following condition:

$$0.10 < |D_{II4}/f_2| < 0.83,$$

where $D_{II4}$ is an air separation between said negative second lens and said positive third lens, and $f_2$ is the focal length of said second lens unit.

28. A zoom lens according to claim 23, satisfying the following condition:

$$0.39 < R_{II5}/R_{II4} < 0.92,$$

where $R_{II4}$ and $R_{II5}$ are the radii of curvature of a rear surface of said negative second lens and a front surface of said positive third lens, respectively.

29. A zoom lens according to claim 23, satisfying the following condition:

$$3.1 < R_{IIF}/f_2 < 12.9,$$

where $R_{IIF}$ is the radius of curvature of a frontmost surface of said second lens unit, and $f_2$ is the focal length of said second lens unit.

30. A zoom lens according to claim 23, satisfying the following condition:

$$0.9 < R_{IL}/f_1 < 2.7,$$

where $R_{IL}$ is the radius of curvature of a rearmost surface of said first lens unit, and $f_1$ is the focal length of said first lens unit.

31. A zoom lens according to claim 23, satisfying the following conditions:

$$0.1 < DA/f_2 < 0.5$$

$$1.2 < RB/RA < 2,$$

where DA is an air separation between said negative second lens and said positive third lens, RA and RB are the radii of curvature of a rear surface of said negative second lens and a front surface of said positive third lens, respectively, and $f_2$ is the focal length of said second lens unit.

32. A zoom lens according to claim 23, further comprising a fifth lens unit having a negative refractive power arranged on the image side of said fourth lens unit.

33. A zoom lens according to claim 31, satisfying the following conditions:

$$0.8<|f_5/f_3|<2.20$$

$$1.2<\beta 5<1.6,$$

where $f_3$ and $f_5$ are the focal lengths of said third lens unit and said fifth lens unit, respectively, and $\beta_5$ is the magnification of said fifth lens unit.

34. A zoom lens according to claim 31, satisfying the following condition:

$$0.10<|D_{II4}/f_2|<0.45,$$

where $D_{II4}$ is an air separation between said negative second lens and said positive third lens, and $f_2$ is the focal length of said second lens unit.

* * * * *

UNITED STATES PATENT AND TRADEMARK OFFICE
CERTIFICATE OF CORRECTION

PATENT NO.  : 5,638,216
DATED       : June 10, 1997
INVENTOR(S) : AKIHISA HORIUCHI, ET AL.

It is certified that error appears in the above-identified patent and that said Letters Patent is hereby corrected as shown below:

COLUMN 17

Line 11 (Numerical Example 8), "R13" should read --*R13--.

COLUMN 21

Line 46, "39((C)." should read --39(C).--.

COLUMN 24

Line 15, "zooming" should read --zooming,--.

COLUMN 35

Line 3 (Numerical Example 22), "D21 = 08 8 50" should read --D21 = 0.8850--; and
   Line 59 (Table 1), "5.96 3.86 11.65 5.57" should read --5.90 5.96 3.86 11.65 5.57--.

UNITED STATES PATENT AND TRADEMARK OFFICE
CERTIFICATE OF CORRECTION

PATENT NO. : 5,638,216
DATED : June 10, 1997
INVENTOR(S) : AKIHISA HORIUCHI, ET AL.

It is certified that error appears in the above-identified patent and that said Letters Patent is hereby corrected as shown below:

COLUMN 52

Line 32, "$0.8<|f_5/f_351<2.20$" should read --$0.8 < |f_5/f_3| < 2.20$--.

COLUMN 55

Line 11, "$1.2<\beta5<1.6$" should read --$1.2 < \beta_5 < 1.6$--.

Signed and Sealed this

Twenty-eighth Day of April, 1998

*Attest:*

BRUCE LEHMAN

*Attesting Officer*   *Commissioner of Patents and Trademarks*